US012098589B2

(12) United States Patent
Whittemore

(10) Patent No.: US 12,098,589 B2
(45) Date of Patent: Sep. 24, 2024

(54) SELF-CLOSING ENTRYWAY FOR DOOR-FRAME

(71) Applicant: Zipwall, LLC, Arlington, MA (US)

(72) Inventor: Jeffrey P. Whittemore, Arlington, MA (US)

(73) Assignee: Zipwall, LLC, Arlington, MA (US)

( * ) Notice: Subject to any disclaimer, the term of this patent is extended or adjusted under 35 U.S.C. 154(b) by 604 days.

(21) Appl. No.: 17/297,139

(22) PCT Filed: Dec. 6, 2019

(86) PCT No.: PCT/US2019/065102
§ 371 (c)(1),
(2) Date: May 26, 2021

(87) PCT Pub. No.: WO2020/118277
PCT Pub. Date: Jun. 11, 2020

(65) Prior Publication Data
US 2022/0081963 A1 Mar. 17, 2022

Related U.S. Application Data

(60) Provisional application No. 62/776,403, filed on Dec. 6, 2018.

(51) Int. Cl.
*E06B 3/80* (2006.01)
*E04G 21/24* (2006.01)
(Continued)

(52) U.S. Cl.
CPC .............. *E06B 3/80* (2013.01); *E04G 21/243* (2013.01); *E05C 19/02* (2013.01); *E06B 5/02* (2013.01)

(58) Field of Classification Search
CPC ........ E06B 3/80; E06B 5/02; E06B 2009/527; E06B 9/52; E04G 21/241; E04G 21/243;
(Continued)

(56) References Cited

U.S. PATENT DOCUMENTS 827,000 A 7/1906 Dinsmore
1,124,829 A * 1/1915 Allen ........................ A47H 1/13 160/DIG. 12
(Continued)

FOREIGN PATENT DOCUMENTS

CN 201977315 9/2011
DE 3918516 12/1990
(Continued)

OTHER PUBLICATIONS

Australian Office Action dated Jun. 16, 2022 issued in related Australian Application No. 2016381274.
(Continued)

*Primary Examiner* — Johnnie A. Shablack
(74) *Attorney, Agent, or Firm* — Onello & Mello, LLP

(57) ABSTRACT

An apparatus for an entry way includes: a sheet of material having a top, a bottom, a left side, and a right side, and a sleeve at the top of the sheet of material. The sheet of material has an opening extending to the bottom of the sheet of material between the left side and the right side of the sheet of material from a position below the sleeve. The opening has a left seam and a right seam, wherein a first magnet is positioned at the left seam of the opening and a second magnet is positioned at the right seam of the opening, wherein the first and second magnets are magnetically coupled. A variable-length cross member has a first end and a second end. The cross member is positioned in the sleeve and includes a first securing mechanism at the first end and
(Continued)

a second securing mechanism at the second end that secure the cross member respectively to body portions of a first vertical pole and a second vertical pole.

18 Claims, 94 Drawing Sheets

(51) Int. Cl.
*E05C 19/02* (2006.01)
*E06B 5/02* (2006.01)

(58) Field of Classification Search
CPC ....... E04G 21/26; E04G 21/30; E04G 21/247; E04G 2021/248; A47H 2201/00; A47H 2201/01
USPC ... 160/327, 351, 352, 354, 130, 135, 174 R, 160/240, 371, 372
See application file for complete search history.

(56) References Cited

U.S. PATENT DOCUMENTS 1,177,274 A 3/1916 Robbins
1,766,324 A 6/1930 Berner
2,219,169 A 10/1940 Alter
2,232,194 A 2/1941 Zogby
2,474,158 A 9/1944 Neely
2,539,703 A 1/1951 Sato
2,816,769 A 12/1957 Noble
2,903,227 A 9/1959 de Kalb Key
2,942,829 A 6/1960 Stiffel
3,072,784 A 1/1963 Mann
3,090,826 A 5/1963 Cochran
3,118,363 A 1/1964 Burgess, Jr.
3,247,558 A 4/1966 Kaufman
3,328,966 A 4/1967 Creuels et al.
3,322,381 A 5/1967 Bubb
3,327,310 A 6/1967 Bethune et al.
3,333,808 A 8/1967 Du Boff
3,350,120 A 10/1967 Hinrichs
3,382,507 A 5/1968 Micheau
3,433,510 A 3/1969 Hulterstrum
3,529,860 A 9/1970 Jelley
3,592,434 A 7/1971 Murray
3,603,098 A 9/1971 Groetschel
3,604,397 A 9/1971 Salerno
3,608,991 A 9/1971 Wade
3,614,045 A * 10/1971 Cegielski, Jr. ........... A47H 1/12 248/262
3,713,643 A 1/1973 Gerstenberger
3,750,739 A * 8/1973 McGuire ................... E06B 3/80 160/354
3,767,253 A 10/1973 Kluetsch
3,792,510 A 2/1974 Evett
3,822,850 A 7/1974 Elias
3,827,019 A 7/1974 Serbu
3,861,663 A 1/1975 Strickland
3,925,858 A 12/1975 Thaeler
3,952,877 A 4/1976 Kindl
3,956,784 A 5/1976 Vargas
3,972,272 A 8/1976 Bagby
4,077,083 A 3/1978 Siemund et al.
4,078,756 A 3/1978 Cross
4,087,006 A 5/1978 Schill
4,111,217 A 9/1978 Victor
4,139,101 A 2/1979 Towfigh
4,277,863 A 7/1981 Faneuf
4,361,914 A 12/1982 Oliver
4,379,654 A 4/1983 Rovelli
4,396,325 A 8/1983 Joice-Cavanagh
4,466,591 A * 8/1984 Alonzo .................. A47H 1/142 248/217.1
4,488,651 A 12/1984 Bishop
4,502,256 A 3/1985 Hahn
4,536,924 A 8/1985 Willoughby
4,576,354 A 3/1986 Blessing, Sr.
4,592,797 A 6/1986 Carlson
4,645,473 A 2/1987 Mochizuki
4,662,034 A 5/1987 Cunningham
4,708,189 A 11/1987 Ward
4,715,089 A 12/1987 Schema
4,717,107 A 1/1988 Servadio
4,770,086 A 9/1988 Gabster
4,794,974 A 1/1989 Melino
4,802,523 A * 2/1989 Scholten ................ A47H 23/02 160/354
4,824,302 A 4/1989 Schultheis et al.
4,852,844 A 8/1989 Villaveces
4,874,028 A 10/1989 Lynch et al.
4,885,876 A 12/1989 Henke
4,889,305 A * 12/1989 Mahan ................... A47H 1/102 248/253
4,907,835 A 3/1990 Salters
4,912,814 A 4/1990 McKenzie
4,926,522 A 5/1990 Wang
4,969,241 A 11/1990 Griffin
4,981,164 A 1/1991 Reichel
5,038,889 A 8/1991 Jankowski
5,040,915 A 8/1991 Stuart et al.
5,056,753 A 10/1991 Unau et al.
5,078,348 A 1/1992 Babitchenko
5,090,469 A * 2/1992 Boulanger ............. A47H 23/01 160/354
5,116,012 A 5/1992 Offenhauer et al.
5,127,460 A * 7/1992 Abadi ....................... E06B 9/40 160/184
5,129,774 A 7/1992 Balseiro et al.
5,148,580 A 9/1992 Dyckow
5,170,974 A 12/1992 Ruggiero
5,240,058 A 8/1993 Ward
5,287,614 A 2/1994 Ehrlich
5,299,773 A 4/1994 Bertrand
5,301,915 A 4/1994 Bahniuk et al.
5,308,280 A 5/1994 Dotson
5,322,403 A 6/1994 Herde
5,323,835 A * 6/1994 Bachmeier .............. E06B 9/521 160/354
5,331,706 A 7/1994 Graham
5,345,989 A 9/1994 Brophy
5,375,303 A 12/1994 Shenier
5,379,491 A 1/1995 Solo
5,384,938 A 1/1995 Frederick
5,388,283 A 2/1995 Garnett
5,404,602 A 4/1995 Kondo
5,469,607 A 11/1995 Henningsson et al.
5,497,537 A 3/1996 Robinson et al.
5,524,689 A * 6/1996 Clark ..................... A47H 13/04 160/349.2
5,524,693 A 6/1996 Hamilton
5,529,326 A 6/1996 Hwang
5,536,229 A 7/1996 Albergo
5,542,209 A 8/1996 Sheu
5,551,115 A 9/1996 Newville
5,555,607 A 9/1996 Parveris
5,558,501 A 9/1996 Wang et al.
5,584,456 A 12/1996 Stephens
5,611,514 A 3/1997 Oliver et al.
5,640,826 A 6/1997 Hurilla, Jr.
5,645,272 A 7/1997 Brennan, Sr.
5,649,780 A 7/1997 Schall
5,666,702 A 9/1997 Ming-Chieh
5,673,741 A 10/1997 Cairns
5,707,032 A 1/1998 Ehrlich
5,715,620 A 2/1998 Walker
5,722,691 A 3/1998 Patel
5,775,400 A * 7/1998 Wilkinson ................ E06B 9/50 160/323.1
5,803,653 A 9/1998 Zuffetti
5,819,474 A * 10/1998 Strom ..................... E04H 15/34 52/63
5,884,424 A 3/1999 Smith
5,897,085 A 4/1999 Cronin

(56) References Cited

U.S. PATENT DOCUMENTS

| | | | | |
|---|---|---|---|---|
| 5,924,469 | A | 7/1999 | Whittemore | |
| 5,937,488 | A | 8/1999 | Geiger | |
| 5,940,942 | A | 8/1999 | Fong | |
| 5,941,434 | A | 8/1999 | Green | |
| 5,941,586 | A | 8/1999 | Fann | |
| 5,979,110 | A | 11/1999 | Tai | |
| 6,067,691 | A | 5/2000 | Feltman | |
| 6,070,640 | A | 6/2000 | Miyagawa et al. | |
| 6,152,434 | A | 11/2000 | Gluck | |
| 6,164,605 | A | 12/2000 | Drake et al. | |
| 6,170,112 | B1 | 1/2001 | Mayfield et al. | |
| 6,209,614 | B1 * | 4/2001 | Smoot | B62D 33/04 160/237 |
| 6,209,615 | B1 | 4/2001 | Whittemore | |
| 6,224,030 | B1 * | 5/2001 | Hepworth | A47G 25/0614 248/215 |
| 6,321,823 | B1 | 11/2001 | Whittemore | |
| 6,341,401 | B1 | 1/2002 | Lin | |
| 6,378,175 | B1 | 4/2002 | Vanderpan | |
| 6,467,741 | B1 | 10/2002 | Shih | |
| 6,474,609 | B1 | 11/2002 | Pinard | |
| 6,490,749 | B1 | 12/2002 | Morad | |
| 6,508,295 | B2 | 1/2003 | Whittemore | |
| 6,523,231 | B1 | 2/2003 | Lassiter | |
| 6,554,237 | B1 * | 4/2003 | Weber | A47H 1/142 248/261 |
| 6,564,512 | B1 | 5/2003 | Whittemore | |
| 6,659,159 | B2 * | 12/2003 | Fritsche | G09F 15/0025 160/371 |
| 6,718,589 | B2 | 4/2004 | Kimbro | |
| 6,942,004 | B2 | 9/2005 | Whittemore | |
| 6,953,076 | B2 | 10/2005 | Whittemore | |
| 6,962,188 | B2 * | 11/2005 | Coenraets | A62C 2/10 160/237 |
| 7,073,758 | B2 | 7/2006 | Whittemore et al. | |
| 7,108,040 | B2 | 9/2006 | Whittemore | |
| 7,154,363 | B2 * | 12/2006 | Hunts | H01F 7/0242 446/92 |
| 7,185,864 | B2 | 3/2007 | Adams | |
| 7,261,140 | B2 | 8/2007 | Whittemore | |
| 7,331,369 | B2 | 2/2008 | Cordova | |
| 7,503,373 | B2 | 3/2009 | Whittemore | |
| 7,533,712 | B2 | 5/2009 | Whittemore et al. | |
| 7,658,219 | B2 | 2/2010 | Whittemore | |
| 7,670,401 | B2 | 3/2010 | Whittemore | |
| 7,717,382 | B2 | 5/2010 | Whittemore et al. | |
| 7,730,932 | B1 * | 6/2010 | Bauer | E06B 9/00 160/369 |
| 7,743,512 | B1 | 6/2010 | Whittemore | |
| 7,841,378 | B2 | 11/2010 | Henning | |
| 7,905,938 | B2 | 3/2011 | Whittemore | |
| 8,066,051 | B2 | 11/2011 | Whittemore | |
| 8,069,546 | B1 | 12/2011 | Whittemore | |
| 8,072,739 | B2 | 12/2011 | Dittmer | |
| 8,113,475 | B2 | 2/2012 | Whittemore et al. | |
| 8,137,426 | B2 | 3/2012 | Whittemore | |
| 8,196,877 | B2 | 6/2012 | Gridley et al. | |
| 8,302,652 | B2 * | 11/2012 | Hirsh | E06B 7/08 160/90 |
| 8,349,047 | B2 | 1/2013 | Whittemore | |
| 8,371,360 | B2 | 2/2013 | Whittemore | |
| 8,591,619 | B2 | 11/2013 | Whittemore | |
| 8,627,873 | B2 | 1/2014 | Whittemore | |
| 8,801,824 | B2 | 8/2014 | Whittemore | |
| 8,857,499 | B2 | 10/2014 | Whittemore | |
| 9,062,466 | B2 | 6/2015 | Glynos | |
| 9,062,468 | B2 | 6/2015 | Behringer | |
| 9,115,539 | B2 | 8/2015 | Whittemore | |
| 9,345,357 | B1 | 5/2016 | Davila, Jr. | |
| 9,387,921 | B1 * | 7/2016 | Hogsette, Jr | B64C 1/1461 |
| 9,440,100 | B2 * | 9/2016 | Lambridis | E06B 9/40 |
| 9,441,392 | B2 | 9/2016 | Whittemore | |
| 9,458,862 | B2 | 10/2016 | Whittemore | |
| D777,901 | S | 1/2017 | Whittemore | |
| 9,591,898 | B2 | 3/2017 | Burkhart-Day | |
| 9,598,873 | B1 * | 3/2017 | Cali | E04G 21/243 |
| 9,657,514 | B1 | 5/2017 | Whittemore | |
| 9,663,962 | B1 | 5/2017 | Whittemore | |
| 9,784,287 | B2 | 10/2017 | Whittemore | |
| 9,903,155 | B1 * | 2/2018 | Wagner | E06B 9/266 |
| 9,969,533 | B1 | 5/2018 | Vargas | |
| 10,077,573 | B1 | 9/2018 | Slaughter | |
| 10,226,107 | B2 | 3/2019 | Burkhart-Day | |
| 10,392,228 | B2 * | 8/2019 | Miller | A47H 1/18 |
| 10,781,597 | B2 * | 9/2020 | Whittemore | E04G 21/26 |
| 10,905,203 | B2 * | 2/2021 | Burkhart-Day | F16B 5/0008 |
| 11,026,534 | B2 * | 6/2021 | Tucker | A47H 1/00 |
| 11,060,319 | B2 * | 7/2021 | Youngblut | E04H 15/58 |
| 11,203,898 | B2 * | 12/2021 | Roberts | E06B 9/52 |
| 11,230,091 | B2 * | 1/2022 | Whittemore | E04G 21/241 |
| 11,598,146 | B2 * | 3/2023 | Conboy | E06B 9/386 |
| 2001/0029640 | A1 | 10/2001 | Cassar | |
| 2002/0092107 | A1 | 7/2002 | Kimbro | |
| 2003/0154588 | A1 | 8/2003 | Blacket et al. | |
| 2004/0006902 | A1 * | 1/2004 | Zarelius | G09F 15/00 40/605 |
| 2004/0011480 | A1 * | 1/2004 | Andre de la Porte | A47H 23/01 160/238 |
| 2004/0065799 | A1 | 4/2004 | Whittemore et al. | |
| 2004/0194418 | A1 | 10/2004 | Gouley | |
| 2004/0200585 | A1 | 10/2004 | Whittemore | |
| 2005/0072886 | A1 | 4/2005 | Adams | |
| 2005/0247414 | A1 | 11/2005 | Whittemore | |
| 2006/0139134 | A1 * | 6/2006 | Hunts | H01F 7/0242 335/205 |
| 2006/0168925 | A1 | 8/2006 | Whittemore | |
| 2006/0272781 | A1 | 12/2006 | Cordova | |
| 2006/0283562 | A1 * | 12/2006 | Hickey | E06B 3/80 160/180 |
| 2007/0102603 | A1 | 5/2007 | Newell | |
| 2007/0125994 | A1 | 6/2007 | Henning | |
| 2008/0250608 | A1 * | 10/2008 | Konecek-Hughes | A47H 15/04 16/96 D |
| 2009/0008039 | A1 * | 1/2009 | Lambridis | E06B 3/80 160/121.1 |
| 2009/0266498 | A1 * | 10/2009 | Cooper | E06B 9/13 24/442 |
| 2009/0278016 | A1 | 11/2009 | Gridley et al. | |
| 2010/0091438 | A1 | 4/2010 | Dittmer | |
| 2010/0115898 | A1 | 5/2010 | Whittemore | |
| 2010/0186300 | A1 * | 7/2010 | Trageser | E04G 21/241 49/506 |
| 2011/0068025 | A1 * | 3/2011 | Whittemore | E06B 5/025 160/368.1 |
| 2011/0126500 | A1 | 6/2011 | Whittemore | |
| 2011/0192522 | A1 | 8/2011 | Whittemore | |
| 2012/0067531 | A1 * | 3/2012 | Ehrsam | H01F 7/0252 160/368.1 |
| 2012/0126569 | A1 | 5/2012 | Disabantonio, III | |
| 2012/0148399 | A1 | 6/2012 | Whittemore | |
| 2012/0234705 | A1 * | 9/2012 | Whittemore | E06B 9/0692 24/302 |
| 2013/0118137 | A1 | 5/2013 | Whittemore | |
| 2013/0284685 | A1 | 10/2013 | Lines-Pinckney | |
| 2014/0047805 | A1 | 2/2014 | Whittemore | |
| 2014/0263916 | A1 | 9/2014 | Behringer | |
| 2014/0341725 | A1 | 11/2014 | Whittemore | |
| 2015/0052843 | A1 | 2/2015 | Whittemore | |
| 2015/0135609 | A1 | 5/2015 | Glynos | |
| 2015/0216267 | A1 | 8/2015 | Burkhart-Day | |
| 2016/0025110 | A1 | 1/2016 | Whittemore | |
| 2016/0356040 | A1 | 12/2016 | Whittemore | |
| 2017/0009473 | A1 | 1/2017 | Whittemore | |
| 2017/0009474 | A1 | 1/2017 | Whittemore | |
| 2017/0020322 | A1 | 1/2017 | Whittemore | |
| 2017/0181506 | A1 | 6/2017 | Burkhart-Day | |
| 2018/0154293 | A1 | 6/2018 | Whittemore | |
| 2018/0291675 | A1 | 10/2018 | Whittemore | |
| 2019/0003193 | A1 | 1/2019 | Whittemore | |
| 2019/0186193 | A1 * | 6/2019 | D'Angelo, Jr. | E06B 9/0692 |
| 2019/0239675 | A1 * | 8/2019 | Northey | A47H 23/01 |

(56) References Cited

U.S. PATENT DOCUMENTS

| | | | | |
|---|---|---|---|---|
| 2020/0170435 A1* | 6/2020 | Hannula | A47H 23/00 |
| 2022/0225813 A1* | 7/2022 | Garfinkel | A47H 23/01 |
| 2023/0167673 A1* | 6/2023 | Benotto | E06B 3/80<br>49/304 |
| 2023/0250691 A1* | 8/2023 | Riddle | E06B 9/521<br>160/349.1 |

FOREIGN PATENT DOCUMENTS

| | | |
|---|---|---|
| DE | 4420849 | 12/1995 |
| DE | 29605222 | 7/1996 |
| FR | 2411282 | 7/1979 |
| GB | 957439 | 5/1964 |
| GB | 1042086 | 9/1966 |
| GB | 2156894 | 10/1985 |
| JP | 5323110 | 3/1978 |
| JP | 3021768 | 3/1996 |
| JP | 2014151011 | 8/2014 |
| KR | 20150000009 | 1/2015 |
| WO | 8603538 | 6/1986 |
| WO | 9109556 | 7/1991 |
| WO | 9427480 | 12/1994 |
| WO | 2017117042 | 7/2017 |

OTHER PUBLICATIONS

Canadian Office Action dated Feb. 13, 2023 issued in related Canadian Application No. 3011207.

International Search Report and Written Opinion dated Jun. 2, 2020 issued in corresponding International Application No. PCT/US2019/065102.

Fastcap, "3rd Hand Magnetic Dust Barrier Door System Overview", Mar. 28, 2013 (online). Retrieved from the Internet on Feb. 19, 2020: https://www.youtube.com/watch?v=WB-L4MuCFJQ, entire document.

"Self-Closing Entryway Partition" Specification, Drawings and Prosecution History of U.S. Appl. No. 16/063,865, filed Jun. 19, 2018, now U.S. Pat. No. 10,781,597, issued Sep. 22, 2020, by Jeffrey P. Whittemore, which is stored in the United States Patent and Trademark Office (USPTO).

Chinese Office Action dated Mar. 4, 2021 issued in corresponding Chinese Application No. 2016800808519, with English translation.

Chinese Office Action dated May 29, 2020 issued in corresponding Chinese Application No. 201680080851.9.

Extended European Search Report dated Aug. 20, 2019 issued in corresponding European Application No. 16882460.5.

International Search Report and Written Opinion dated Apr. 13, 2017 issued in International Application No. PCT/US2016/068493.

International Search Report and Written Opinion dated Jun. 2, 2020 issued in related International Application No. PCT/US2019/065102.

Japanese Office Action dated Feb. 9, 2021 issued in corresponding Japanese Application No. 2018-534112, with machine translation to English.

FastCap, "Fastcap Catalogue 2012", Jan. 24, 2013, pp. 1-64. Retrieved on Aug. 7, 2019 from the internet: https://www.hghhardware.com/ASSETS/DOCUMENTS/ITEMS/EN/83675_brochure-catalog.pdf.

FastCap, "Setting Up Dust Barrier With Dust Door", YouTube, Dec. 19, 2011. Retrieved on Mar. 29, 2017 from the internet: https://www.youtube.com/watch?v=VSy30tXRnHE.

Australian Office Action dated Sep. 30, 2021 issued in corresponding Australian Application No. 2016381274.

"Self-Closing Entryway Partition" Specification, Drawings and Prosecution History of U.S. Appl. No. 16/943,356, filed Jul. 30, 2020, by Jeffrey P. Whittemore, which is stored in the United States Patent and Trademark Office (USPTO).

"Self-Closing Entryway Partition" Specification, Drawings and Prosecution History of U.S. Appl. No. 17/351,494, filed Jun. 18, 2021, by Jeffrey P. Whittemore, which is stored in the United States Patent and Trademark Office (USPTO).

Canadian Office Action dated Dec. 21, 2023 issued in Canadian application No. 3121808.

Canadian Office Action dated Feb. 2, 2024 issued in Canadian Application No. 3011207.

* cited by examiner

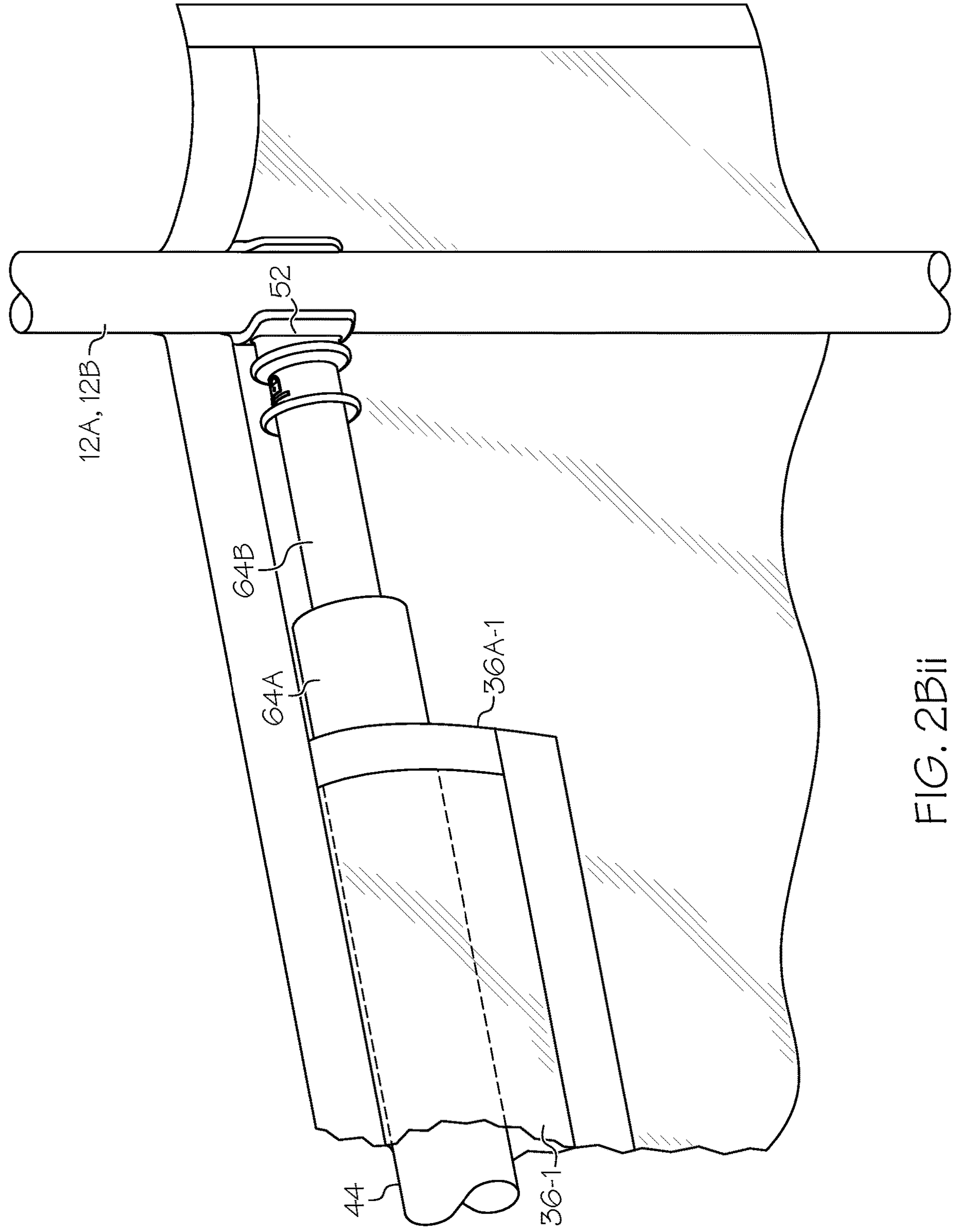
FIG. 2Bii

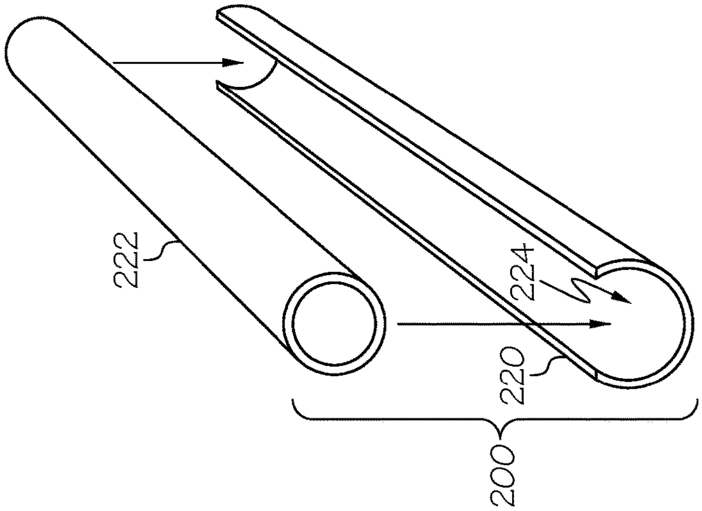
FIG. 15Ai
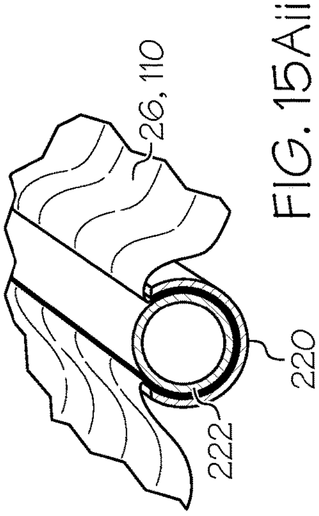
FIG. 15Aii
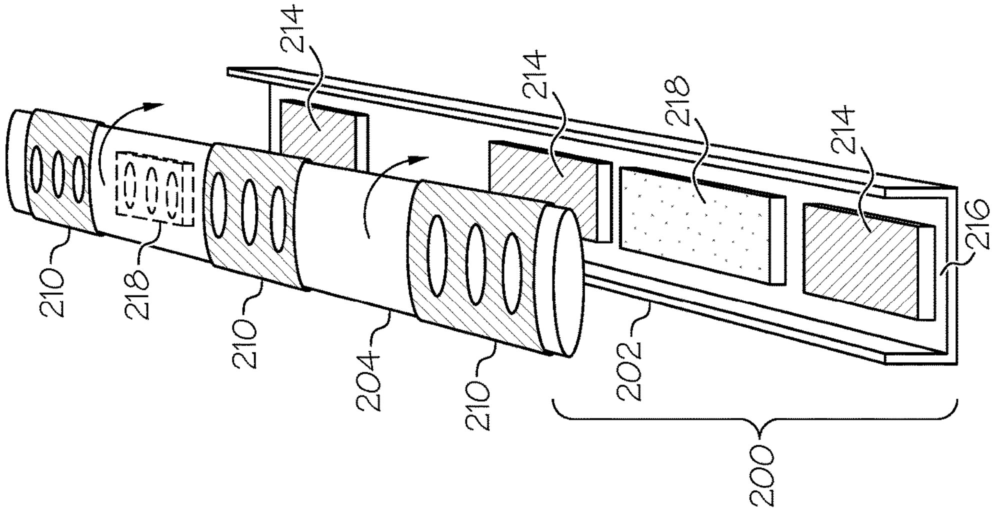
FIG. 15Bi
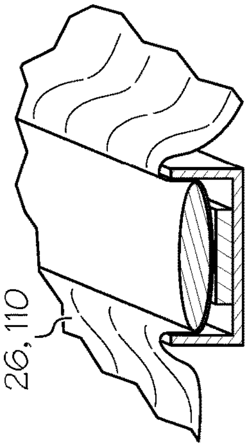
FIG. 15Bii

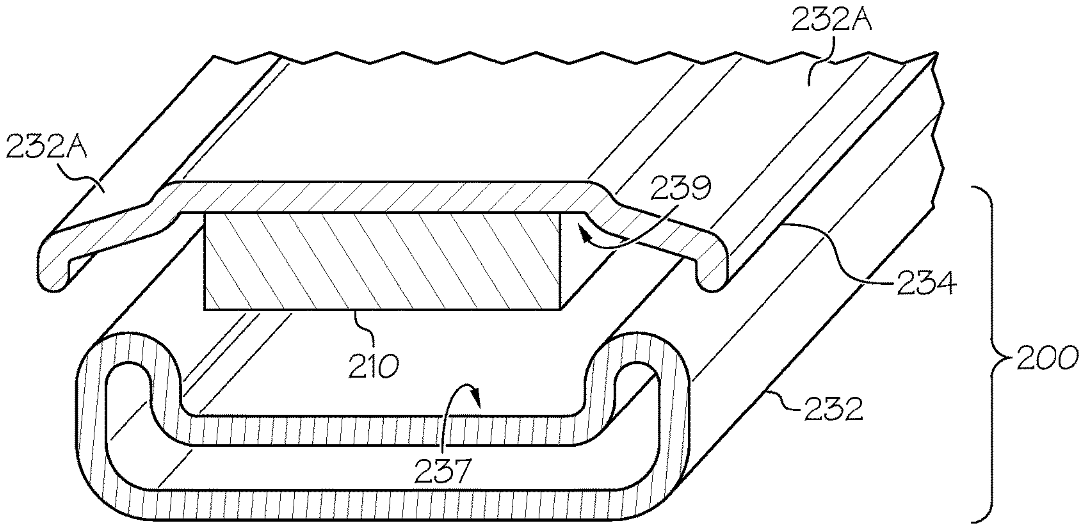
FIG. 15Ci
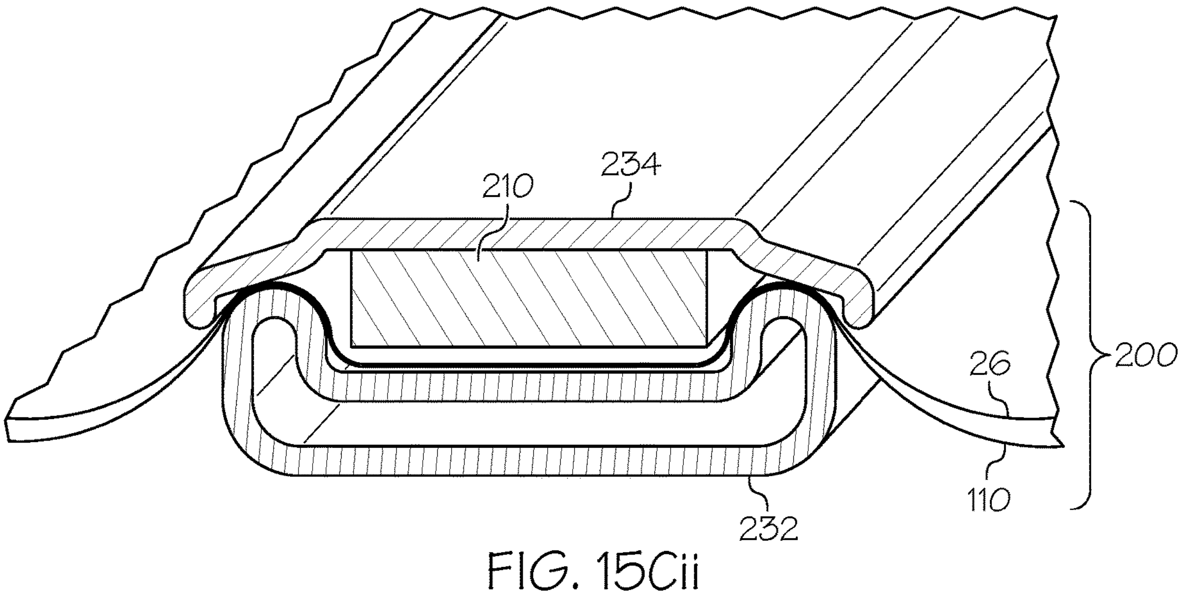
FIG. 15Cii

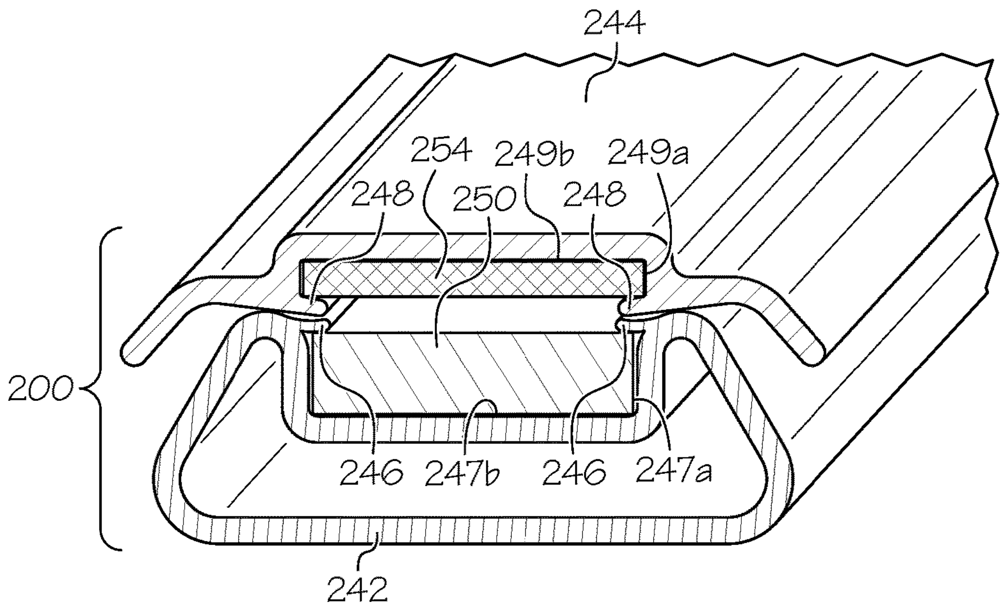
FIG. 15Dii
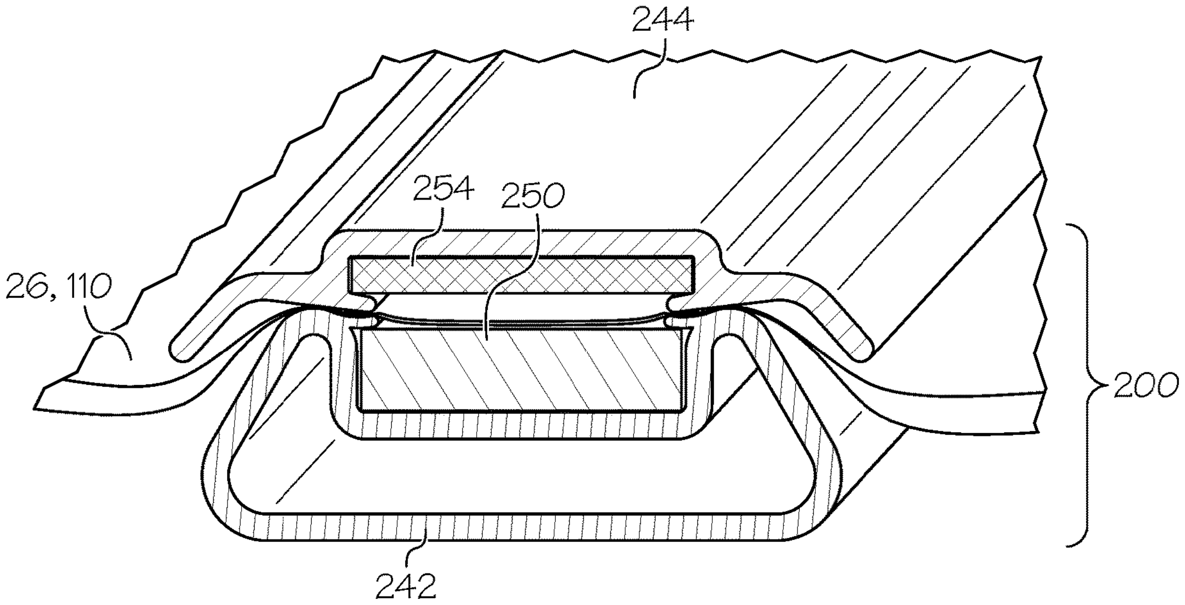
FIG. 15Diii

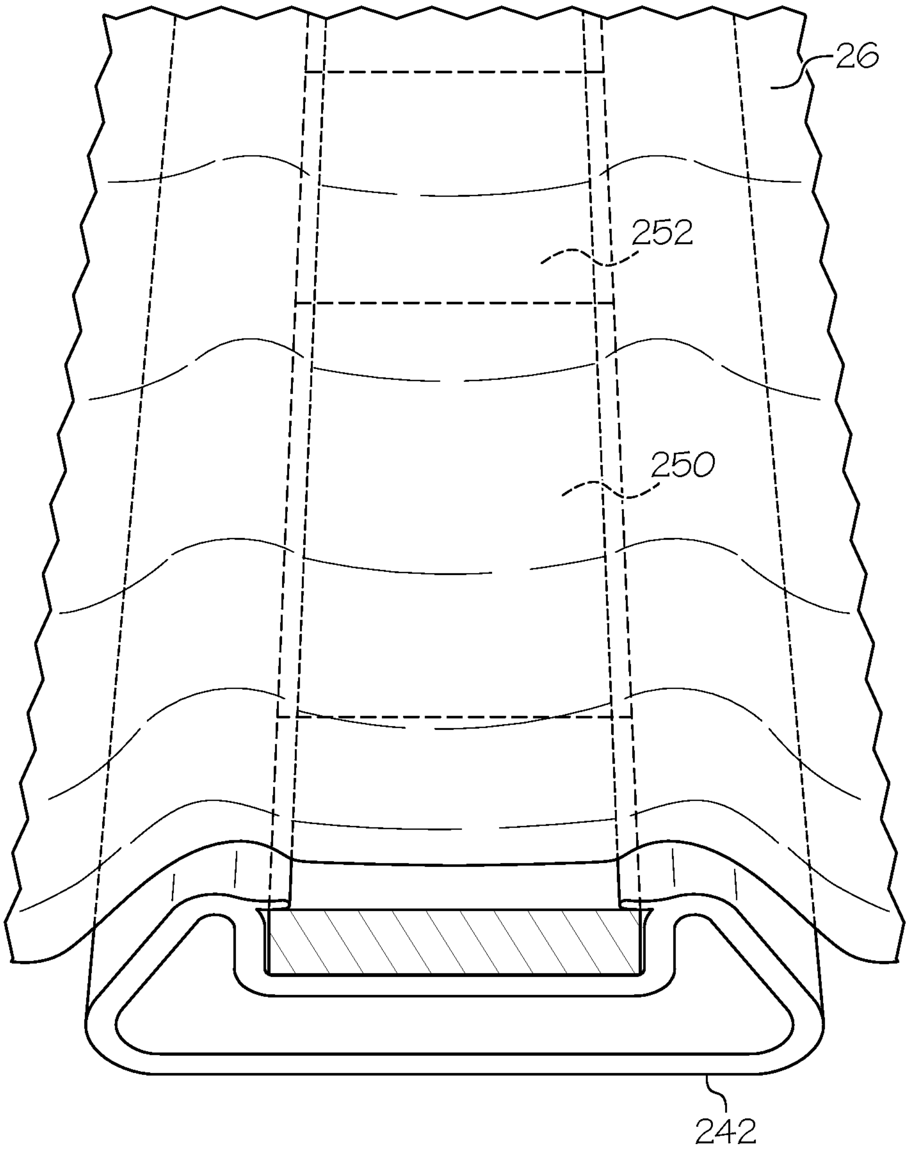
FIG. 15Div

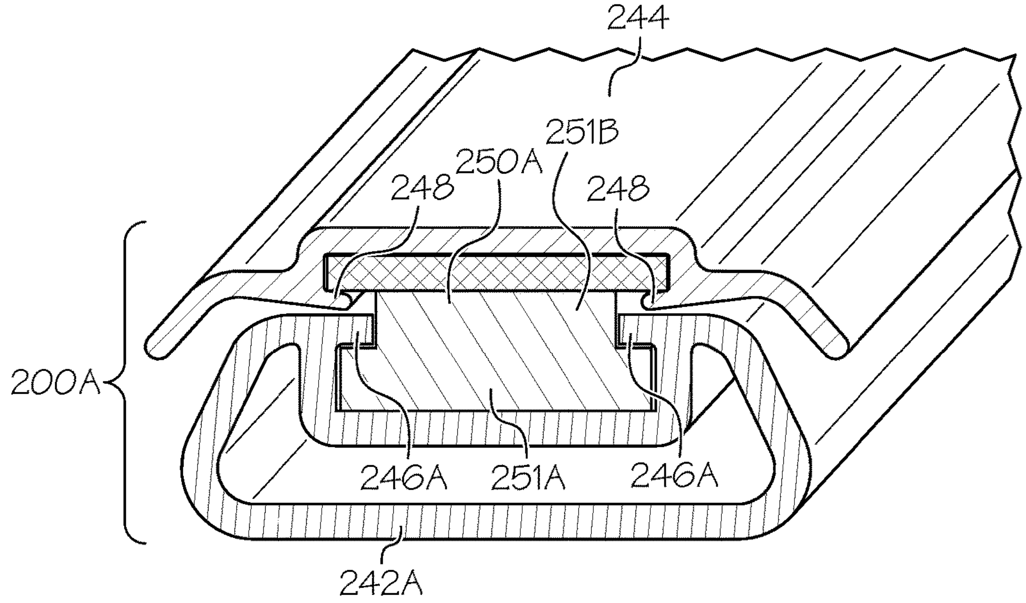
FIG. 15Eii
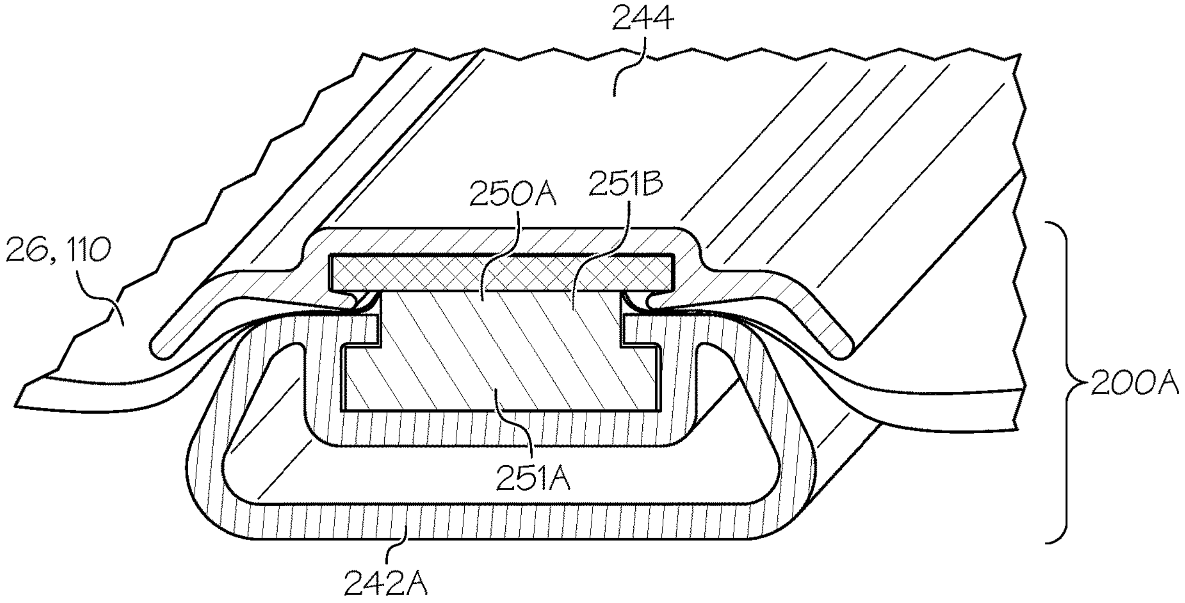
FIG. 15Eiii

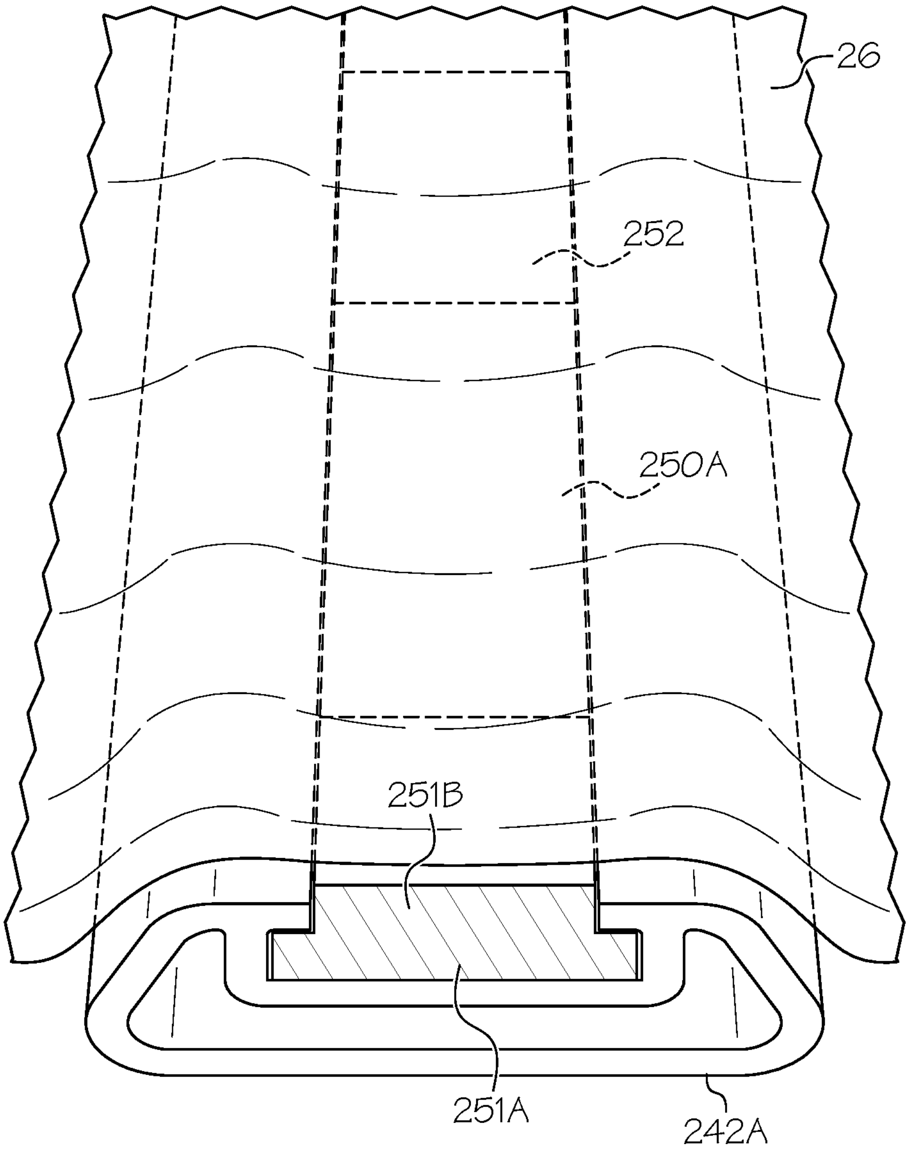
FIG. 15Eiv

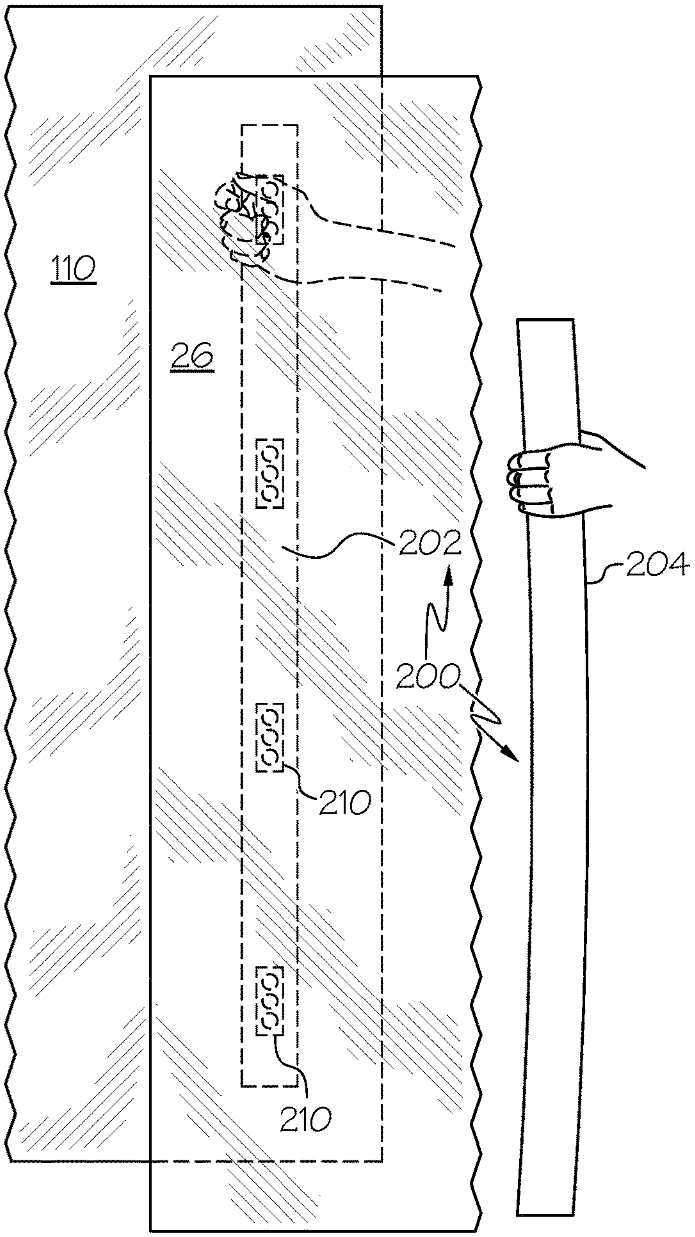
FIG. 16Ai
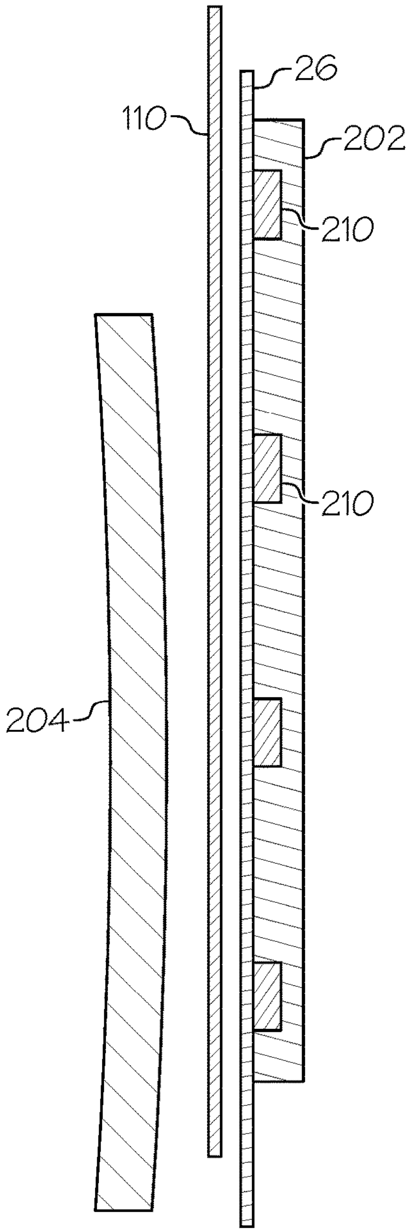
FIG. 16Aii

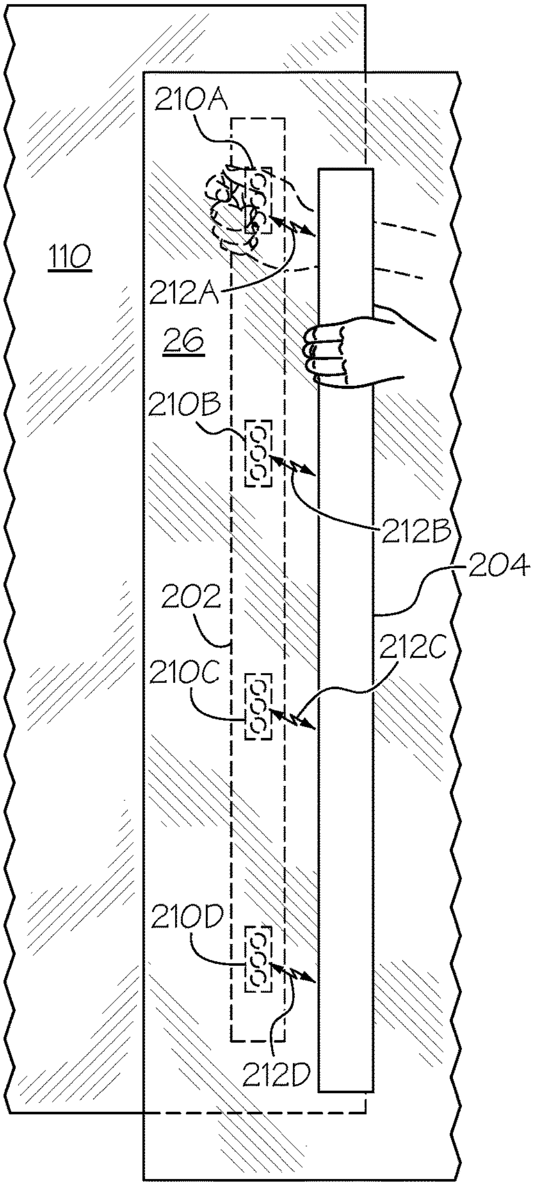
FIG. 16Bi
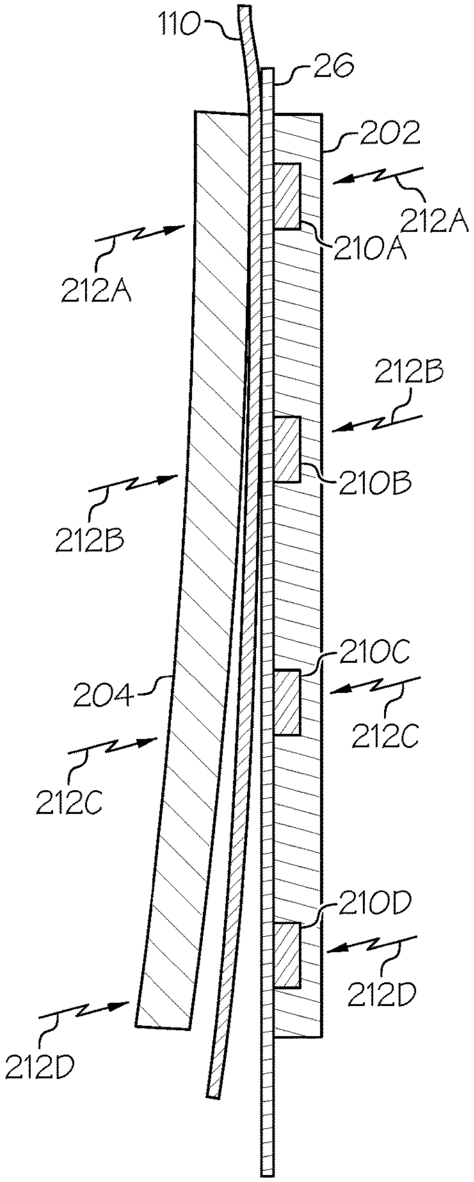
FIG. 16Bii

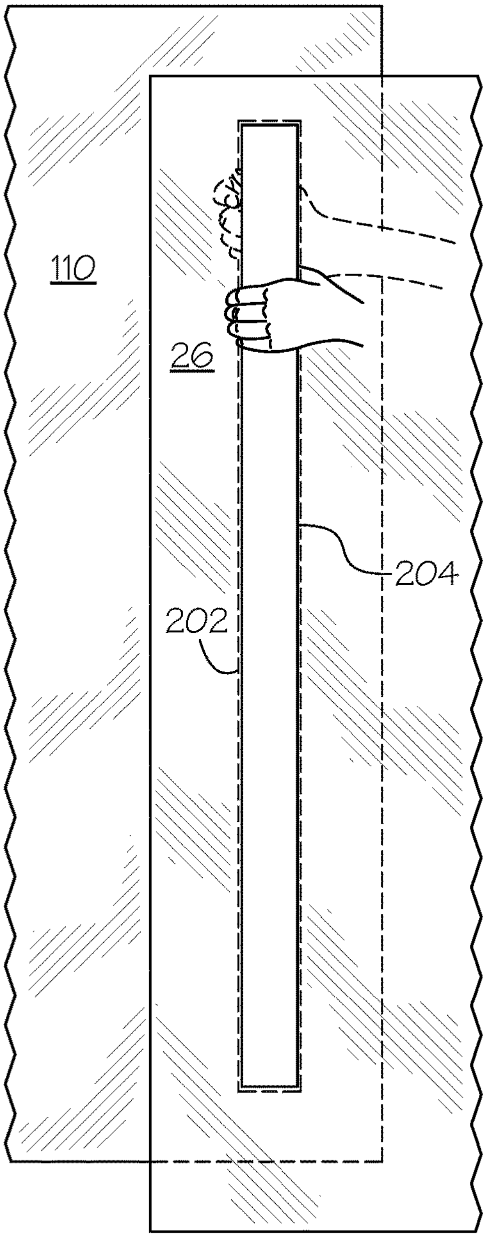
FIG. 16Ci
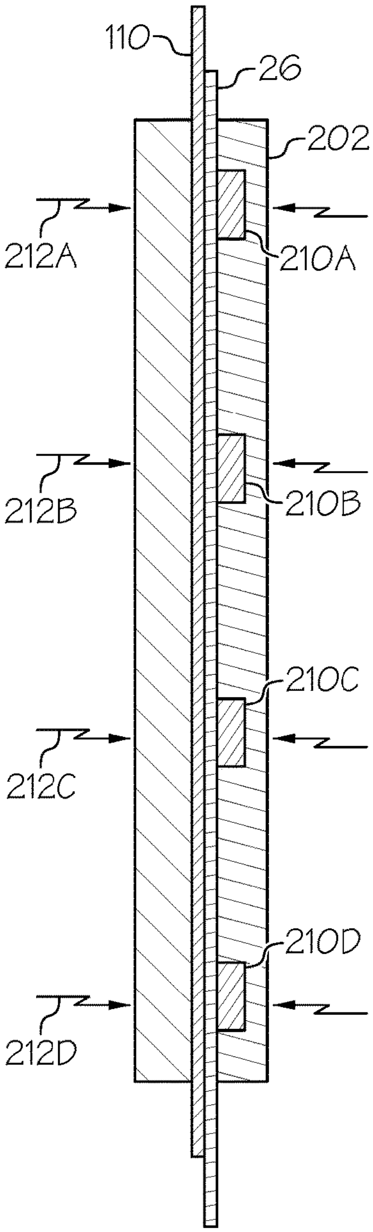
FIG. 16Cii

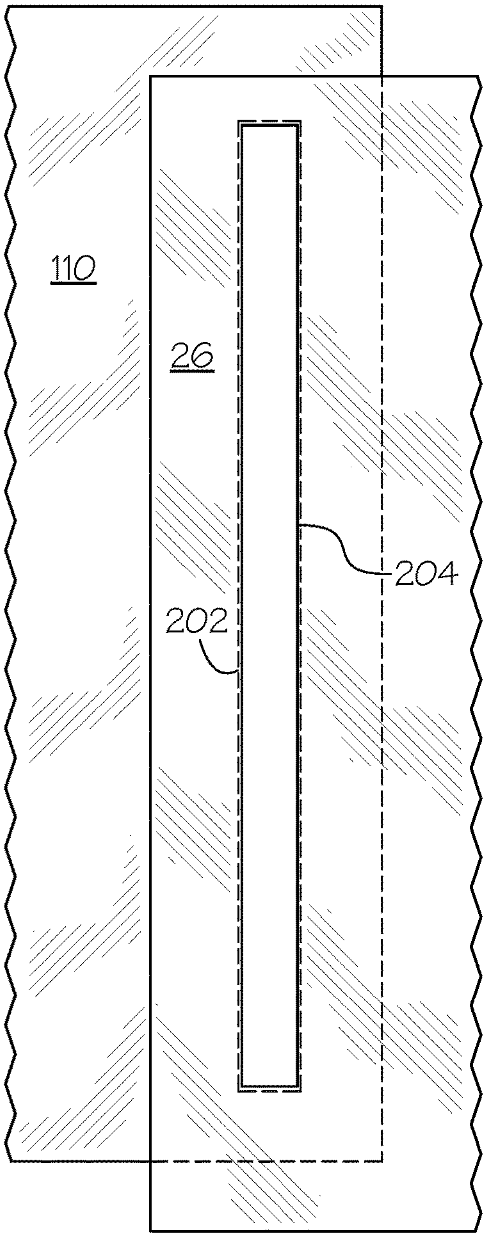
FIG. 16Di
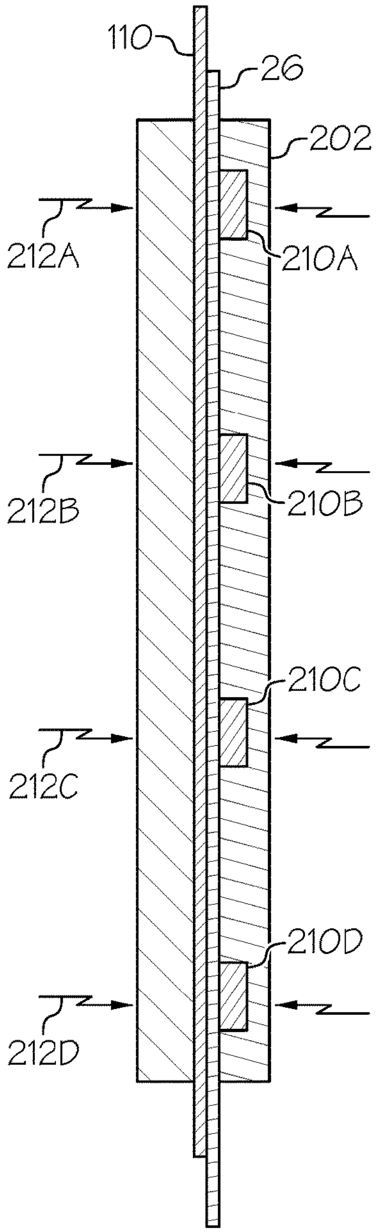
FIG. 16Dii

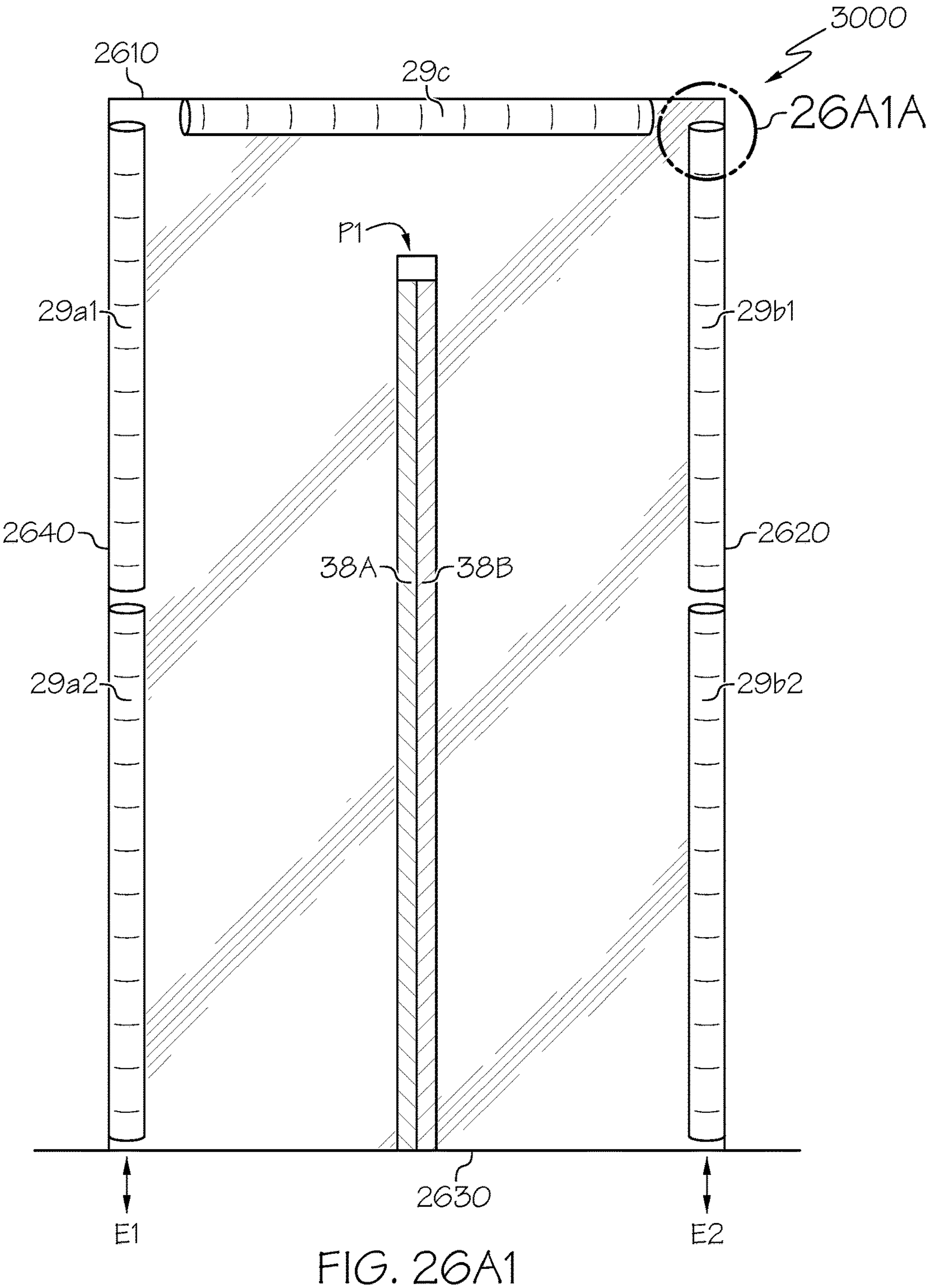
FIG. 26A1
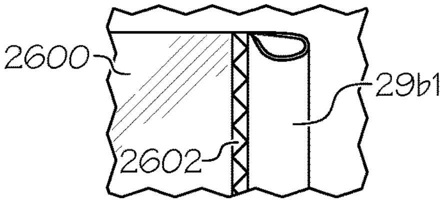
FIG. 26A1A

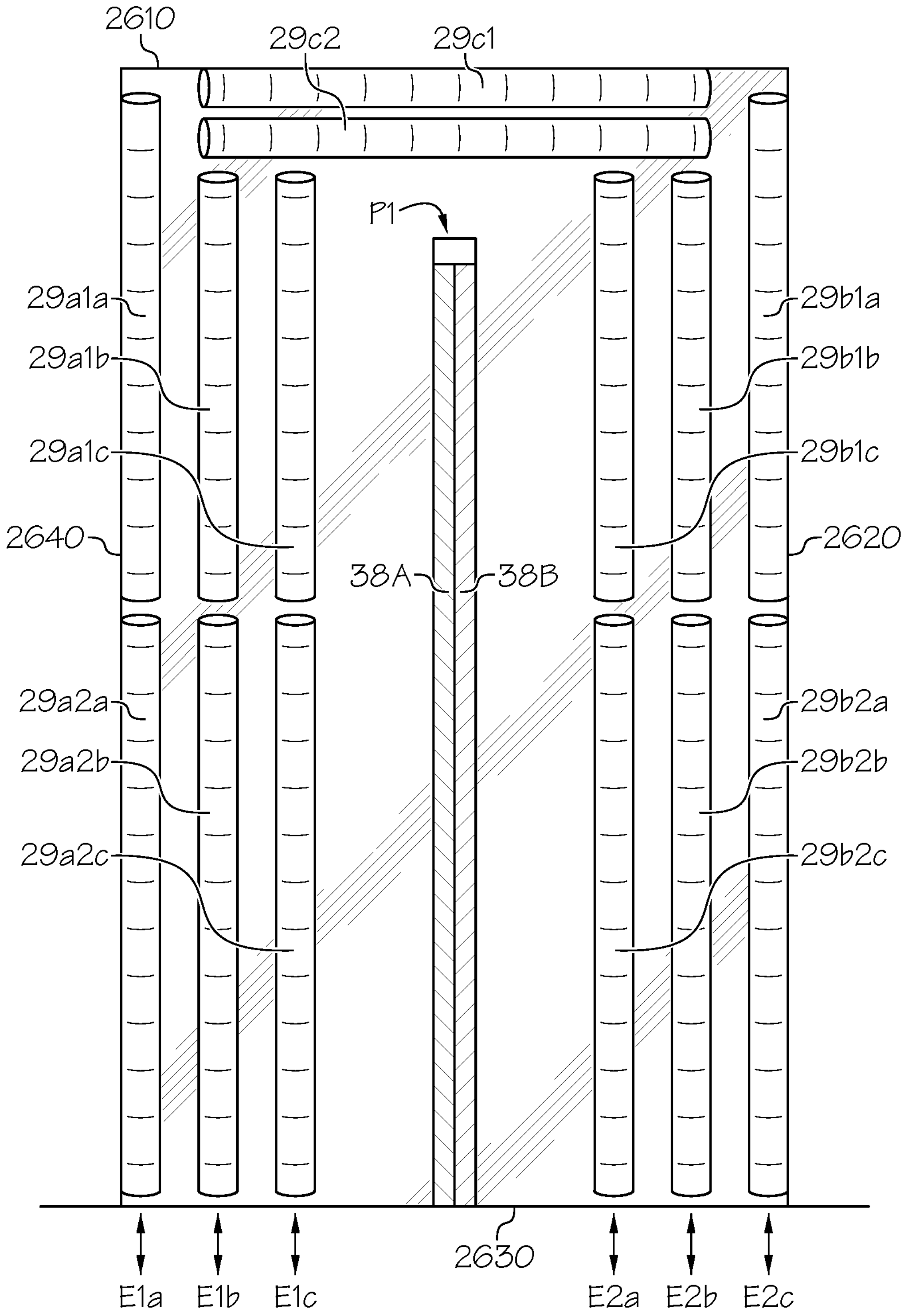
FIG. 26A2

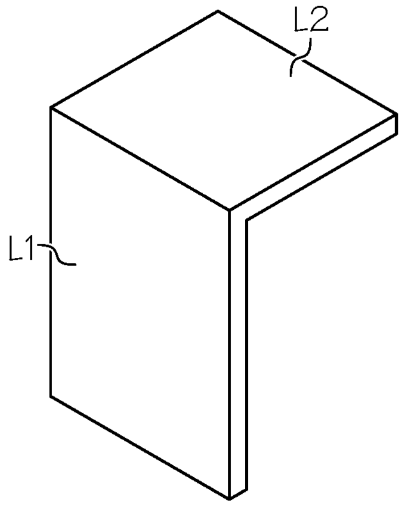
FIG. 35C1
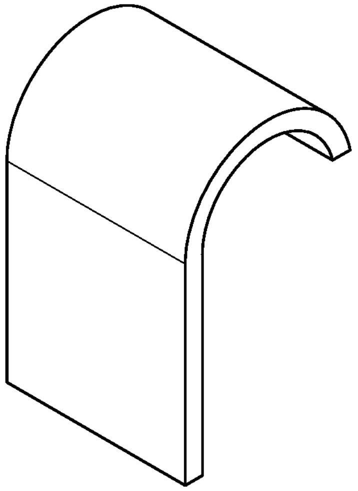
FIG. 35C2
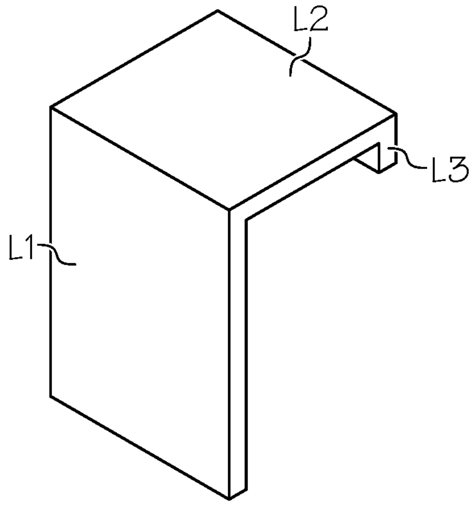
FIG. 35C3
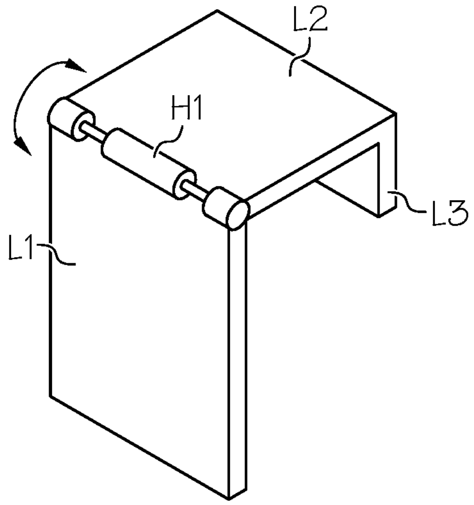
FIG. 35C4

SELF-CLOSING ENTRYWAY FOR DOOR-FRAME

RELATED APPLICATIONS

This application claims the benefit of U.S. Provisional Application Ser. No. 62/776,403, filed Dec. 6, 2018, the content of which is incorporated herein by reference, in its entirety.

This Application is Related to:

U.S. patent application Ser. No. 16/063,865, filed Jun. 19, 2018, published as U.S. Publication Number 2020/0087935, now U.S. Pat. No. 10,781,597, and PCT application Serial Number PCT/US16/068493, filed Dec. 23, 2016, published as PCT Publication No. WO 2017/117,042 on Jul. 6, 2017 the content of each being incorporated herein by reference, in its entirety;

- U.S. Pat. No. 5,924,469, issued on Jul. 20, 1999;
- U.S. Pat. No. 6,564,512, issued on May 20, 2003;
- U.S. Pat. No. 7,073,758, issued on Jul. 11, 2006;
- U.S. Pat. No. 7,533,712, issued on May 19, 2009;
- U.S. Pat. No. 7,658,219, issued on Feb. 9, 2010;
- U.S. Pat. No. 7,670,401, issued on Mar. 2, 2010;
- U.S. Pat. No. 7,743,512, issued on Jun. 29, 2010;
- U.S. Pat. No. 7,717,382, issued on May 18, 2010;
- U.S. Pat. No. 9,115,539, issued on Aug. 25, 2015;
- U.S. Pat. No. 9,657,514, issued on May 23, 2017;
- U.S. Pat. No. 9,663,962, issued on May 30, 2017;
- U.S. patent application Ser. No. 15/203,942, filed on Jul. 7, 2016;
- U.S. patent application Ser. No. 15/170,155, filed on Jun. 1, 2016;
- U.S. patent application Ser. No. 15/216,877, filed on Jul. 22, 2016, issued as U.S. Pat. No. 10,081,955 issued on Sep. 25, 2018; and
- U.S. patent application Ser. No. 15/822,423, filed on Nov. 27, 2017, United States Publication No. 2018-0154293, published Jun. 7, 2018, the content of each being incorporated herein by reference in its entirety.

BACKGROUND

Partition systems are often employed to isolate portions of a building or room, by serving as a barrier to dust, noise, light, odors, and the like. In construction zones, partitions are useful for protecting a clean area from a work area, for example, protecting an area where furniture and rugs are temporarily stored from an area where wood floors are being refinished.

Workers at construction sites often use rudimentary techniques for installing partitions. Some simply nail, screw, or staple the curtain or partition material to the floor, ceiling, and abutting walls, resulting in damage to their surfaces. Others tape, or otherwise adhere, a curtain or plastic sheet to the walls and ceilings. The tape usually fails to stick, but if it does stick, as the tape is removed, paint can pull off with the tape, or adhesive is left behind.

U.S. Pat. Nos. 5,924,469 and 7,658,219, the contents of which are incorporated herein by reference, disclose partition mount systems that address these limitations. Such systems are compatible with a variety of commercially-available curtain or drape materials, for example plastic, cloth, and the like. The disclosed systems are "clean" systems designed to be installed and removed without damaging or otherwise marking the ceiling, floor or walls in the construction zone. Assembly is easy and fast and can be accomplished by a single individual.

In some situations, it is desired to have a defined entryway location for ingress into/egress from a partitioned area. Contemporary entryway mechanisms for such systems can employ a zipper mechanism, such as a zippered doorway. Such systems require an operator to manually un-zip the doorway to permit entry/exit and to re-zip the doorway to re-seal the entryway after entry/exit.

SUMMARY

Embodiments of the present disclosure relate to an apparatus and method for a self-closing partition system.

In an aspect, an apparatus for an entryway comprises: a sheet of material having a top, a bottom, a left side, and a right side, a sleeve at the top of the sheet of material, the sheet of material having an opening extending to the bottom of the sheet of material between the left side and the right side of the sheet of material from a position below the sleeve, the opening having a left seam and a right seam; a first magnet positioned at the left seam of the opening; a second magnet positioned at the right seam of the opening, wherein the first and second magnets are magnetically coupled; and a variable-length cross member having a first end and a second end, the cross member constructed and arranged to positioned in the sleeve, the cross member including a first securing mechanism at the first end and a second securing mechanism at the second end, the first securing mechanism and the second securing mechanism constructed and arranged to secure the cross member to body portions of a first vertical pole and a second vertical pole respectively.

In some embodiments, the variable-length cross member comprises multiple telescoping segments.

In some embodiments, an inner one of the multiple telescoping segments slides within an outer one of the multiple telescoping segments.

In some embodiments, the multiple segments slide so that the length of the variable-length cross-member is freely modifiable and unimpeded by a locking or length-fixing mechanism.

In some embodiments, the multiple segments comprise a first relatively narrow segment and a second relatively wide segment.

In some embodiments, the multiple segments comprise first and second relatively narrow segments and a relatively wide intermediate segment, and the first and second segments telescope at ends of the intermediate segment.

In some embodiments, the multiple segments slide alongside each other.

In some embodiments, the first securing mechanism and second securing mechanism include a quick-coupling mechanism that releasably couples the quick coupling mechanism to an interior of ends the variable-length cross member.

In some embodiments, the quick-coupling mechanism comprises a twist-lock mechanism.

In some embodiments, the first and second securing mechanisms each comprise a C-clip.

In some embodiments, the sheet of material comprises a material selected from a durable material, a ruggedized Nylon material, a Nylon taffeta, a rip-stop material, a synthetic material, a natural fabric material, a plastic material.

In some embodiments, the magnet comprises a plurality of magnets positioned along the left or right seam.

In some embodiments, the magnet comprises an elongated body having a north pole and a south pole.

In some embodiments, the north and south poles of corresponding magnets of corresponding vertical positions of the left and right seams are configured to be opposite so that the magnets attract each other.

In some embodiments, the sleeve extends from the left side to the right side of the sheet of material.

In some embodiments, the sleeve is continuous along its length

In some embodiments, the sleeve comprises a plurality of openings.

In some embodiments, the variable-length cross member has a length that is freely modifiable and unimpeded by a locking or length-fixing mechanism.

In some embodiments, a plurality of weights are positioned along the bottom of the sheet of material.

In another aspect, a method for assembling a hands-free entryway system comprises: identifying a position of a region of a dust partition system including first and second vertical poles, where a hands-free entryway curtain is to be installed, wherein the entryway curtain comprises: a sheet of material having a top, a bottom, a left side, and a right side, the top of the sheet of material including a sleeve, the sheet of material having an opening extending to the bottom of the sheet of material between the left side and the right side of the sheet of material from a position below the sleeve, the opening having a left seam and a right seam; a first magnet positioned at the left seam of the opening; and a second magnet positioned at the right seam of the opening, wherein the first and second magnets are magnetically coupled; mounting a variable-length cross member to a sleeve of an entryway curtain; mounting the variable-length cross member and entryway curtain to side portions of the bodies of the first and second vertical poles; and securing side portions of the entryway curtain to the side portions of the bodies of the first and second vertical poles.

In some embodiments, the method further comprises positioning the cross member at vertical positions on the first and second vertical poles sufficient for human ingress or egress.

In some embodiments, the variable-length cross member has a length that is freely modifiable and unimpeded by a locking or length-fixing mechanism.

In some embodiments, the variable-length cross member comprises multiple telescoping segments.

In some embodiments, an inner one of the multiple telescoping segments slides within an outer one of the multiple telescoping segments.

In some embodiments, the multiple segments slide so that the length of the variable-length cross-member is freely modifiable and unimpeded by a locking or length-fixing mechanism.

In some embodiments, the multiple segments comprise a first relatively narrow segment and a second relatively wide segment.

In some embodiments, the multiple segments comprise first and second relatively narrow segments and a relatively wide intermediate segment, and wherein the first and second segments telescope at ends of the intermediate segment.

In some embodiments, the multiple segments slide alongside each other.

In some embodiments, the mounting of the variable-length cross member to the first and second vertical poles is performed after the first and second vertical poles are installed between a floor and ceiling of a room of a building.

In some embodiments, an apparatus for an entryway comprises: a first strap portion having a longitudinal groove, a first end and a second end, the first strap portion including a left tab and a right tab along the longitudinal groove of the first strap portion and protruding toward the a middle region of the longitudinal groove; first and second spacers positioned in the longitudinal groove of the first strap portion and coupled to the first strap portion; and a magnet positioned in the longitudinal groove of the first strap portion between the first and second spacers.

In some embodiments, the apparatus further comprises: multiple pairs of first and second spacers positioned in the longitudinal groove, the pairs being spaced apart at multiple spaced apart positions; and multiple magnets between each pair of first and second spacers.

In some embodiments, the apparatus further comprises: a second strap portion having a longitudinal groove, a first end and a second end, the second strap portion including a left tab and a right tab along the longitudinal groove and protruding toward the a middle region of the longitudinal groove; first and second spacers positioned in the longitudinal groove of the second strap portion and coupled to the second strap portion; and a metal insert positioned in the longitudinal groove of the second strap portion between the first and second spacers.

In some embodiments, the apparatus further comprises: multiple pairs of first and second spacers positioned in the longitudinal groove of the second strap portion, the pairs being spaced apart at multiple spaced apart positions that correspond with those of the first strap portion; and multiple metal inserts between each pair of first and second spacers.

In an aspect, an apparatus for an entryway, comprises: a sheet of material, comprising: a top edge; a bottom edge; a left edge; a right edge; and an opening extending from a position below the top edge to the bottom edge, the opening comprising a left seam and a right seam.

In some embodiments, the apparatus further comprises a support above the opening.

In some embodiments, the support is coupled to the sheet of material at the top edge.

In some embodiments, the support is coupled to the sheet of material in a region of the sheet of material spaced apart from the top edge.

In some embodiments, the support is coupled to the sheet of material below the top edge.

In some embodiments, the support comprises a hook.

In some embodiments, the hook is arcuate.

In some embodiments, the hook includes first and second legs that are transverse to each other.

In some embodiments, the hook further includes a third leg that is transverse to the second leg.

In some embodiments, the support includes a contact portion, the contact portion extending in a direction transverse to the plane of the sheet of material.

In some embodiments, the support is constructed and arranged to be supported by an upper edge of a door frame in contact with the contact portion.

In some embodiments, the support comprises a base coupled to the sheet of material directly above the opening.

In some embodiments, the base and the contact portion are rigidly coupled to each other.

In some embodiments, the base and the contact portion are hinged relative to each other.

In some embodiments, the contact portion comprises a magnet.

In some embodiments, the support is coupled to an elongated support member positioned above the opening.

In some embodiments, the apparatus further comprises a first strap sleeve positioned at a first side of the opening; and a second strap sleeve positioned at a second side of the opening opposite the first side of the opening, the second strap sleeve spaced apart from and parallel to the first strap sleeve, wherein the first and second strap sleeves are each constructed and arranged to receive an elongated magnetic strap.

In some embodiments, the apparatus further comprises at least one strap portion, wherein each of the at least one strap portion is constructed and arranged to fit in a corresponding one of the first or second strap sleeves.

In some embodiments, at least one of the at least one strap portion comprises a magnet.

In some embodiments, the first and second strap sleeves each extend in a vertical direction, and the first and second strap sleeves are spaced apart from each other in a horizontal direction by a distance corresponding to a width of a standard door frame.

In some embodiments, the distance corresponds to a door frame width between 16 and 48 inches.

In some embodiments, the distance corresponds to a door frame width selected from a group of widths consisting of 16, 18, 20, 22, 24, 26, 28, 30, 32, 34, 36, 38, 40, 42, 44, 46 and 48 inches.

In some embodiments, the first and second strap sleeves are positioned at the left and right edges, respectively, of the sheet of material.

In some embodiments, the first strap sleeve comprises a first portion of the sheet of material at the left edge that is folded back on itself and coupled to a body portion of the sheet of material to form the first strap sleeve; and the second strap sleeve comprises a second portion of the sheet of material at the right edge that is folded back on itself and coupled to a body portion of the sheet of material to form the first strap sleeve.

In some embodiments, the first and second portions at the left and right edges are coupled to the respective body portions of the sheet of material using stitching.

In some embodiments, the first and second portions at the left and right edges are coupled to the respective body portions of the sheet of material using fabric welding, bonding or glue.

In some embodiments, the first and second strap sleeves are positioned spaced apart from the left and right edges, respectively, of the sheet of material.

In some embodiments, the first strap sleeve comprises a plurality of first strap sleeves along a common first axis of extension; the second strap sleeve comprises a plurality of second strap sleeves along a common second axis of extension.

In some embodiments, the plurality of first strap sleeves comprises two first strap sleeves; and the plurality of second strap sleeves comprises two first strap sleeves.

In some embodiments, the first strap sleeve comprises a plurality of first strap sleeves along a respective plurality of first axes of extension, the respective plurality of first axes of extension spaced apart from, and parallel to, each other; the second strap sleeve comprises a plurality of second strap sleeves along a respective plurality of second axes of extension, the respective plurality of second axes of extension spaced apart from, and parallel to, each other.

In some embodiments, the first strap sleeve extends along a first axis of extension.

In some embodiments, the second strap sleeve extends along a second axis of extension, the second axis of extension being parallel to the first axis of extension.

In some embodiments, the apparatus further comprises a third strap sleeve positioned above the opening, the third strap sleeve extending in a third axis of extension, the third axis of extension orthogonal to the first axis of extension and the third axis of extension orthogonal to the second axis of extension.

In some embodiments, the apparatus further comprises at least one strap portion, the at least one strap portion being constructed and arranged to fit in the third strap sleeves.

In some embodiments, at least one of the at least one strap portion comprises a magnet.

In some embodiments, the third strap sleeve is positioned above the bottom edge of the sheet of material at a vertical position corresponding to a height of a standard door frame.

In some embodiments, the vertical position corresponds to a door frame height between 70 and 120 inches.

In some embodiments, the vertical position corresponds to a door frame height selected from a group of heights consisting of a height at or between 70 and 120 inches at one-inch increments.

In some embodiments, the third strap sleeve is positioned at the top edge of the sheet of material.

In some embodiments, the third strap sleeve is positioned spaced apart from the top edge of the sheet of material.

In some embodiments, the third strap sleeve comprises a third portion of the sheet of material at the top edge that is folded back on itself and coupled to a body portion of the sheet of material to form the third strap sleeve.

In some embodiments, the third portion of the sheet of material at the top edge is coupled to the body portion of the sheet of material using stitching.

In some embodiments, the third portion of the sheet of material at the top edge is coupled to the body portion of the sheet of material using fabric welding, bonding or glue.

In some embodiments, the first and second strap sleeves are spaced apart from each other in a horizontal direction by a distance corresponding to a width of a standard door frame, and the third strap sleeve is positioned above the bottom edge of the sheet of material at a vertical position corresponding to a height of a standard door frame.

In some embodiments, the third strap sleeve comprises a plurality of third strap sleeves along the third axis of extension.

In some embodiments, the plurality of third strap sleeves comprises two third strap sleeves.

In some embodiments, the third strap sleeve comprises a plurality of third strap sleeves along a respective plurality of third axes of extension, the respective plurality of third axes of extension spaced apart from, and parallel to, each other.

In some embodiments, the apparatus further comprises: a first magnet positioned at the left seam of the opening; and a second magnet positioned at the right seam of the opening, the first and second magnets being magnetically coupled.

In some embodiments, the apparatus, further comprises: a third magnet positioned at the left seam of the opening; and a fourth magnet positioned at the right seam of the opening, the third and fourth magnets being magnetically coupled.

In some embodiments, the magnitude of the magnetic force between the third magnet and the fourth magnet is greater than the magnitude of the magnetic force between the first magnet and the second magnet.

In some embodiments, the sheet of material comprises at least one window.

In some embodiments, the at least one window is of an area about half an area of the sheet of material.

In some embodiments, the at least one window is of an area less than about half an area of the sheet of material.

In some embodiments, the window is of an area about a whole area of the sheet of material.

In some embodiments, the at least one window comprises a transparent, semi-transparent, translucent, semi-translucent, or opaque material.

In some embodiments, the apparatus further comprises a bottom left extender and a bottom right extender, each constructed and arranged to couple to the sheet of material and extend dimensions of the sheet of material in a region proximal the bottom edge of the sheet of material.

In some embodiments, the sheet of material further comprises one or more stiff regions constructed and arranged to be stiffer than neighboring regions of the sheet of material.

In some embodiments, the stiff region comprises an elongated member coupled to the sheet of material in the stiff region.

In some embodiments, the stiff region comprises an elongated member comprising a batten seated in a stiffening sleeve in turn positioned on the sheet of material.

In some embodiments, the sheet of material comprises a flame-retardant material.

In some embodiments, the sheet of material comprises at least one pocket.

In some embodiments, at least one of the at least one pocket comprises a transparent, semi-transparent, translucent, semi-translucent, or opaque material.

In some embodiments, the opening is parallel to the left edge.

In some embodiments, the opening is parallel to the right edge.

In some embodiments, the opening is perpendicular to the top edge.

In another aspect, an entryway apparatus, comprises: a sheet of material, comprising a top edge; a bottom edge, a left edge; and a right edge, the top edge, bottom edge, left edge, and right edge defining a plane; an opening extending from a position below the top edge to the bottom edge, the opening comprising a left seam and a right seam, a first magnet positioned at the left seam of the opening, and a second magnet positioned at the right seam of the opening, wherein the first and second magnets are magnetically coupled; and a support above the opening, the support including a contact portion, the contact portion extending in a direction transverse to the plane of the sheet of material.

In another aspect, an entryway apparatus, comprises: a sheet of material, comprising: a top edge; a bottom edge, a left edge; and a right edge; an opening extending from a position below the top edge to the bottom edge, the opening comprising a left seam and a right seam; a first strap sleeve positioned at a first side of the opening; and a second strap sleeve positioned at a second side of the opening opposite the first side of the opening, the second strap sleeve spaced apart from and parallel to the first strap sleeve, wherein the first and second strap sleeves are each constructed and arranged to receive an elongated magnetic strap.

In another aspect, an entryway apparatus, comprises: a sheet of material, comprising a top edge; a bottom edge, a left edge; and a right edge, the top edge, bottom edge, left edge, and right edge defining a plane; an opening extending from a position below the top edge to the bottom edge, the opening comprising a left seam and a right seam, a first magnet positioned at the left seam of the opening, and a second magnet positioned at the right seam of the opening, wherein the first and second magnets are magnetically coupled; a first strap sleeve positioned at a first side of the opening; a second strap sleeve positioned at a second side of the opening opposite the first side of the opening, the second strap sleeve spaced apart from and parallel to the first strap sleeve; and a support above the opening, the support including a contact portion, the contact portion extending in a direction transverse to the plane of the sheet of material, wherein the first and second strap sleeves are each constructed and arranged to receive an elongated magnetic strap.

In another aspect, a method for assembling an entryway apparatus, comprises:

providing a sheet of material, comprising a top edge; a bottom edge, a left edge; and a right edge, the top edge, bottom edge, left edge, and right edge defining a plane; providing an opening extending from a position below the top edge to the bottom edge, the opening comprising a left seam and a right seam, a first magnet positioned at the left seam of the opening, and a second magnet positioned at the right seam of the opening, wherein the first and second magnets are magnetically coupled; providing a first strap sleeve positioned at a first side of the opening;

providing a support above the opening, the support including a contact portion, the contact portion extending in a direction transverse to the plane of the sheet of material; providing at least one strap constructed and arranged to fit in the first strap sleeve; inserting the strap into the first strap sleeve; mounting the first strap sleeve to at least a portion of a door frame; and mounting the support to the door frame.

BRIEF DESCRIPTION OF THE DRAWINGS

The foregoing and other features and advantages of the inventive concepts will be apparent from the more particular description of embodiments of the inventive concepts, as depicted throughout the different views. The drawings are not necessarily to scale, emphasis instead being placed upon illustrating the principles of the inventive concepts.

FIGS. 15Ai and 15Bi are perspective views of embodiments of curtain mounting straps in accordance with the present inventive concepts. FIGS. 15Aii and 15Bii are close-up perspective views of embodiments of the curtain mounting straps of FIGS. 15Ai and 15Bi in mounted positions in accordance with the present inventive concepts.

FIGS. 15Ci and 15Cii are a cross-sectional perspective views of an alternative embodiment of a curtain mounting strap in accordance with the present inventive concepts.

FIG. 15Di is an exploded view. FIGS. 15Dii-15Div are close up perspective views of the curtain mounting straps.

FIG. 15Ei is an exploded view. FIGS. 15Eii-15Eiv are close up perspective views of the curtain mounting straps.

FIGS. 16Ai-16Di are front views of a method for installing curtain mounting straps for a self-closing entryway, in accordance with the present inventive concepts. FIGS. 16Aii-16Dii are side views of the method for installing curtain mounting straps depicted in FIGS. 16Ai-16Di, in accordance with the present inventive concepts.

FIGS. 24A-22C are perspective views of a method for installing a self-closing entryway in accordance with additional embodiments of the present inventive concepts.

FIG. 26A1 is a front view of an embodiment of an entryway apparatus comprising a portion of the sheet of material folded back on itself and coupled to a body portion of the sheet of material to form a strap sleeve, in accordance with aspects of the present inventive concepts.

FIG. 26A1A is a close-up view of an embodiment of the strap sleeve of FIG. 26A1, in accordance with aspects of the present inventive concepts.

FIG. 26A2 is a front view of an embodiment of an entryway apparatus wherein the first strap sleeve comprises a plurality of first strap sleeves along a respective plurality of first axes of extension and the second strap sleeve comprises a plurality of second strap sleeves along a respective plurality of second axes of extension, in accordance with aspects of the present inventive concepts.

FIG. 35C1 is a perspective view of an embodiment of a support comprising a hook that comprises a first leg and a second leg, in accordance with aspects of the present inventive concepts.

FIG. 35C2 is a perspective view of an embodiment of a support comprising a hook that is arcuate, in accordance with aspects of the present inventive concepts.

FIG. 35C3 is a perspective view of an embodiment of a support comprising a hook that comprises a first leg, a second leg, and a third leg, in accordance with aspects of the present inventive concepts.

FIG. 35C4 is a perspective view of an embodiment of a support comprising a hook that comprises a first leg, a second leg, a third leg, and a hinge between the first leg and the second leg, in accordance with aspects of the present inventive concepts.

DETAILED DESCRIPTION OF EMBODIMENTS

Figure 1A:
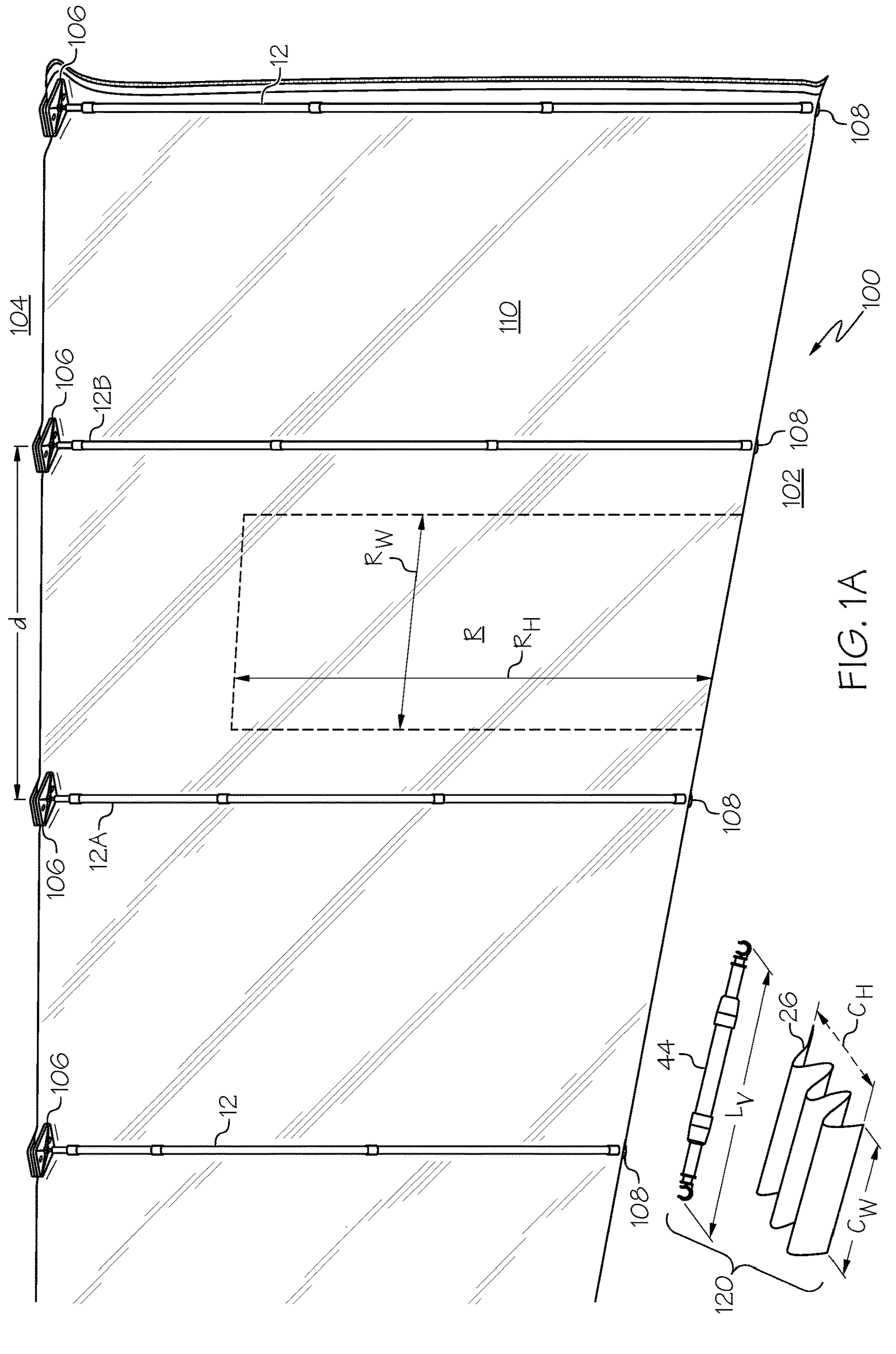
FIGS. 1A-1G are perspective front views of a method for installing and operating a self-closing entryway, in accordance with embodiments of the present inventive concepts.

Various example embodiments will be described more fully hereinafter with reference to the accompanying drawings, in which some example embodiments are shown. The present inventive concepts may, however, be embodied in many different forms and should not be construed as limited to the example embodiments set forth herein.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in such shapes.

The confinement of construction residue to a particular region or section of a room or building traditionally involves the use of primitive approaches such as laying plastic sheeting to cover openings or items that are to remain dust-free. These basic approaches often times fail, as small particles can find their way through to the clean regions. The resulting clean up can be difficult and time consuming and can affect those not associated with the construction project.

Systems such as those disclosed in U.S. Pat. Nos. 5,924,469 and 7,658,219, and U.S. Ser. No. 14/517,062, filed Oct. 17, 2014, incorporated herein by reference, address these limitations. Such systems are compatible with a variety of commercially-available curtain or drape materials, for example plastic, cloth, and the like. The disclosed systems are "clean" systems designed to be installed and removed without damaging or otherwise marking the ceiling, floor or walls in the construction zone. Assembly is easy and fast and can be accomplished by a single individual. In some situations, it is desired to have a defined entryway location for ingress into/egress from a partitioned area. Contemporary entryway mechanisms for such systems can employ a zipper mechanism, such as a zippered doorway. Such systems require an operator to manually un-zip the doorway to permit entry/exit and to re-zip the doorway to close the entryway after entry/exit. The operator must have a free hand to perform the procedure. In many situations, an operator will have both hands occupied when carrying tools and other construction equipment so using a zipper is impractical or inefficient.

Embodiments of the present inventive concepts are directed to a hands-free partition entryway mechanism that automatically closes itself following entry/exit by an operator. The partition entryway mechanism is hands-free in the sense that an operator can pass through a vertical seam which automatically separates during entry as a result of an applied force. In some examples, the applied force can be greater than a magnetic force that operates to maintain the seam in a closed position. For example, an operator can project a hand or knee, or, optionally, his hand, into the seam to open the seam to break the magnetic force, and then allow the remainder of his body to pass through. Following pass through, the vertical seam closes back on itself as a result of magnetic interaction, thereby allowing an operator to pass through the opening hands-free.

Embodiments of the present inventive concepts are further directed to a hands-free partition entryway mechanism including a curtain of material constructed and arranged to be supported by a cross-member, in turn supported by first and second vertical poles that are spaced apart from each other. The cross-member is constructed and arranged to have first and second ends that are freely slidable relative to each other. In this manner, the cross-member has a length that is freely adjustable. For purposes of the present disclosure the term "variable length" will be used herein to refer to a cross-member having a length that is freely modifiable, and unimpeded by a locking or length-fixing mechanism, as opposed to a cross-member having a length that is permanently fixed or otherwise having a length that can be temporarily locked or fixed.

FIGS. 1A-1G are perspective front views of a method for installing and operating a self-closing entryway, in accordance with embodiments of the present inventive concepts.

Referring to FIG. 1A, the use of a variable-length cross-member 44 is highly advantageous over the use of a fixed-length cross-member for this purpose. Such a configuration allows for the dust partition system 100 with multiple vertical poles 12A, 12B to be pre-installed, prior to the installation of the cross-member 44 and the related hands-free partition entryway mechanism 120. As a result, the variable length cross-member 44 can be applied to pre-installed vertical poles 12A, 12B, so long as the poles are spaced apart from each other by a distance d that falls within the range of lengths Lv of the variable-length cross-member 44. Furthermore, in a case where a vertical pole 12A, 12B to which the variable-length cross-member 44 is attached is subjected to an external force, such as an inadvertent bump, a change in air pressure, or the like, the inherent play in a lengthwise-direction of the variable-length cross-member 44 operates to absorb the shock induced on the vertical poles 12A, 12B, preventing potential failure of the entire structure.

In contrast, in a case where a cross-member of fixed length were to be employed, mounting of the cross-member to the vertical poles 12A, 12B is quite inconvenient, since the positioning of the vertical poles 12A, 12B relative to each other, and the distance between them d, in this case, must equal the fixed length of the cross-member. The spacing of or distance d between the vertical poles 12A, 12B is especially difficult to modify since the tops of the poles 12A, 12B are to be attached to the top of the partition curtain 110 at heads 106. In practice, it would be highly difficult or inconvenient to adjust the attachment position of the partition curtain 110 on the heads 106 for both poles 12A, 12B prior to installation of a fixed-length cross-member. In addition, in a case where a vertical pole 12A, 12B to which the fixed-length cross-member is attached is subjected to an external force, such as an inadvertent bump, a change in air pressure operating on the surface area of the attached dust partition curtain, or the like, the lack of play in a lengthwise-direction of the variable-length cross-member would operate to cause the shock induced on the vertical poles 12A, 12B, to pass through the entire system, possibly causing a catastrophic failure of the system.

For these, and other, reasons, the use of a variable-length Lv cross-member 44, in accordance with the present inventive concepts, is highly advantageous.

Accordingly, since the cross-member 44 has a variable length that can be freely modified, it can be mounted to the first and second vertical poles 12A, 12B over a range of distances d between the first and second vertical poles, after the vertical poles 12A, 12B have been installed. This configuration of a variable-length cross-member 44 has the advantage of ease of installation. For example, in some embodiments, the first and second vertical poles can be mounted and positioned prior to the mounting of the cross-member and the entryway curtain.

In some embodiments, the first and second vertical poles can form part of a dust partition system that has been installed to partition a work area from a clean area. In some embodiments, the dust partition system can include a plurality of vertical poles that support a curtain or plastic sheet positioned between the ceiling and floor of a room, as described in U.S. Pat. Nos. 5,924,469 and 7,658,219.

Continuing to refer to FIG. 1A, a dust partition system 100 includes a plurality of vertical poles 12 installed between a floor 102 and ceiling 104 of a room of a building. The vertical poles 12 each include a head 106 at a top end and a foot 108 at a bottom end and are length-adjustable over a range of lengths. A twist-locking mechanism may be included in the poles for adjusting and fixing the lengths of the vertical poles 12. In some embodiments, the heads 106 each include a curtain attachment mechanism, for example in the form of a clip for securing the partition curtain 110 to top ends 106 of the vertical poles 12. The partition curtain 110 is raised to the ceiling at each vertical pole 12 and the vertical pole 12 is adjusted in length between the floor and the ceiling. In some embodiments, the heads 106 of the vertical poles are spring-biased in an outward longitudinal direction relative to the feet 108 with a biasing mechanism, such as a spring mechanism, so that the vertical poles can be held in place by vertical compression applied to the vertical pole 12 between the floor 102 and ceiling 104. By applying a top portion of the partition curtain 110 to the heads 106 of the vertical poles 12 and by tucking a bottom portion of the partition curtain 110 beneath the feet 108 of the vertical poles, the partition curtain 110 can in turn be tensioned in position between the floor 102 and ceiling 104.

An installer of such a system can designate a region R of the partition curtain 110 that will serve as an entryway region for the dust partition system. Upon designation of an entryway region, the installer can, in some embodiments, prepare the hands-free partition entryway mechanism for installation. In some embodiments, the hands-free partition entryway mechanism 120 includes a variable-length cross-member 44 and an entryway curtain 26. As described herein, the variable-length cross-member 44 has a length Lv that is freely modifiable between first and second ends.

In such a region R, the installer can position a first vertical pole 12A and second vertical pole 12B to be spaced apart a distance d. In such a case, the distance d is determined to be a distance that is within a range of lengths Lv at which the variable-length cross-member can be modified. In addition, in some embodiments, the distance d of spacing between the first and second vertical poles is selected to be a distance d that is less than a width Cw of the entryway curtain 26. The height Rh and the width Rw of the region R can be selected to allow a human operator to walk through. In addition, the height Rh and the width Rw of the region R can be selected to be less than the height Ch and width Cw of the entryway curtain 26. In some embodiments, the region R extends in a horizontal direction at positions between the first pole 12A and the second pole 12B and extends in a vertical direction between a position below a top edge of the curtain 110 and a bottom edge of the curtain 110, as shown.

Figure 1B:
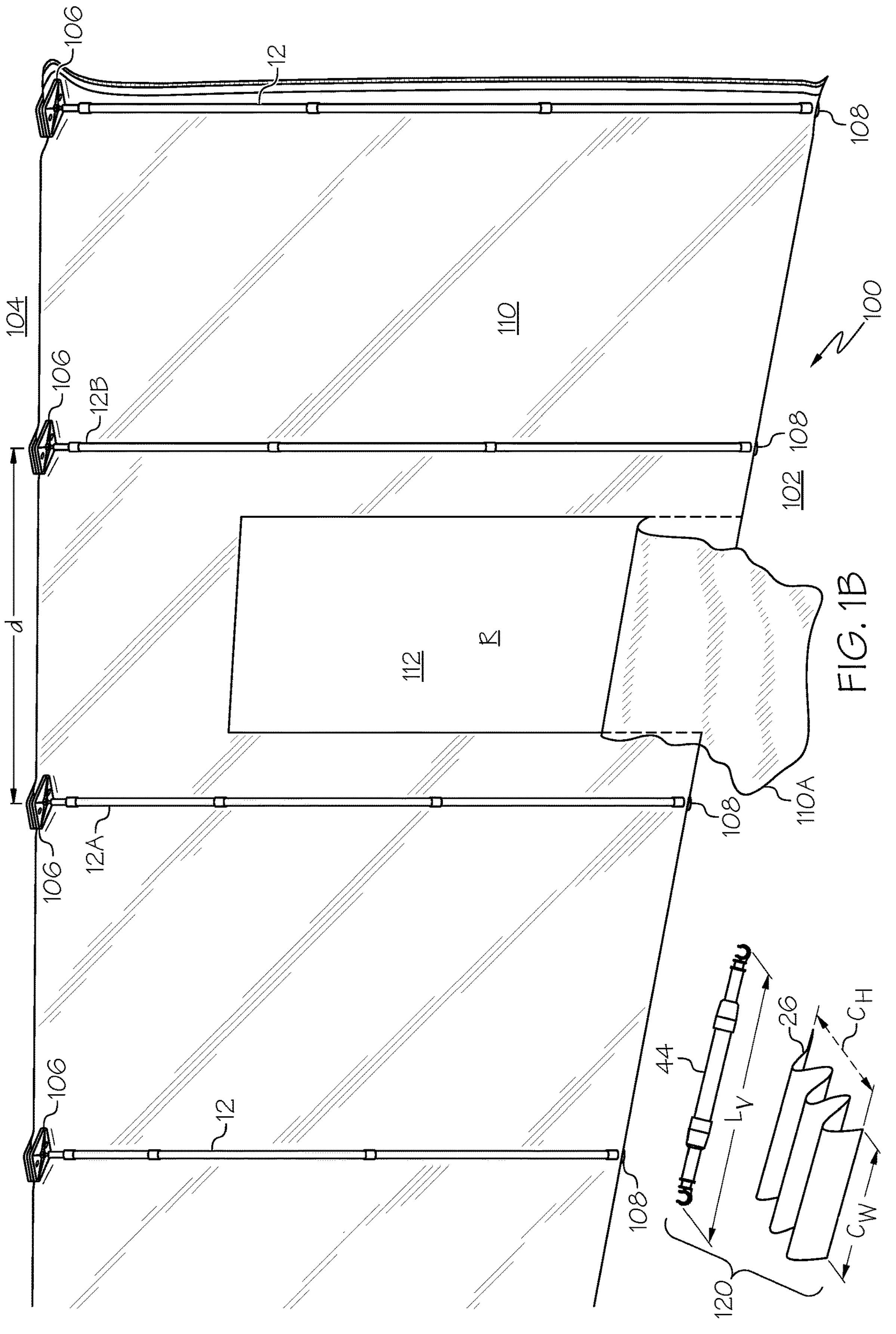

With reference to FIG. 1B, in some embodiments, the installer cuts, for example with a knife, the partition curtain 110 in the region R between the first and second vertical poles 12A, 12B to provide an opening 112 in the partition curtain 110. In a case where a cut is provided by the installer, the excess material 110A can be discarded. In other embodiments, the opening 112 may be pre-formed in the partition curtain 110. In such a case, the installer can install the first and second vertical poles 12A, 12B at either side of the pre-formed opening 112 at the appropriate distance d within the range of lengths Lv described herein.

Figure 1C:
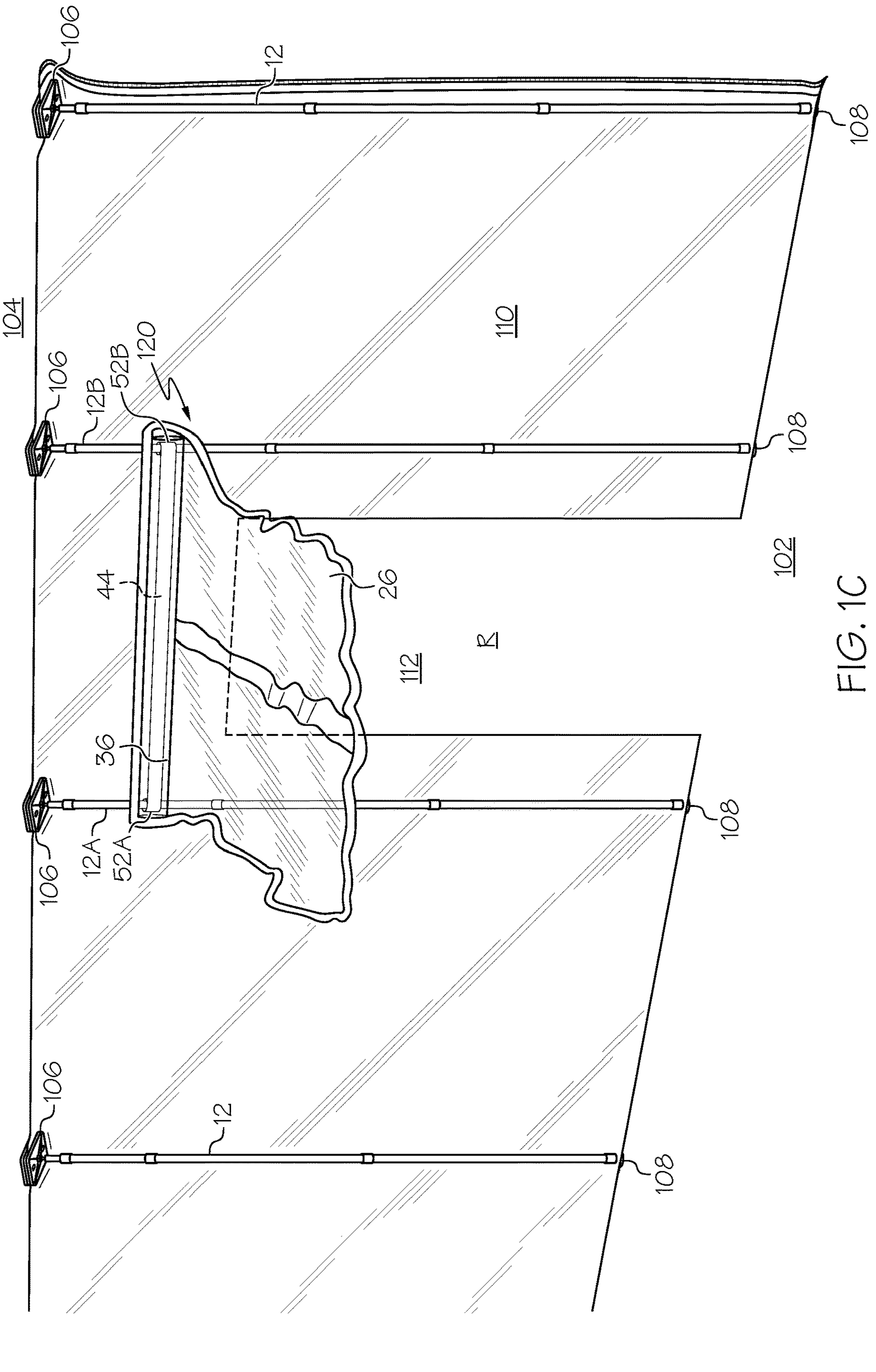

With reference to FIG. 1C, in some embodiments, the installer positions the variable-length cross-member 44 within a sleeve 36 of the entryway curtain 26 and raises the cross-member 44 and entryway curtain into position between the first and second vertical poles 12A, 12B at a top portion of the opening 112 defined in the region R. First and second ends of the variable-length cross-member 44 are attached to side body portions of the first and second vertical poles 12A, 12B. The ends of the cross-member 44 include cross-member attachment mechanisms 52A, 52B constructed and arranged to removably attach the cross-member 44 to the side body portions of the first and second vertical poles. In some embodiments, the cross-member attachment mechanisms 52A, 52B comprise elastically deformable "C" clamps that secure the cross-member 44 to the side body portions of the first and second vertical poles, as described in detail herein.

In some embodiments, the variable-length cross-member 44 is positioned at vertical positions on the first and second vertical poles 12A, 12B above a top of the region R so as to cover the top of the region R with a top portion of the entryway curtain 26. In some embodiments, the cross-member 44 is positioned at vertical positions on the first and second vertical poles 12A, 12B so that a bottom of the entryway curtain 26 is positioned at a suitable distance relative to the floor 102, is positioned to barely glance at the floor 102, or is positioned to lay on the floor 102.

Figure 1D:
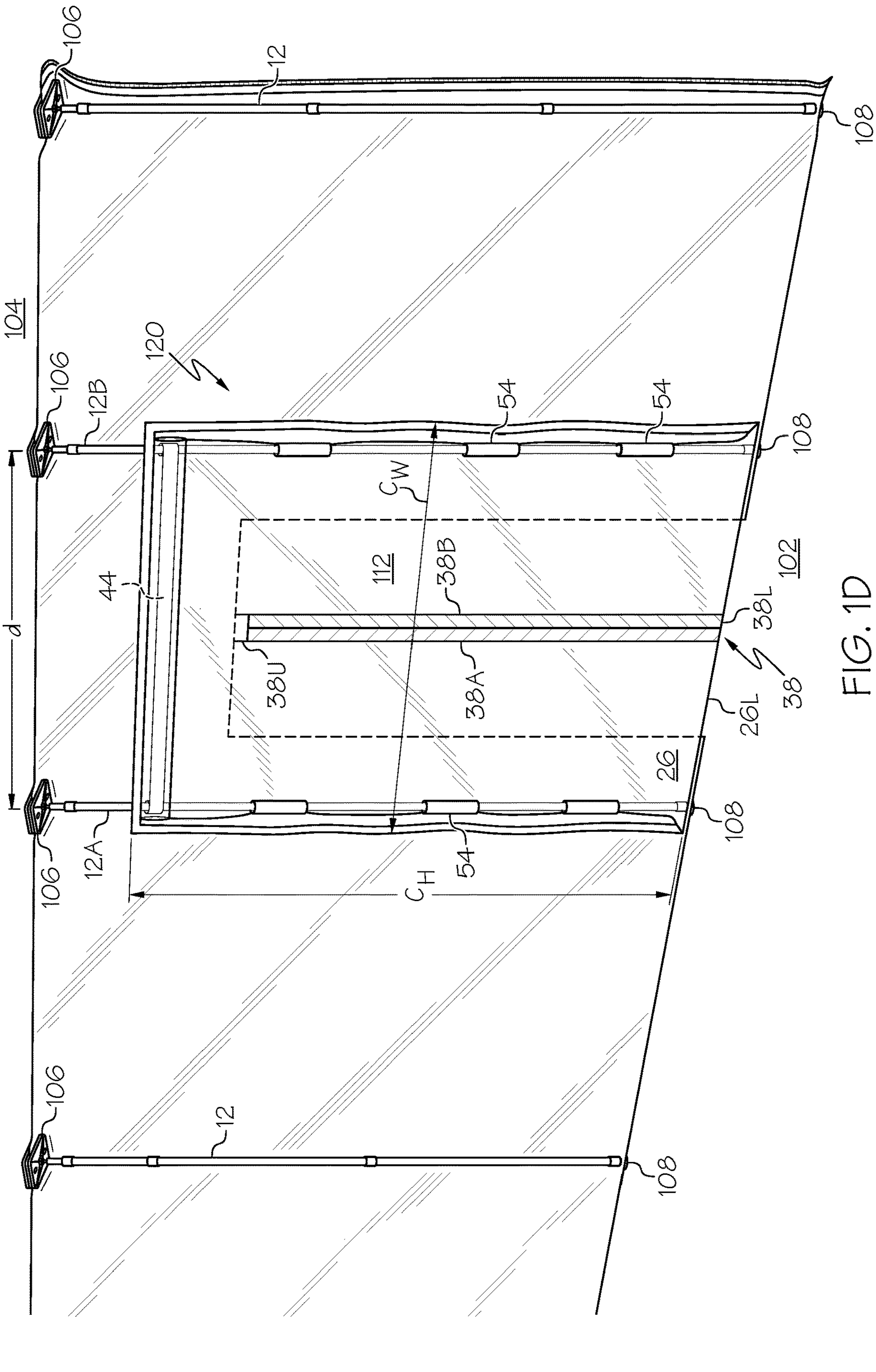

With reference to FIG. 1D, in some embodiments, the installer positions one or more entryway curtain clips 54 along the first and second vertical poles 12A, 12B to secure lower portions of the entryway curtain 26 to the first and second vertical poles 12A, 12B. In doing so, the installer can create a slight horizontal tension in the entryway curtain 26 so that the entry curtain 26 is positioned relatively taut between the first and second vertical poles 12A, 12B. In this figure, it can be seen that the first and second seams 38A, 38B of the entryway curtain 26 are positioned in a central region of the entryway curtain 26 and are vertically oriented to extend from an upper position 38U at or below the cross member 44 at an upper end to a lower position 38L at a lower end 26L of the entryway curtain 26. The hands-free partition entryway mechanism 120 is properly installed and ready for use.

Figure 1E:
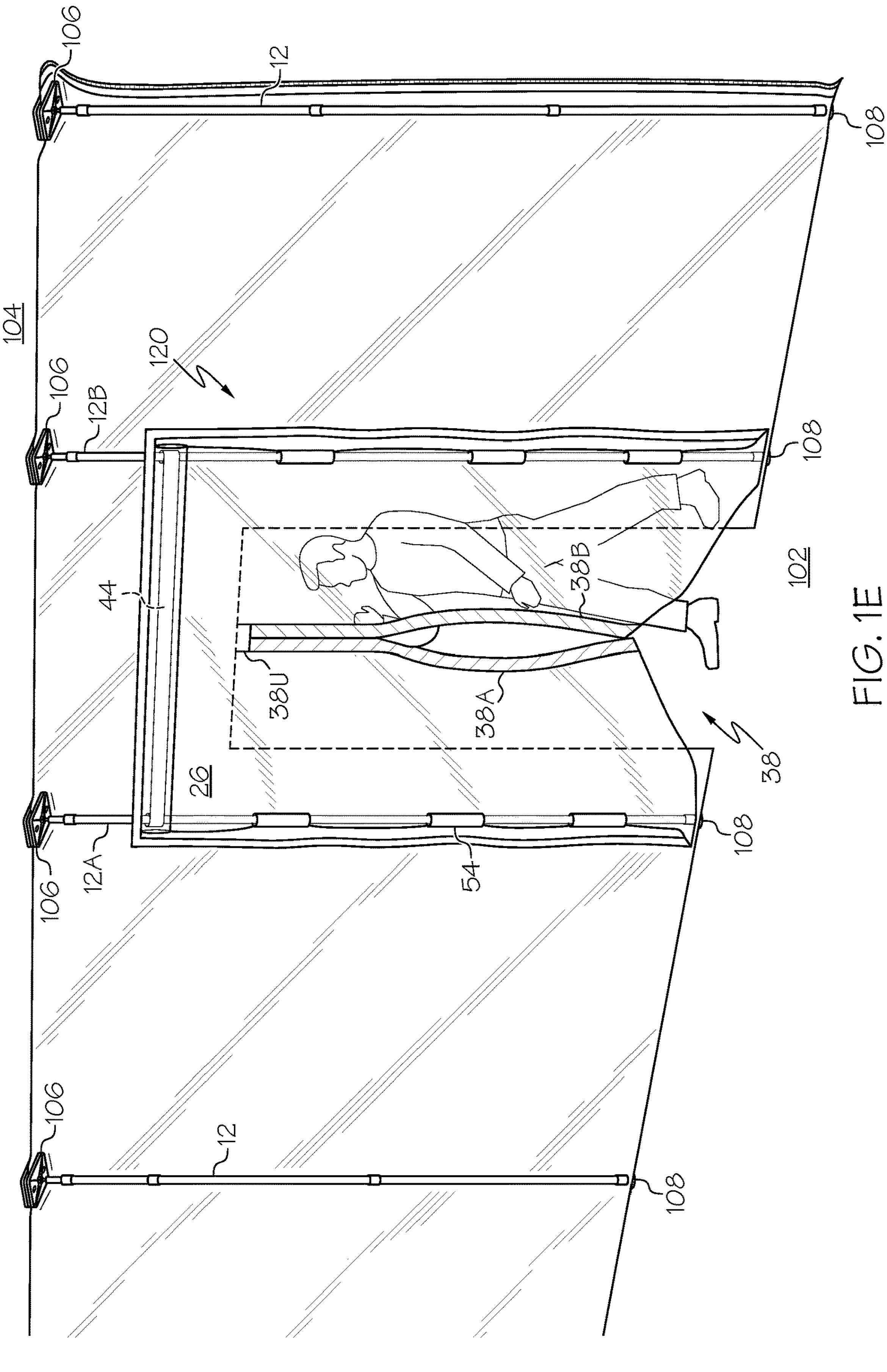

With reference to FIG. 1E, an operator of the hands-free entryway passes through the seam 38 of the entryway curtain 26. In an example operation, the operator may be carrying tools or other items in his hands and may push through the seam 38 with his elbow as shown. As a result, the magnetic attraction of the left and right seam portions 38A, 38B is broken and the seam portions 38A, 38B are partially or fully separated, allowing the operator to pass through the seam 38.

Figure 1F:
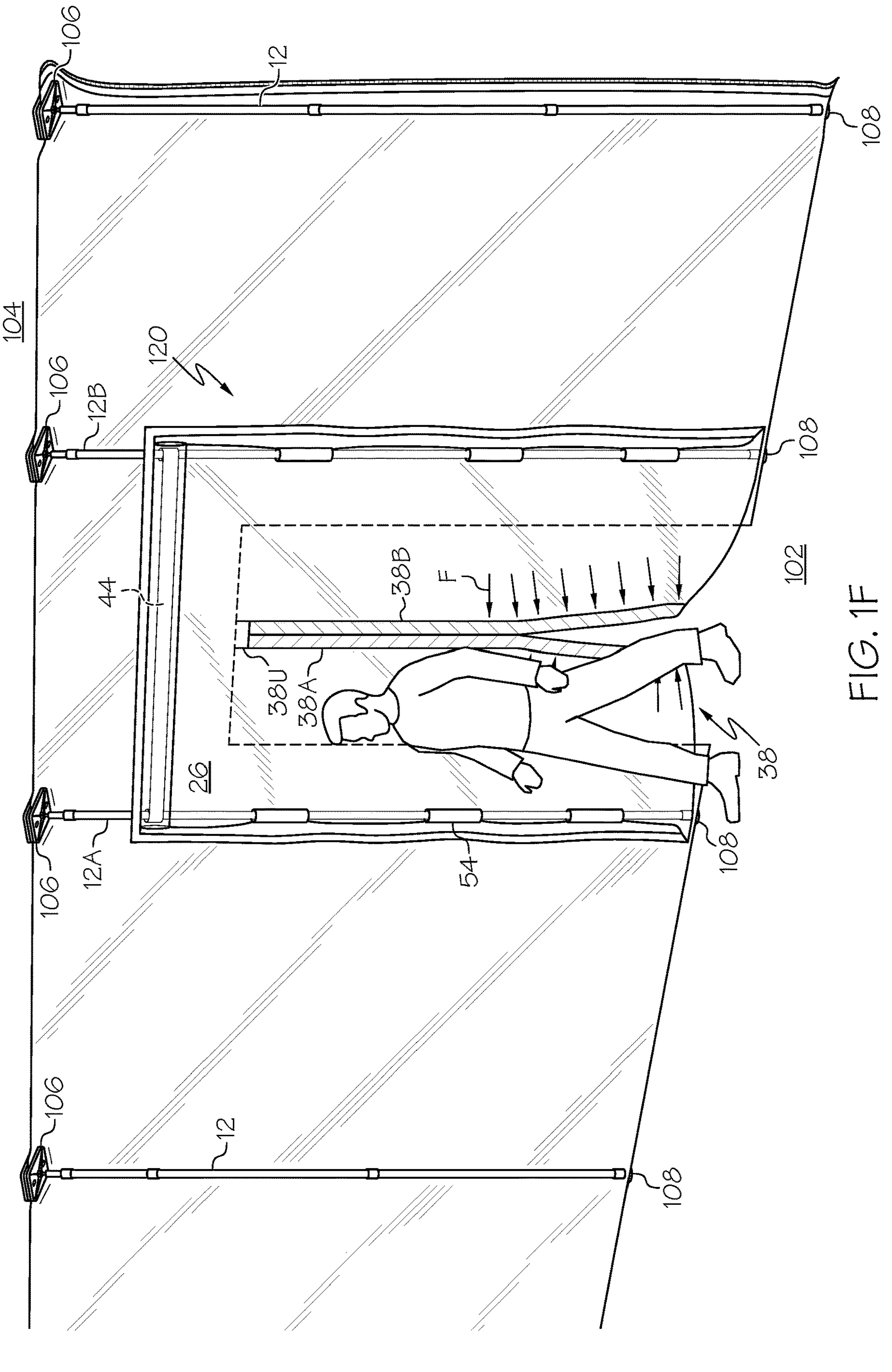

With reference to FIG. 1F, the operator has passed through the entryway. As a result of the positioning of the magnets in the seam 38, and, as a result of the proximity of the magnets when the entryway curtain 26 naturally drapes back into position in the opening as a result of gravity and as a result of the magnetic attraction, the left and right seam portions 38A, 38B re-locate with respect to each other and automatically close the seam 38. Registration of the left and right seam portions can be further ensured by a number of factors including: relative placement of the magnets in the left and right seam portions 38A, 38B, placement of weights 61 (see FIG. 6) at a bottom portion of the entryway curtain at its lower end 26L, the tautness of the mounting of the entryway curtain between the left and right vertical poles 12A, 12B and the variable-length cross member 44, the material of the entryway curtain, the weight of the entryway curtain, and other factors, and combinations of these factors. In this manner, the hands-free partition entryway mechanism operates to recouple the partition, automatically preparing the entryway for the next operator to pass through.

Figure 1G:
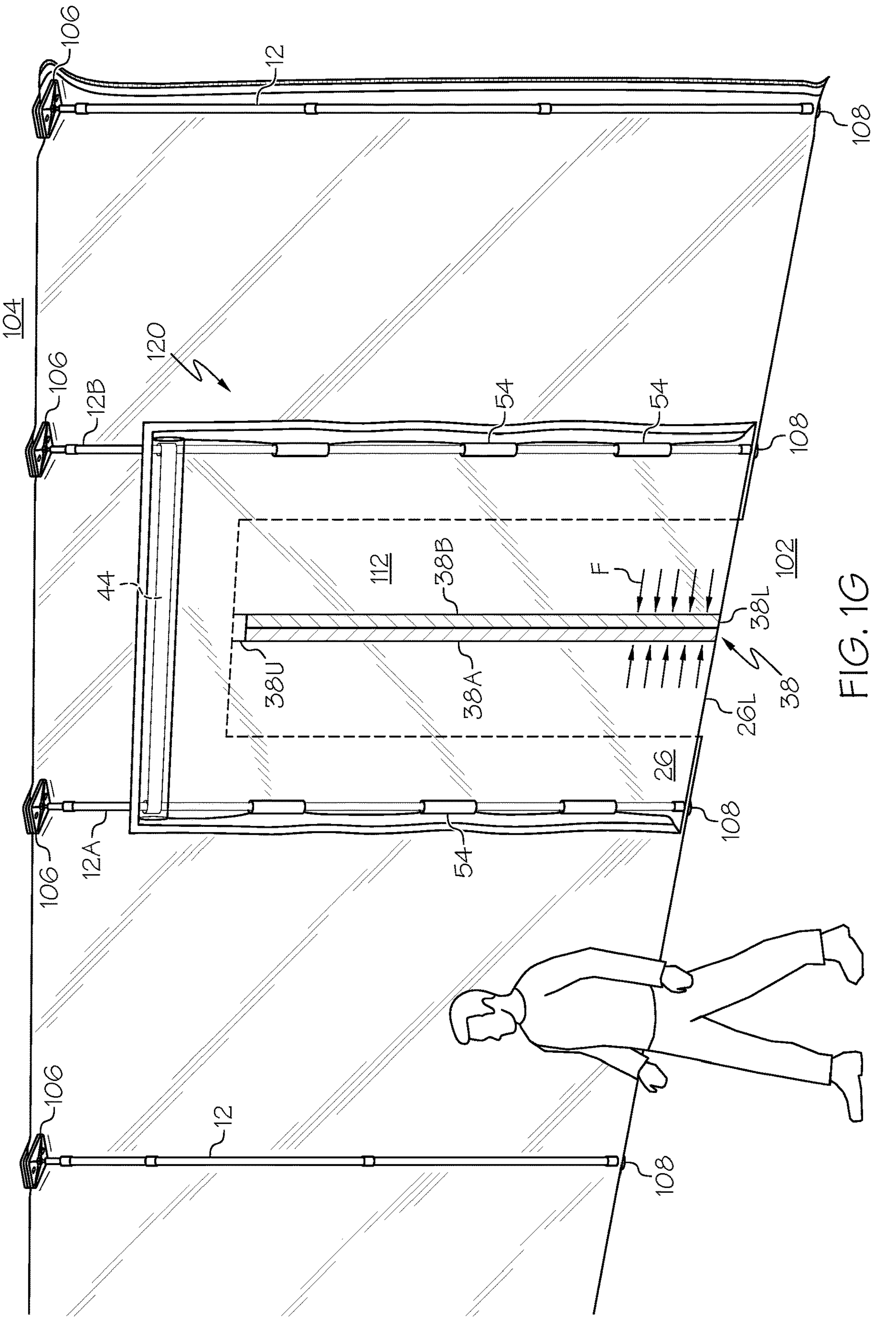

With reference to FIG. 1G the operator has passed fully through the hands-free partition entryway 120. As a result, the magnets in the left and right portions of the seam 38A, 38B, re-register and align with each other over the entire seam, from the upper position 38U to the lower position 38L. In this manner the seam 38A, 38B self-closes and the hands-free partition entryway system is again operable as a dust partition.

Figure 2A:
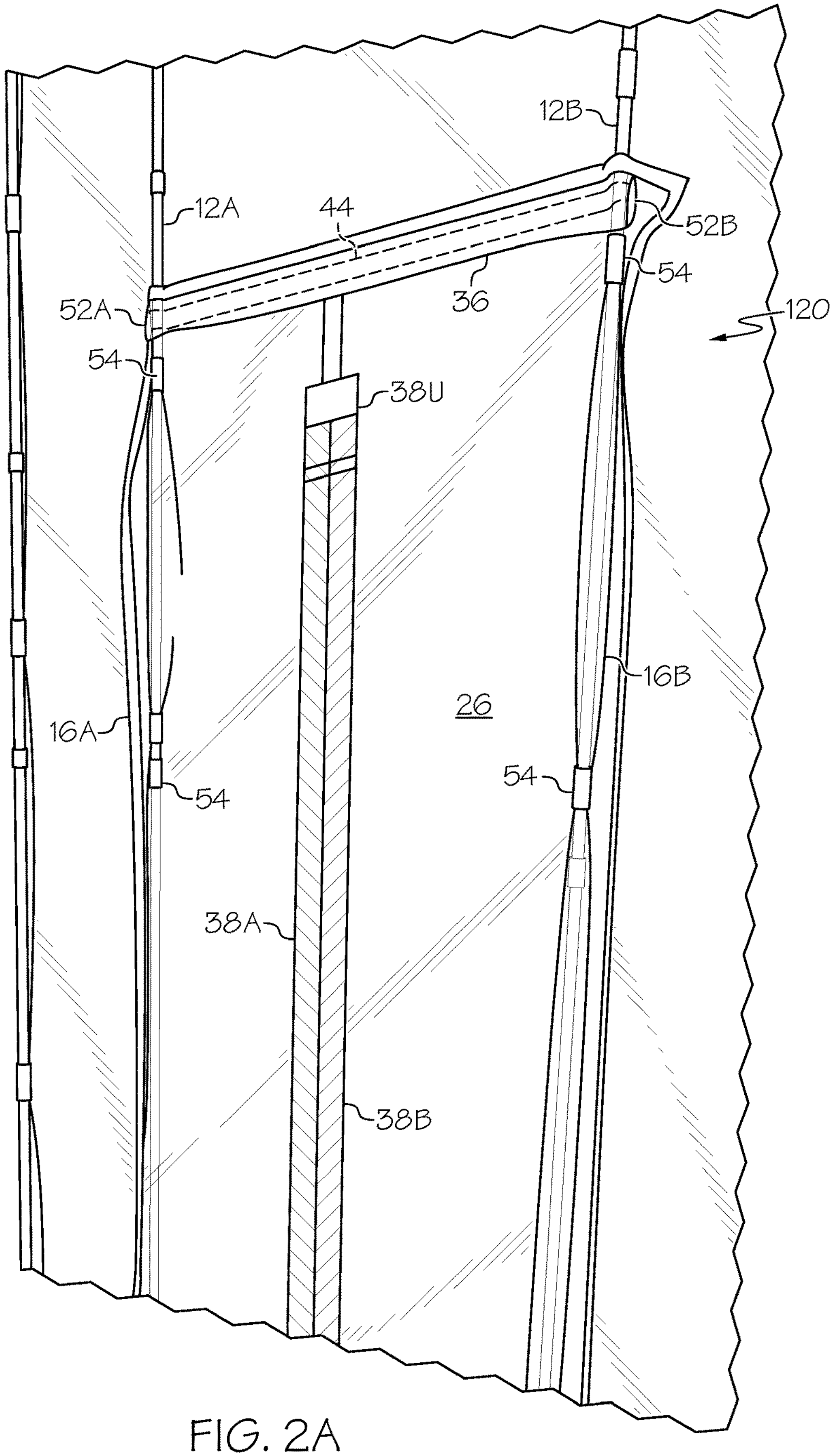
FIG. 2A is a front perspective view of a hands-free partition entryway mechanism, in accordance with embodiments of the present inventive concepts.
Figure 2B:
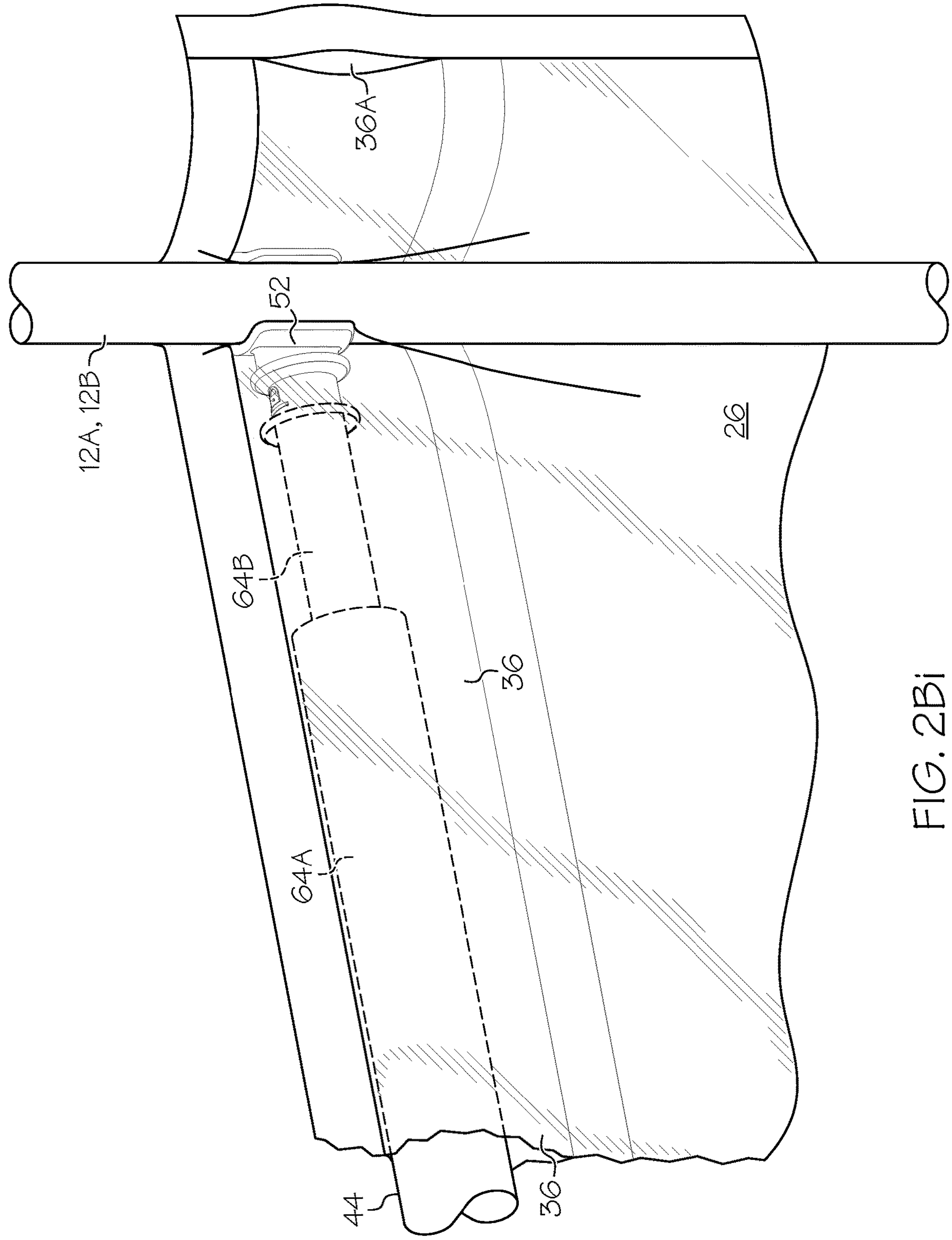
FIGS. 2Bi and 2Bii are close-up rear perspective views of embodiments of a hands-free partition entryway mechanism, in accordance with embodiments of the present inventive concepts.

FIG. 2A is a front perspective view of a hands-free partition entryway mechanism, in accordance with embodiments of the present inventive concepts. FIG. 2B is a close-up rear perspective view of a hands-free partition entryway mechanism, in accordance with embodiments of the present inventive concepts.

FIG. 2A is a perspective view of hands-free partition entryway mechanism 120 installed on a dust partition system, in accordance with embodiments of the present inventive concepts. The mechanism 120 includes a variable-length cross member 44 and an entryway curtain 26. In this view, it can be seen that, in some embodiments, the entryway curtain 26 includes a cross-member sleeve 36. The cross-member sleeve 36 can be configured to accommodate the variable-length cross-member 44 so that it passes through the cross-member sleeve 36 and can be coupled to side portions of the first and second vertical poles 12A, 12B at left and right cross-member attachment mechanisms 52A, 52B. The cross-member sleeve 36 can be constructed and arranged to support the weight of the entryway curtain 26 when hung by the variable-length cross-member 44. Entryway curtain clips 54 further serve to support the weight of the entryway curtain by securing portions of the first and second vertical outer edge regions 16A, 16B of the entryway curtain 26 to the first and second vertical poles 12A, 12B. In some embodiments, the curtain clips 54 can be used to adjust the tautness of the entryway curtain 26 so that the action of the first and second magnetic seams 38A, 38B is optimized.

Referring to FIG. 2Bi, it can be seen that the variable-length cross-member 44 can be positioned endwise in the cross-member sleeve 36, for example via sleeve opening 36A. In various embodiments the sleeve opening 36A can be positioned at an end of the sleeve 36 or, alternatively, at an intermediate portion of the sleeve 36. The cross-member attachment mechanisms 52 can be brought into position within the cross-member sleeve 36 in a position near a sidewall of the vertical pole 12A, 12B. The cross-member attachment mechanisms 52 can be configured to engage the sidewall of the pole 12A, 12B through the material of the cross-member sleeve 36 as shown, for example, so that the material of the curtain 26 is positioned between the attachment mechanisms 52 and the poles 12A, 12B when the attachment mechanisms 52 are engaged. In this manner, the engagement point of the variable-length cross-member 44 and vertical pole 12A, 12B can also serve as an anchor location for an upper corner of the entryway curtain 26. In this view, it can be seen that the variable-length cross member embodiment used in this example comprises a telescoping-type cross member 44, with the inner portion 64B sliding freely into, and out of, the outer portion 64A.

In other embodiments, for example in the embodiment illustrated in FIG. 2Bii, the cross-member sleeve 36-1 can be positioned to terminate at opening 36A-1 located at an intermediate portion of the body of the entryway curtain 26. In the illustrated embodiment, it can be seen that the cross-member 64A, 64B extends from the end 36A-1 of the cross-member sleeve 36-1. Accordingly, the attachment mechanisms 52 of the cross member 44 directly engage the side portions of the poles 12A, 12B. In such an embodiment, other mechanisms are employed for anchoring the entryway curtain 26 to the poles 12A, 12B or to the partition curtain 110, as described herein.

Figures 3A, 3B, 3C, 3D:
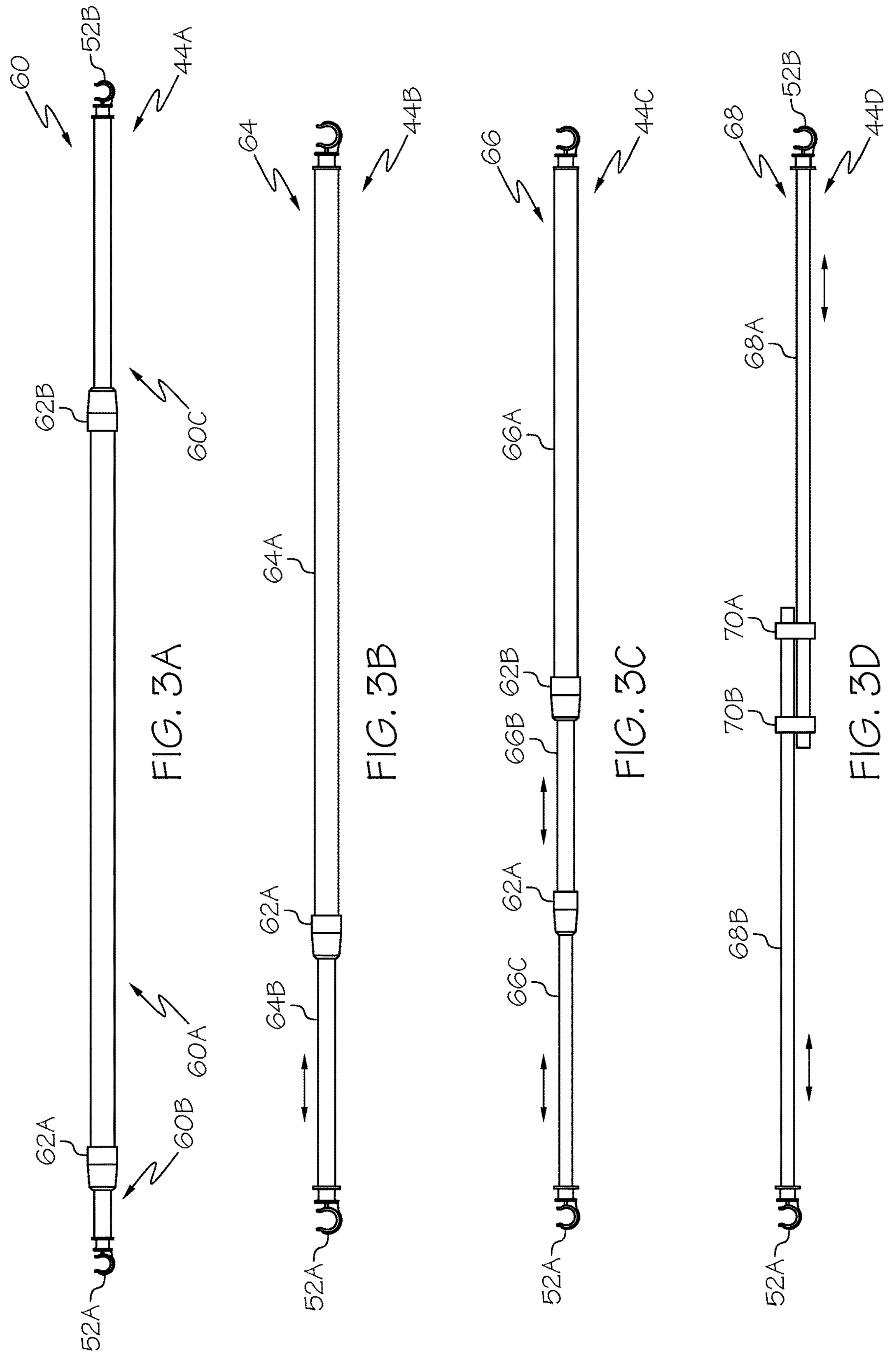
FIGS. 3A-3D are top views of various embodiments of the variable-length cross member 44 in accordance with embodiments of the present inventive concepts.

FIGS. 3A-3D are top views of various embodiments of the variable-length cross member 44 in accordance with embodiments of the present inventive concepts. Referring to FIG. 3A, in one embodiment, the variable-length cross member 44A comprises a telescoping pole 60. First and second cross-member attachment mechanisms 52A, 52B are coupled to first and second corresponding ends of the telescoping pole 60. In the present embodiment, the telescoping pole 60 includes an intermediate portion 60A and first and second end portions 60B, 60C. The intermediate portion 60A has an inner width greater than an outer width of the first and second end portions 60B, 60C so that the first and second end portions 60B, 60C slide freely relative to the intermediate portion 60A. Stops (not shown) may be included at inner ends of the first and second end portions 60B, 60C to prevent inadvertent release of the first and second end portions 60B, 60C from the intermediate portion 60A. Collars 62A, 62B may be provided at the junctions of the intermediate portion 60A and end portions 60B, 60C to prevent snagging of the cross-member 44 with the material of the partition curtain 110 or sleeve 36, or to prevent the installer's fingers from becoming pinched.

Referring to FIG. 3B, in another embodiment, the variable-length cross member 44B comprises a telescoping pole 64 including first and second cross-member attachment mechanisms 52A, 52B in a manner similar to the embodiment of FIG. 3A. In the present embodiment, however, the telescoping pole includes a base portion 64A and a single end portion 64B. The base portion 64A has an inner width greater than an outer width of the end portion 64B so that the end portion 64B can slide freely relative to the base portion 64A. Stops (not shown) may be included at an inner end of the first end portions 64B to prevent inadvertent release of the end portions 64B from the base portion 64A. Collars 62A may be provided at the junctions of the base portion 64A and end portion 64B to prevent snagging of the cross-member 44 with the material of the partition curtain 110 or sleeve 36, or to prevent the installer's fingers from becoming pinched.

Referring to FIG. 3C, in another embodiment, the variable-length cross member 44C comprises a telescoping pole 66 including first and second cross-member attachment mechanisms 52A, 52B in a manner similar to the embodiments of FIG. 3A-3B. In the present embodiment, however, the telescoping pole includes a base portion 66A, an intermediate portion 66B, and an end portion 66C. The base portion 66A has an inner width greater than an outer width of the intermediate portion 66B so that the intermediate portion 66B can slide freely relative to the base portion 66A. Similarly, the intermediate portion 66B has an inner width greater than an outer width of the end portion 66C so that the end portion 66C can slide freely relative to the intermediate portion 66B. Stops (not shown) may be included at inner ends of the end portion 66C and intermediate portion 66B to prevent their inadvertent release. Collars 62A, 62B may be provided at the junctions of the base portion 66A, intermediate portion 66B, and end portion 66C to prevent snagging of the cross-member 44 with the material of the partition curtain 110 or sleeve 36, or to prevent the installer's fingers from becoming pinched.

In some embodiments, the cross-section of the portions of the telescoping pole 60, 64, 66 of the variable-length cross member 44 is generally circular, however, embodiments of the present inventive concepts are not limited thereto. For example, in other embodiments, the cross-section of the cross member 44 can be other geometries, such as elliptical, square, rectangular, hexagonal, and the like and known to one of skilled in the art.

Referring to FIG. 3D, in some embodiments the variable-length cross-member 44 can comprise first and second elongated members 68A, 68B that are clamped together at clamps 70A, 70B in a slidable relationship so as to slide alongside each other. First and second cross-member attachment mechanisms 52A, 52B can be included in a manner similar to the manner of the embodiments of FIG. 3A-3C.

The body of the variable-length cross-member 44 may comprise any of a number of suitable materials, including aluminum, steel, alloy, graphite, composite, fiberglass, plastic, wood, or any other suitable material known to one skilled in the art. In some embodiments where a cross-member sleeve 36 is included in the entryway curtain 26 for supporting the entryway curtain 26, the cross-member 44 may have an outer width that is less than an inner width of the cross-member sleeve 36.

FIGS. 4A-4D are a perspective view of various embodiments of cross-member sleeves 36 of the entryway curtain 26, in accordance with the present inventive concepts. In various embodiments, the cross-member sleeve 36 may comprise a portion of a material that is stitched, pressed, glued, or otherwise bonded to the material of the body of the entryway curtain 26.

Figure 4A:
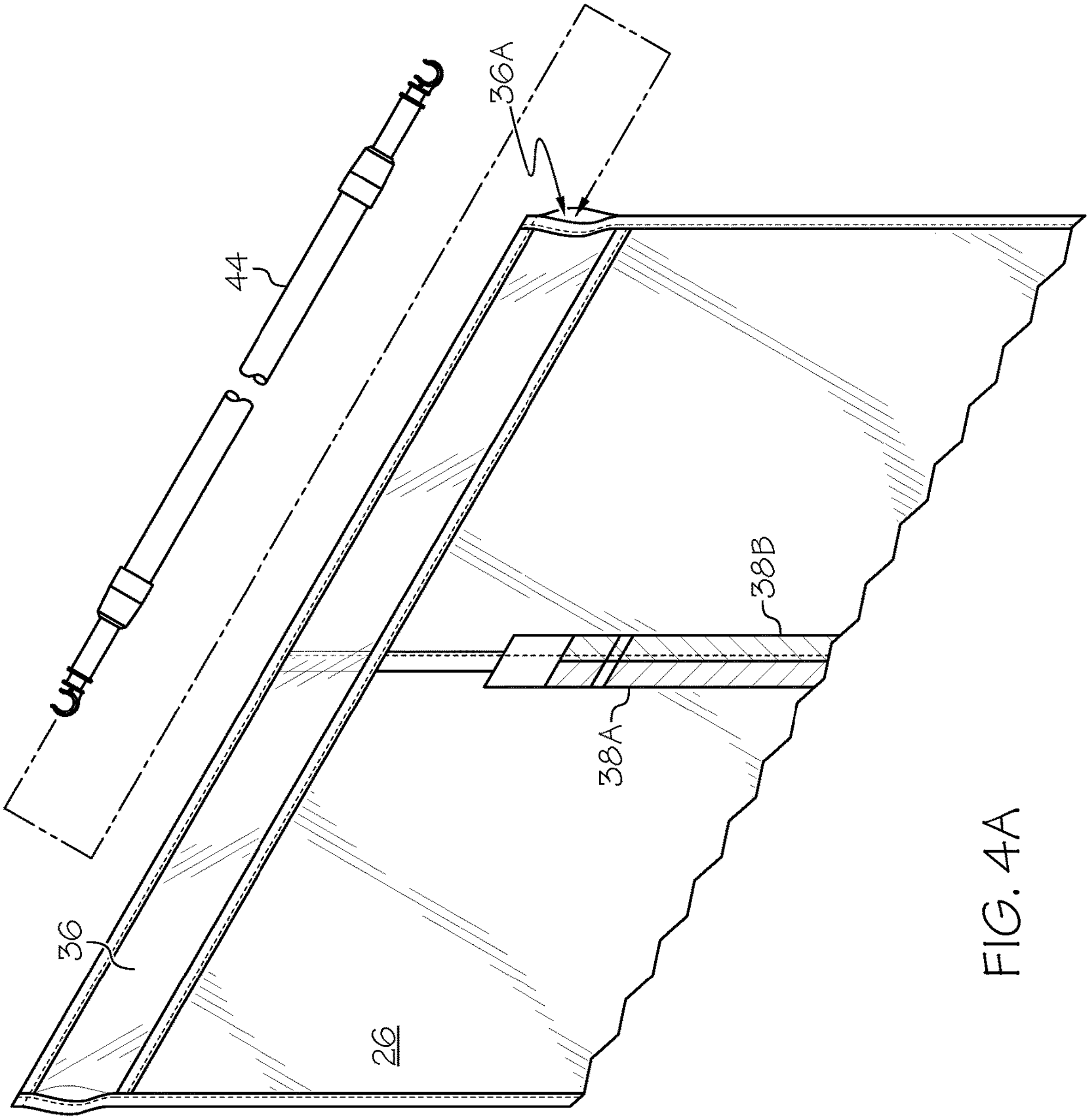
FIGS. 4A-4G are a perspective view of various embodiments of cross-member sleeves of the entryway curtain, in accordance with the present inventive concepts.

In the embodiment depicted in FIG. 4A the cross-member sleeve 36 extends across an entire top portion of the entryway curtain 26. As described in connection with FIG. 2 herein the variable-length cross member 44 can be inserted into the cross-member sleeve 36 at sleeve opening 36A.

Figure 4B:
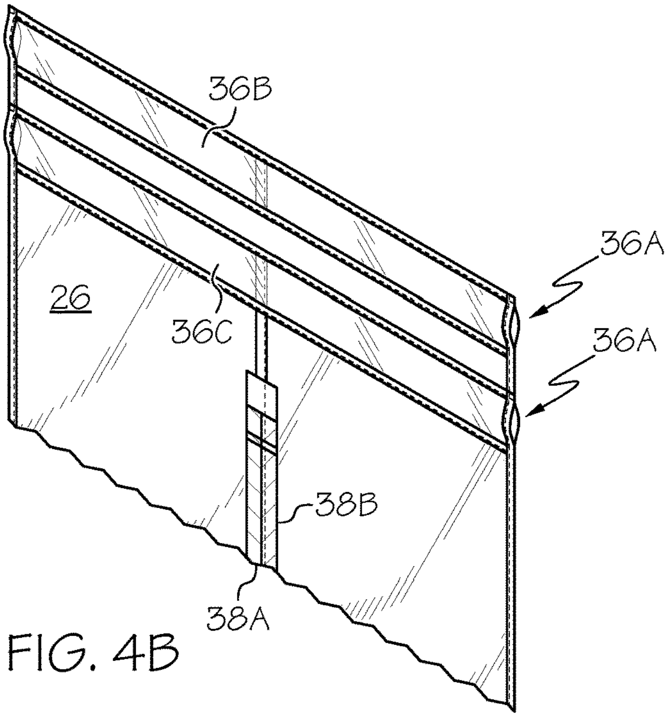

In the embodiment depicted in FIG. 4B a plurality of cross-member sleeves 36A, 36B extend across the entryway curtain 26 at different vertical positions of the entryway curtain 26. In this manner, the entryway curtain 26 can be readily modified for installation at different heights above the floor.

Figure 4C:
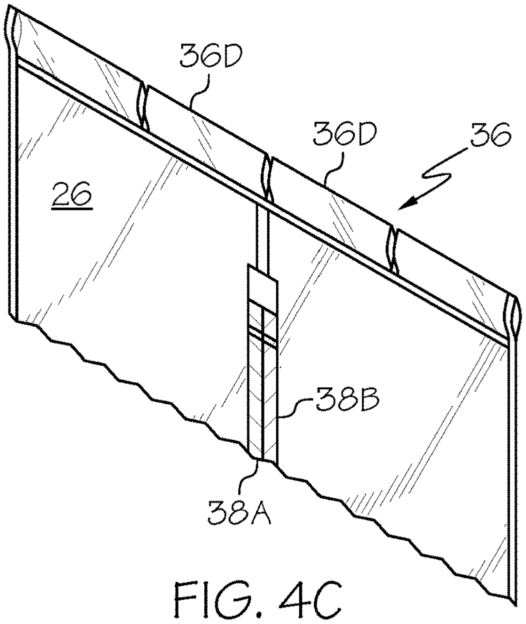

In the embodiment depicted in FIG. 4C the cross-member sleeve 36 extends across the entryway curtain 26; however, in this embodiment, the sleeve comprises a plurality of neighboring loops 36D of material through which the variable-length cross member 44 can be inserted.

Figure 4D:
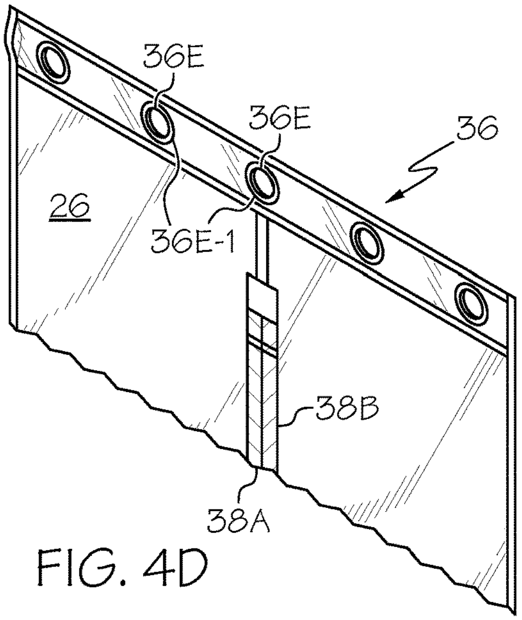

In the embodiment depicted in FIG. 4D the cross-member sleeve 36 comprises a plurality of openings 36E formed in the material of the entryway curtain 26. In this manner, the body of the variable-length cross member can be alternately inserted through the openings to thereby support the entryway curtain 26. In some embodiments, the openings can be reinforced with webbing or stitching 36E-1 to resist tear of the body of the entryway curtain 26.

Figure 4E:
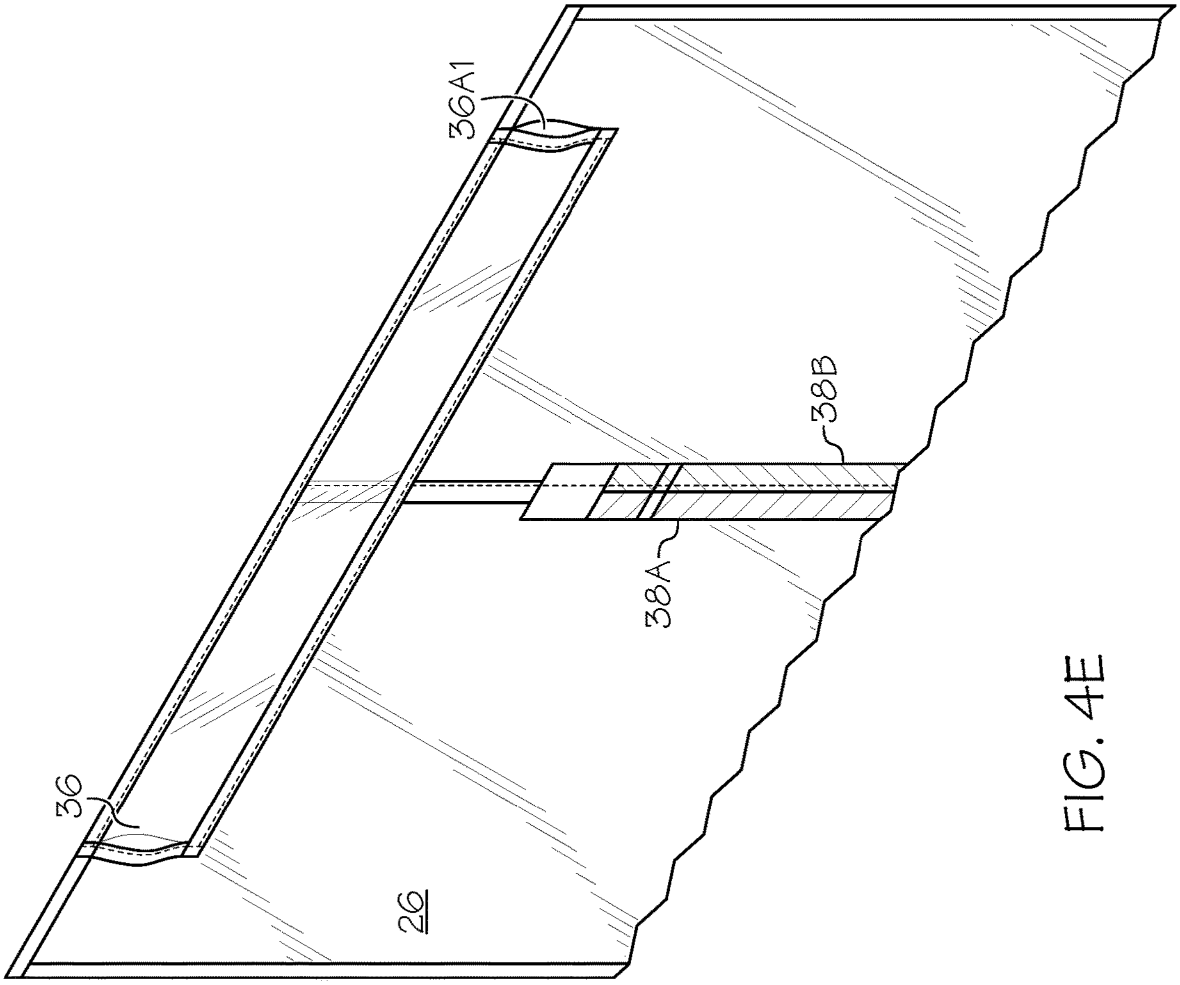

In the embodiment depicted in FIG. 4E, the cross-member sleeve 36 terminates at sleeve opening 36A-1 positioned at an intermediate portion of the body of the entryway curtain. In this manner, the attachment mechanisms 52 of the cross-member 64A, 64B can be made to directly engage the side portions of the poles 12A, 12B, as described herein at least in connection with the embodiment described and illustrated in FIG. 2Bii.

Figure 4F:
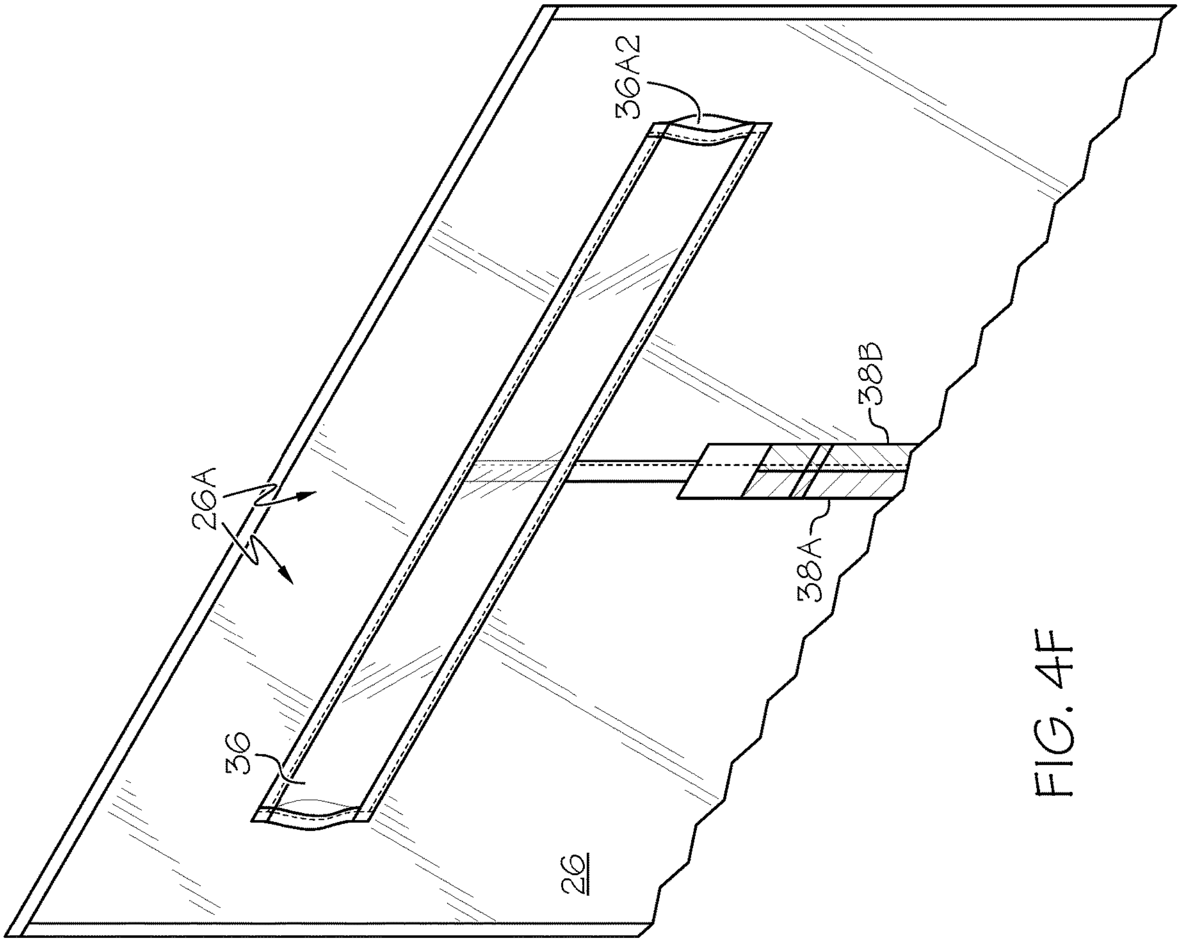

In the embodiment depicted in FIG. 4F, similar to the embodiment of FIG. 4E, the cross-member sleeve 36 terminates at sleeve opening 36A-2 positioned at a horizontal intermediate portion of the body of the entryway curtain 26. In the present embodiment of FIG. 4F, however, the cross-member sleeve 36 is further located at a vertical-intermediate position of the entryway curtain 26. In this manner, an upper region 26A of the entryway curtain 26 extends above the cross-member sleeve 36. This embodiment is amenable to attachment of the upper region 26A of the entryway curtain 26 directly to the partition curtain 110 using straps, for example magnetic curtain mounting straps, as described herein.

Figure 4G:
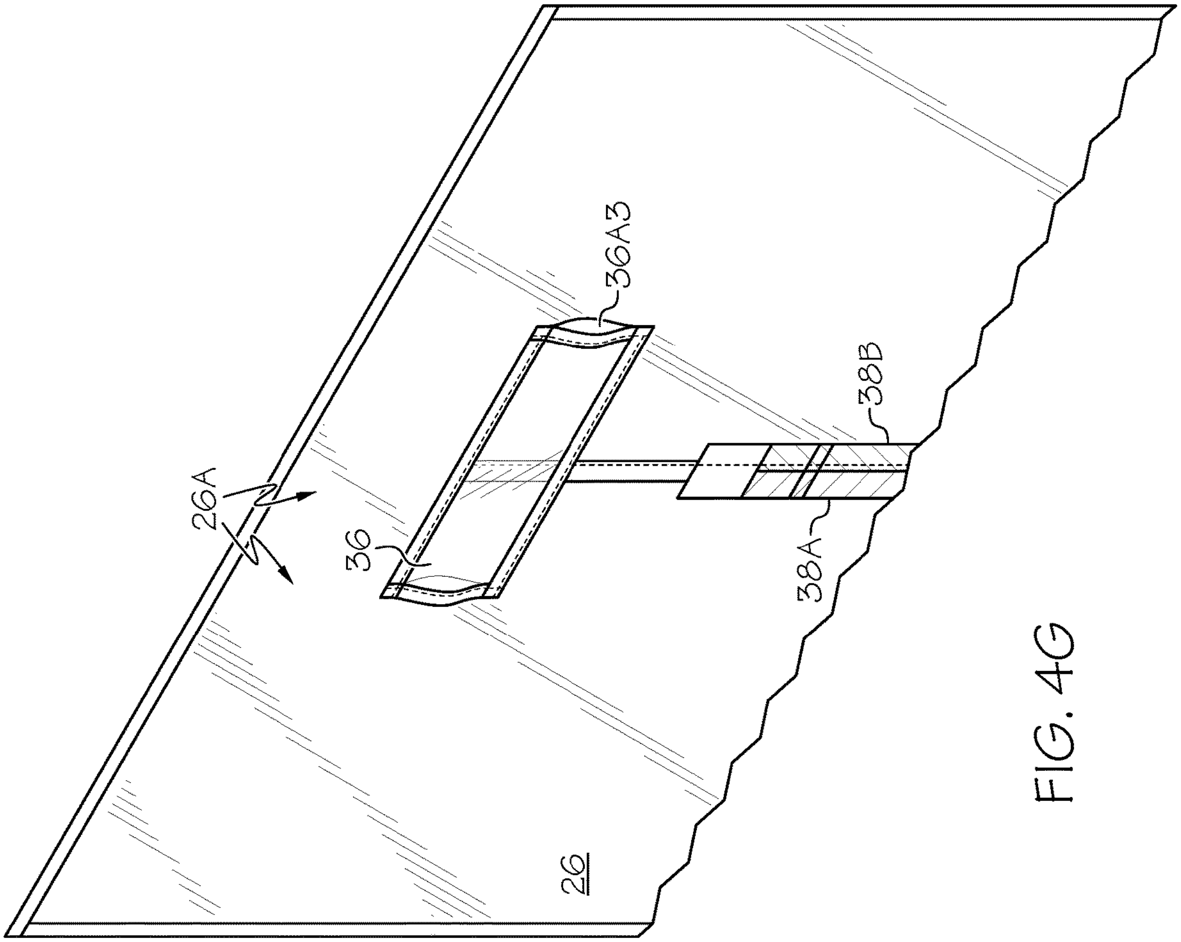

In the embodiment depicted in FIG. 4G, a horizontal-intermediate and vertical-intermediate positioned cross-member sleeve 26 is provided. This embodiment is similar to that shown in the embodiment of FIG. 4F, however, in the present embodiment, the length of the sleeve is reduced even further so that the sleeve openings 36A-3 are positioned proximal to a position above the first and second seams 38A, 38B. In such an embodiment, the shortened sleeve 36 operates to support the weight of the entryway curtain at a point directly above the first and second seams 38A, 38B, providing enhanced control of the magnetic operation of the self-closing seams 38A, 38B when installed.

In some embodiments, in the absence of a cross-member sleeve 36, the entryway curtain 26 can be coupled to the variable-length cross-member 44 using clips constructed and arranged to secure entryway curtain about the body of the variable-length cross-member 44. For example, the clips can have a C-shaped inner cross-section of an inner width so that the clips can be press-fir about the body of the variable-length cross-member. In some embodiments, the clips can resemble the construction of the curtain clips 54 illustrated and described herein in connection with FIG. 2A and FIG. 10A, B.

In some embodiments, for example as shown in FIG. 4A, the cross-member sleeve 36 can comprise a sleeve of material that is stitched, pressed, glued, or otherwise bonded to the material of the body of the entryway curtain 26. The variable-length cross-member 44 can pass through the length of the sleeve 36 and can be coupled to the first and second vertical poles 12A, 12B at ends thereof.

In the embodiment of FIG. 4A, it can be seen that the sleeve 36 has an inner width that is larger than an outer width the variable-length cross member 44. In some embodiments, the sleeve 36 is sufficiently long so as to cover the entirety of variable-length cross member 44 including the cross-member attachment mechanisms 52A, 52B. For example, in some embodiments, the sleeve 36 is of a length that is commensurate with the width Cw of the entryway curtain 26. In this manner, the cross-member attachment mechanisms 52A, 52B can operate to couple upper left and right portions of the entryway curtain to the left and right vertical poles 12A, 12B. In other embodiments, the sleeve 36 can be of a relatively shorter length such that the cross-member attachment mechanisms 52A, 52B of the variable-length cross-member 44 are exposed and couple directly to the left and right vertical poles 12A, 12B.

In some embodiments, the cross-member sleeve 36 may be a separate component that is attached to the entryway curtain 26. In some embodiments the sleeve 36 may be formed from another portion of the entryway curtain 26, for example, by folding over a top portion of the material of the entryway curtain to form the sleeve 36.

Figure 5B:
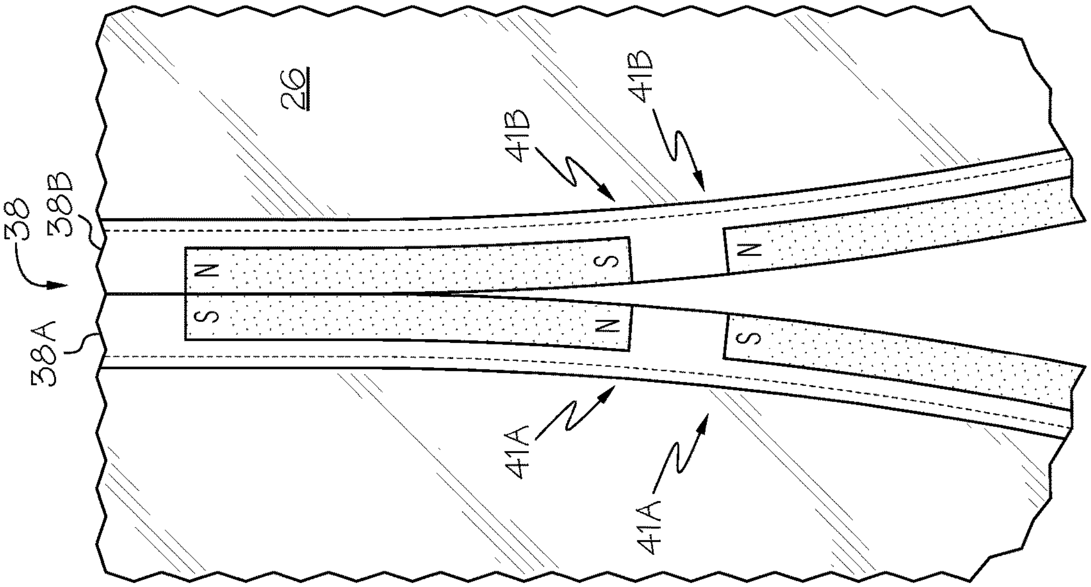
FIGS. 5A-5C is a front view of alternative embodiments of arrangements of magnets that may be employed in the entryway curtain seam, in accordance with embodiments of the present inventive concepts.
Figure 5A:
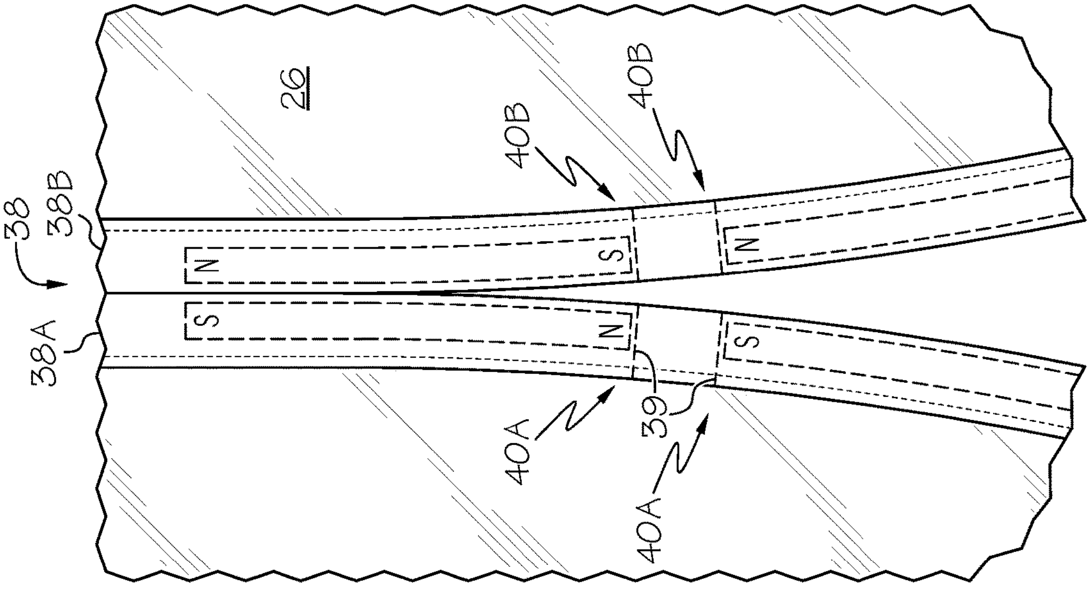
Figure 5C:
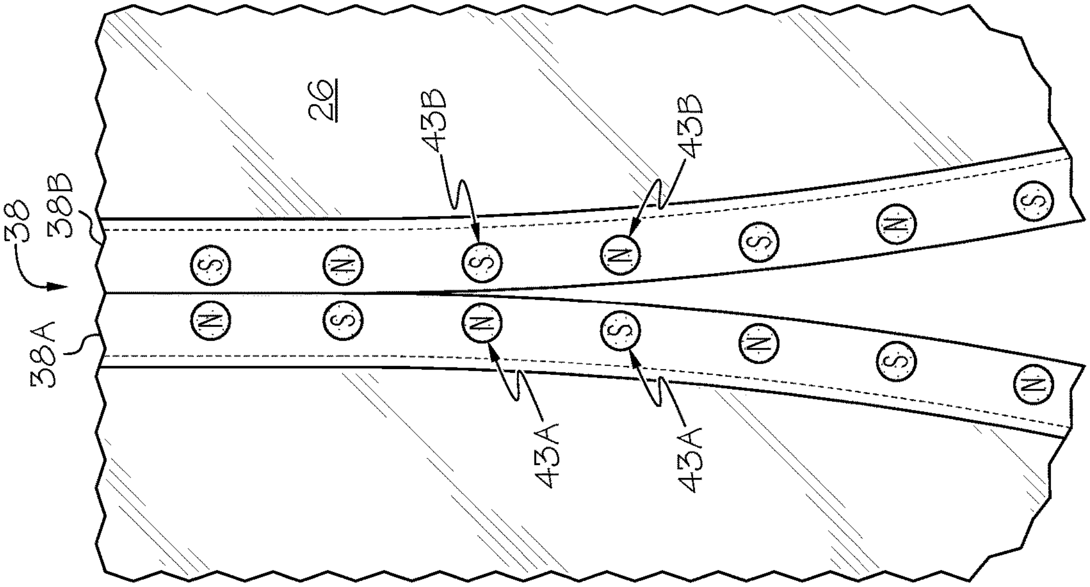

FIGS. 5A-5C is a front view of alternative embodiments of arrangements of magnets that may be employed in the entryway curtain seam, in accordance with embodiments of the present inventive concepts.

In the embodiment of FIG. 5C, the entryway seam 38 includes first and second seams 38A, 38B. Each of the first and second seams 38A, 38B includes a plurality of elongated magnets 40A, 40B. In some embodiments, the elongated magnets 40A, 40B are cylindrical in shape, with a circular cross-section. In other embodiments, the elongated magnets 40A, 40B comprise bars that have a rectangular or square cross-section. In various embodiments, the magnets 40A, 40B comprise permanent magnets. In some embodiments, the magnets 40A, 40B comprise a material type of one or more of ferromagnetic material, a metal, alloy or composite material that exhibits magnetic properties, or other suitable magnetic material.

In some embodiments, the elongated magnets 40A, 40B are positioned along the seams 38A, 38B so that a first magnet 40A in the first seam 38A is positioned at a vertical position opposite a second magnet 40B of the second seam 38B, as shown. In particular each first magnet 40A of the first seam 38A and corresponding second magnet 40B of the second seam 38B may be positioned so that their respective north N and south S poles are opposite, and therefore, they attract each other as shown. In this manner, the magnetic fields of the neighboring magnets 40A, 40B may be naturally attractive to each other, biasing the seam 38 of the entryway curtain to be naturally biased to be in a closed state. In some embodiments, the magnets may be secured into defined vertical positions, for example by horizontal seam stitching 39 to fix their respective vertical positions, and thus ensure long-term attraction of the first and second seams 38A, 38B. In some embodiments, the magnets 40A, 40B may be positioned in a sleeve portion of the seam 30A, 30B. In another embodiment, one of the seams 38A, 38B can include magnets and the other seam 38B, 38A can include elements of magnetically attractive material, such as metal elements.

In the embodiment of FIG. 5B, rather than being positioned in a sleeve, the magnets 41A, 41B are exposed, and positioned at an exterior portion of the inner edge of the seam 38A, 38B. In this embodiment, the magnets 41A, 41B can be adhered to the seam 38 using any of a number of suitable mechanisms, including stitching, bonding, press fit, clamping, and the like.

In the embodiment of FIG. 5C, the magnets 43A, 43B comprise discrete elements, rather than bars. In some embodiments, the discrete elements can comprise spherical elements, round elements, or discrete elements of other geometries. The individual magnets 43A, 43B can be positioned to be separate from each other in a vertical direction, and can be selected so that corresponding neighboring magnets on the opposite seam 38A, 38B are attractive. In another embodiment, one of the seams 38A, 38B can include magnets and the other seam 38B, 38A can include elements of magnetically attractive material, such as metal elements.

Figure 6:
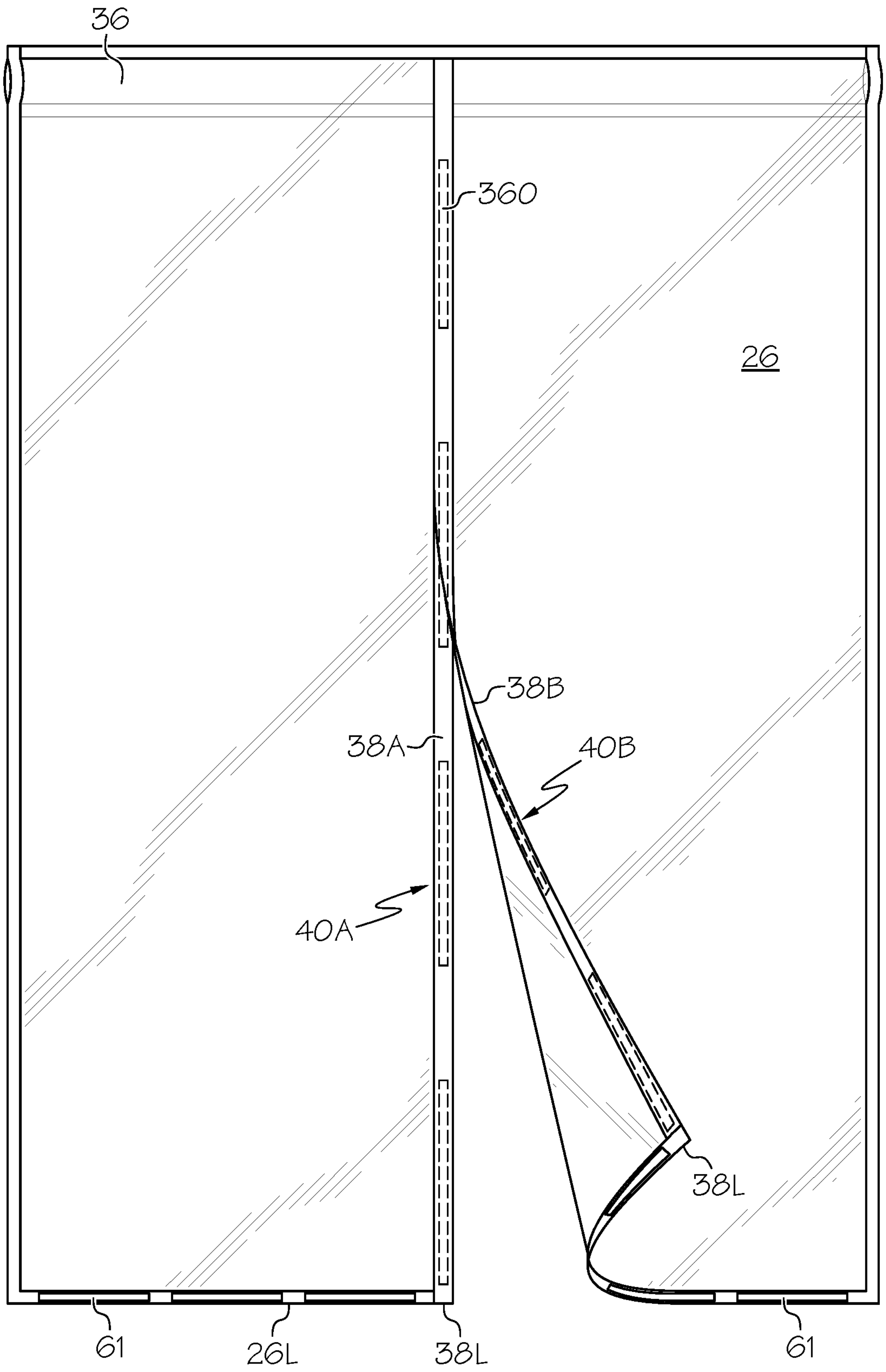
FIG. 6 is a front view of the entryway curtain, in accordance with embodiments of the present inventive concepts.

FIG. 6 is a front view of an embodiment of entryway curtain, in accordance with embodiments of the present inventive concepts. In this view it can be seen that weights 61 can be positioned along a lower end 26L of the entryway curtain 26. As described herein, the weights 61 can help to ensure registration of the first and second seams 38A, 38B by applying longitudinal tension to the body of the entryway curtain 26.

In some embodiments, magnets positioned at opposite seams 38A, 38B have opposite polarity creating a magnetic force between the left seam and the right seam so at a resting position the magnetic force is strong enough to retain the seams 38A, 38B so that that remain positioned next to each other. At the same time, the magnets can be selected to be of a weak enough strength so that their magnetic attraction force is sufficiently weak to allow an operator to break the attractive seam and readily walk through the seam without much constraint. In some embodiments the magnets are selected to be of a strength so that a simple elbow nudge would create a large enough force to break the magnetic force between the seams 38A, 38B.

In some embodiments, where elongated magnets 40A, 40B of the type illustrated in FIG. 5A, are employed, the magnets 40A of a common seam 38A are positioned along the seam 38A so that they remain a certain distance apart from each other in a vertical direction. Magnets 40B of the corresponding seam 38B are likewise positioned. This configuration helps to ensure that the two seams 38A, 38B line up properly, avoiding skew of the magnets and folding of the entryway curtain. In a case where the magnets become skewed, the bottom ends 26L of the entryways curtain would not align, forming a lower gap in the entryway curtain 26. In other embodiments, different lengths of the elongated bar magnets can be employed at a common seam 38A, with corresponding magnets of different lengths at the opposite seam 38B. This arrangement can further help to ensure proper vertical registration of the first and second seams 38A, 38B.

Figure 7:
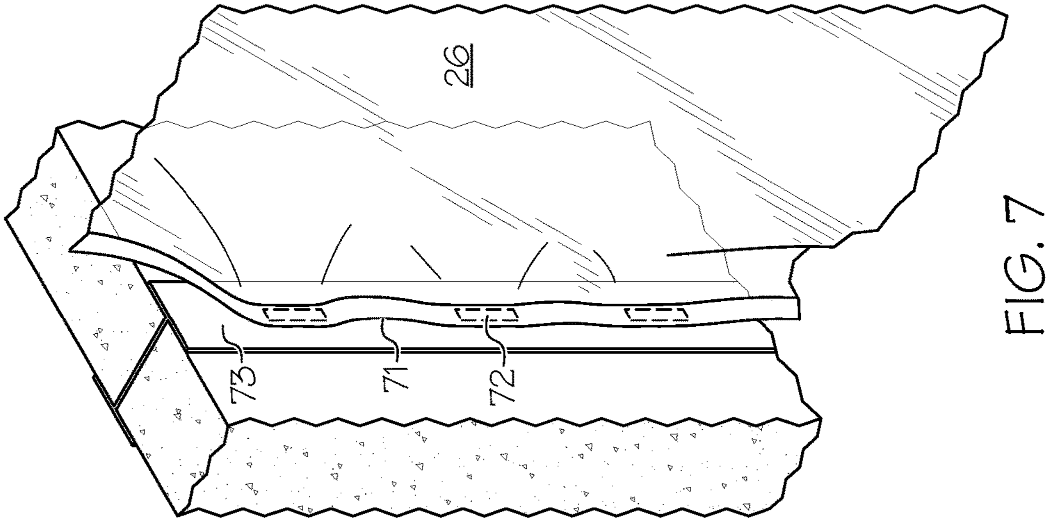
FIG. 7 is a front perspective view of an entryway curtain having a magnetic seam constructed and arranged to interface with a complementary magnetically attractive surface in accordance with embodiments of the present inventive concepts.

FIG. 7 is a front perspective view of an entryway curtain having a magnetic seam constructed and arranged to interface with a complementary magnetically attractive surface in accordance with embodiments of the present inventive concepts. In the embodiment depicted, a portion of the entryway curtain 26 may have an outer edge 71 including a plurality of magnets 72. In this manner, the outer edge 71 of the curtain can be magnetically attracted to a suitable surface, such as a steel I-beam 73 of a neighboring wall.

In some embodiments, the entryway curtain 26 can be formed of durable material. In some embodiments, the entryway curtain 26 may comprise a ruggedized Nylon material. In some embodiments, the entryway curtain 26 may comprise a nylon taffeta. In some embodiments, the entryway curtain 26 may comprise rip-stop, nylon or rip-stop, nylon taffeta. In some embodiments, the entryway curtain 26 may comprise a synthetic or natural fabric material. In some embodiments, the entryway curtain 26 may comprise a plastic material. In general, the taffeta or fabric materials have a relatively more supple and soft feel, and may serve to provide an installation that is relatively more quiet when subjected to a passing breeze or incidental touching.

In some embodiments, the entryway curtain 26 may be opaque such that a sectioned off work area is shielded from view, thereby providing a private, clean and professional appearance for the work site.

In some embodiments, outer portions of the entryway curtain 26 may have a hemmed finish, thereby creating a clean and professional look, and mitigating future fray of the material of the entryway curtain 26.

Figures 8A, 8B, 8C:
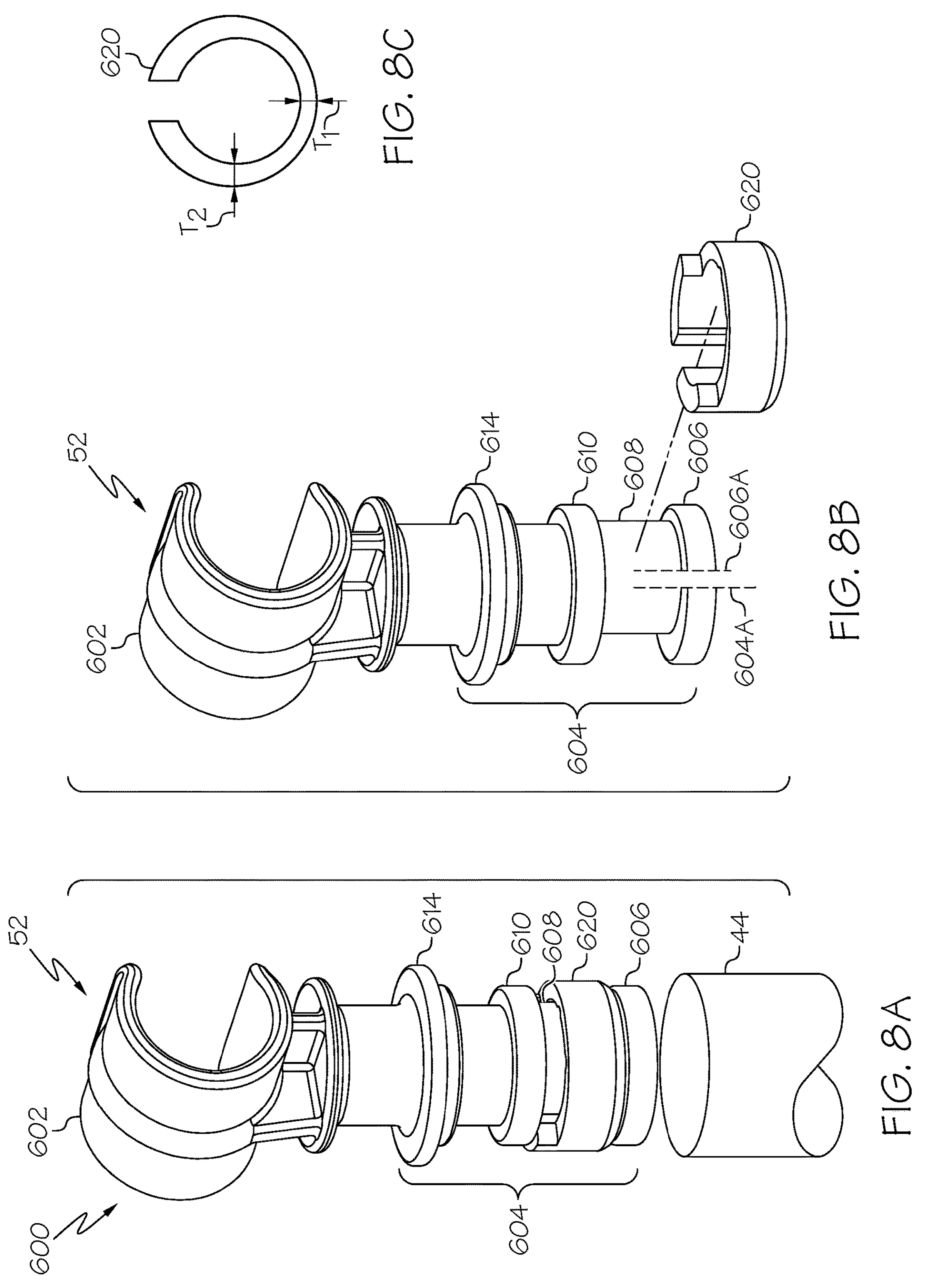
FIGS. 8A-8B are assembled-perspective and exploded-perspective views, respectively of a quick-release cross-member attachment mechanism in the form of a clip, in accordance with embodiments of the present inventive concepts.
FIG. 8C is a top view of a locking ring of a quick-release cross-member attachment mechanism, in accordance with embodiments of the present inventive concepts.

FIGS. 8A-8B are assembled-perspective and exploded-perspective views, respectively of a quick-release cross-member attachment mechanism in the form of a clip, in accordance with embodiments of the present inventive concepts.

As illustrated, cross-member attachment mechanisms 52 are constructed and arranged to be inserted into the end of a pole of a corresponding inner diameter, such as an end of the variable-length cross-member 44. The cross-member attachment mechanism 52 includes a locking base portion 604 at a first end and a clip portion 602 at a second end opposite the first end. The clip portion 602 is C-shaped and reinforced so that it can be press-fit onto a side portion of the vertical poles 12A, 12B, enabling the variable-length cross-member 44 to be attached and coupled to the vertical poles 12A, 12B. The locking base portion 604 includes a twist-locking mechanism comprising a locking ring 620 that engages an eccentric spool 608. The central axis 608A of the spool 608 is spaced apart from the central axis 604A of the body of the base portion 604. As shown in FIG. 8C, the locking ring 620 has a thickness that varies between a relatively thick portion T2 and a relatively thin portion T1. In this manner, the locking ring 620 can be positioned at a first position on the eccentric spool 608 to minimize interference of the locking base portion 604 with the interior of the pole, allowing the locking base portion 604 to freely slide into and out of the end of a corresponding pole 44. Then, by twisting the cross-member attachment mechanism 52 relative to the pole, the thicker portion T2 can be made to interfere with the inner region of the pole 44, causing the cross-member attachment mechanism 52 to lock within the end of the pole. A simple twist in the opposite direction again releases the locking mechanism to allow the cross-member attachment mechanism 52 to be removed from the end of the pole. In some embodiments, the locking ring 620 is seated between first and second seats 606, 610 to prevent its release from the spool 608. Lip 614 can be provided at the interface of the base portion 604 and the clip 602 to provide a reference for maximum pole insertion of the cross-member attachment mechanism 52.

While in the embodiment of FIGS. 8A and 8B, the clip 602 is illustrated to have a 'C'-shaped cross-section, other clips or attachments arrangements suitable for coupling the variable-length cross-member 44 to the vertical poles 12A, 12B may equally apply to the principles of the present inventive concepts. In some example embodiments, the cross-member attachment mechanisms 52A, 52B may comprise pins and mating holes, bars, rods, clamps, hook-and-loop systems and the like for coupling the variable-length cross-member 44 to the vertical poles 12A, 12B.

Figure 8D:
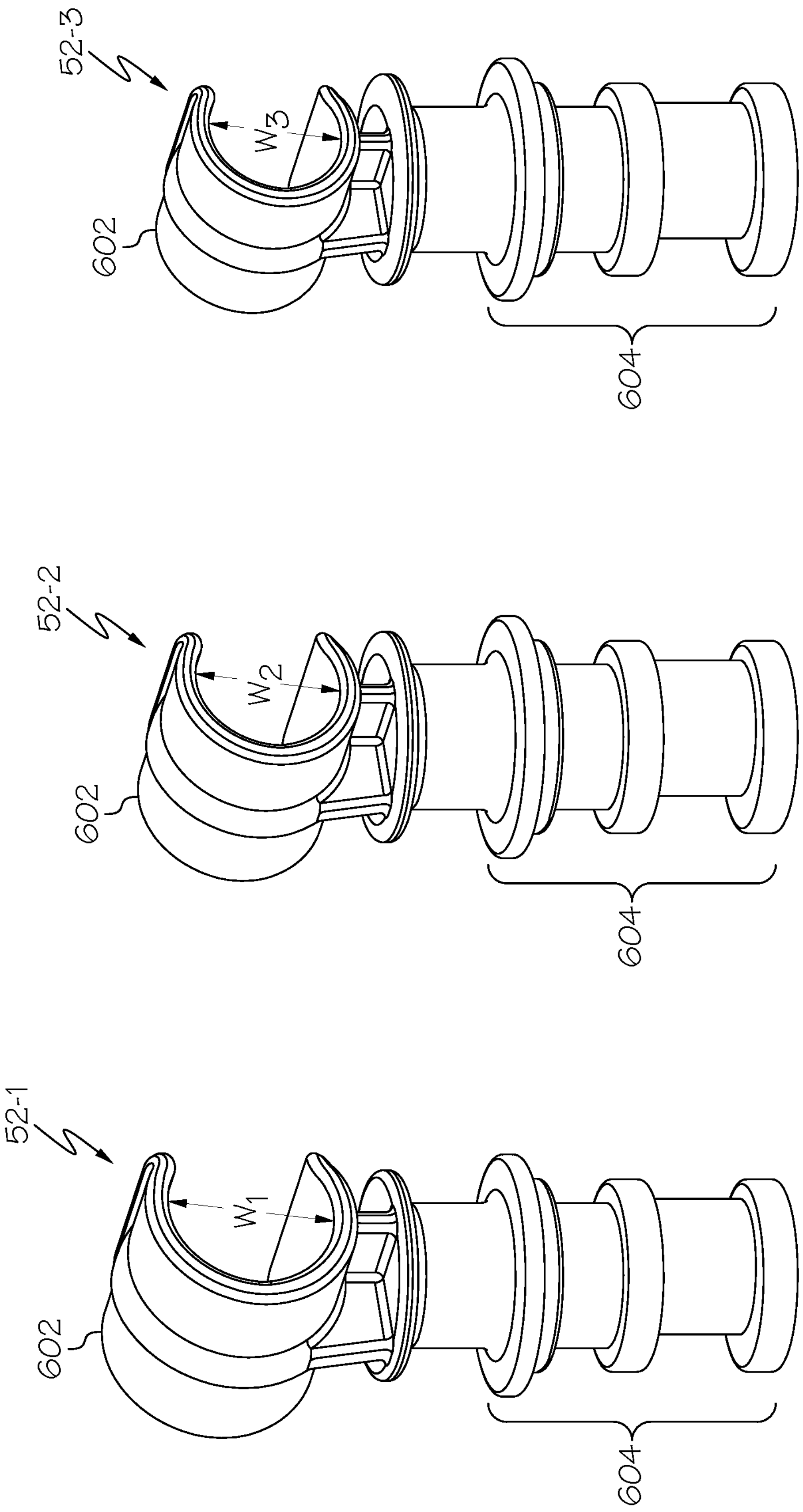
FIG. 8D is a perspective view of a plurality of cross-member attachment mechanisms having C-clips of respectively different inner widths, in accordance with embodiments of the present inventive concepts.

In some embodiments, the vertical poles 12 to which the cross-member attachment mechanisms 52A, 52B are to be attached are telescoping poles having segments of different outer widths. As a result, the outer width of the segment of the pole 12 to which the cross-member attachment mechanisms 52A, 52B are to be coupled may vary. Accordingly, embodiments of the present inventive concepts may include a plurality of cross-member attachment mechanisms 52 having C-clips 602 of different inner widths W1, W2, W3. For example, in the embodiment illustrated in FIG. 8D, it is demonstrated that cross-member attachment mechanisms 52-1, 52-2, 52-3 each have a C-clip 602 of a different respective inner width W1, W2, W3. For example, in some embodiments, W1>W2>W3. The cross-member attachment mechanisms 52 further include a locking base portion 604 of the quick-release type described herein. Accordingly, an installer can quickly install a suitably sized C-clip at the ends of the variable-length cross-member 44, depending on the outer width of the pole and pole segment to which the C-clip is to be coupled.

Figure 9:
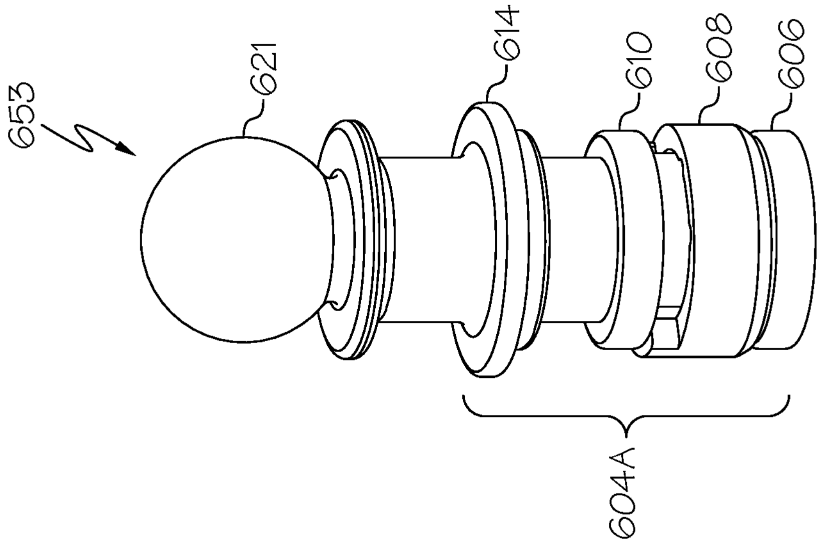
FIG. 9 is an assembled perspective view of a quick-release universal joint mechanism constructed and arranged for insertion at the end of a hollow cylindrical pole, in accordance with embodiments of the present inventive concepts.

FIG. 9 is an assembled perspective view of a quick-release universal joint mechanism 653 constructed and arranged for insertion at the end of a hollow cylindrical pole, in accordance with embodiments of the present inventive concepts. It can be seen in this embodiment that the base portion 604 of the mechanism is the same as, or similar to, the base portion of the cross-member attachment mechanism 52 described herein. In the present embodiment, however, the top portion of the mechanism comprises a ball of a ball-and socket joint. In some examples, the ball may be sized in accordance with the standard ball-and-socket universal joint used in connection with Zipwall dust partition systems sold by Zipwall LLC, Arlington, Massachusetts, United States.

Figure 10B:
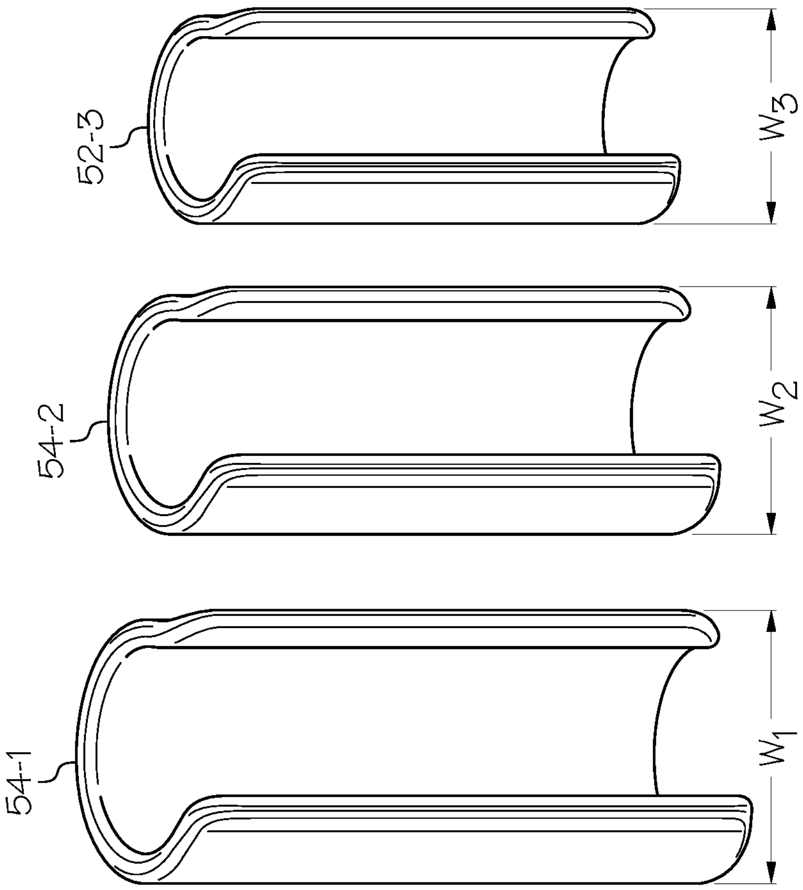
FIG. 10B is a perspective view of a plurality of curtain clips of respectively different inner widths, in accordance with embodiments of the present inventive concepts.
Figure 10A:
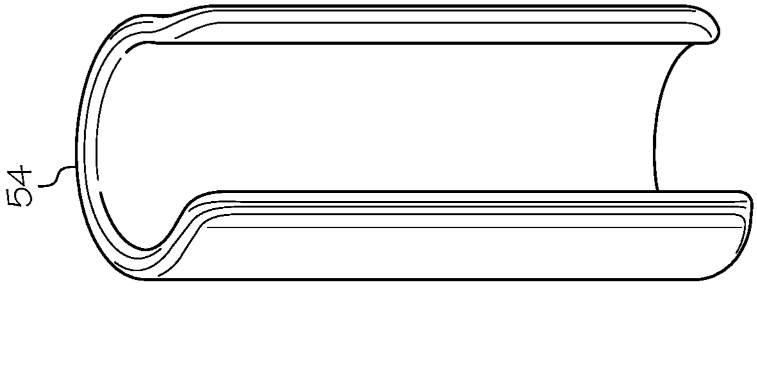
FIG. 10A is a perspective view of a curtain clip in accordance with embodiments of the present inventive concepts.

FIG. 10A is a perspective view of a curtain clip 54 in accordance with embodiments of the present inventive concepts. In some embodiments the curtain clips 54 are employed to clip portions of the entryway curtain to side portions of the vertical poles 12A, 12B. As shown in FIG. 10B, in some embodiments, the curtain clips 54 can comprise a plurality of curtain clips 54-1, 54-2, 54-3 configured to have a plurality of inner widths W1, W2, W3 so that they are compatible with pole segments of a corresponding plurality of outer widths. In some embodiments the inner widths of the clips can be represented by W1, W2, W3 where W1>W2>W3.

Figure 11:
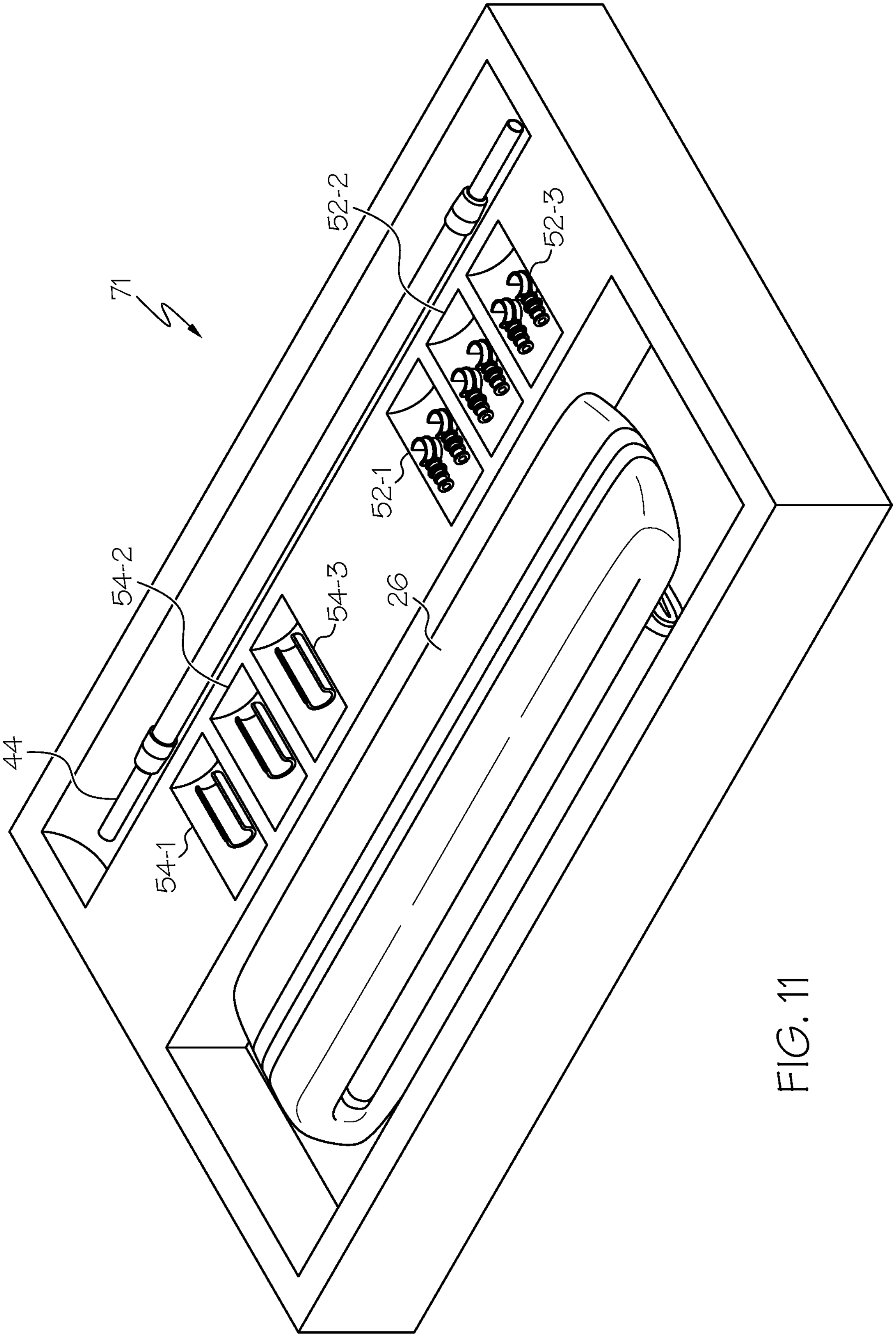
FIG. 11 is a perspective view of a kit for a hands-free partition entryway mechanism, in accordance with embodiments of the present inventive concepts.

FIG. 11 is a perspective view of a kit for a hands-free partition entryway mechanism, in accordance with embodiments of the present inventive concepts. In some embodiments, the kit 71 includes an entryway curtain 26, a variable-length cross member 44, and a plurality of pairs of cross-member attachment mechanisms 52-1, 52-2, 52-3 of different respective inner widths W1, W2, W3. Optionally, the kit may further include a plurality of sets of curtain clips 54-1, 54-2, 54-3, each set configured to have a plurality of inner widths W1, W2, W3.

Figure 12:
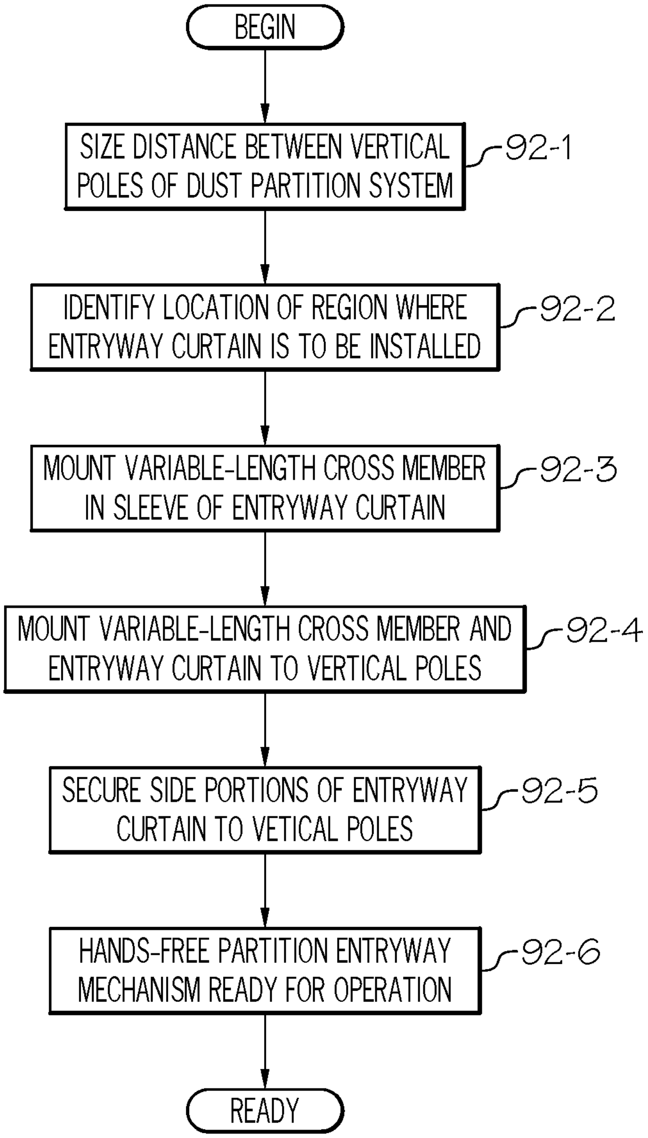
FIG. 12 is a flow diagram of a method of installing hands-free partition entryway mechanism, in accordance with embodiments of the present inventive concepts.

FIG. 12 is a flow diagram of a method of installing hands-free partition entryway mechanism, in accordance with embodiments of the present inventive concepts.

Initially, the distance d between the vertical poles of the dust partition system is sized 92-1, as described herein in connection with FIG. 1A.

Next, the location of the region R where the entryway curtain is to be installed is identified 92-2, as described herein the connection with FIG. 1B.

The variable-length cross-member is mounted to the sleeve of the curtain 92-3 and the variable-length cross-member and entryway curtain are mounted to the vertical poles 92-4 as described herein the connection with FIG. 1C.

Side portions of the entryway curtain are secured to the vertical poles 92-5, as described herein the connection with FIG. 1D.

The hands-free partition entryway system is now ready for operation 92-6, as described herein the connection with FIGS. 1E-1G.

Figure 13:
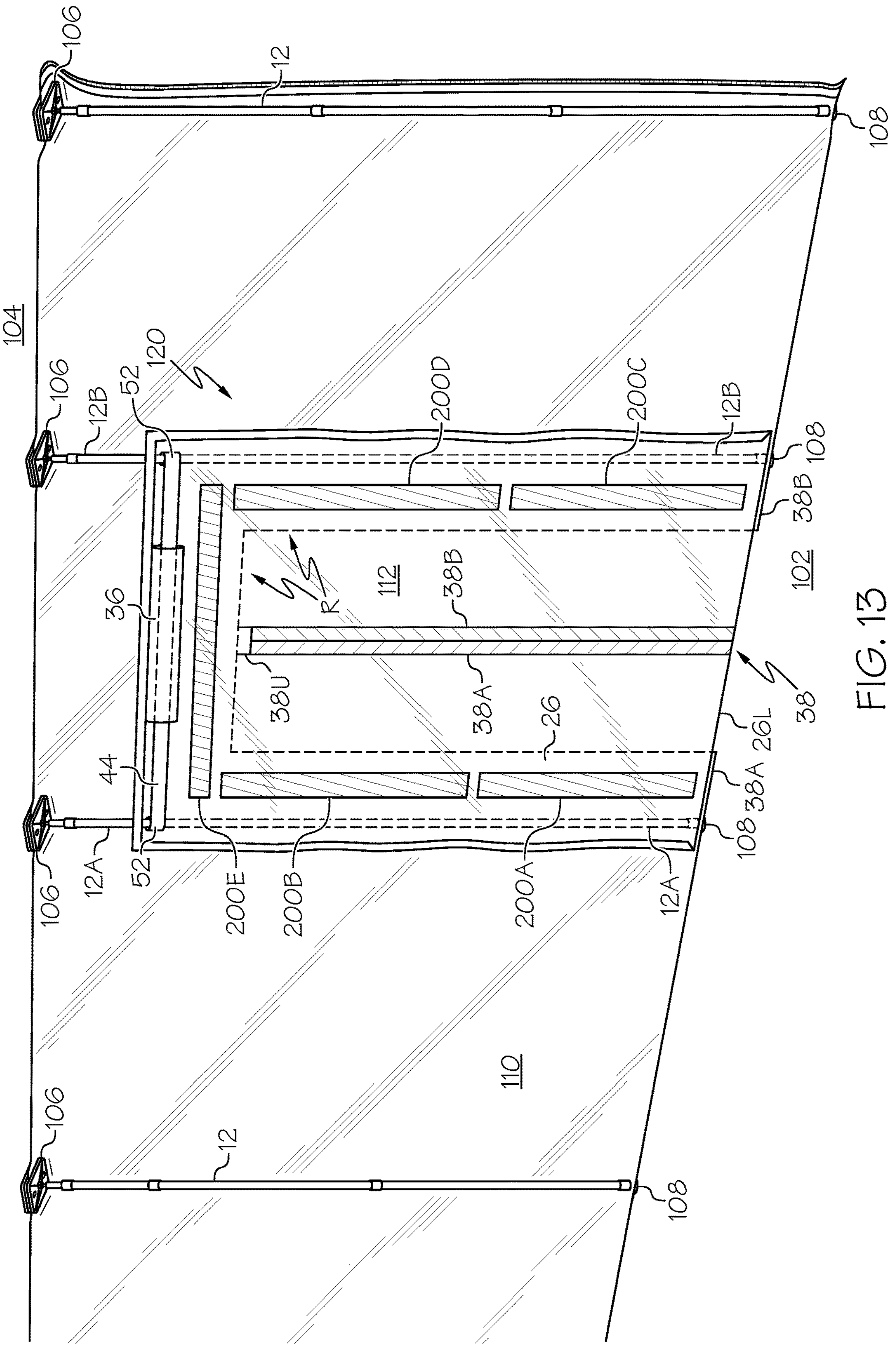
FIG. 13 is a perspective front view of a self-closing entryway, in accordance with additional embodiments of the present inventive concepts.

FIG. 13 is a perspective front view of a self-closing entryway, in accordance with additional embodiments of the present inventive concepts. In the present embodiment, it can be seen that the entryway curtain 26 including the self-closing seam 38 is mounted to the partition curtain 110 and poles 12A, 12B using the variable-length cross member 44, as described herein. One difference in the present embodiment is that the cross-member sleeve 36 of the entryway curtain 26 is of the type that includes openings at locations intermediate the body of the entryway curtain 26 so that the cross-member sleeve 36 does not extend to left and right edge regions of the entryway curtain 26. Accordingly, the ends of the variable-length cross member 44 and its corresponding attachment mechanisms are exposed, for example in a manner similar to the embodiments shown and described in connection with FIG. 2Bii and FIG. 4E.

In the present embodiment of FIG. 13, it can also be seen that the entryway curtain clips 54 (see FIG. 1D) are not necessary for attaching the entryway curtain 26 to the partition curtain 110. Instead, a plurality of curtain mounting straps 200A-200E are included for mounting the body of the entryway curtain 26 to the partition curtain 110. As described herein, the curtain mounting straps 200A-200E each include a front strap and a back strap that couple to each other with portions of the entryway curtain 26 and the partition curtain 110 therebetween. The front strap and back strap secure portions of the entryway curtain 26 to prevent movement of the entryway curtain 26 relative to the partition curtain.

As shown in FIG. 13, the curtain mounting straps 200A-200E can be positioned to surround the region R of the opening in the partition curtain 110 that corresponds with the installed entryway curtain 26. In some embodiments, first and second curtain mounting straps 200A, 200B are positioned are left sides of the self-closing seam 38 in a vertical orientation, while third and fourth curtain mounting straps 200C, 200D are positioned are right sides of the self-closing seam 38 in a vertical orientation. The curtain mounting straps 200A, 200B, 200C, 200D are positioned between an outer left/right edge of the entryway curtain 26 and an inner left-right edge of the region R of the opening of the partition curtain 110. Similarly, a fifth curtain mounting strap 200E is positioned above the top of the self-closing seam 38U and below the cross-member sleeve 36 in a horizontal orientation. The curtain mounting straps 200E is positioned between a top edge of the entryway curtain 26 and an inner top edge of the region R of the opening of the partition curtain 110. In this manner, the curtain mounting straps 200A-200E operate to secure the position of the entryway curtain 26 relative to the partition curtain 110.

In some embodiments, the entryway curtain 26 can be secured in position relative to the partition curtain 110 using the curtain mounting straps themselves, without the need for the entryway curtain clips 54 (see FIG. 1D) being attached to the bodies of the poles 12A, 12B. In other embodiments, the entryway curtain clips 54 can further optionally be used to enhance the strength of the installation.

FIGS. 14A-14F are perspective front views of a method for installing and operating a self-closing entryway, in accordance with the embodiment illustrated and described in connection with FIG. 13, in accordance with the present inventive concepts.

Figure 14A:
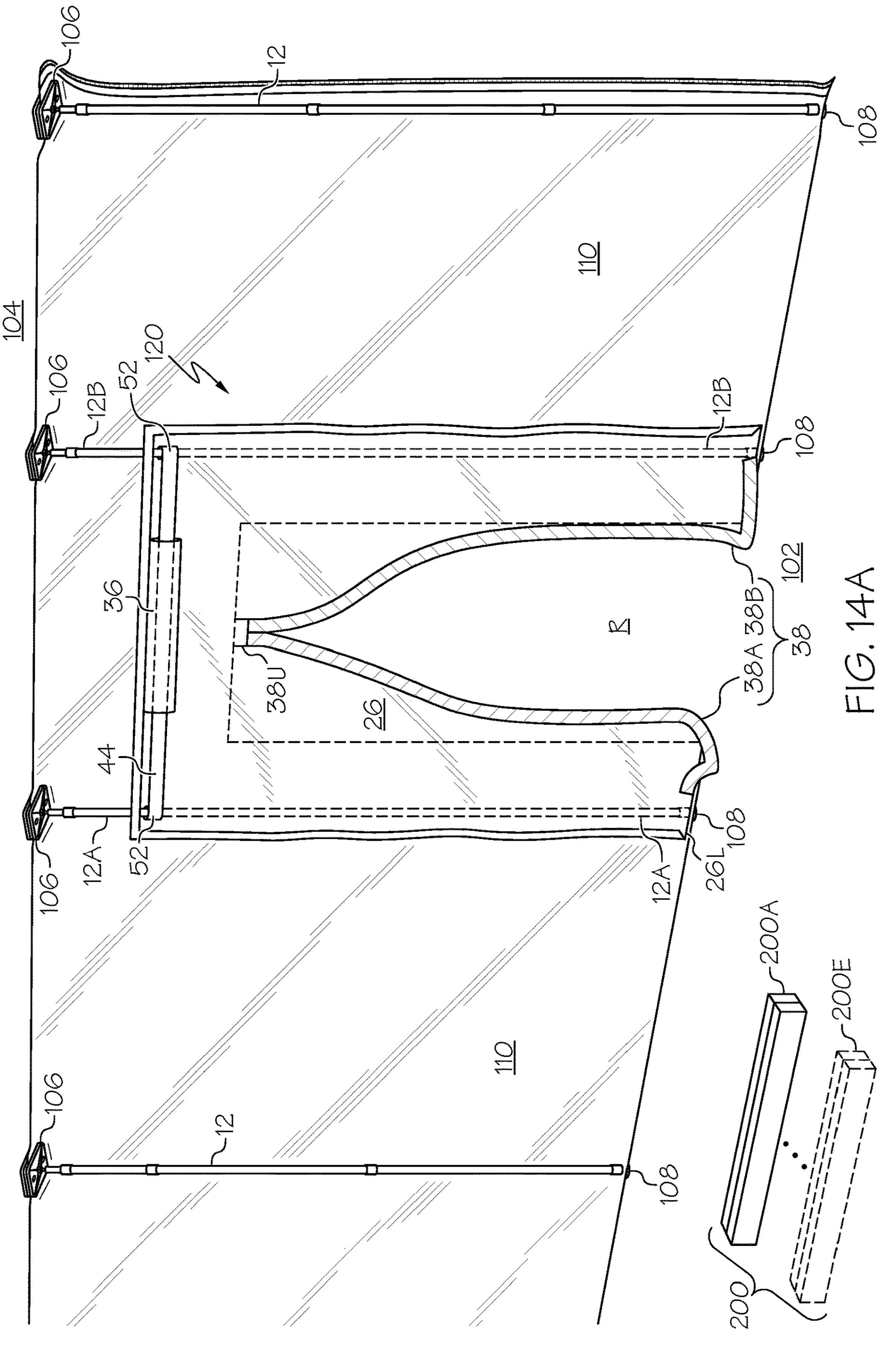
FIGS. 14A-14F are perspective front views of a method for installing and operating a self-closing entryway, in accordance with the embodiment illustrated and described in connection with FIG. 13, in accordance with the present inventive concepts.

With reference to FIG. 14A, in some embodiments, and as described herein in connection with FIG. 1C, the installer positions the variable-length cross-member 44 within a sleeve 36 of the entryway curtain 26 and raises the cross-member 44 and entryway curtain into position between the first and second vertical poles 12A, 12B at a top portion of the opening 112 defined in the region R. First and second ends of the variable-length cross-member 44 are attached to side body portions of the first and second vertical poles 12A, 12B using the cross-member attachment mechanisms 52, as described herein.

With reference to FIG. 14A, in some embodiments, an installer next opens the seam 38 and prepares to install the entryway curtain clips 200. The seam 38 is opened since a front portion of each curtain clip 200 is installed at a front surface of the entryway curtain 26/partition curtain 110, while a rear portion of each curtain clip 200 is installed at a rear surface of the entryway curtain 26/partition curtain 110. Simultaneous access to both front and rear surfaces is therefore desired. Alternatively two installers can be positioned at front and rear surfaces of the installation site.

Figure 14B:
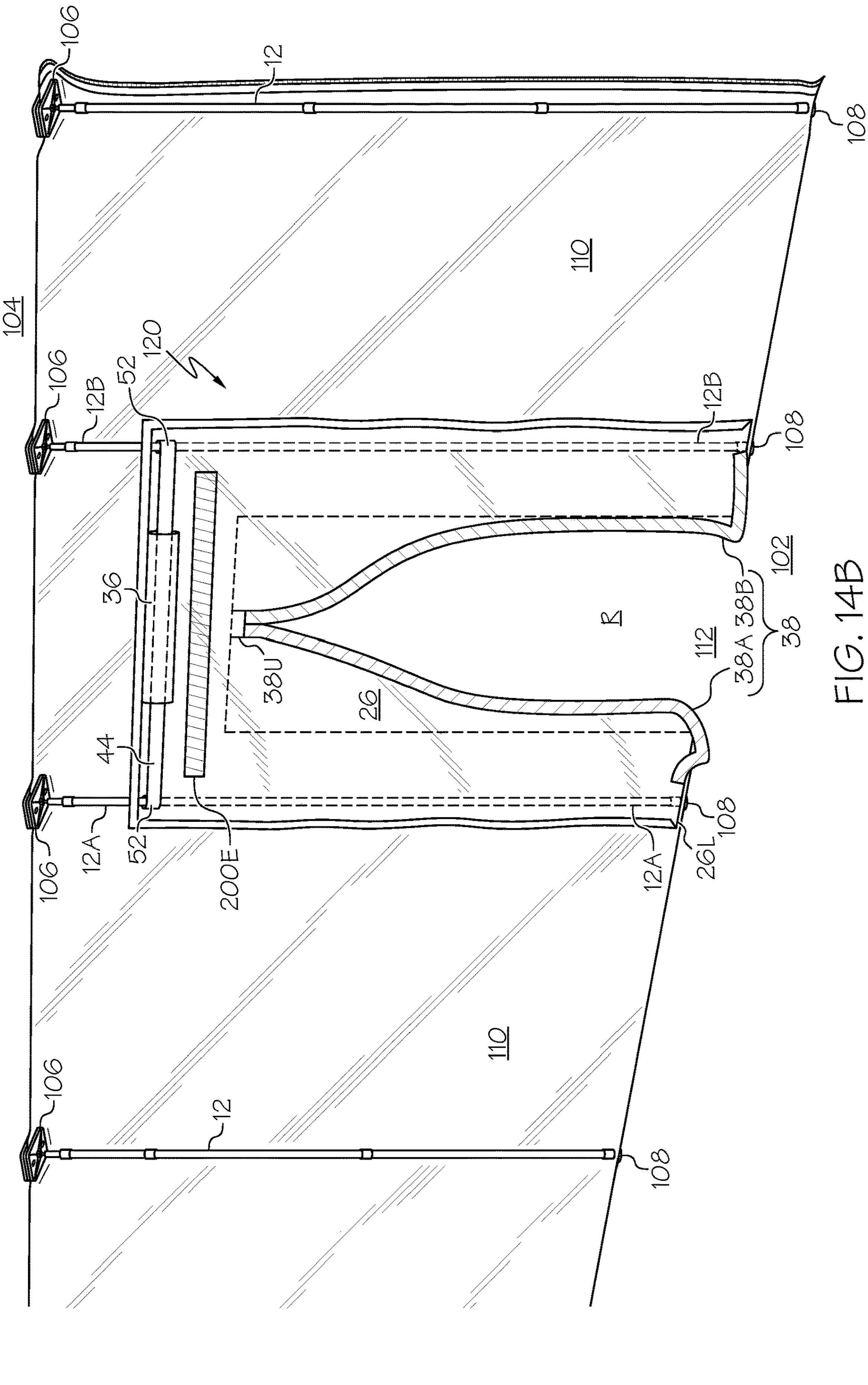

With reference to FIG. 14B, in some embodiments, an installer installs the fifth curtain mounting strap 200E above the top of the self-closing seam 38U and below the cross-member sleeve 36 in a horizontal orientation. In doing so, the installer can position the fifth curtain mounting strap 200E so that a bottom 26L of the entryway curtain 26 is positioned at a suitable distance relative to the floor 102, is positioned to barely glance at the floor 102, or is positioned to lay on the floor 102, as desired.

Figure 14C:
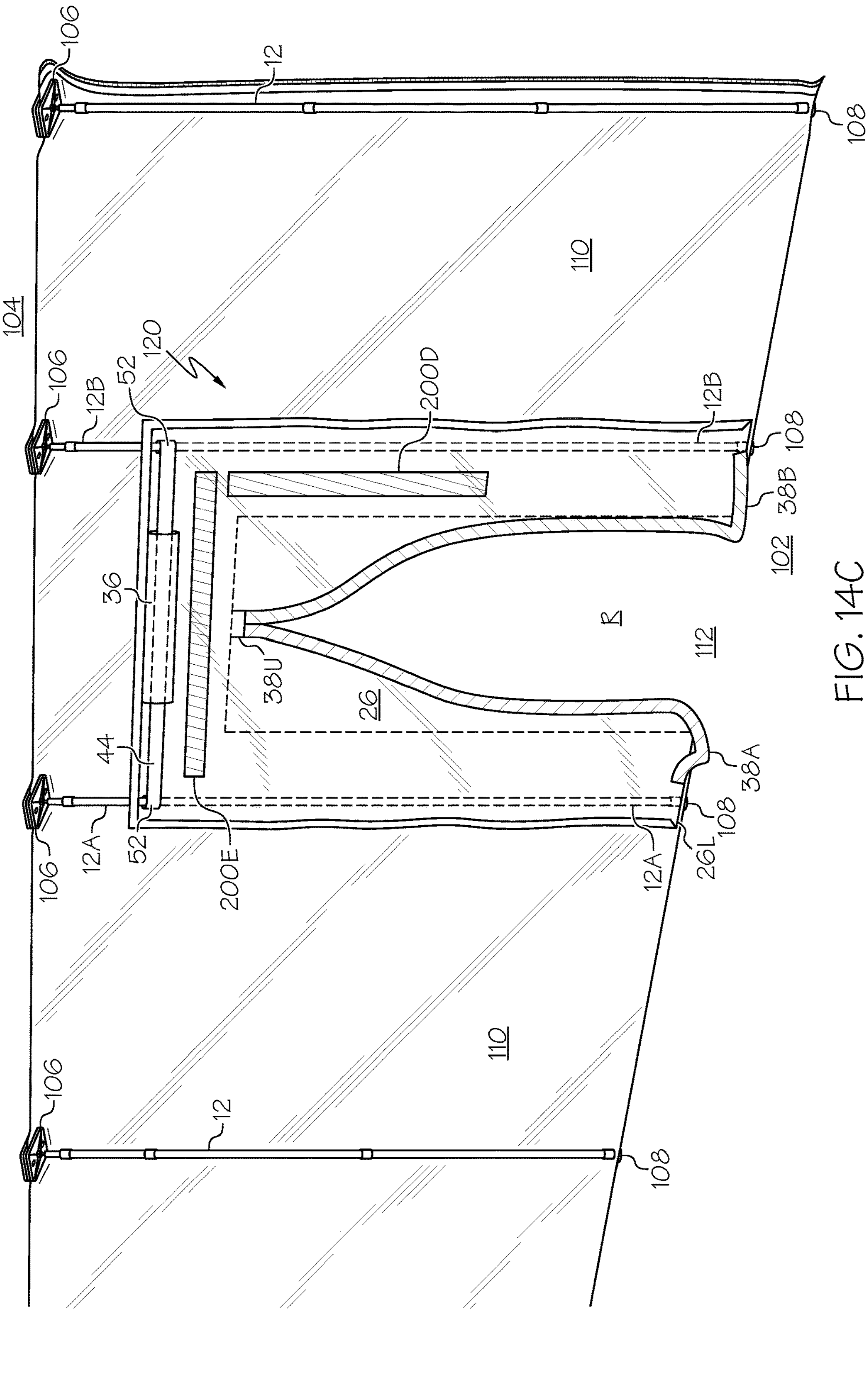
Figure 14D:
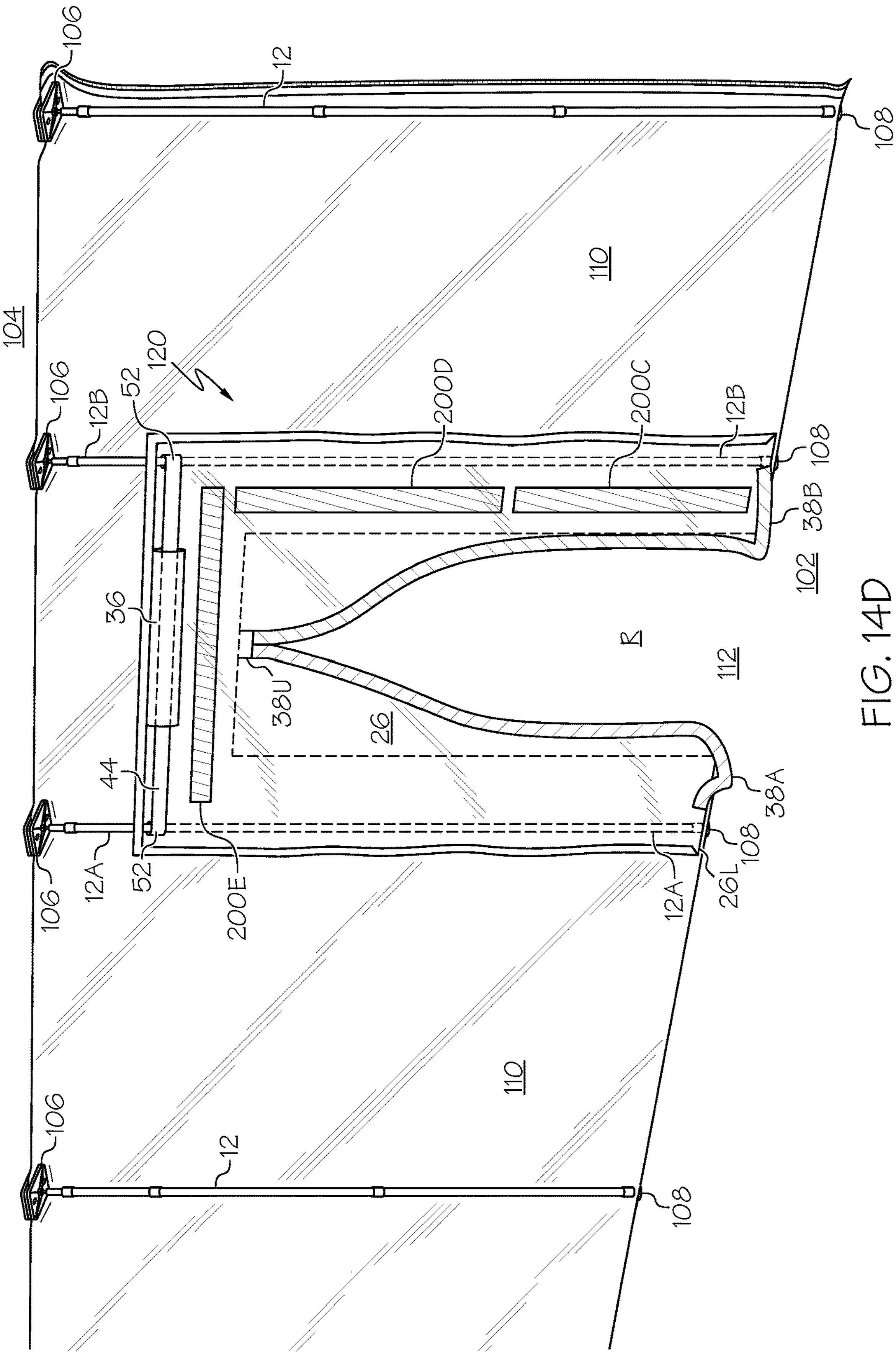

With reference to FIG. 14C, in some embodiments, an installer installs the fourth curtain mounting strap 200D between an outer right edge of the entryway curtain 26 and an inner right edge of the region R of the opening 112 of the partition curtain 110. With reference to FIG. 14D, in some embodiments, an installer installs the third curtain mounting strap 200C between an outer right edge of the entryway curtain 26 and an inner right edge of the region R of the opening 112 of the partition curtain 110, below the fourth curtain mounting strap 200D.

Figure 14E:
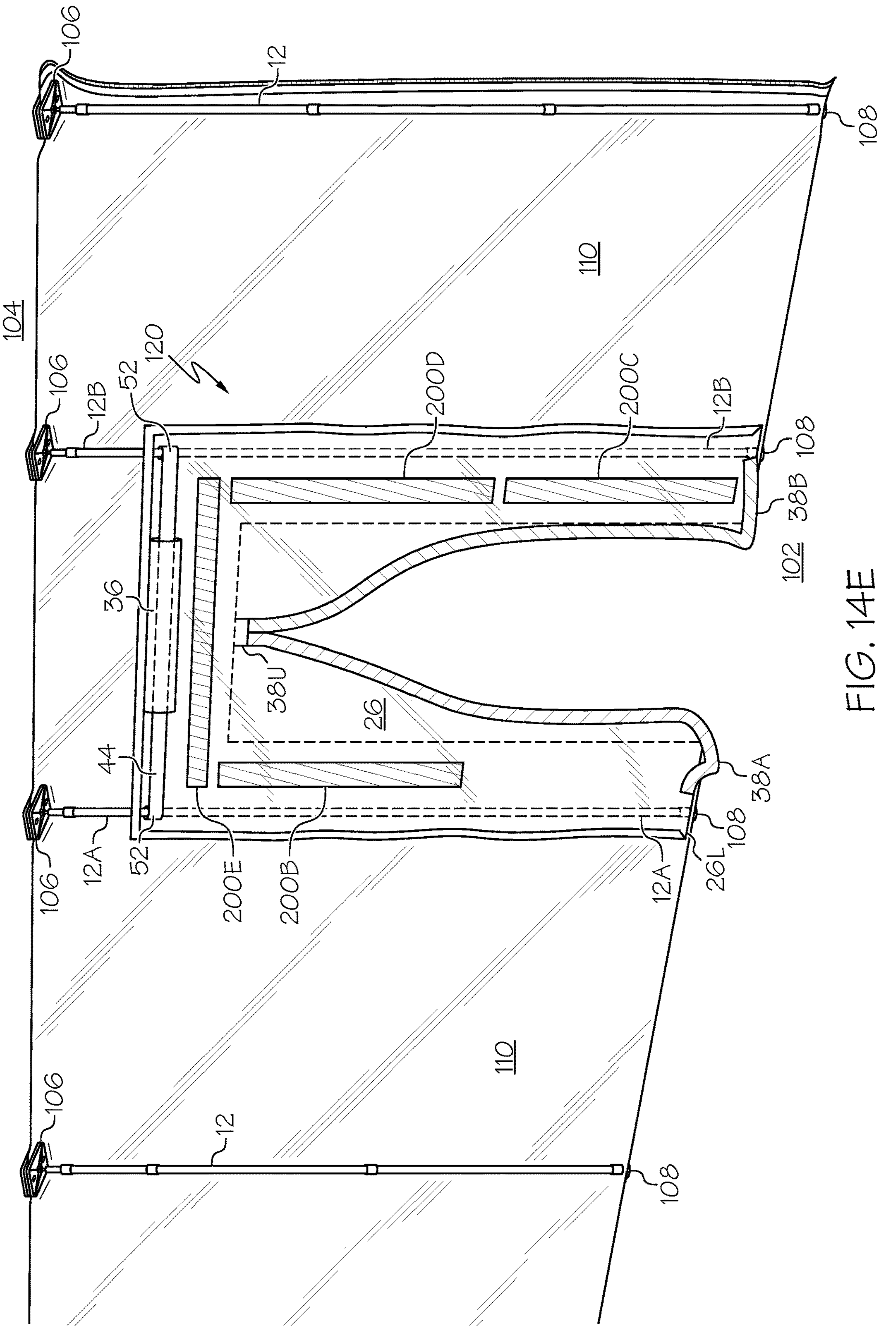
Figure 14F:
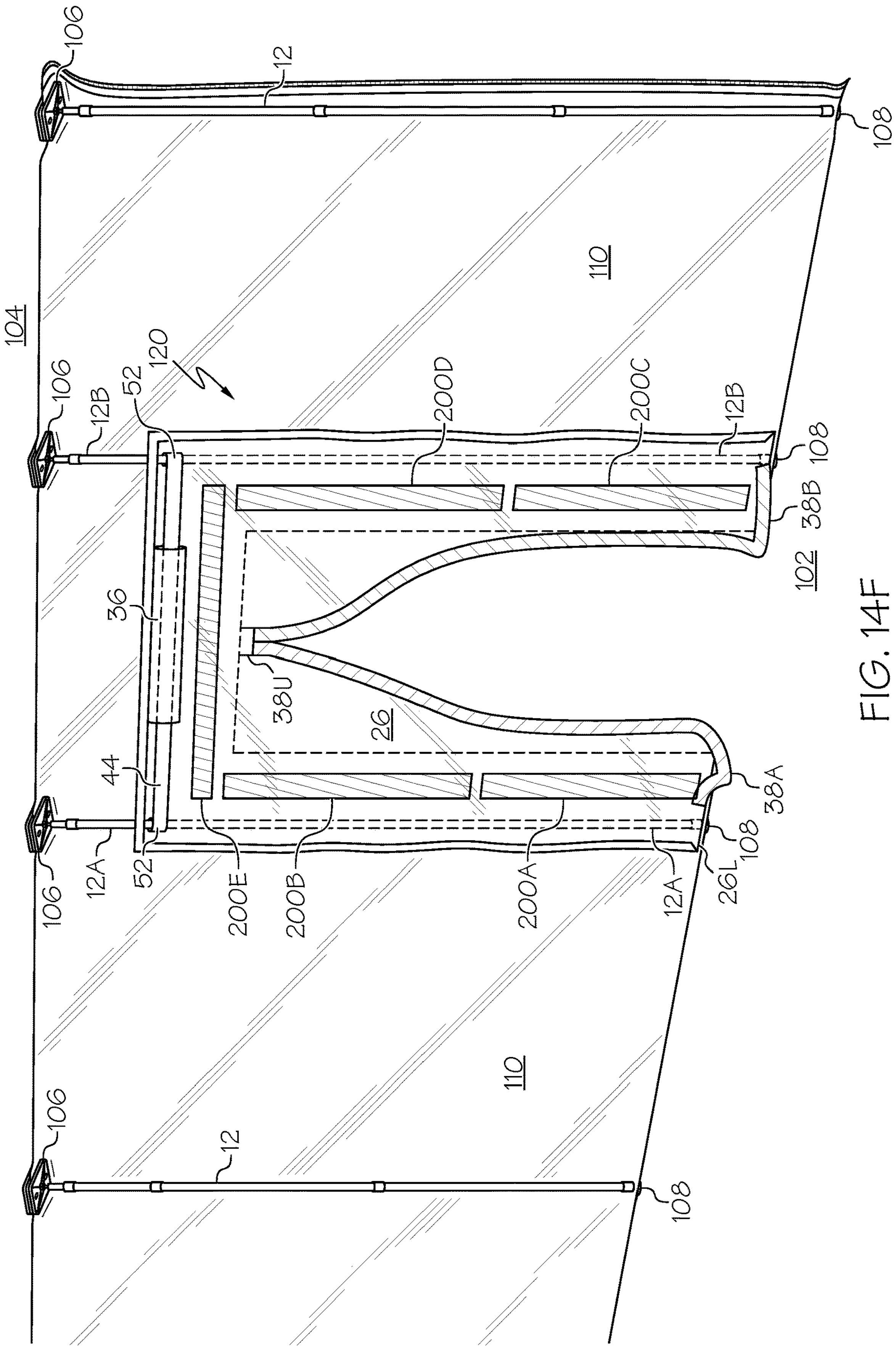

With reference to FIG. 14E, in some embodiments, an installer installs the second curtain mounting strap 200B between an outer left edge of the entryway curtain 26 and an inner left edge of the region R of the opening 112 of the partition curtain 110. With reference to FIG. 14F, in some embodiments, an installer installs the first curtain mounting strap 200A between an outer left edge of the entryway curtain 26 and an inner left edge of the region R of the opening 112 of the partition curtain 110, below the second curtain mounting strap 200B.

While installation of the curtain mounting straps 200A-200E is described and illustrated in a particular order, beginning with the fifth curtain mounting strap 200E and subsequent sequential installation of the remaining fourth through first mounting straps 200D-200A, any suitable order of installation is equally applicable to the principles of the present inventive concepts. For example, the first 200A and third 200C curtain mounting straps may first be mounted, followed by the second and fourth curtain mounting straps 200B, 200D, and followed by the fifth curtain mounting strap 200E. Any order of install is possible and equally applicable.

FIGS. 15Ai and 15Bi are perspective views of embodiments of curtain mounting straps in accordance with the present inventive concepts. FIGS. 15Aii and 15Bii are close-up perspective views of embodiments of the curtain mounting straps of FIGS. 15Ai and 15Bi in mounted positions in accordance with the present inventive concepts.

In a first embodiment illustrated in FIG. 15Ai, 15Aii, a curtain mounting strap 200 comprises a first strap portion 220 and a second strap portion 222. The first strap portion 220 comprises an elongated concave receiver. In some example embodiments the first strap portion 220 may comprise a pliable, soft, material such as plastic or rubber. The second strap portion 222 similarly comprises an elongated member that is sized to be press-fit into a concave region 224 of the first strap portion 220. In some example embodiments the second strap portion 222 may comprise a pliable, soft, material such as plastic or rubber tubing or cloth or nylon rope. The concave region 224 of the first strap 220 may expand to receive and retain the body of the second strap 222, with corresponding portions of the entryway curtain 26 and partition curtain 110 retained therebetween.

In a second embodiment illustrated in FIG. 15Bi, 15Bii, a curtain mounting strap 200 comprises a first strap portion 202 and a second strap portion 204. The first strap portion 202 comprises an elongated concave receiver. In some example embodiments the first strap portion 202 may comprise a pliable, soft material or a rigid material. In various embodiments, the material of the first strap portion 202 may comprise plastic, rubber, wood, carbon fiber, composite, metal, alloy or steel. The second strap portion 204 similarly comprises an elongated member that is sized to be received by a concave region 216 of the first strap portion 202. In some example embodiments the second strap portion 204 may comprise a pliable, soft material or a rigid material. In various embodiments, the material of the second strap portion 202 may comprise plastic, rubber, wood, carbon fiber, composite, metal, alloy or steel.

In some embodiments, magnets 210 can be positioned at regions of the second strap portion 204. In various embodiments, the magnets 210 can take the form of discrete magnetic buttons or magnetic strips, as desired. In some embodiments, locations of the first strap portion 202 corresponding to the magnets 210 of the second strap portion 204 can include steel segments 214 that are magnetically attractive to the magnets 210. In this manner, the first and second strap portions 202, 204 can magnetically attract each other through the surfaces of the entryway curtain 26 and partition curtain 110 retained therebetween.

In alternative embodiments, the magnets 210 may be provided on the first strap portion 202 and the steel segments 214 provided on the second strap portion 204.

In alternative embodiments, a body the first strap portion 202 or second strap portion 204 that does not include the magnets 210 can be formed of magnetically attractive material such as steel. In this manner, discrete magnetically attractive segments are not needed.

In alternative embodiments, pads 218, for example formed of a compressible, resilient material such as foam, can be provided on the first or second strap portions 202, 204 at locations between the positions of the magnets 210 and/or between the positions of steel segments 214 to further compress the portions of the entryway curtain 26 and partition curtain 110 retained therebetween.

FIGS. 15Ci and 15Cii are a cross-sectional perspective views of an alternative embodiment of a curtain mounting strap 200 in accordance with the present inventive concepts. In the embodiment of FIG. 15C, the first strap portion 232 includes a first concave region 237 and the second strap portion 234 includes a second concave region 239. A magnet 210 is mounted to the second concave region 239 of the second strap portion 234. In some embodiments, the first strap portion 232 is formed of an extruded metal material that is magnetically attractive. As can be seen in FIG. 15Cii, the first strap portion 232 and second strap portion 234 are attracted to each other to compress and retain the portions of the entryway curtain 26 and partition curtain 110 retained therebetween. Side tabs 232A positioned at sides of the second strap portion 234 extend the contact surface between the first strap portion 232 and second strap portion 234 to even further secure the entryway curtain 26 and partition curtain 110 to each other.

Figure 15D:
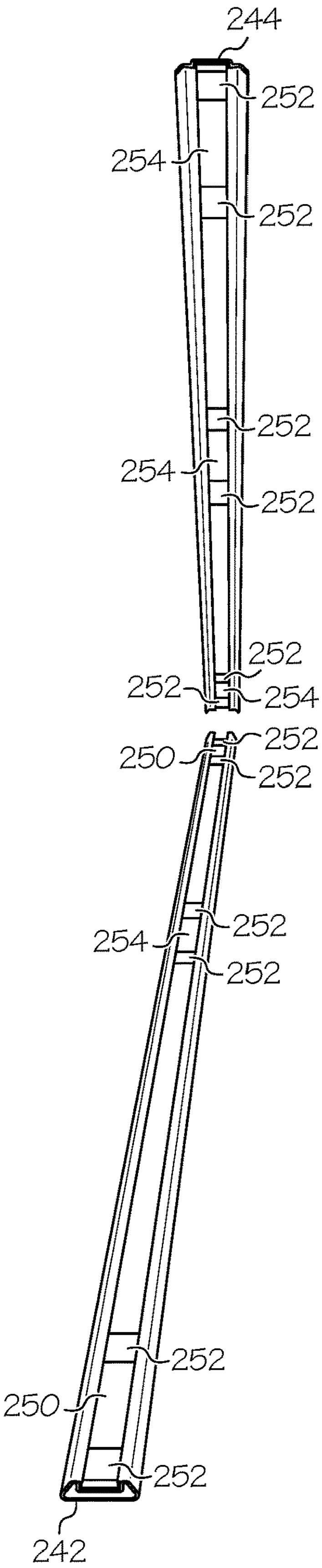
FIGS. 15Di-15Div are perspective views of embodiments of curtain mounting straps in accordance with the present inventive concepts.

FIGS. 15Di-15Div are perspective views of embodiments of curtain mounting straps in accordance with the present inventive concepts. FIG. 15Di is an exploded view. FIGS. 15Dii-15Div are close-up perspective views of the curtain mounting straps.

In the embodiment of FIG. 15Di, a first strap portion 242 includes a plurality of plastic spacers 252. The spacers 252 are positioned apart from each other in a longitudinal direction of the first strap portion 242. Pairs of the spacers 252 positioned in relative proximity to each other operate to provide for location of, and retention of, one or more magnets 250 between them. The spacers 252 operate to prevent the magnets 250 from sliding in a longitudinal direction of the concave region of the first strap portion 242. In some embodiments, the body of the first strap portion 242 is formed of a plastic or nylon material. In such a case, is can be difficult to ensure a proper and permanent bond of the ferromagnetic material of the magnets 250 directly to the body of the first strap portion 242. Accordingly, the spacers 252 can be formed of a similar plastic or nylon material and readily bonded to the plastic or nylon material of the first strap portion 242. In such an embodiment, the spacers 252 and magnets 250 can be positioned in a longitudinal slot of the first strap portion 242. The longitudinal slot will be described in further detail herein. In some embodiments, the longitudinal slot is dimensioned to capture and retain side walls of the spacers 252 and magnets 250, while exposing upper portions of their primary surfaces. Upon positioning of the spacers 252 and magnets 250, lower portions of the primary surfaces of the spacers 252 can be bonded directly to an inner surface of the longitudinal slot.

A second strap portion 244 is provided to mate with the first strap portion 242. In the second strap portion 244, however, metal inserts 254 are provided as an attractive contact for the magnets 250 of the first strap portion 242. The metal inserts 254 are magnetically attractive and can be formed of a material such as steel, nickel, cobalt, or any suitable magnetically attractive material. The metal inserts 254 are flanked by spacers 252 in a manner similar to the configuration of the first strap portion 242. In some embodiments, the plastic or nylon spacers 252 can be bonded directly to the inner surface of the longitudinal slot, as described herein in connection with the first strap portion 242. In this manner, the plastic or nylon spacers can operate as a locator and retainer for the metal inserts 254. In some embodiments, the metal inserts are located at longitudinal positions along the body of the second strap portion 244 so that they correspond with the positions of the magnets 250 along the body of the first strap portion 242.

Referring to FIG. 15Dii, the longitudinal slots of the straps 242, 244 are defined by first tabs 246 of the first strap portion 242 and second tabs 248 of the second tab portion.

The longitudinal slot of the first strap 242 includes a sidewall 247*a* and a base 247*b* at side and lower portions thereof. The first tabs 246 form an upper lip of the longitudinal slot. In this manner, the magnets 250 and spacers 252 (see FIG. 15Di) are seated in the longitudinal slot, and the first tabs 246 prevent release of the magnet 250, while providing a window for exposure of an upper surface thereof. In some embodiments, the first tabs 246 are of a sufficient structural robustness so as to prevent inadvertent release, such as due to twisting or breaking through, of the magnet 250 through the window formed between the first tabs 246, for example that may be as result of magnetic attractive force of the magnet 250 with the metal insert 254 or with another piece of magnetically attractive metal.

The longitudinal slot of the second strap 244 includes a sidewall 249*a* and a base 249*b* at side and upper portions thereof. The second tabs 246 form a lower lip of the longitudinal slot. In this manner, the metal inserts 254 and spacers 252 (see FIG. 15Di) are seated in the longitudinal slot, and the second tabs 248 prevent release of the metal inserts 254, while providing a window for exposure of a lower surface thereof. In some embodiments, the second tabs 248 are of a sufficient structural robustness so as to prevent inadvertent release of the metal insert 254 through the window formed between the second tabs 248, for example that may be as result of magnetic attractive force of the magnet 250 with the metal insert 254.

FIG. 15Dii illustrates a cross sectional view of a coupling 200 of the first strap portion 242 and the second strap portion 244.

In the present embodiment, it can be seen that first strap portion 242 is hollow. Other embodiments may contain a solid first strap portion or a first strap portion 242 with vertical bars fabricated therein to reinforce the hollow portion.

FIG. 15Diii illustrates a cross sectional view of the first strap portion 242 and the second strap portion 244 in a coupled configuration 200, for example, with two sheets of material positioned therebetween. In the present example, the material of the entryway 26 and the partition curtain 110 are positioned between the first strap portion 242 and the second strap portion 244. The magnetic force between the first strap portion 242 and the second strap portion is sufficiently strong such that the extra displacement of the thicknesses of the two pieces of material 26, 110 in insubstantial relative to the magnetic force between the magnet 250 and metal inserts 254. The magnetic coupling 200 is sufficiently strong so as to create a surface-to-surface coupling of the entryway 26 and partition curtain 110 that is relatively impenetrable to dust particulates.

FIG. 15Div is a perspective view of the first strap portion 242 with the entryway 26 adjacent. In some embodiments, the magnets 250 in the first strap portion 242 can be coupled to metal present in the material of a door or an entryway. A door frame may be made of a magnetically attractive metal material such as nickel, steel, iron, or cobalt. Similarly, the magnets 250 may be strong enough to couple with a metal corner frame or bracket. In such an embodiment, the first strap portion 242 may be mounted directly to the metal door frame with the entryway or curtain material positioned therebetween; in such an embodiment the second strap portion 242 may not be necessary.

Figure 15E:
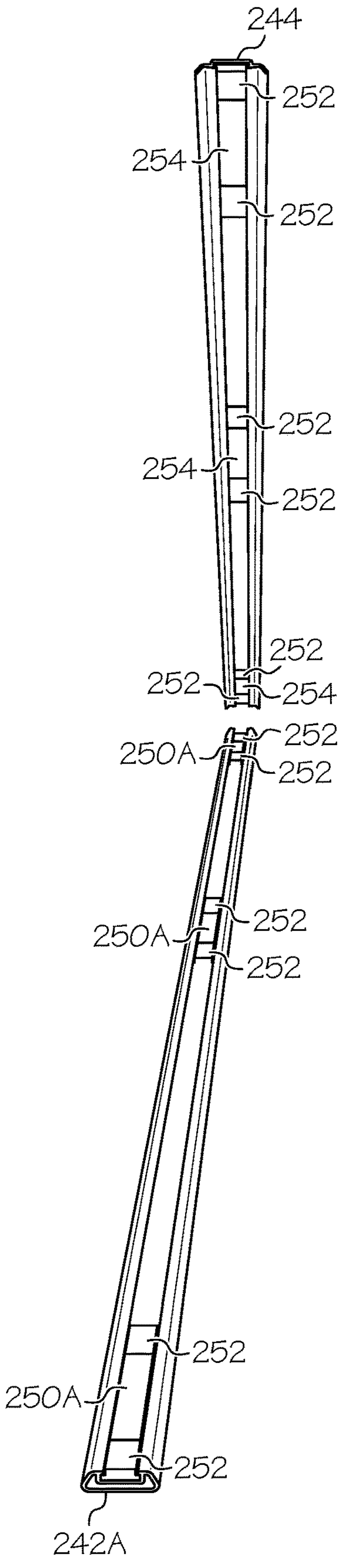
FIGS. 15Ei-15Eiv are perspective views of embodiments of curtain mounting straps in accordance with the present inventive concepts.

FIGS. 15Ei-15Eiv are perspective views of embodiments of curtain mounting straps 242, 242A in accordance with the present inventive concepts. FIG. 15Ei is an exploded view. FIGS. 15Eii-15Eiv are close up perspective views of the first strap portion 242A of the curtain mounting straps. In the present example embodiment, the first strap portion 242A has a configuration that is different than the embodiment described herein in connection with FIGS. 15Di-15Div, while the second strap portion 244 is the same as that described herein in connection with FIGS. 15Di-15Div. For the purpose of efficiency in description, only differences among the embodiments will be described.

FIG. 15Eii illustrates a cross-sectional view of the first strap portion 242A and the second strap portion 244 in a coupled 200 relationship. As shown, the magnet 250A is in a substantially T-shaped in cross-section to include a base portion 251A that is wider than a neck portion 251B. The neck portion 251B extends above a plane of the window framed by the tabs 248A. The tabs 246A retain the magnet 250A in a transverse direction as described herein, by engaging the wider, base portion 251A. The spacers 252 (see FIG. 15E1) retain the magnet 250A in a longitudinal direction, by preventing the magnet 250A from sliding in the longitudinal slot defined by the tabs 246A. This configuration includes tabs 246A that are further reinforced relative to the tabs 246 of the embodiment of FIGS. 15Di-15Div. Such additional reinforcement allows for a relatively stronger configuration, further preventing inadvertent release of the magnet 250A from the longitudinal slot.

The extension of the neck portion 251B of the magnet 250A beyond the window framed by the tabs 248A permits the magnet 250A to make direct contact with the metal inserts 254, enhancing the magnetic interaction between them. This configuration results in a relatively stronger magnetic attractive force between the first and second strap portions 242A, 242B, as the displacement distance between the magnet 250A and the metal inserts 254 is eliminated. No air gap is present as a result of the configuration of the tabs 246A, 248.

FIG. 15Eiii shows a cross sectional view of the first strap portion 242A and the second strap portion 244 coupled 200. With the presence of the neck extension 251B of the magnet 250A the magnets 250A and the metal inserts 254 are separated only by the thickness of the sheets of material of the dust barrier 110, and the entryway 26. This allows for a relatively strong magnetic force between the first strap portion 242A and the second strap portion 244 enhancing stability of the structure. In some embodiments, the neck extension 251B can have various lengths of extension beyond the window defined by the tabs 246A. The length of neck extension 251B, as well as its geometry, can be adjusted as required.

FIG. 15Eiv shows a perspective view of the first strap portion 242A with the entryway 26 adjacent. This embodiment is in preparation to be attached to a metal region, such as a metal door frame at a residential or commercial job site, as described herein in connection with FIG. 15Div. The neck extension 251B enhances the coupling strength between the magnets 250A and the metal regions since the displacement between the neck extension 251B and the metal region is limited to the thickness of the sheet of the entryway 26 or curtain 110.

In other embodiments, the first and second strap portions can take different forms and shapes. For example, one or more of the first and second strap portions can optionally be flat. In such a case, the magnets and the corresponding magnetically attractive regions can be embedded in the material of the strap portions.

FIGS. 16Ai-16Di are front views of a method for installing curtain mounting straps for a self-closing entryway, in accordance with the present inventive concepts. FIGS. 16Aii-16Dii are side views of the method for installing curtain mounting straps depicted in FIGS. 16Ai-16Di, in accordance with the present inventive concepts.

Referring to FIGS. 16Ai and 16Aii, an installer's right hand holds and suspends, a first strap portion 202 at a rear surface of the partition curtain 110 and an overlap region of the partition curtain 110 and entryway curtain 26 where they are to be secured to each other by the curtain mounting strap 200. It can be seen in this example illustration that the second strap portion 204 is longitudinally flexible and is therefore bending slightly in the installer's left hand.

Referring to FIGS. 16Bi and 16Bii, the installer's left hand brings an upper region of the second strap portion 204 into proximity with an upper region of the first strap portion 202. At this point a magnetic interaction 212A begins to occur between the magnet 210A of the first strap portion 202 in that region and the corresponding metal segment or region of the second strap portion 204. As that magnetic attraction 212A begins to strengthen as the first and second strap portions 202, 204 come into closer proximity with each other, this sequentially increases the magnetic interaction 212B, 212C, 212D of other magnets 210B, 210C, 210D and corresponding regions of the second strap portion 204.

Referring to FIGS. 16Ci and 16Cii, the magnetic interactions 212A-212D have now fully taken over the securing of the second magnetic strap 204 to the first magnetic strap 202, and the installer's left hand can be removed. At this point, the corresponding regions of the entryway curtain 26 and partition curtain 110 are secured to each other, compressed between the first and second magnetic straps 202, 204. Referring to FIGS. 16Di and 16Dii, the installation is complete and the operation of the entryway curtain 26 can be performed as described herein.

Figure 17:
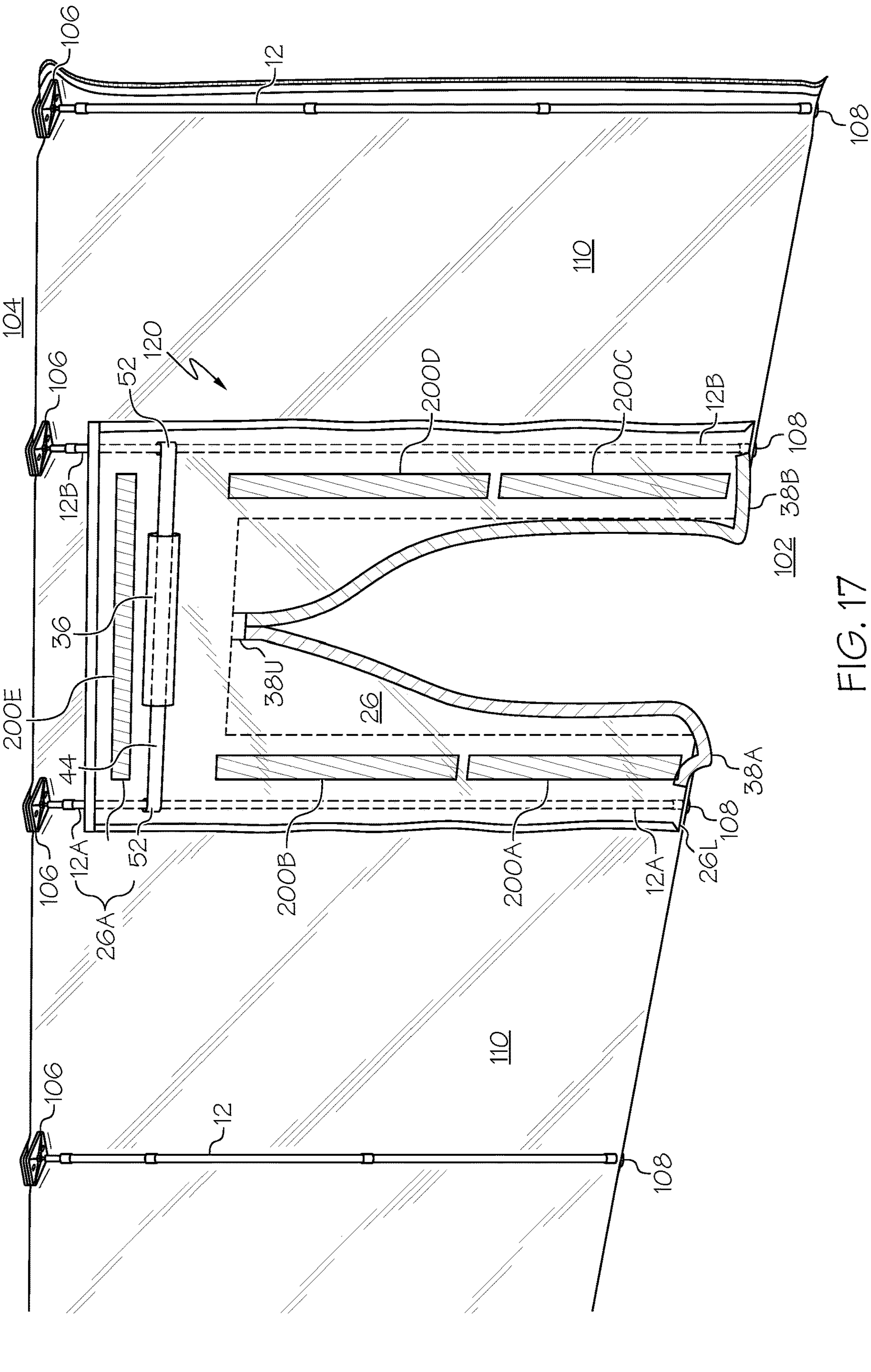
FIG. 17 is a perspective front view of a self-closing entryway of the type described herein in connection with the embodiment of FIG. 4F, in accordance with the present inventive concepts.

FIG. 17 is a perspective front view of a self-closing entryway of the type described herein in connection with the embodiment of FIG. 4F, in accordance with the present inventive concepts. In the present embodiment, the cross-member sleeve 36 is located at a vertical-intermediate position of the entryway curtain 26. In this manner, an upper region 26A of the entryway curtain 26 extends above the cross-member sleeve 36 and variable-length cross member 44. It can be seen that the fifth curtain mounting strap 200E is mounted at the upper region 26A, above the position of the sleeve 36. An optional additional curtain mounting strap (not shown) can be provided below the sleeve, as described herein.

Figure 18:
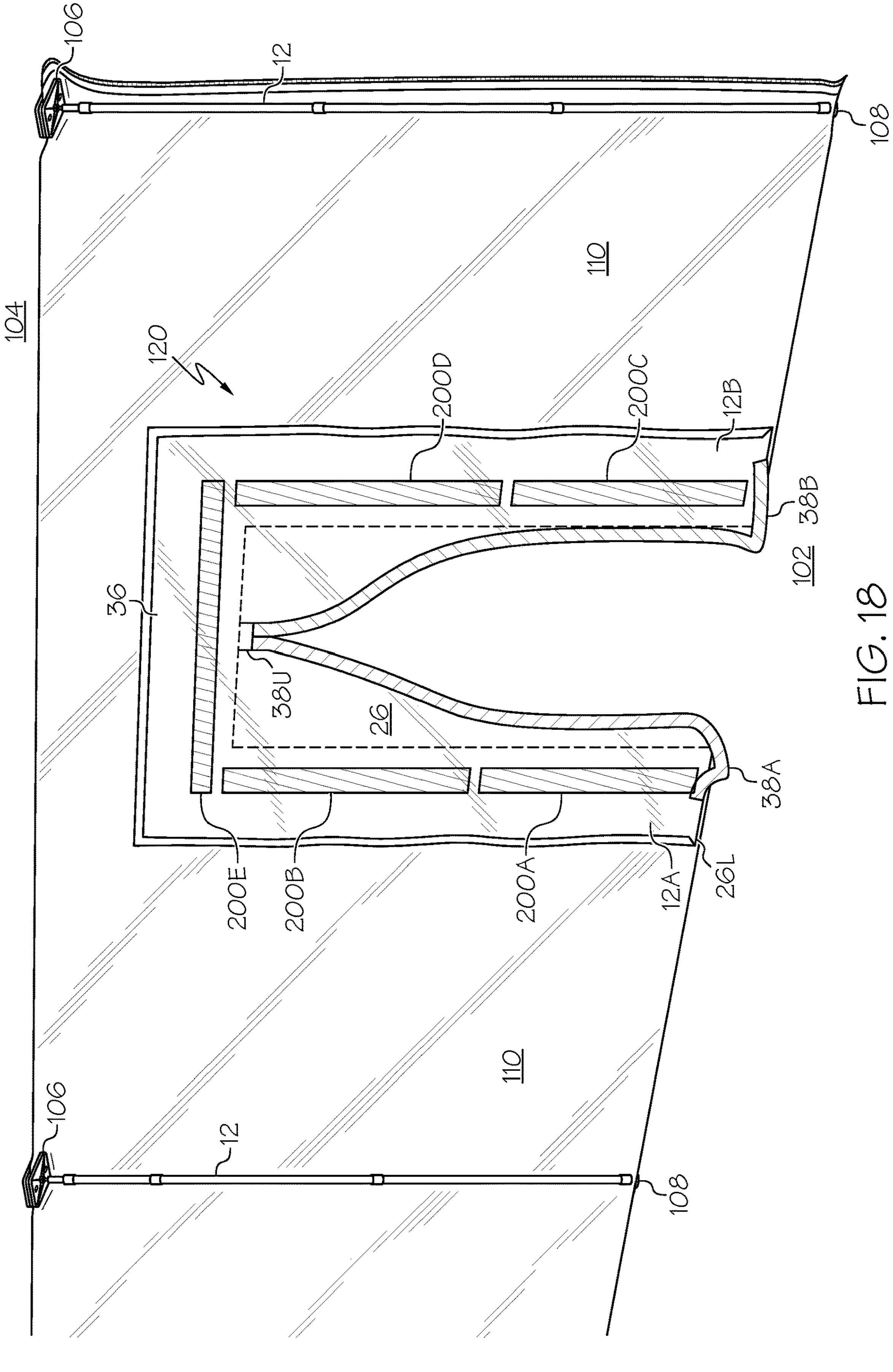
FIG. 18 is a perspective front view of a self-closing entryway in accordance with another embodiment of the present inventive concepts.

FIG. 18 is a perspective front view of a self-closing entryway in accordance with another embodiment of the present inventive concepts. In the present embodiment, the hands-free partition entryway mechanism 120 does not include a cross member 44 (not shown) and the entryway curtain 26 does not include a sleeve 36. Instead, the entryway curtain 26 is installed to the partition curtain 110, fully supported by the first through fifth curtain mounting straps 200A-200E and the partition curtain.

Figure 19:
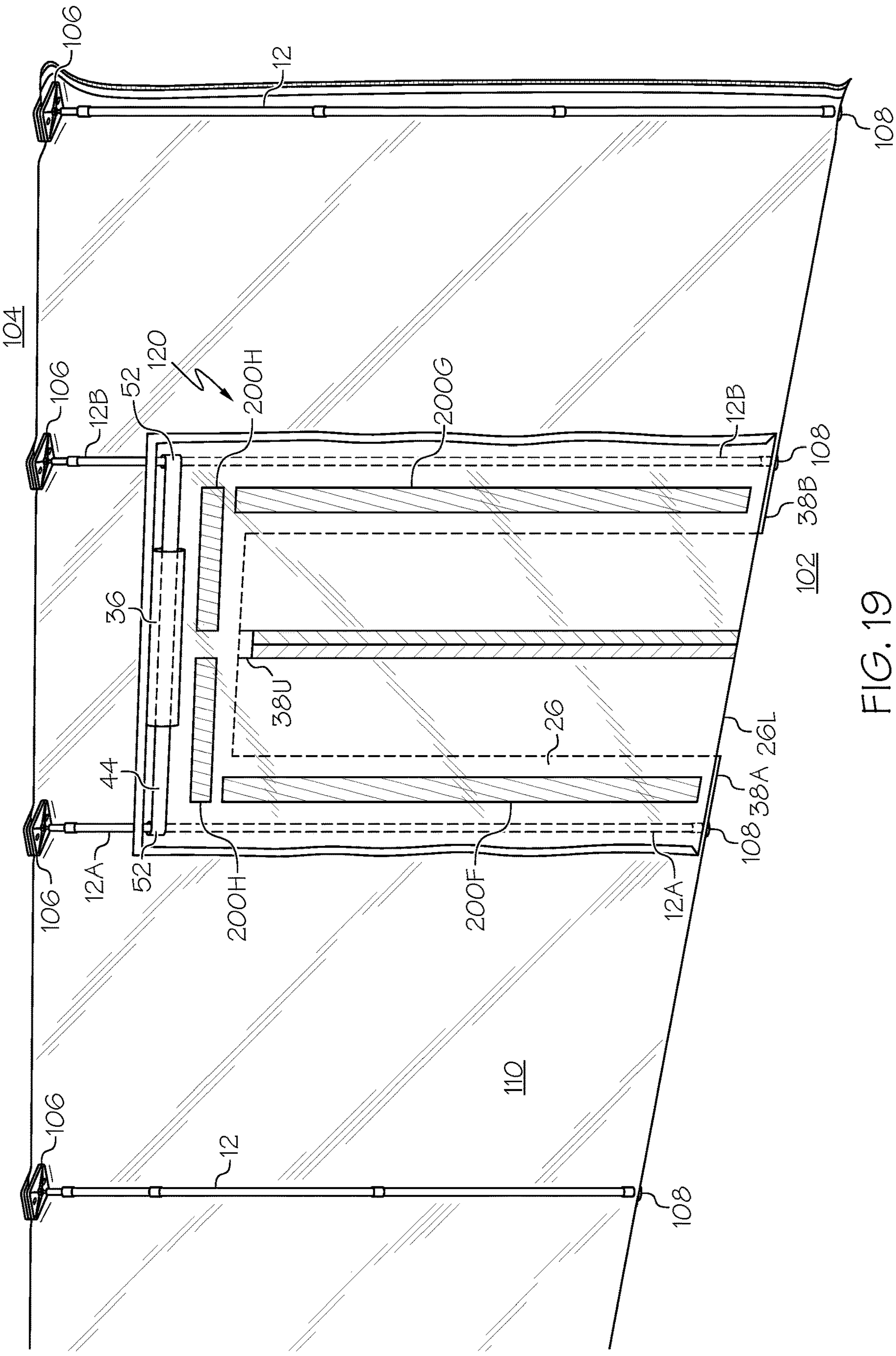
FIG. 19 is a perspective front view of a self-closing entryway in accordance with another embodiment of the present inventive concepts.

FIG. 19 is a perspective front view of a self-closing entryway in accordance with another embodiment of the present inventive concepts. In this embodiment, it can be seen that the curtain mounting straps 200F, 200G, 200H can have various lengths, depending on the desired application. For example, the vertically oriented straps can comprise first and second straps 200F, 200G that cover the entire vertical distance between the entryway curtain 26 and the partition curtain 110. Also, the horizontally-oriented strap 200H can comprise multiple, smaller straps that cover only a portion of the horizontal distance. Any of a number of configurations of the curtain mounting straps a possible and equally applicable to the principles of the present inventive concepts.

Figure 20:
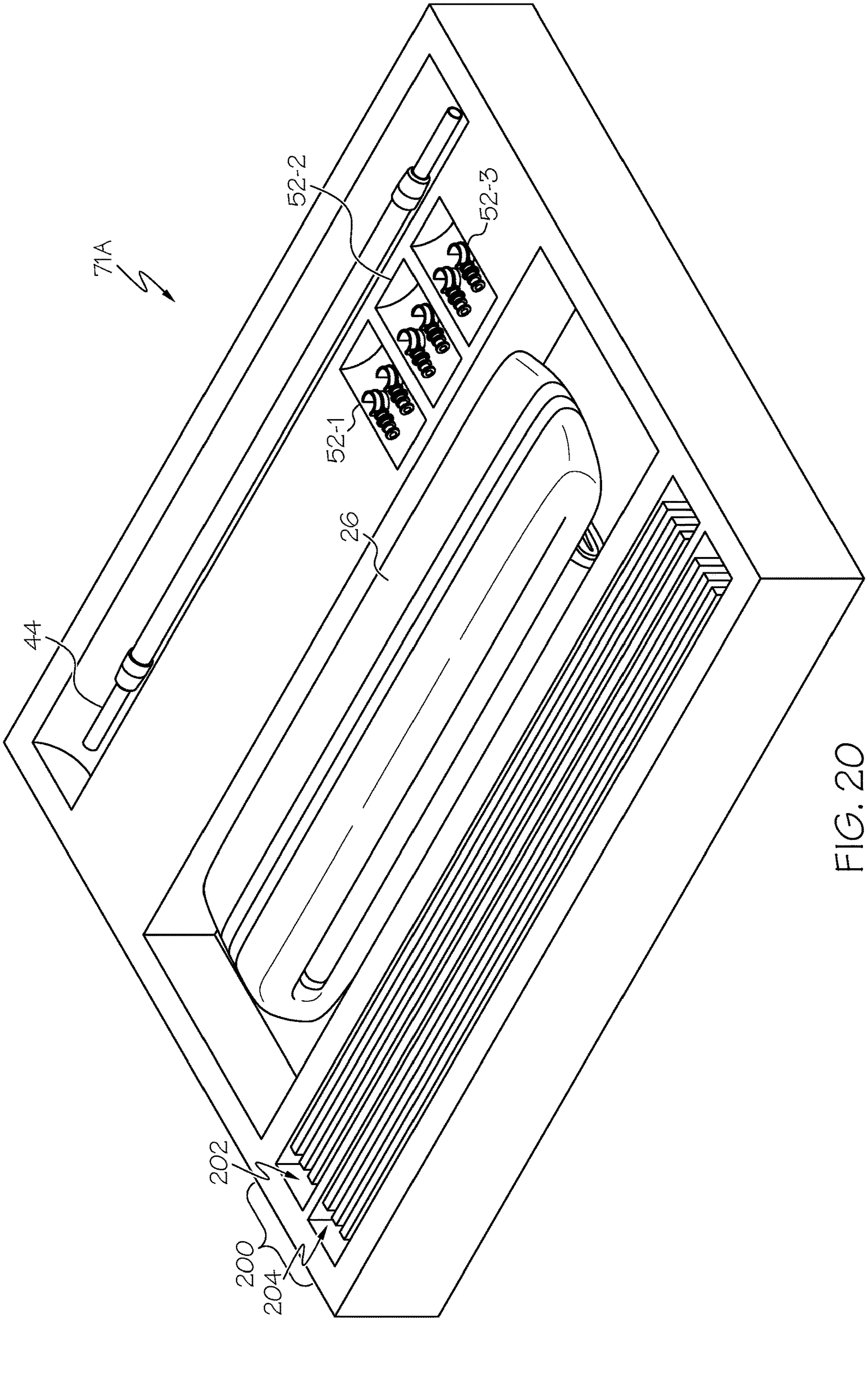
FIG. 20 is a perspective view of a kit for a hands-free partition entryway mechanism, in accordance with embodiments of the present inventive concepts.

FIG. 20 is a perspective view of a kit for a hands-free partition entryway mechanism, in accordance with embodiments of the present inventive concepts. In some embodiments, the kit 71A includes an entryway curtain 26, a variable-length cross member 44, and a plurality of pairs of cross-member attachment mechanisms 52-1, 52-2, 52-3 of different respective inner widths W1, W2, W3. The kit may further include a plurality of sets of curtain mounting straps 200 including first strap portions 202 and corresponding second strap portions 204 as described herein.

Figure 21:
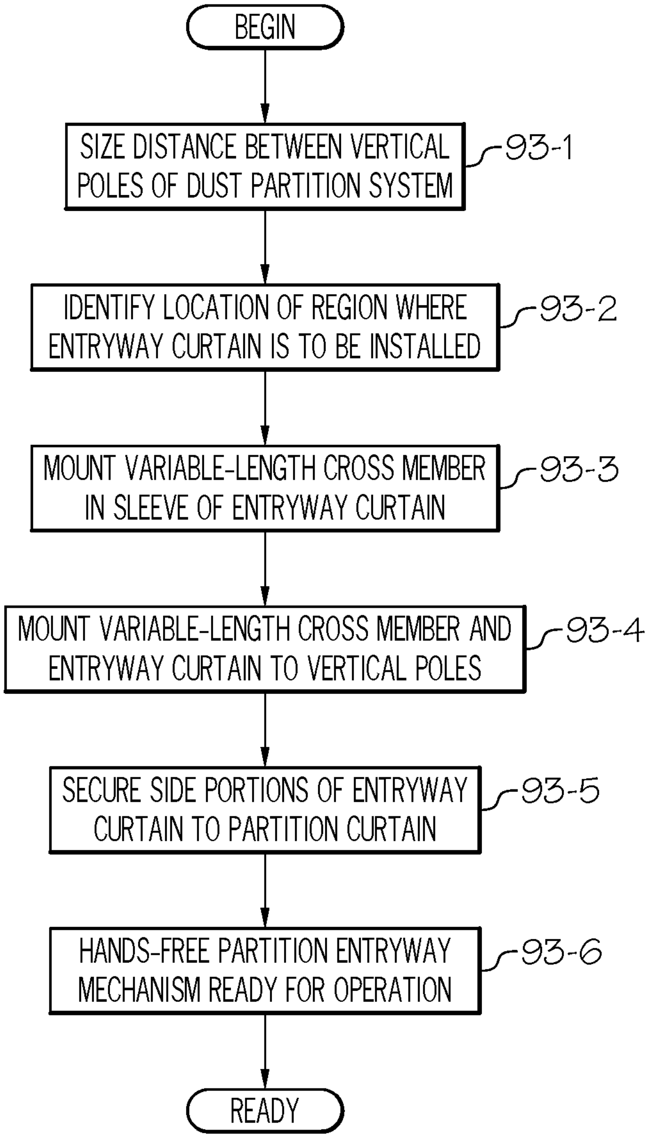
FIG. 21 is a flow diagram of a method of installing a hands-free partition entryway mechanism, in accordance with embodiments of the present inventive concepts.

FIG. 21 is a flow diagram of a method of installing hands-free partition entryway mechanism, in accordance with embodiments of the present inventive concepts.

Initially, the distance d between the vertical poles of the dust partition system is sized 93-1, as described herein in connection with FIG. 1A.

Next, the location of the region R where the entryway curtain is to be installed is identified 93-2, as described herein the connection with FIG. 1B.

The variable-length cross-member is mounted to the sleeve of the curtain 93-3 and the variable-length cross-member and entryway curtain are mounted to the vertical poles 93-4 as described herein the connection with FIG. 1C.

Side portions of the entryway curtain 93-5 are secured to the partition curtain 110 using the curtain mounting straps 200, as described herein in connection with FIGS. 14A-14F.

The hands-free partition entryway system is now ready for operation 93-6, as described herein the connection with FIGS. 1E-1G.

Figure 22A:
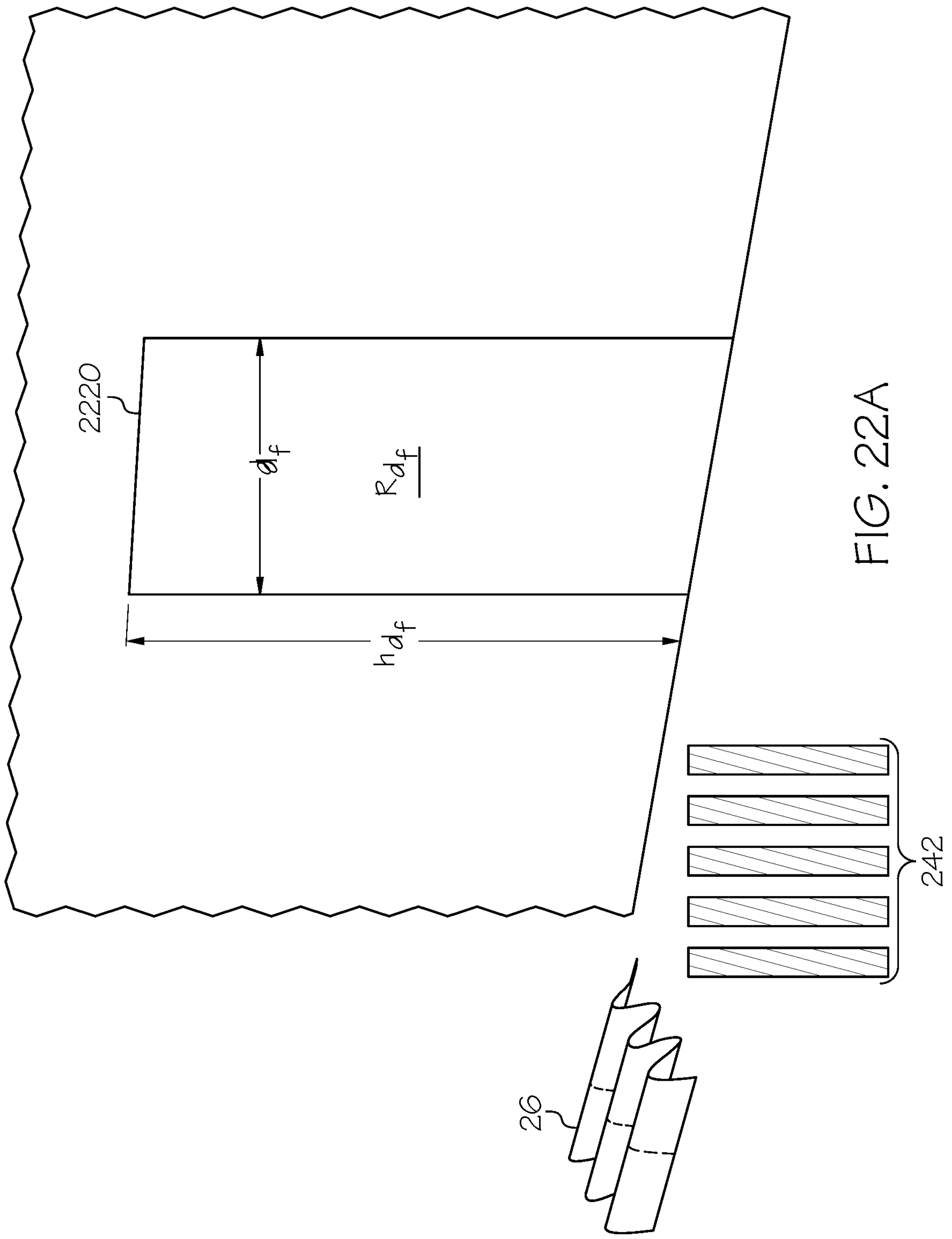
FIGS. 22A-22C are perspective front views of a method for installing and operating a self-closing entryway, in accordance with embodiments of the present inventive concepts.
Figure 22B:
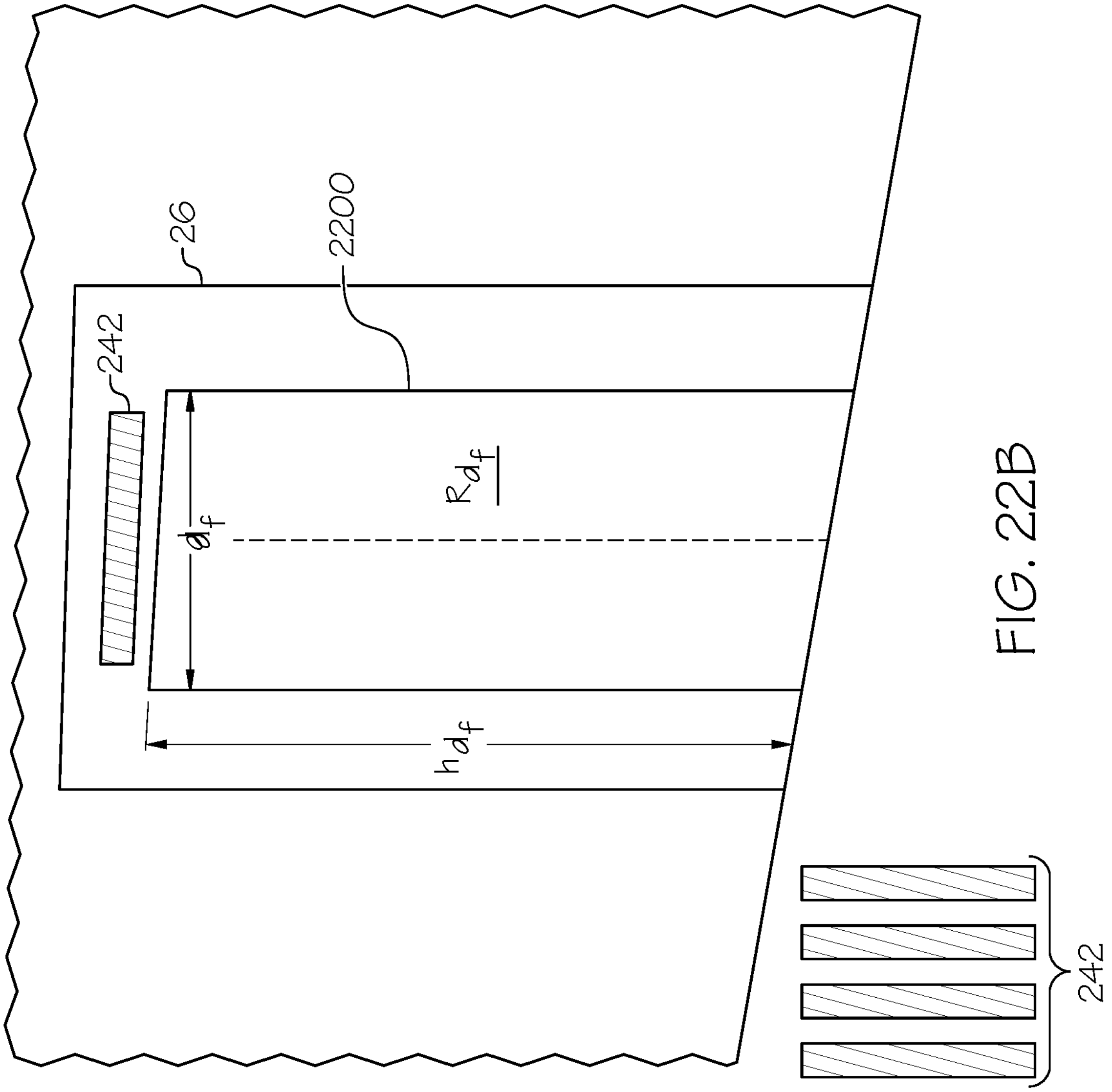
Figure 22C:
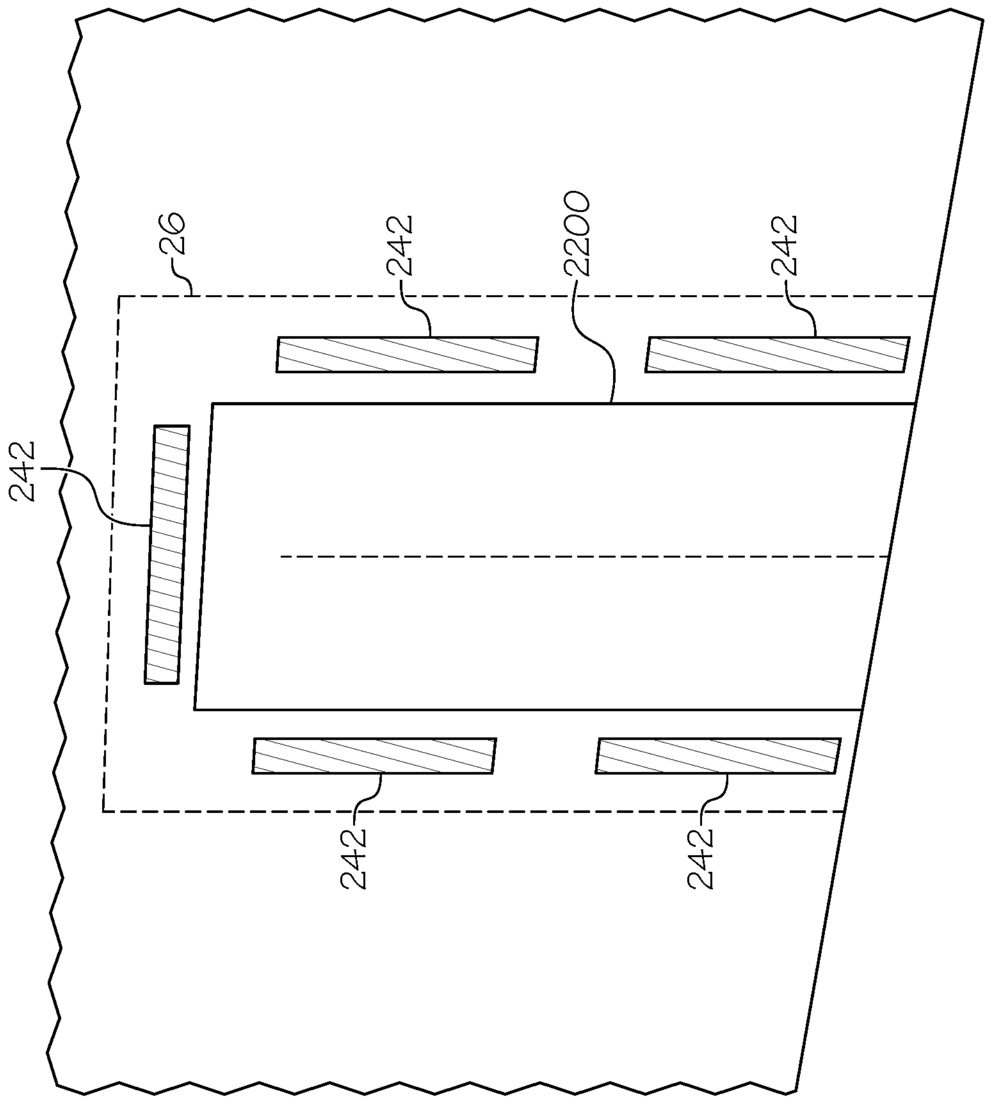

FIGS. 22A-22C are perspective front views of a method for installing a self-closing entryway 26 in a door frame 2200 formed of a magnetically attractive material, in accordance with embodiments of the present inventive concepts.

This embodiment also allows the entryway 26 to be installed without the structure and poles of the dust partition mechanism 110 (as in FIG. 1A herein) utilizing the structure of surrounding walls and surfaces). The present embodiment is described in particular in connection with the first strap portion 242, 242A of the embodiments of FIGS. 15Div and 15Eiv; however, other suitable strap embodiments are equally application to the present inventive concepts.

The open region $R_{df}$ of the door frame 2200 includes left and right sides positioned a distance $d_{df}$ apart; the doorframe has a height $h_{df}$. The expanse of the horizontal and vertical dimensions of the entryway curtain 26 are greater than the open region $R_{df}$. Upon installation, the entryway curtain 26 can form a partition, preventing contaminants from a work area at one side of the door frame from entering a clean area at the other side of the door frame.

FIG. 22A shows the entryway 26 in an unassembled state with a sufficient number of first strap portions 242 to seal the perimeter of the entryway to the metal door frame 2200.

Shown in this illustration is five first strap portions 242—two for application to each of the vertical sides ha and one for application to the top horizontal edge $d_{df}$. As described herein, the relative lengths of the first strap portions can vary, as needed, for application to door frame 2220 of various dimensions.

FIG. 22B shows the first steps of assembling the entryway 26 in a metal door frame 2200. In this example, a top portion of the entryway 26 is applied to the door frame 2200 by placing a first strap portion 242 at the top of the door frame 2200. The entryway material edges are positioned between first strap portion 242 and the door frame 2200. The magnetic attraction of the magnets of the first strap portion 242 couple the first strap portion 242 and entryway 26 material to the door frame 2200. The magnetic attraction is ideally sufficiently strong so that repeated ingress/egress by a user through the entryway does not affect the position of the first strap portions 242 and does not move the entryway 26 relative to the door frame 2200.

Assembly continues by placing one of the first strap portions 242 along the vertical portions of the door frame on the left and right sides $h_{dr}$.

FIG. 22C is a perspective view of the fully assembled self-closing entryway 26 installed at a door frame 2200. Five first strap portions 242 are shown. This embodiment shows that entryway in a position where in fully seals off the room with the bottom of the entryway touching and overlapping the floor.

In this embodiment, the area of the material of the entryway 26 sheet is larger than the area of the door frame$_{dr}$ $R_{dr}$. This way the entryway 26 creates a physical barrier to fully partition the door frame 2200.

Figure 23:
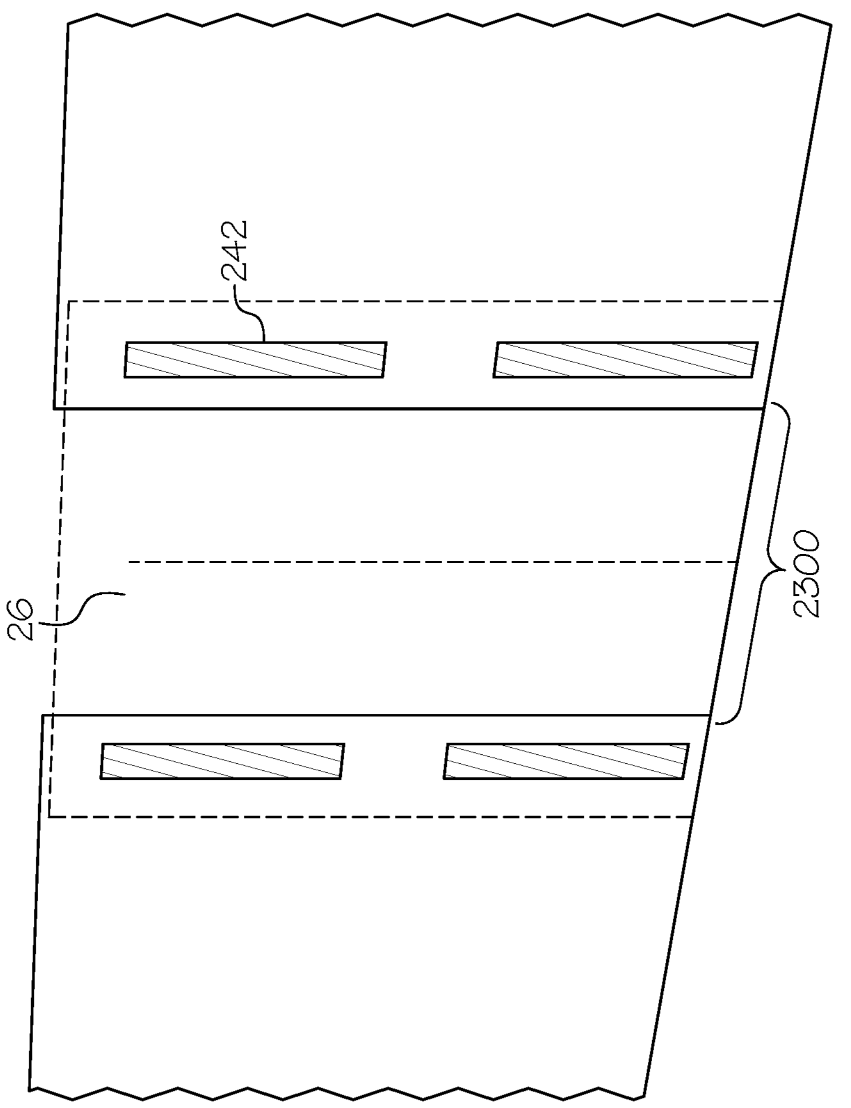
FIG. 23 is a perspective front view of a self-closing entryway, in accordance with additional embodiments of the present inventive concepts.

FIG. 23 is a perspective front view of a self-closing entryway 26, in accordance with additional embodiments of the present inventive concepts. In this embodiment, the first strap portions 242 are applied directly to the wall, for example at the threshold of a room. Interior drywall corners of modern residential/commercial buildings are often times formed of galvanized steel. In such instances, the first strap portions 242 can be configured to couple directly to the corners of the wall 2300.

With two of these entryways aligned at different positions of the same hallway, an additional room can be created. This can be utilized for pop-up clothing changing or dressing stations, especially with the use of an opaque curtain, such as may be used for dance recitals or theater.

Figure 24A:
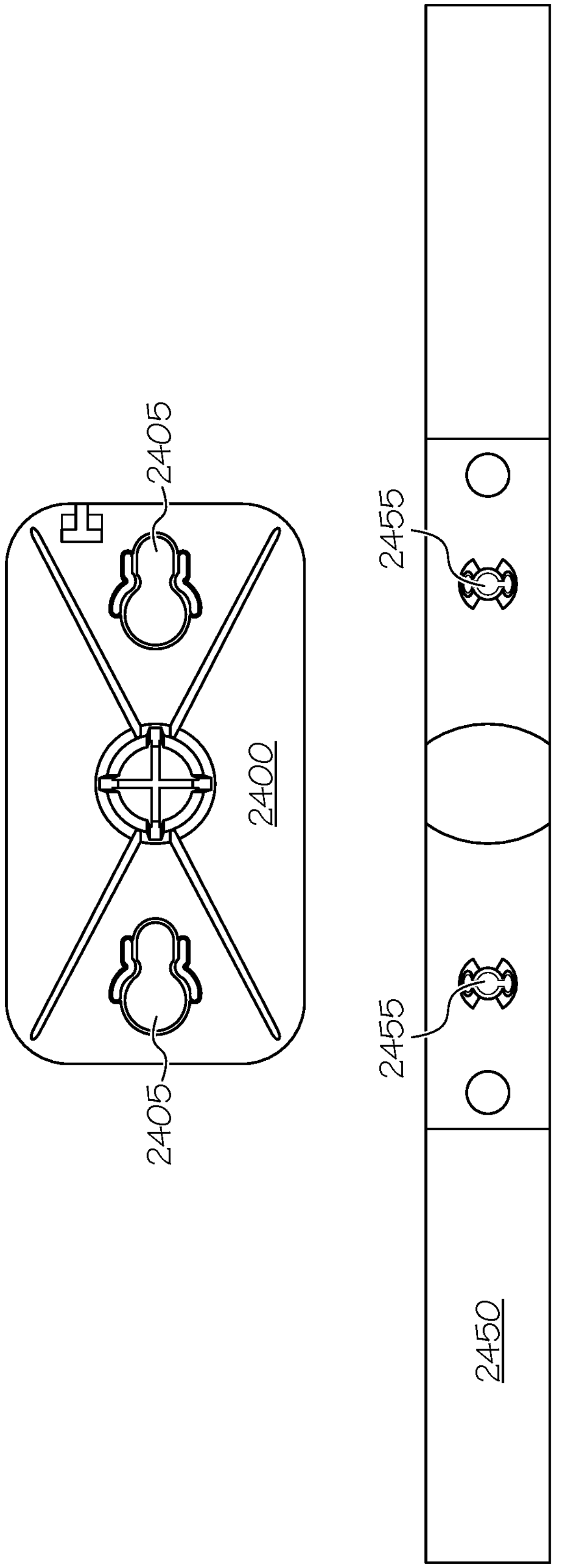

FIGS. 24A-22C are perspective views of a method for installing a self-closing entryway directly to a suspended ceiling structure, such as a metal channel of a drop ceiling.

FIG. 24A is an exploded view of a ceiling attachment 2400 having a key and slot attachment with a magnetic strip for attaching to a drop ceiling. As shown the magnetic strip 2450 has three individual magnets spaced a distance apart. In other embodiments, a single elongated magnet may be employed or a different number of magnets may be employed to stabilize the coupling of the ceiling attachment to the ceiling.

The key and slot attachment is described in U.S. Pat. No. 7,658,219 incorporated herein by reference. In the embodiment is shown, a snap fit relationship with flat panel 2400 have a key hole 2405 and the magnetic strip 2450 having knobs 2455 that fit flexibly through the key holes 2405. The coupling allows the entryway or another sheet of material the positioned between these two elements.

Figure 24B:
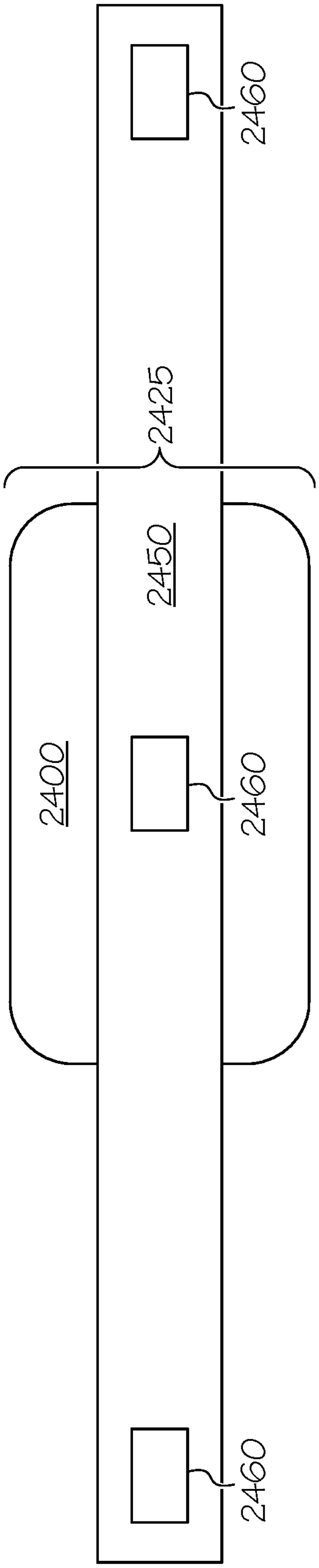

FIG. 24B is a coupled view of the key slot with magnets located along the magnetic strip. Once coupled 2425 the entryway 26 sheet is positioned between the opening panel 2400 and the magnetic strip 2450 having the key protrusions (not shown). Shown is three individual magnets 2460 separated a distance apart. In other embodiments, there might be a single elongated magnet or a different plurality of magnets to stabilize the coupling of the ceiling attachment to the ceiling. The plate attachment 2400 and the magnetic strip 2450 are shown as coupled 2425 in a manner similar to that of U.S. Pat. No. 7,658,219 having a pin and plate combination with the entryway curtain positioned between the two elements.

Figure 24C:
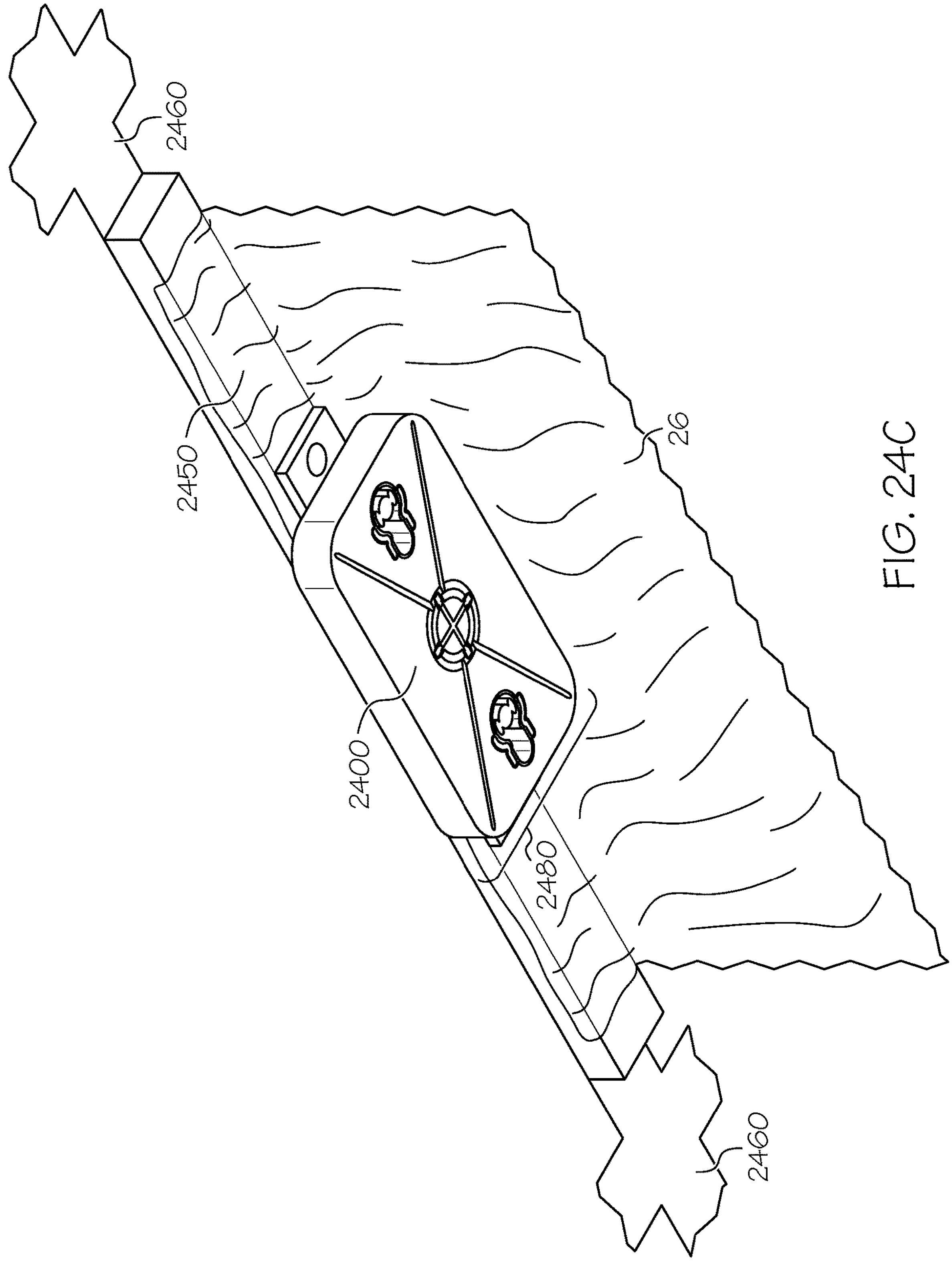

FIG. 24C is a perspective view of the assembled ceiling attachment. Drop ceilings typically have metal channels 2460 for positioning ceiling tiles. It can be seen in this embodiment that the magnetic strip 2450 is coupled directly to the metal channel of the drop ceiling 2460.

This assembly allows an installer to establish an entryway without the use of a cross member or vertical poles. The entryway 26 can be suspended directly from the metal channels 2460 of a drop ceiling.

Figure 25A:
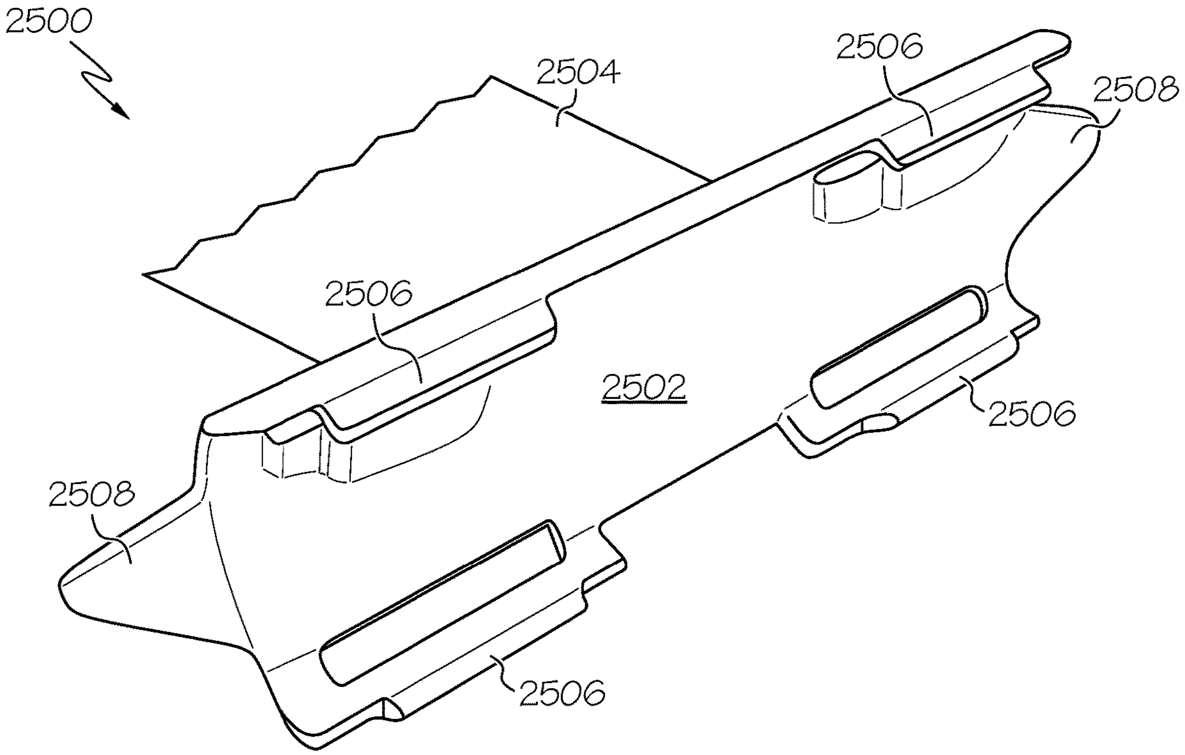
FIGS. 25A-25B are perspective views of a tool for installing and uninstalling a curtain directly to a drop ceiling in accordance with additional embodiments of the present inventive concepts.
Figure 25B:
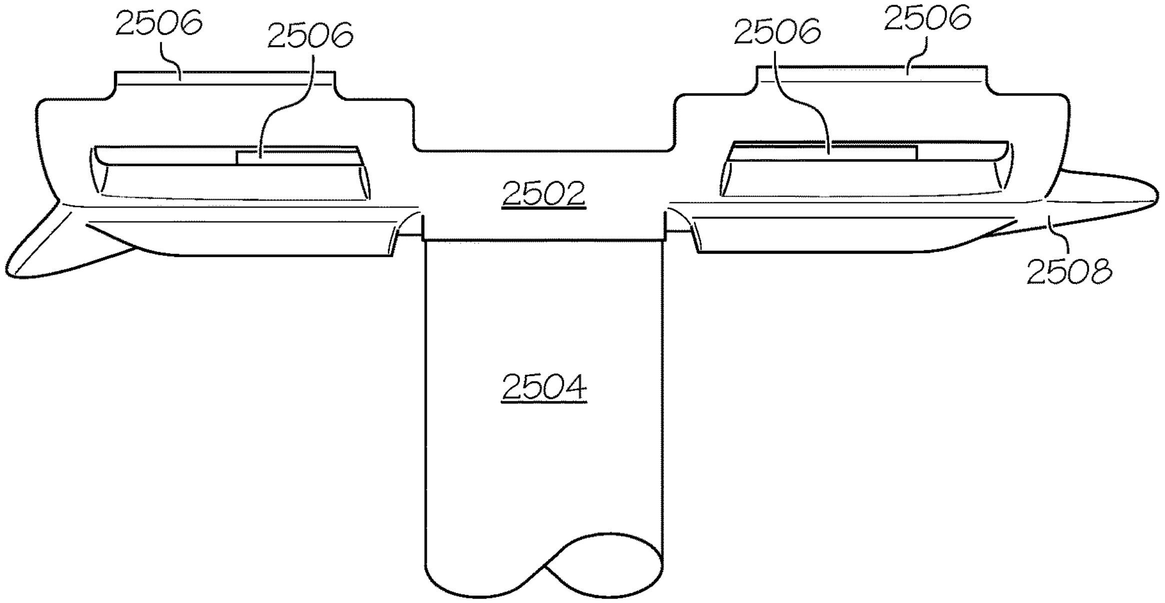

FIGS. 25A-25B are perspective views of a tool for installing and uninstalling a curtain and coupling it to the ceiling.

FIG. 25A is a top perspective view of a tool 2500 for installing and uninstalling a curtain and coupling the curtain directly to a drop ceiling. The head 2502 of the tool includes four attachment protrusions 2506 configured to grasp the first strap portions, such as portions 242, 242A described herein. The head 2502 is attached to the top of a pole 2504. The four protrusions flex about the body of the first strap portions 242, 242A. Upon engaging the magnets of the first strap portions with the drop ceiling channels, the head can be leveraged by the pole to flex so that the attachment protrusions disengage the body of the first strap portion 242, 242A. This allows the pole 2504 and head 2502 to be released from the system, in turn permitting the sheet of material of the entryway 26 to be suspended directly from the drop ceiling, without the need for a vertical pole system for support. Also included are removal features 2508 that provide an ability to disconnect the first strap portions 242, 242A from the ceiling channels. The head 2502 and pole are positioned so that the removal features 2508 can be positioned in the hollow ends of the first strap portions. Upon insertion, the head can be tipped at an angle by the pole to pry the first strap portions 242, 242A away from the ceiling channels, breaking the magnetic attraction. In this manner, the tool 2500 can be used for assembly and disassembly of the system. As shown in the perspective view of FIG. 25B, the removal features 2508 can be formed at different angles to permit leverage at different positions and angles of the pole 2504. The end portions 2508 may be longitudinally perpendicular to the tool head 2502 or at an angle relative to the main body of the tool depending on where it can be best utilized to overcome the magnetic force. The end portions 2508 are shown as triangles, but may be configured in a variety of shapes depending on the shapes and size of the magnetic strips being uncoupled. In some embodiments, upon removal, the tool attachment protrusions 2506 can be snapped back about the body of the first strap portions 242, 242A for removal of the straps.

Figure 26A:
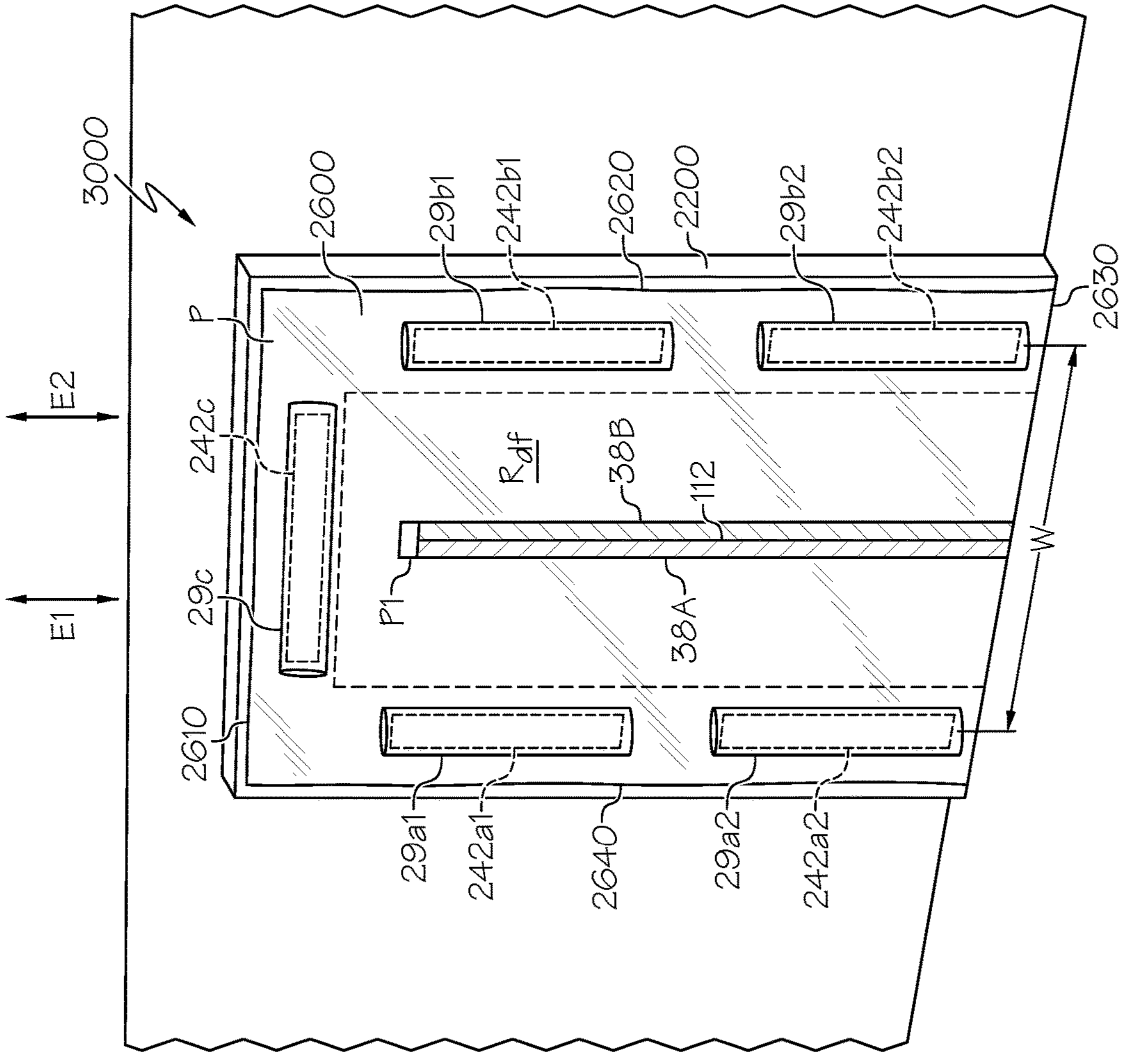
FIG. 26A is a perspective view of an embodiment of an entryway apparatus installed at a door frame, in accordance with aspects of the present inventive concepts.

FIG. 26A is a perspective view of an embodiment of an entryway apparatus 3000 installed at a door frame 2200, in accordance with aspects of the present inventive concepts. In some embodiments, such as the one shown in FIG. 26A, the entryway apparatus 3000 comprises a sheet of material 2600, an opening 112, and one or more strap sleeves 29. In some embodiments, the entryway apparatus 3000 also comprises one or more strap portions 242.

In some embodiments, the sheet of material 2600 comprises a top edge 2610, a bottom edge 2630, a left edge 2640, and a right edge 2620. With the entryway apparatus 3000 in the closed position (as shown in FIG. 26A), the top edge 2610, the bottom edge 2630, the left edge 2640, and the right edge 2620 lie in a plane P. It is understood by those skilled in the art that the edges define a plane P when the sheet of material 2600 lies flat; however, since the sheet is flexible, it is understood that while the edges of the sheet of material 2600 can be considered to define a plane P, when the primary surface, or body, of the sheet of material flexes, it exhibits a more complex surface that no longer lies on the plane P.

In some embodiments, the entryway apparatus 3000 comprises an opening 112 extending from a position P1 below the top edge 2610 to the bottom edge 2630. In some embodiments, the opening 112 comprises a left seam 38A and a right seam 38B. In some embodiments, a first magnet is positioned at the left seam, a second magnet is positioned at the right seam. In some embodiments, the first and second magnets are magnetically coupled.

In some embodiments, the entryway apparatus 3000 comprises a first strap sleeve 29*a* positioned at a first side of the opening 112 and extending in a first direction of extension E1. In some embodiments, the apparatus 3000 comprises a second strap sleeve 29*b* positioned at a second side of the opening, with the second strap sleeve 29*b* spaced apart from and parallel to the first strap sleeve 29*a*. In some embodiments, the first and second strap sleeves 29*a-b* are each constructed and arranged to receive first strap portion 242. In some embodiments, the first and second strap sleeves 29*a-b* extend in a vertical direction, spaced apart from each other in a horizontal direction by a distance corresponding to a width W of a standard door frame 2200. In various embodiments, the spacing of the first and second strap sleeves 29*a-b* relative to each other in a horizontal direction can be determined according to known distances between the centers of the left and right spans of a standard door frame 2200, the outer edges of the left and right spans of a standard door frame 2200, the inner edges of the left and right spans of a standard door frame 2200, or some other suitable horizontal position of the left and right spans of a standard door frame 2200. In any of these embodiments, it is optimal for the first and second strap sleeves 29*a-b*, and, in some embodiments, the third strap sleeve 29*c*, to have relative spacings such the straps 242*a-c* when inserted in the respective sleeve 29*a-c* are magnetically coupled to the door frame 2200 over a suitable portion of their lengths and widths, so as to support the entryway apparatus 3000 on the door frame 2200 with sufficient strength.

In some embodiments, the first and/or second and/or third strap sleeves 29*a-c* are integral with the sheet of material 2600. In some embodiments, the first and/or second and/or third strap sleeves 29*a-c* are coupled to the sheet of material 2600 using any suitable connection mechanism, including, but not limited to, hook and loop, fabric welding, glue, buttons, etc.

In some embodiments, the first strap sleeve 29*a* is at the left edge 2640 of the sheet of material 2600. In some embodiments, the second strap sleeve 29*b* is at the right edge 2620 of the sheet of material 2600. In some embodiments, the entryway apparatus 3000 further comprises a third strap sleeve 29*c* positioned above the opening extending between the left 2640 and right 2620 edges.

In the embodiment shown in FIG. 26A, five first strap portions 242*a*1, 242*a*2, 242*b*1, 242*b*2, 242*c* are shown positioned at the door frame 2200, each within a corresponding strap sleeve 29. Alternative embodiments comprise a different number of first strap portions 242. In alternative embodiments, the first strap portions 242 are positioned near the door frame 2200. Additional embodiments of the entryway sheet of material 2600, and entryway apparatus 3000 are described in International Publication Number WO 2017/117042. The content of International Publication Number WO 2017/117042 is incorporated herein by reference, in its entirety.

In the embodiment shown in FIG. 26A, each of the first strap portions 242 comprises magnets, which allows each first strap portions 242 to couple to magnetically attractive material in the door frame 2200. In some embodiments, the door frame 2200 comprises metal, for example steel.

In this embodiment, the entryway apparatus 3000 fully covers an open region of the door frame $R_{df}$ and the dimensions of the sheet of material 2600 are fitted to approximately match the outer dimensions of the door frame 2200. In the embodiment of FIG. 26A, the sheet of material 2600 can be installed to touch the floor, and in alternative embodiments, the sheet of material 2600 does not touch the floor. In some embodiments, the sheet of material 2600 is dimensioned to fit a standard residential door frame. In some embodiments, the sheet of material 2600 is dimensioned to fit a standard commercial door frame. In some embodiments, the sheet of material 2600 is dimensioned to fit a commercial door frame measuring 40"×86" outer edge-to-edge. In some embodiments, the sheet of material 2600 has dimensions greater than a standard residential door frame. In some embodiments, the sheet of material 2600 has dimensions greater than a standard commercial door frame.

In the embodiment shown in FIG. 26A, the installed sheet of material 2600 has a top edge 2610 parallel with a floor. In alternative embodiments, the top edge is not parallel with a floor. In the embodiment shown in FIG. 26A, the sheet of material 2600 has a bottom edge 2630 parallel with a floor. In alternative embodiments, the bottom edge is not parallel with a floor. In the embodiment shown in FIG. 26A, the sheet of material 2600 has a left edge 2640 perpendicular with a floor. In alternative embodiments, the left edge is not parallel with a floor. In the embodiment shown in FIG. 26A, the sheet of material 2600 has a right edge 2620 perpendicular with a floor. In alternative embodiments, the right edge is not perpendicular with a floor.

In some embodiments, the entryway apparatus 3000 comprises five strap sleeves 29*a*1, 29*a*2, 29*b*1, 29*b*2, 29*c*, each constructed and arranged to cover at least a portion of one or more first strap portions 242. In alternative embodiments, the entryway apparatus 3000 comprises different numbers of strap sleeves 29.

FIG. 26A1 is a front view of an embodiment of an entryway apparatus 3000 comprising a portion of the sheet of material folded back on itself and coupled to a body portion of the sheet of material to form a strap sleeve, in accordance with aspects of the present inventive concepts. In the embodiment shown in FIG. 26A1, the entryway apparatus 3000 comprises five strap sleeves 29*a*1, 29*a*2, 29*b*1, 29*b*2, 29*c*. In this embodiment all five strap sleeves 29 are formed by a portion of the sheet of material folded back on itself and coupled to a body portion of the sheet of material 2600 to form a strap sleeve 29. In alternative embodiments, some of the strap sleeves are formed by a portion of the sheet of material folded back on itself and coupled to a body portion of the sheet material 2600.

FIG. 26A1A is a close-up view of an embodiment of a strap sleeve 29*b*1 of FIG. 26A1, in accordance with aspects of the present inventive concepts. In this embodiment, the entryway apparatus 3000 comprises a stitched/bonded region 2602 where the portion of the sheet of material 2600 is coupled to the body portion of the sheet of material 2600 to form the strap sleeve 29*b*1. In the embodiment shown in FIG. 26A1 a portion of the right edge of the sheet of material 2600 is coupled to the body portion of the sheet of material 2600 using stitching.

FIG. 26A2 is a front view of an embodiment of an entryway apparatus wherein the first strap sleeve comprises a plurality of first strap sleeves along a respective plurality of first axes of extension and the second strap sleeve comprises a plurality of second strap sleeves along a respective plurality of second axes of extension, in accordance with aspects of the present inventive concepts. In this embodiment, the entryway apparatus 3000 comprises three first axes of extension Ela-c. In alternative embodiments, the entryway apparatus 3000 comprises a different number of first axes of extension. In some embodiments, the respective plurality of first axes of extension are spaced apart from, and parallel to, each other. In alternative embodiments, the respective plurality of first axes of extension are spaced apart from, and not parallel to, each other.

In this embodiment, the entryway apparatus 3000 comprises three second axes of extension E2*a-c*. In alternative embodiments, the entryway apparatus 3000 comprises a different number of first axes of extension. In some embodiments, the respective plurality of second axes of extension are spaced apart from, and parallel to, each other. In alternative embodiments, the respective plurality of second axes of extension are spaced apart from, and not parallel to, each other.

In this embodiment, the entryway apparatus 3000 comprises strap sleeves of different lengths (see strap sleeve 29*a*1*a* and strap sleeve 29*a*1*b*). In alternative embodiments, the strap sleeves are all the same length.

Figure 26B:
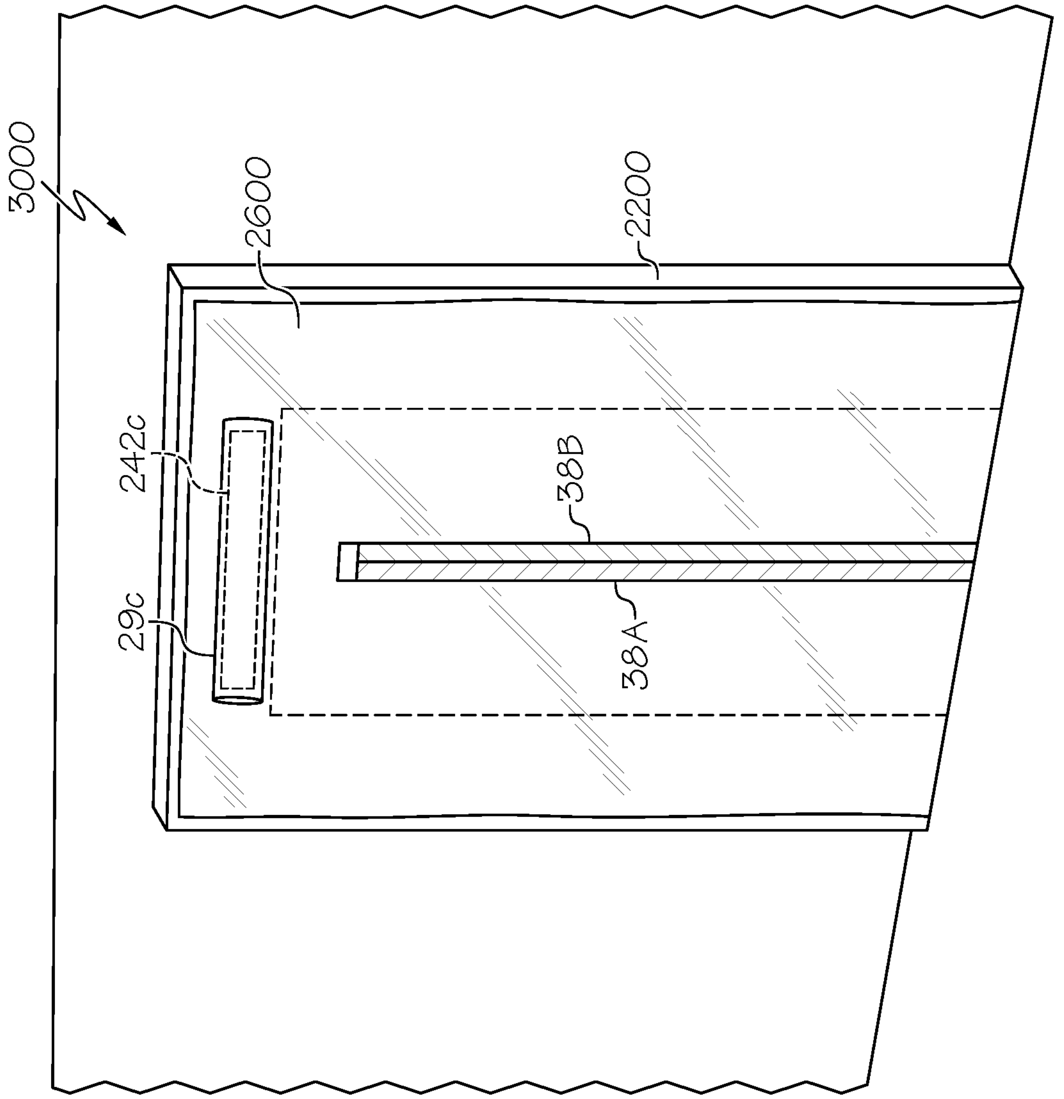
FIG. 26B is a perspective view of an embodiment of an entryway apparatus comprising one strap sleeve constructed and arranged to be positioned along the top of a door frame, in accordance with aspects of the present inventive concepts.

FIG. 26B is a perspective view of an embodiment of an entryway apparatus 3000 comprising one strap sleeve 29*c* constructed and arranged to be positioned along the top of a door frame 2200, in accordance with aspects of the present inventive concepts.

Figure 26C:
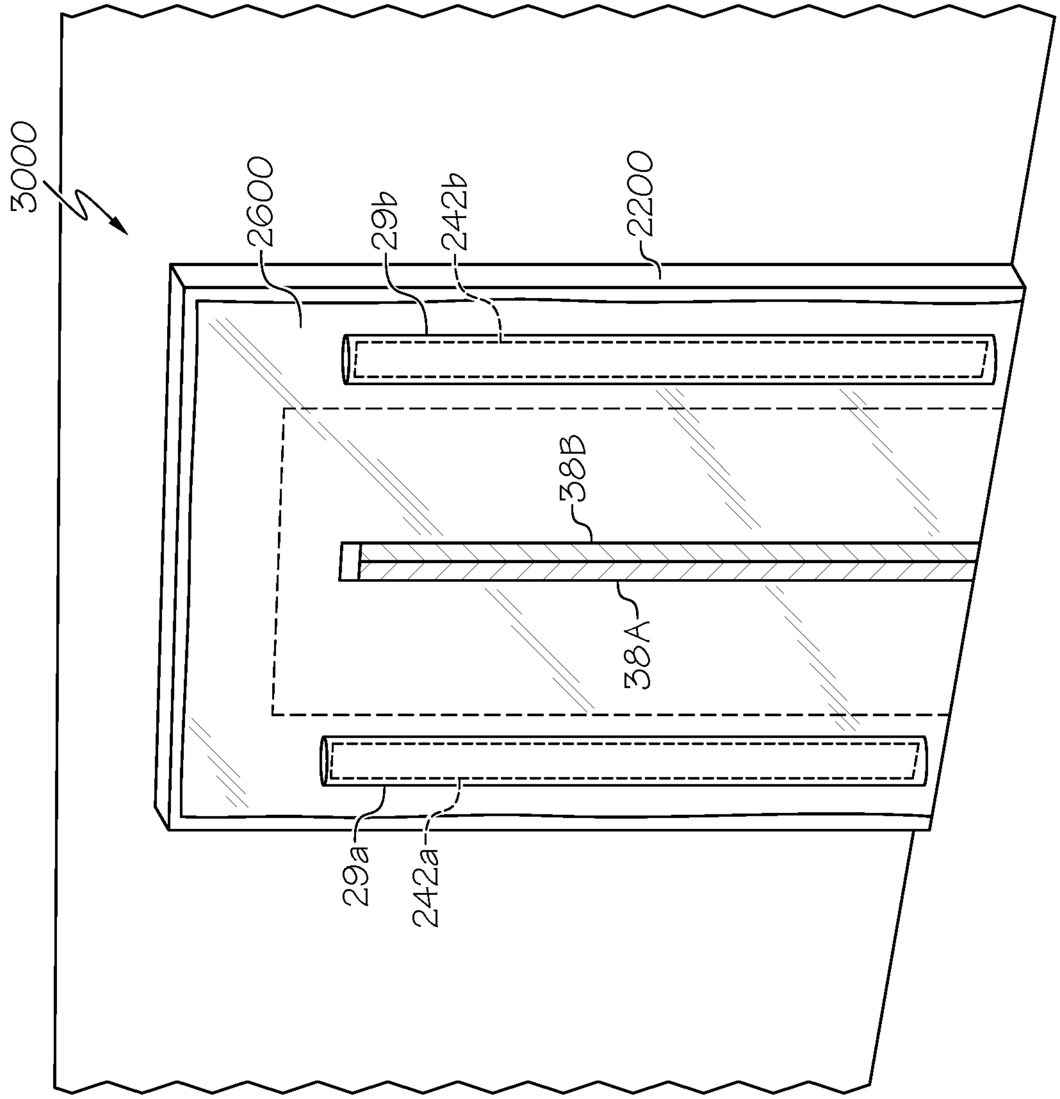
FIG. 26C is a perspective view of an embodiment of an entryway apparatus comprising two strap sleeves constructed and arranged to be positioned along the sides of a door frame, in accordance with aspects of the present inventive concepts.

FIG. 26C is a perspective view of an embodiment of an entryway apparatus 3000 comprising two strap sleeves 29*a-b* constructed and arranged to be positioned along the sides of a door frame 2200, in accordance with aspects of the present inventive concepts.

Figure 26D:
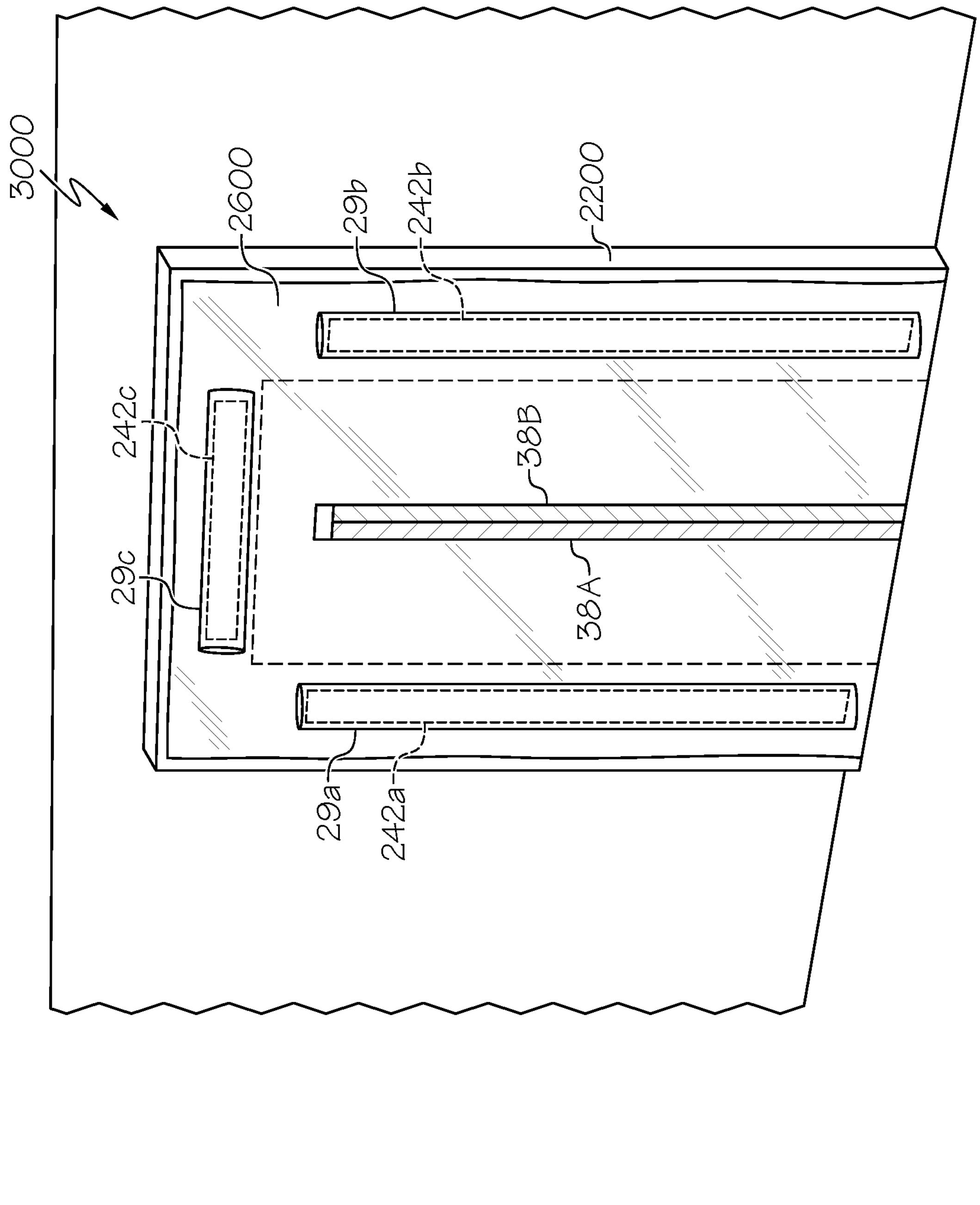
FIG. 26D is a perspective view of an embodiment of an entryway apparatus comprising one strap sleeve constructed and arranged to be positioned along the top of a door frame and two strap sleeves constructed and arranged to be positioned along the side of a door frame, in accordance with aspects of the present inventive concepts.

FIG. 26D is a perspective view of an embodiment of an entryway apparatus 3000 comprising one strap sleeve 29*c* constructed and arranged to be positioned along the top of a door frame 2200 and two strap sleeves 29*a-b* constructed and arranged to be positioned along the side of a door frame 2200, in accordance with aspects of the present inventive concepts.

Figure 26E:
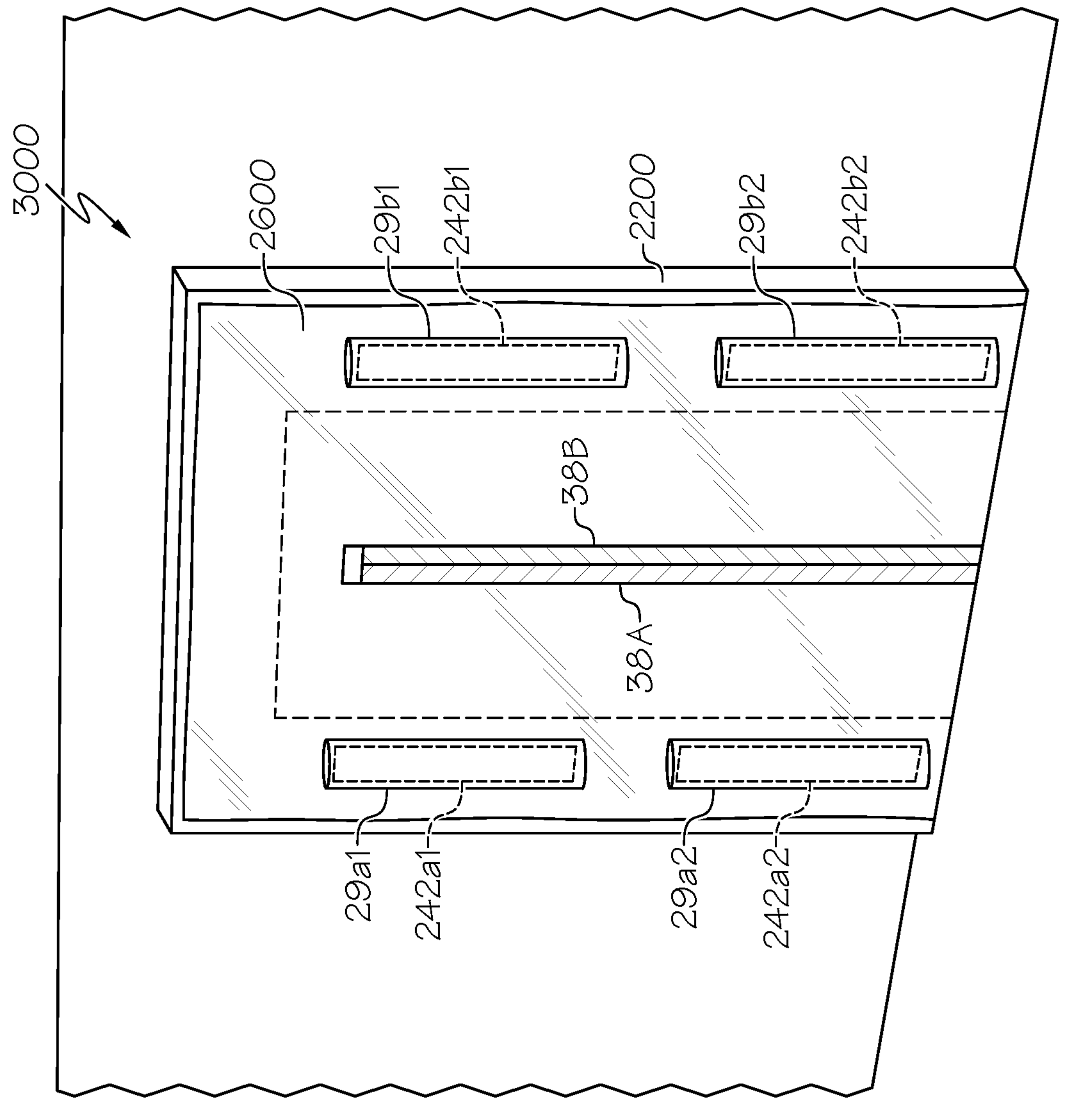
FIG. 26E is a perspective view of an embodiment of an entryway apparatus comprising four strap sleeves constructed and arranged to be positioned along the sides of a door frame, in accordance with aspects of the present inventive concepts.

FIG. 26E is a perspective view of an embodiment of an entryway apparatus 3000 comprising four strap sleeves 29*a*1, 29*a*2, 29*b*1, 29*b*2 constructed and arranged to be positioned along the sides of a door frame 2200, in accordance with aspects of the present inventive concepts.

Figure 26F:
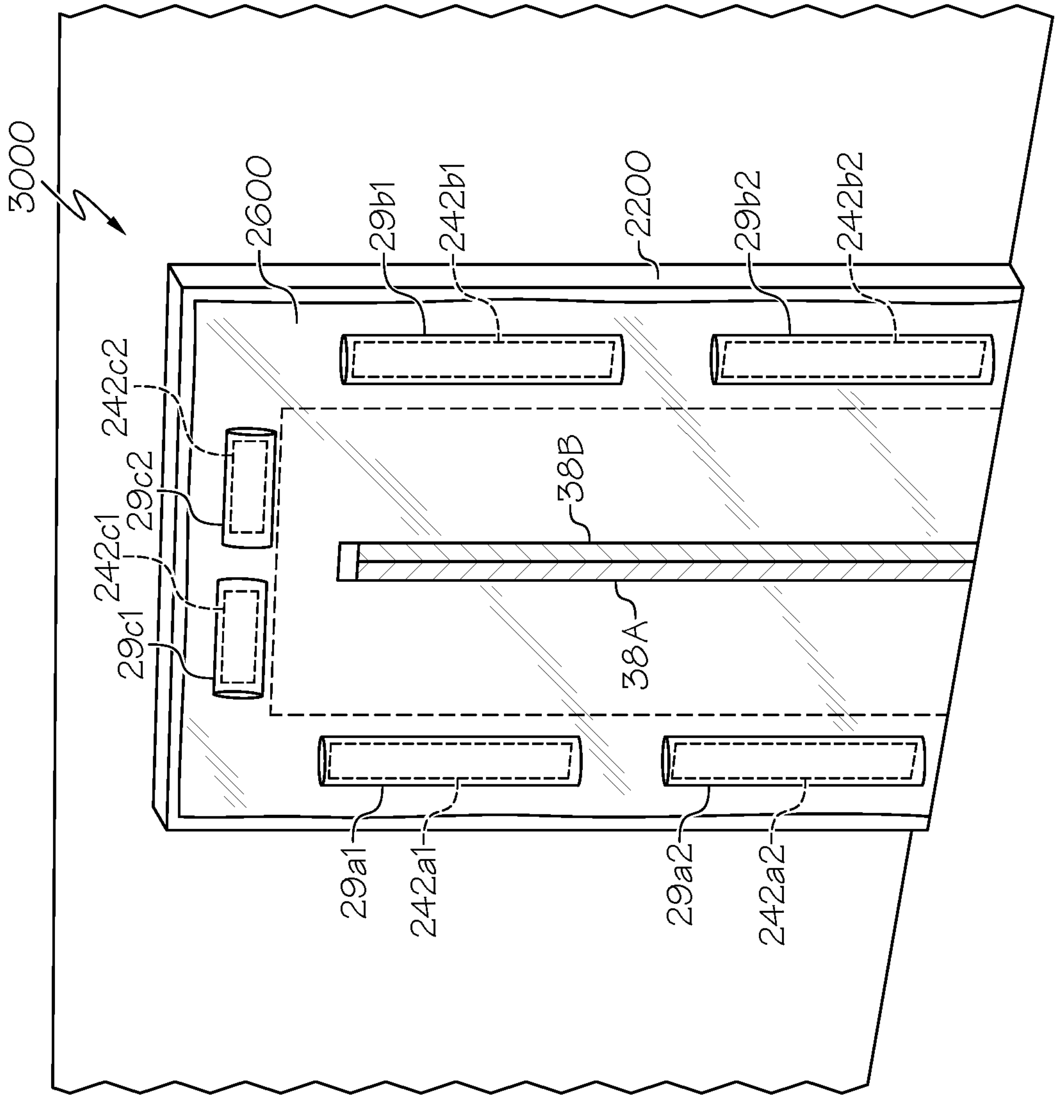
FIG. 26F is a perspective view of an embodiment of an entryway apparatus comprising two strap sleeves constructed and arranged to be positioned along the top of a door frame and four strap sleeves constructed and arranged to be positioned along the sides of a door frame, in accordance with aspects of the present inventive concepts.

FIG. 26F is a perspective view of an embodiment of an entryway apparatus 3000 comprising two strap sleeves 29*c*1, 29*c*2 constructed and arranged to be positioned along the top of a door frame 2200 and four strap sleeves 29*a*1, 29*a*2, 29*b*1, 29*b*2 constructed and arranged to be positioned along the sides of a door frame 2200, in accordance with aspects of the present inventive concepts.

Figure 26G:
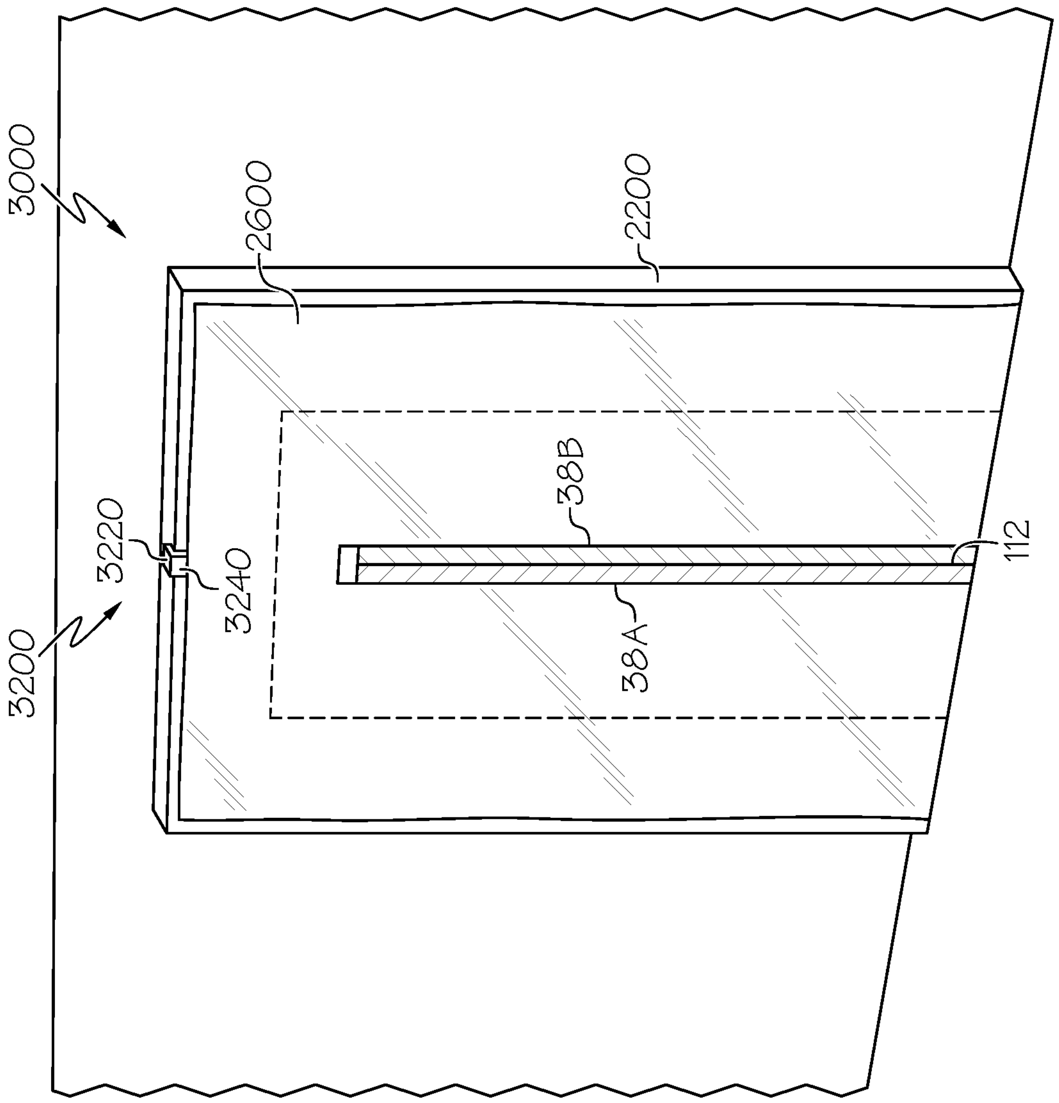
FIG. 26G is a perspective view of an embodiment of an entryway apparatus with a support, in accordance with aspects of the present inventive concepts.

FIG. 26G is a perspective view of an embodiment of an entryway apparatus 3000 with a support 3200, in accordance with aspects of the present inventive concepts. In some embodiments, such as the embodiment shown in FIG. 26G, the support comprises a contact portion 3220 that extends in a direction transverse to the plane P. In some embodiments, the support 3200 is constructed and arranged to be supported by an upper edge of a door frame 2200. In some embodiments, the support 3200 comprises a base 3240 coupled to the sheet of material 2600 directly above the opening 112. In some embodiments, the base 3240 and the contact portion 3220 are rigidly coupled to each other. In some embodiments, the base 3240 and the contact portion 3220 are hinged relative to each other.

In some embodiments, the support 3200 comprises a hook. In alternative embodiments, the support 3200 takes different forms, including, but not limited to, a magnet, a nail, hook and loop, etc. In some embodiments, the support is constructed and arranged to couple to a top portion of a door frame. The presence and position of such a support ensures that the entryway apparatus 3000 experiences upward tension at the center region thereof, ensuring proper self-closing action of the left and right seam portions 38A, 38B.

Figure 26H:
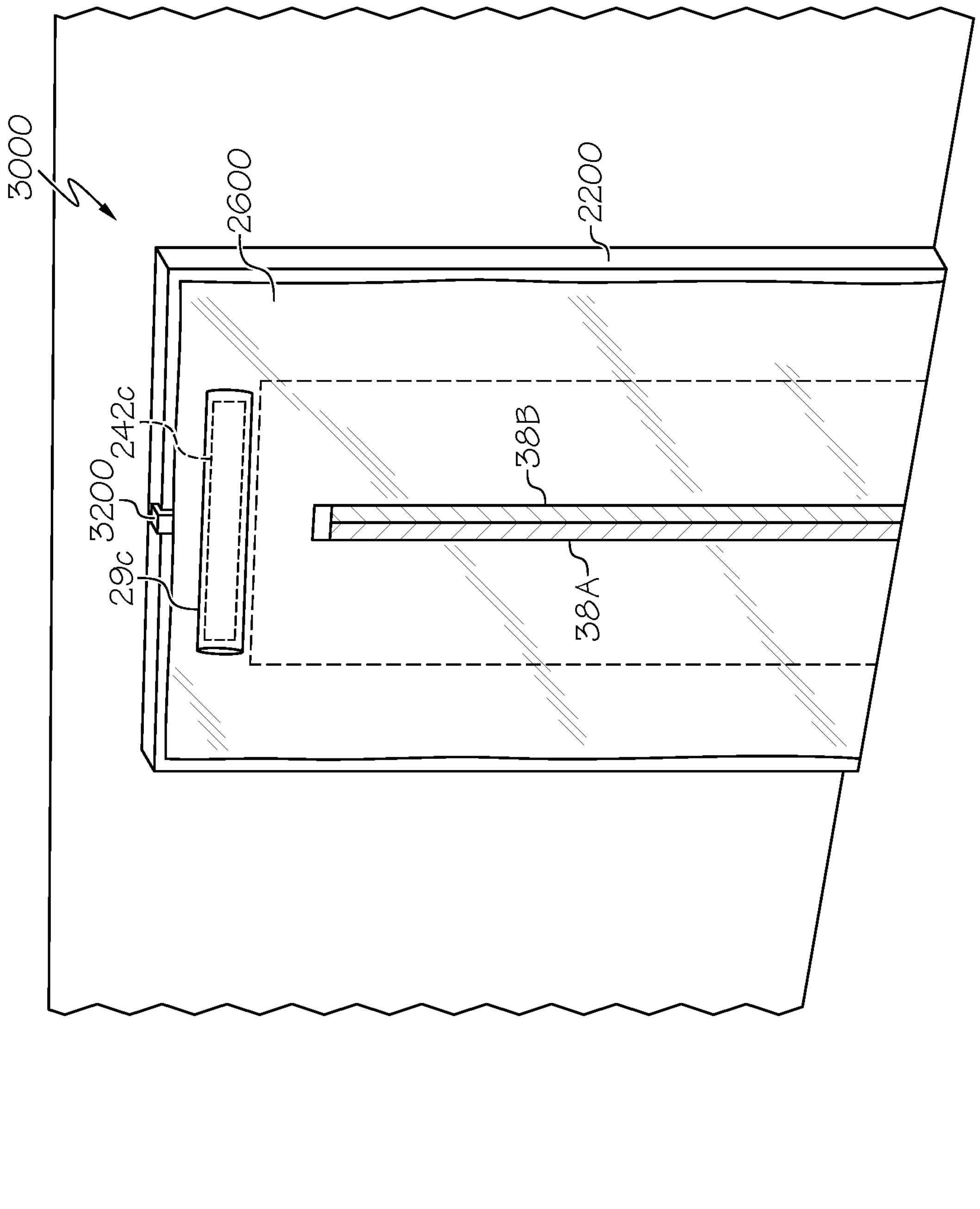
FIG. 26H is a perspective view of an embodiment of an entryway apparatus comprising a support and one strap sleeve constructed and arranged to be positioned along the top of a door frame, in accordance with aspects of the present inventive concepts.

FIG. 26H is a perspective view of an embodiment of an entryway apparatus 3000 comprising a support 3200 and one strap sleeve 29*c* constructed and arranged to be positioned along the top of a door frame 2200, in accordance with aspects of the present inventive concepts.

Figure 26I:
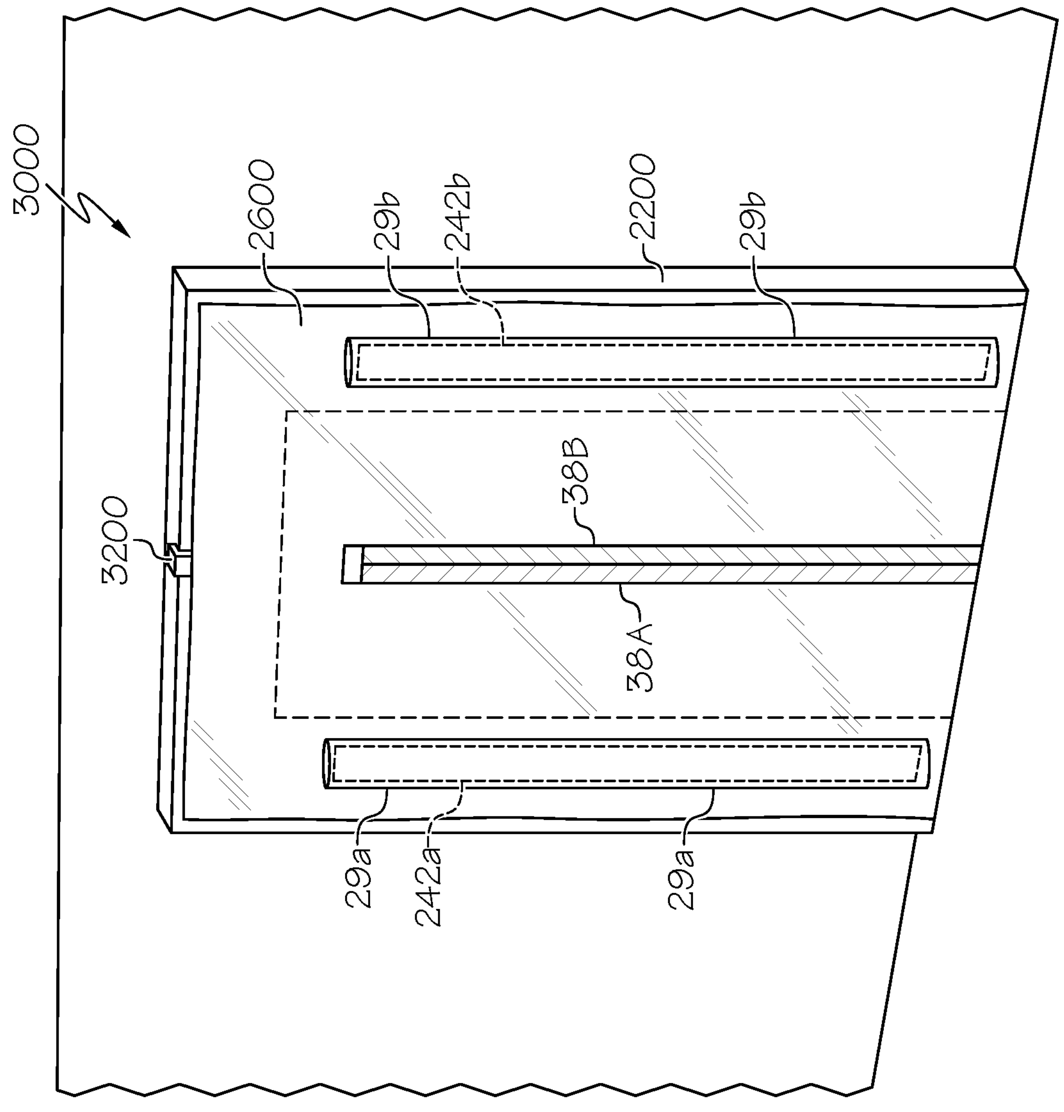
FIG. 26I is a perspective view of an embodiment of an entryway apparatus 3000 comprising a support 3200 and two strap sleeves 29*a-b* constructed and arranged to be positioned along the sides of a door frame 2200, in accordance with aspects of the present inventive concepts.

FIG. 26I is a perspective view of an embodiment of an entryway apparatus 3000 comprising a support 3200 and two strap sleeves 29*a-b* constructed and arranged to be positioned along the sides of a door frame 2200, in accordance with aspects of the present inventive concepts.

Figure 26J:
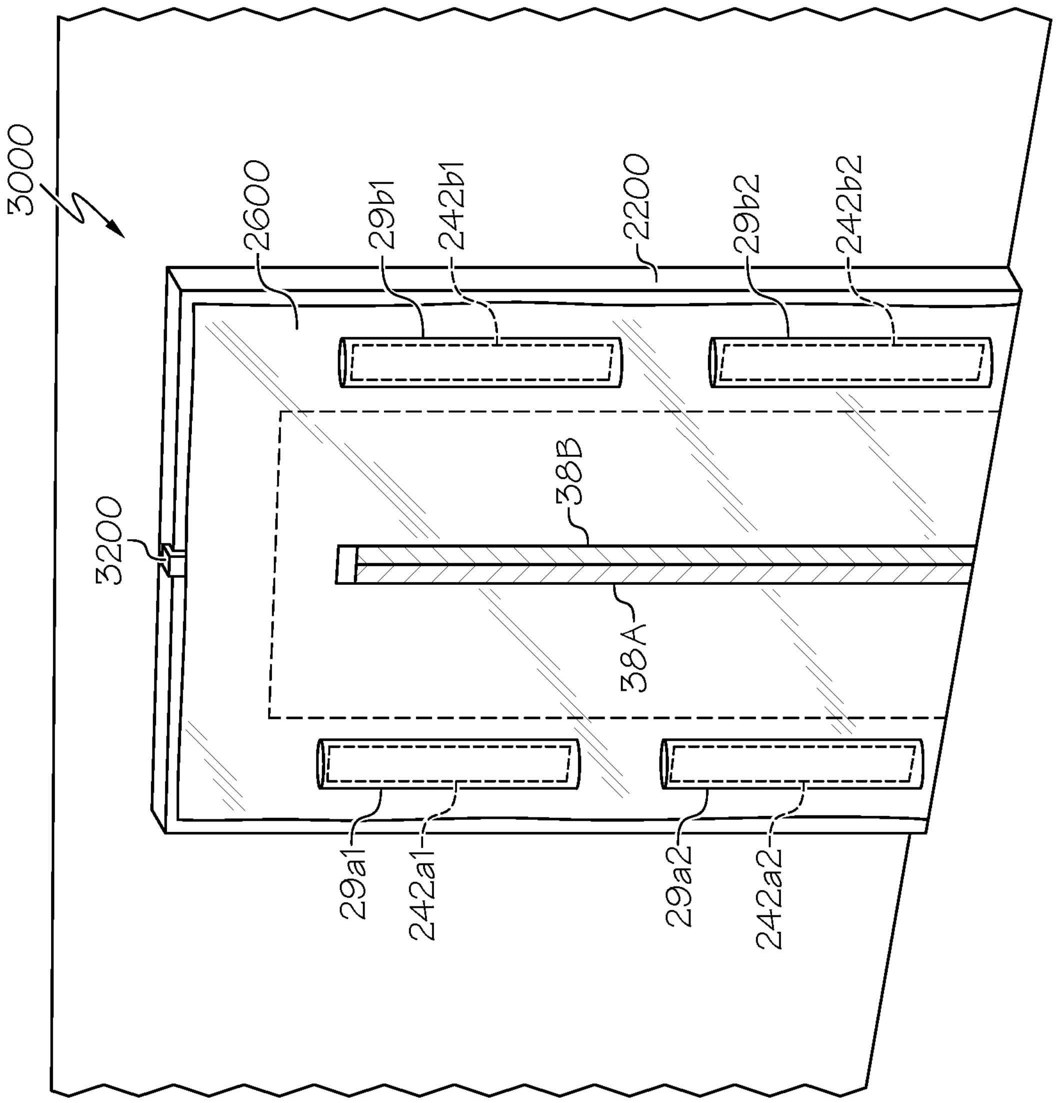
FIG. 26J is a perspective view of an embodiment of an entryway apparatus 3000 comprising a support 3200 and four strap sleeves 29*a*1, 29*a*2, 29*b*1, 29*b*2 constructed and arranged to be positioned along the sides of a door frame 2200, in accordance with aspects of the present inventive concepts.

FIG. 26J is a perspective view of an embodiment of an entryway apparatus 3000 comprising a support 3200 and four strap sleeves 29*a*1, 29*a*2, 29*b*1, 29*b*2 constructed and arranged to be positioned along the sides of a door frame 2200, in accordance with aspects of the present inventive concepts.

Figure 26K:
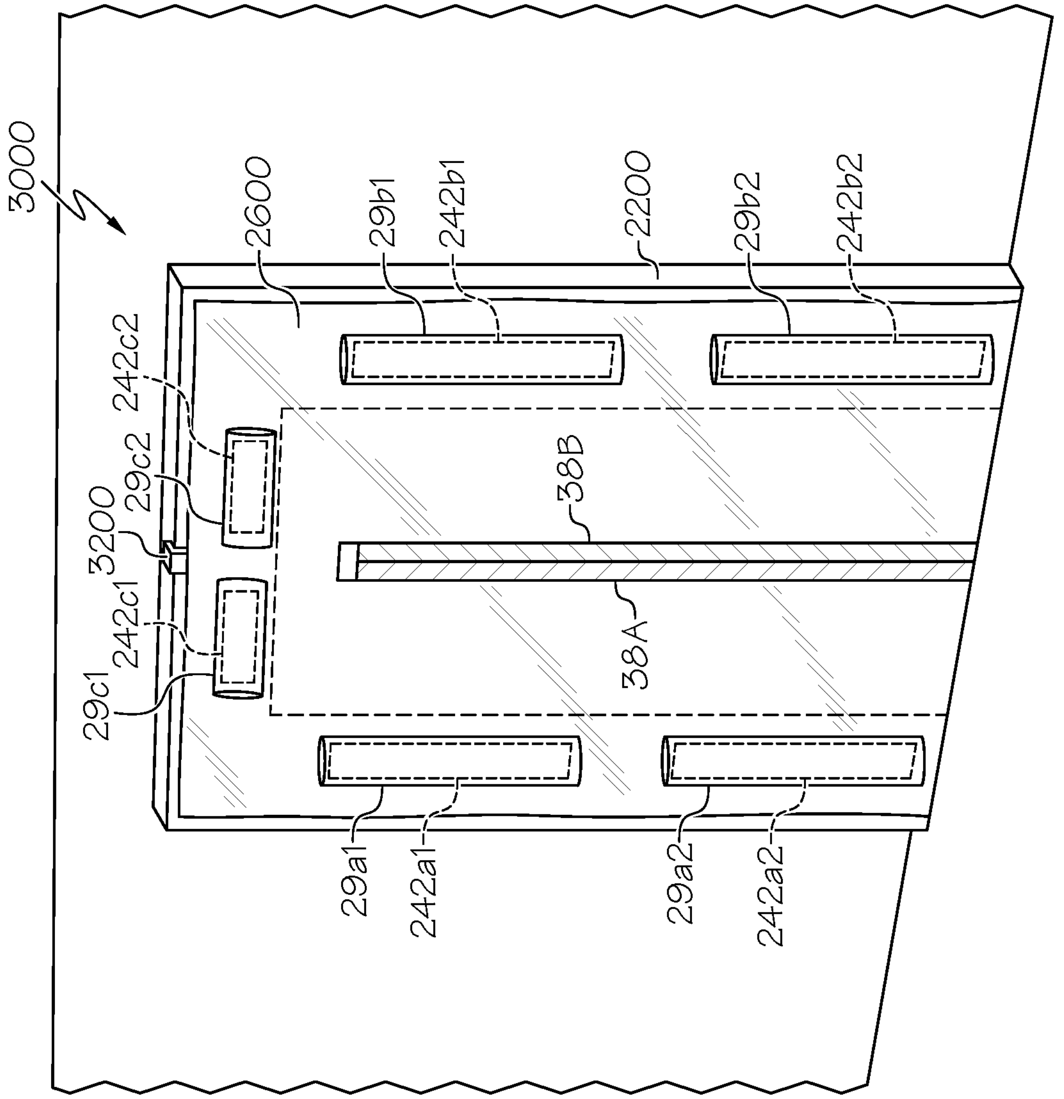
FIG. 26K is a perspective view of an embodiment of an entryway apparatus 3000 comprising a support 3200 and two strap sleeves 29*c*1, 29*c*2 constructed and arranged to be positioned along the top of a door frame 2200 and four strap sleeves 29*a*1, 29*a*2, 29*b*1, 29*b*2 constructed and arranged to be positioned along the sides of a door frame 2200, in accordance with aspects of the present inventive concepts.

FIG. 26K is a perspective view of an embodiment of an entryway apparatus 3000 comprising a support 3200 and two strap sleeves 29*c*1, 29*c*2 constructed and arranged to be positioned along the top of a door frame 2200 and four strap sleeves 29*a*1, 29*a*2, 29*b*1, 29*b*2 constructed and arranged to be positioned along the sides of a door frame 2200, in accordance with aspects of the present inventive concepts.

Figure 26L:
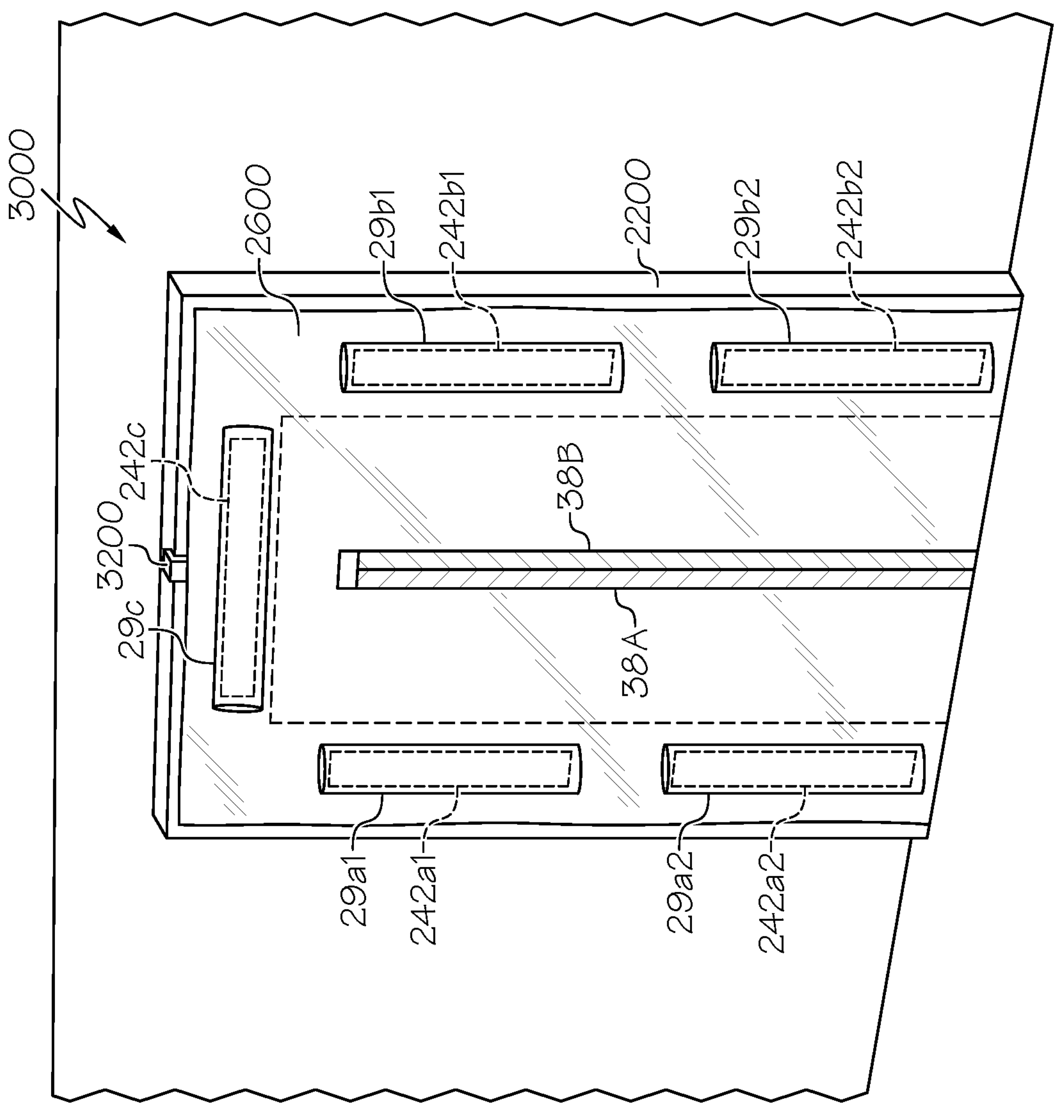
FIG. 26L is a perspective view of an embodiment of an entryway apparatus 3000 with a support 3200 and one strap sleeve 29*c* constructed and arranged to be positioned along the top of a door frame 2200 and four strap sleeves 29*a*1, 29*a*2, 29*b*1, 29*b*2 constructed and arranged to be positioned along the sides of a door frame 2200, in accordance with aspects of the present inventive concepts.

FIG. 26L is a perspective view of an embodiment of an entryway apparatus 3000 with a support 3200 and one strap sleeve 29*c* constructed and arranged to be positioned along the top of a door frame 2200 and four strap sleeves 29*a*1, 29*a*2, 29*b*1, 29*b*2 constructed and arranged to be positioned along the sides of a door frame 2200, in accordance with aspects of the present inventive concepts.

Figure 27A:
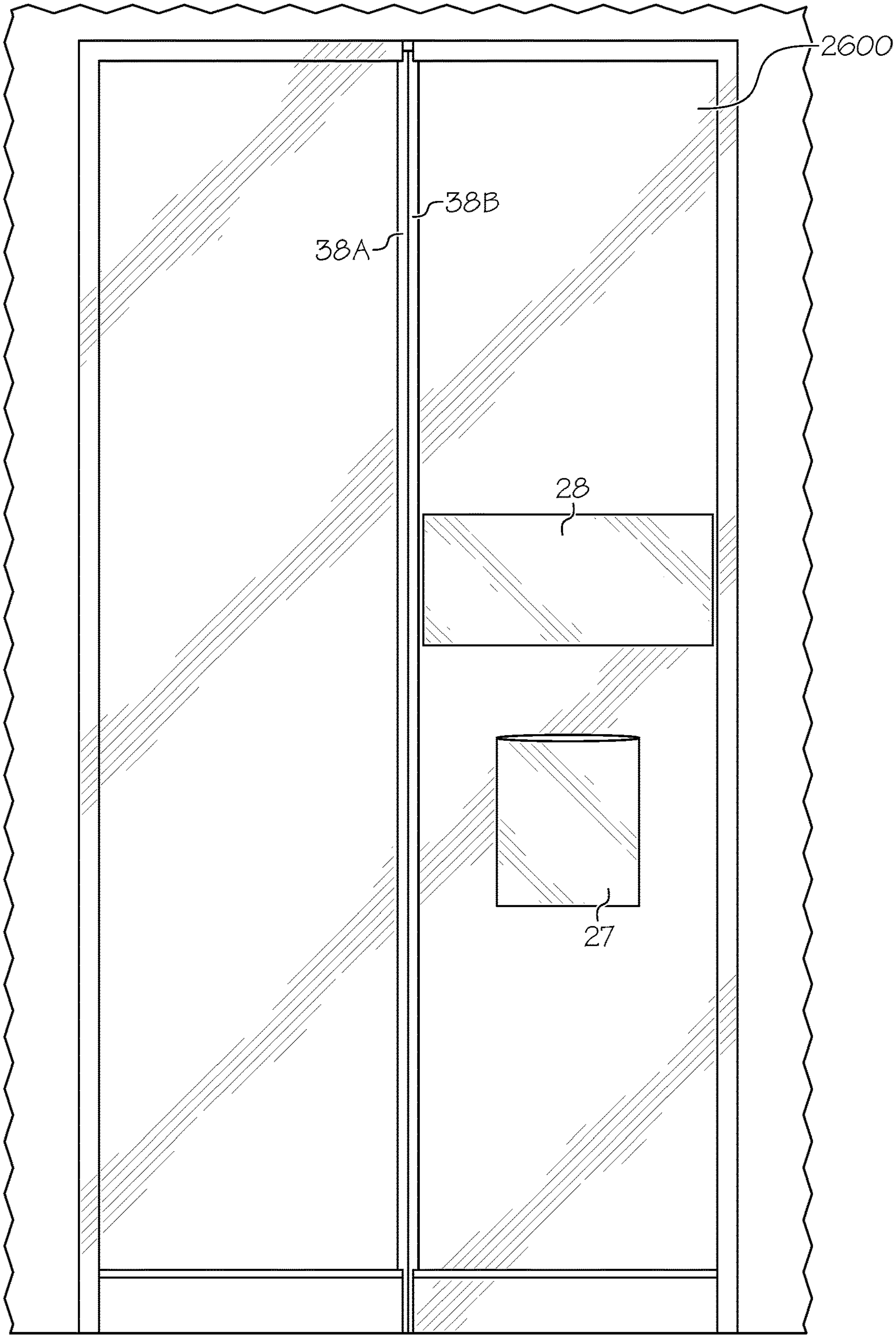
FIG. 27A is a front view of an embodiment of an entryway apparatus installed at a door frame, in accordance with aspects of the present inventive concepts.

FIG. 27A is a front view of an embodiment of an entryway apparatus 3000 installed at a door frame 2200, in accordance with aspects of the present inventive concepts. In the embodiment shown in FIG. 27, the entryway apparatus 3000 comprises a pocket 27. In alternative embodiments, the entryway apparatus 3000 comprises multiple pockets, and in some embodiments, the entryway apparatus 3000 does not comprise a pocket.

In the embodiment shown in FIG. 27, the entryway apparatus 3000 comprises a window 28 on the right side. In alternative embodiments, the entryway apparatus 3000 comprises a window on the right and/or left side. In alternative embodiments, the entryway apparatus 3000 does not comprise a window. In alternative embodiments, the entryway apparatus 3000 comprises multiple windows.

Figure 27B:
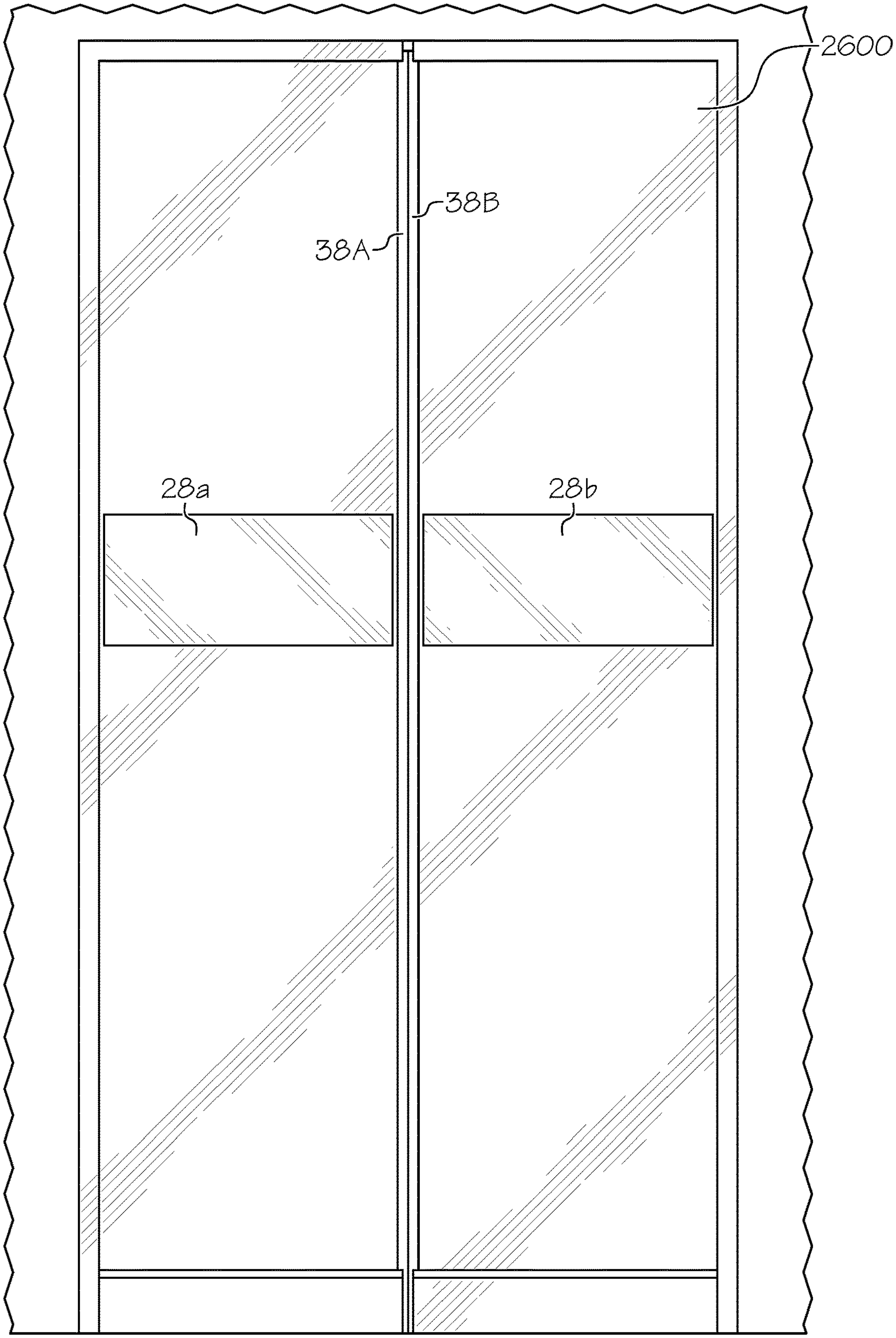
FIG. 27B is a front view of an embodiment of an entryway apparatus comprising two windows, in accordance with aspects of the present inventive concepts.

FIG. 27B is a front view of an embodiment of an entryway apparatus 3000 comprising two windows 28*a-b*, in accordance with aspects of the present inventive concepts.

Figure 27C:
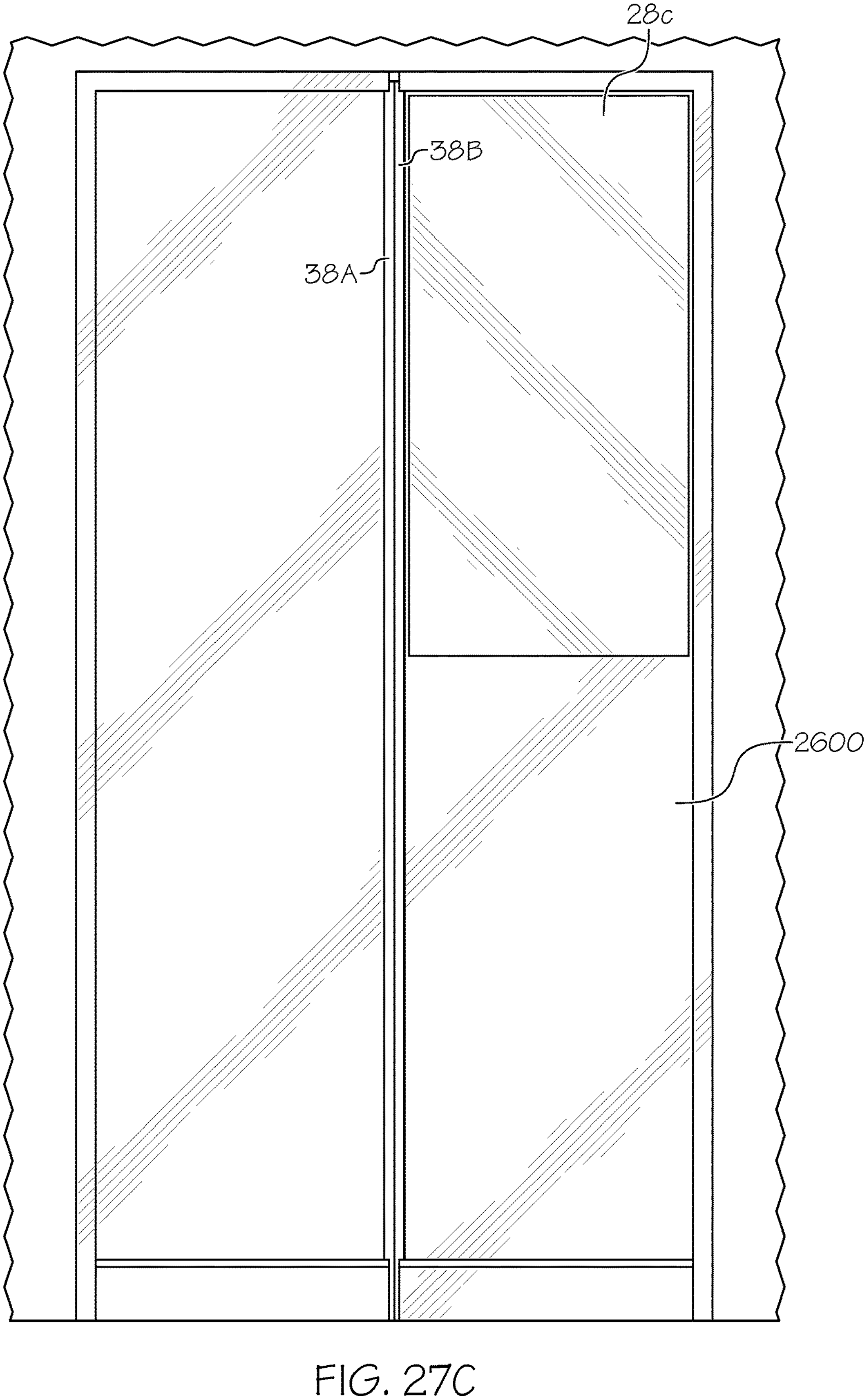
FIG. 27C is a front view of an embodiment of an entryway apparatus comprising a large window, in accordance with aspects of the present inventive concepts.

FIG. 27C is a front view of an embodiment of an entryway apparatus 3000 comprising a large window 28*c*, in accordance with aspects of the present inventive concepts. In alternative embodiments, the large window 28*c* extends to the bottom edge 2630.

Figure 27D:
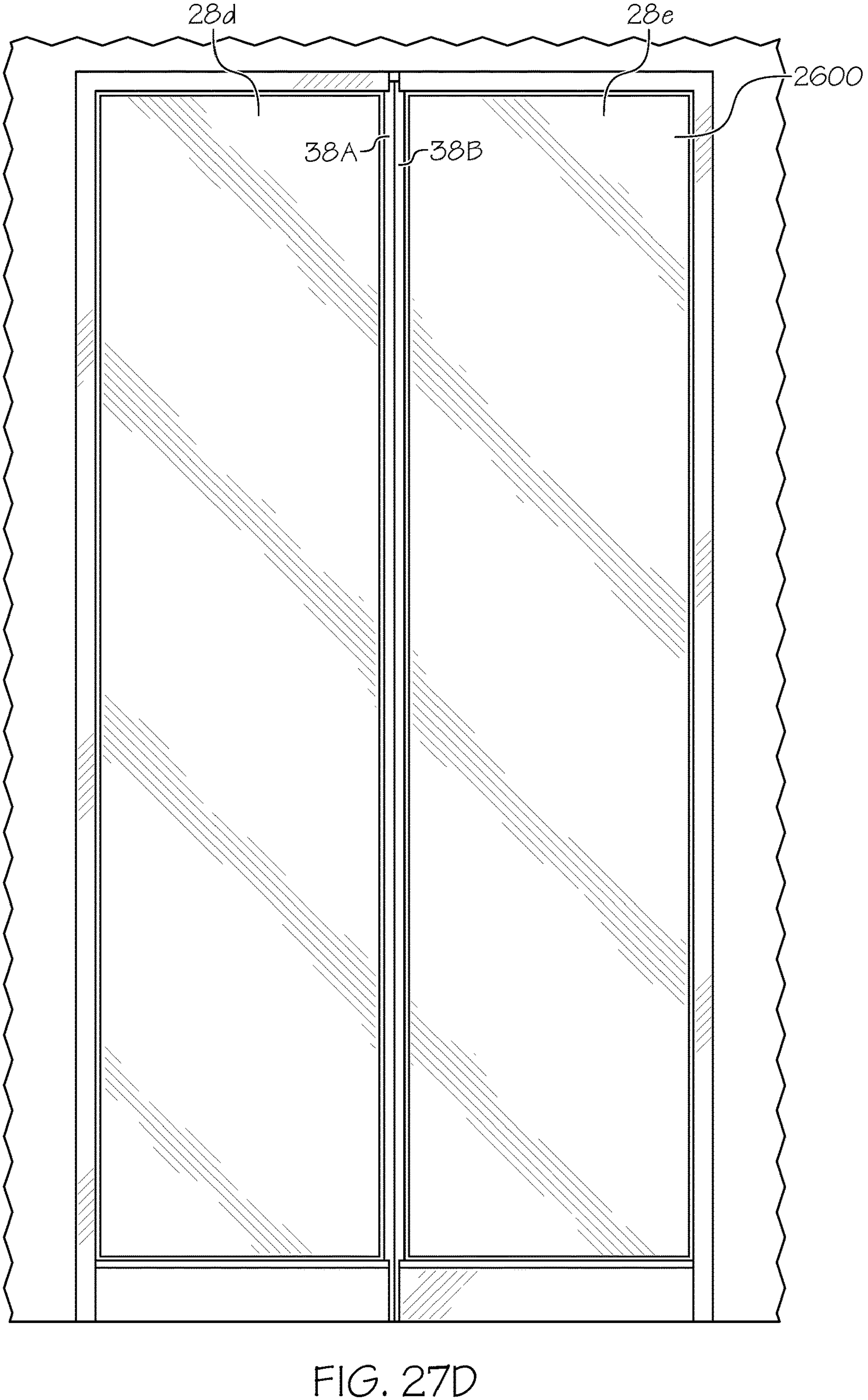
FIG. 27D is a front view of an embodiment of an entryway apparatus comprising two large windows, in accordance with aspects of the present inventive concepts.

FIG. 27D is a front view of an embodiment of an entryway apparatus 3000 comprising two large windows 28*d-e*, in accordance with aspects of the present inventive concepts.

Figure 28A:
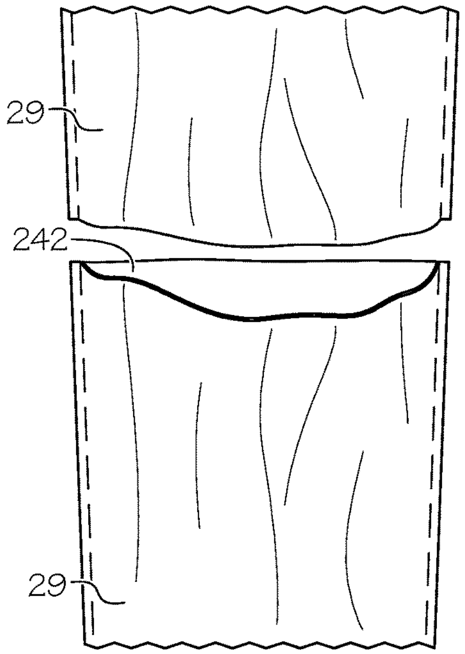
FIG. 28A is a front view of an embodiment of a strap sleeve constructed and arranged to cover at least one first strap portion, in accordance with aspects of the present inventive concepts.

FIG. 28A is a front view of an embodiment of a strap sleeve 29 constructed and arranged to cover at least one first strap portion 242, in accordance with aspects of the present inventive concepts. In the embodiment shown in FIG. 28, the strap sleeve 29 is open on the top and closed on the bottom. In alternative embodiments, the strap sleeve 29 is open on the bottom and closed on the top.

Figure 28B:
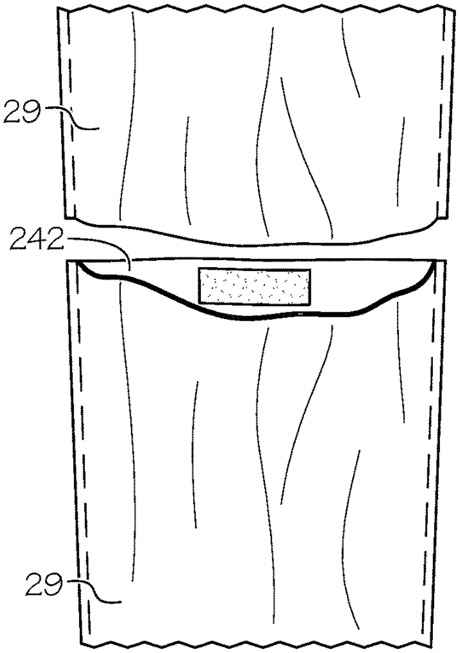
FIG. 28B is a front view of an embodiment of a strap sleeve comprising a hook and loop securing mechanism, in accordance with aspects of the present inventive concepts.

FIG. 28B is a front view of an embodiment of a strap sleeve 29 comprising a hook and loop securing mechanism, in accordance with aspects of the present inventive concepts.

Figure 28C:
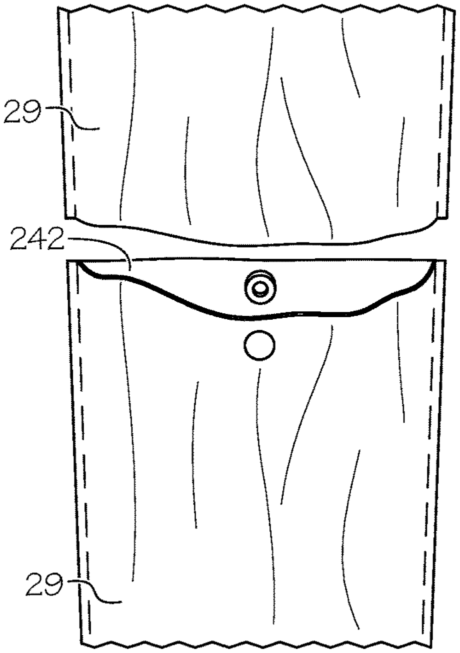
FIG. 28C is a front view of an embodiment of a strap sleeve comprising a button securing mechanism, in accordance with aspects of the present inventive concepts.

FIG. 28C is a front view of an embodiment of a strap sleeve 29 comprising a button securing mechanism, in accordance with aspects of the present inventive concepts.

Figure 29A:
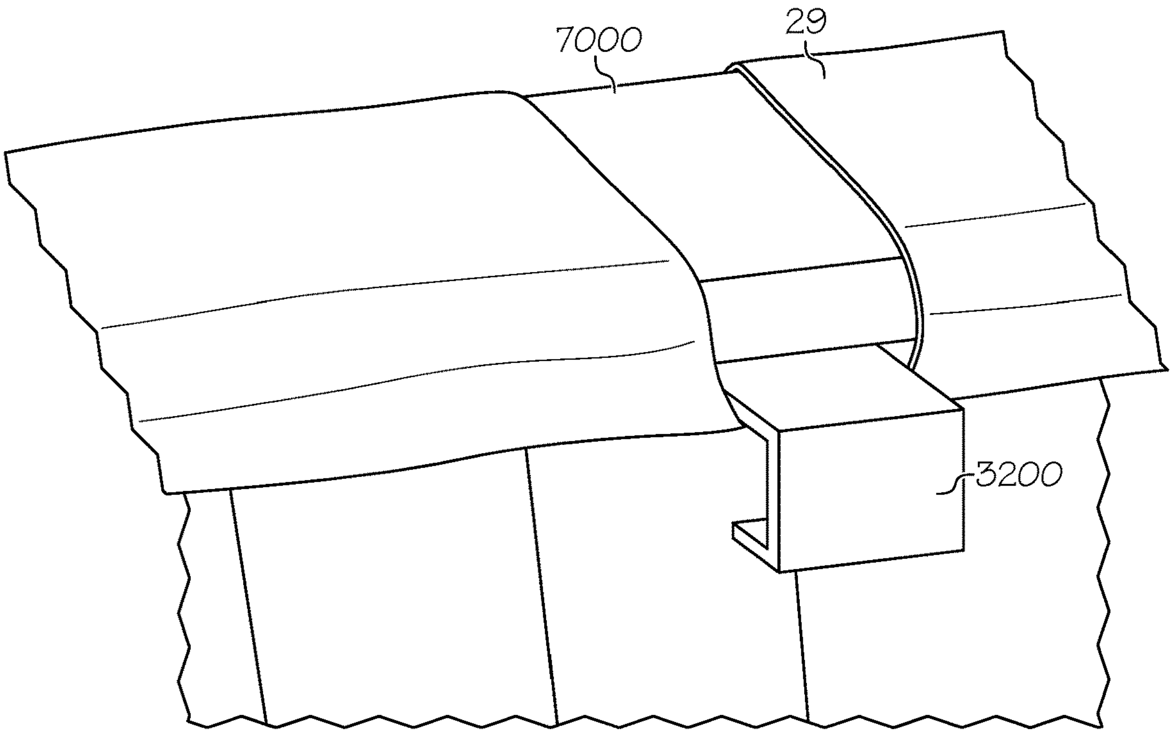
FIG. 29A is a perspective view of an embodiment of a strap sleeve positioned along the top of the door frame, in accordance with aspects of the present inventive concepts.

FIG. 29A is a perspective view of a strap sleeve 29 positioned along the top of the door frame 2200, in accordance with aspects of the present inventive concepts. In this embodiment, the strap sleeve 29 comprises a support 3200, for example, a hook. In alternative embodiments, the strap sleeve 29 may comprise multiple hooks. In some embodiments, the strap sleeve 29 does not comprise a support 3200.

In some embodiments, such as the one shown in FIG. 29A, the support 3200 is coupled to a rigid member 7000. In some embodiments, the rigid member 7000 is a strap portion 242. In alternative embodiments, the rigid member is not a strap portion 242.

In some embodiments, the support 3200 is configured to be positioned at a top portion, namely, at a horizontal cross-member portion of the door frame 2200. In some embodiments, the support 3200 is held in position at the cross-member portion of the door frame 2200 by a magnetic strip positioned in a horizontal top sleeve of the entryway curtain 26.

Supporting of the support 3200 by the cross-member portion of the door frame ensures that the entryway curtain 26 experiences upward tension at a center region thereof, ensuring proper self-closing action of the left and right seam portions 38A, 38B, for example, proper registration and magnetic coupling of the magnets positioned at the left and right seam portions 38A, 38B, as described herein.

Figure 29B:
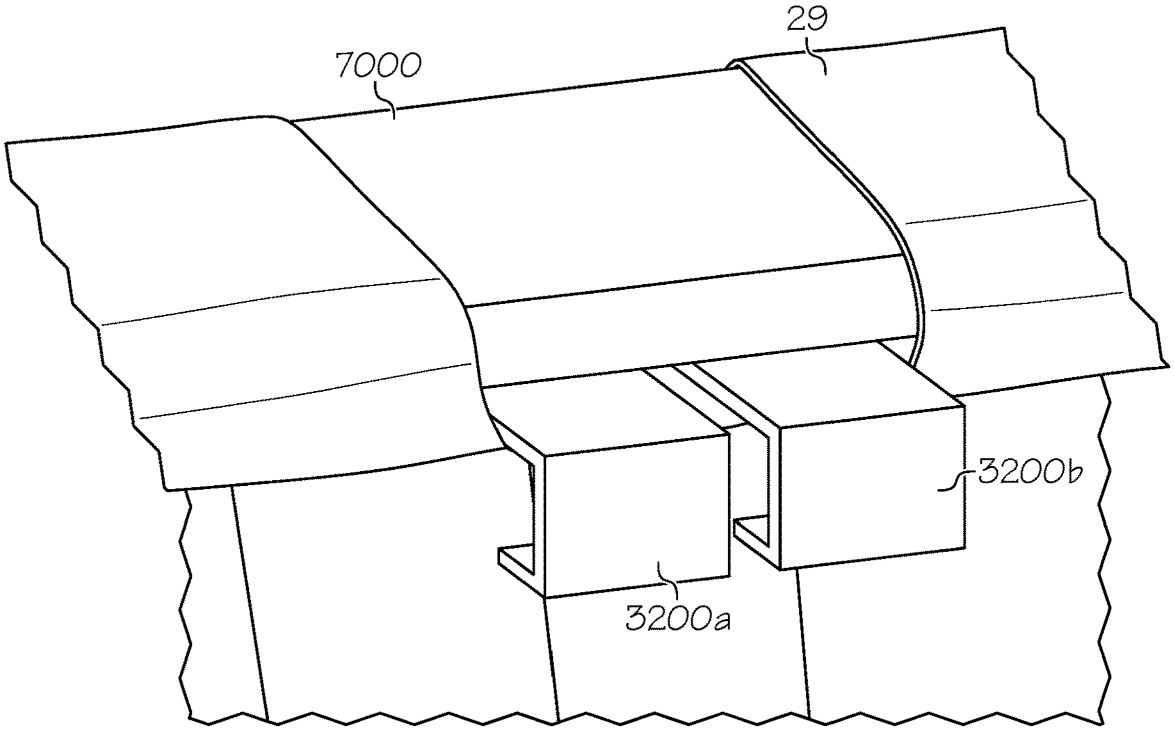
FIG. 29B is a perspective view of an embodiment of an entryway apparatus with two hooks positioned about the center of the opening, in accordance with aspects of the present inventive concepts.

FIG. 29B is a perspective view of an entryway apparatus 3000 with two hooks positioned about the center of the opening, in accordance with aspects of the present inventive concepts.

FIGS. 30-33 show additional views of embodiments of the entryway apparatus 3000.

Figure 30:
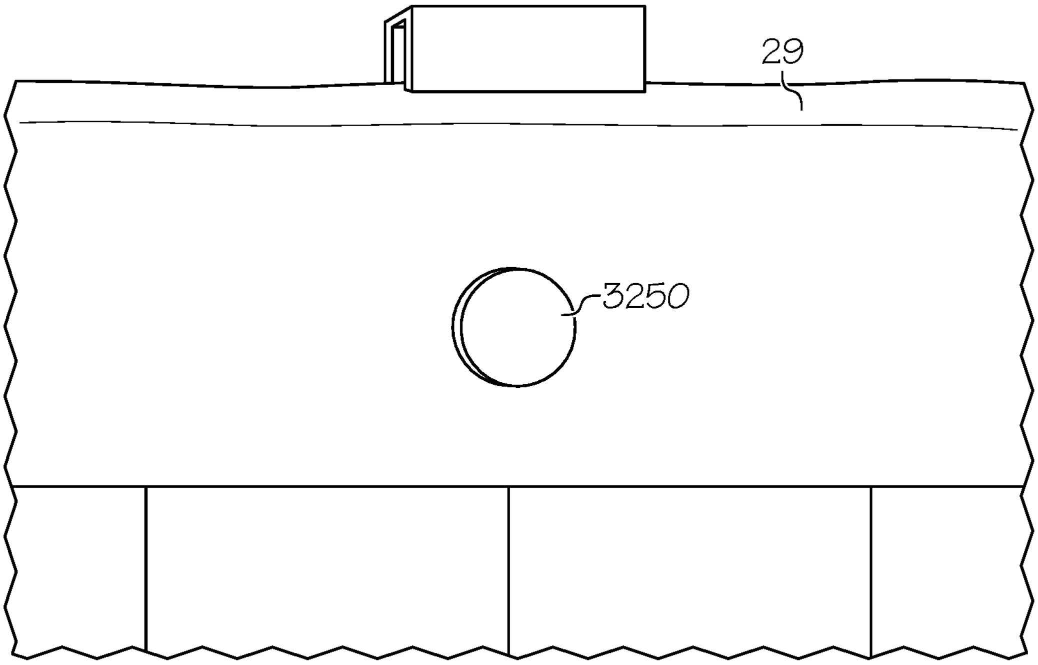
FIG. 30 is a rear view of an embodiment of a support coupled to an entryway apparatus with a support attachment mechanism, in accordance with aspects of the present inventive concepts.

FIG. 30 is a rear view of an embodiment of a support 3200 coupled to an entryway apparatus 3000 with a support attachment mechanism 3250, in accordance with aspects of the present inventive concepts. In some embodiments, the support attachment mechanism 3250 couples the support 3200 to the sheet of material 2600. In this embodiment, the support attachment mechanism 3250 comprises a rivet. In alternative embodiments the support attachment mechanism 3250 takes different forms including, but not limited to, glue, one or more magnets, and/or tape.

Figure 31A:
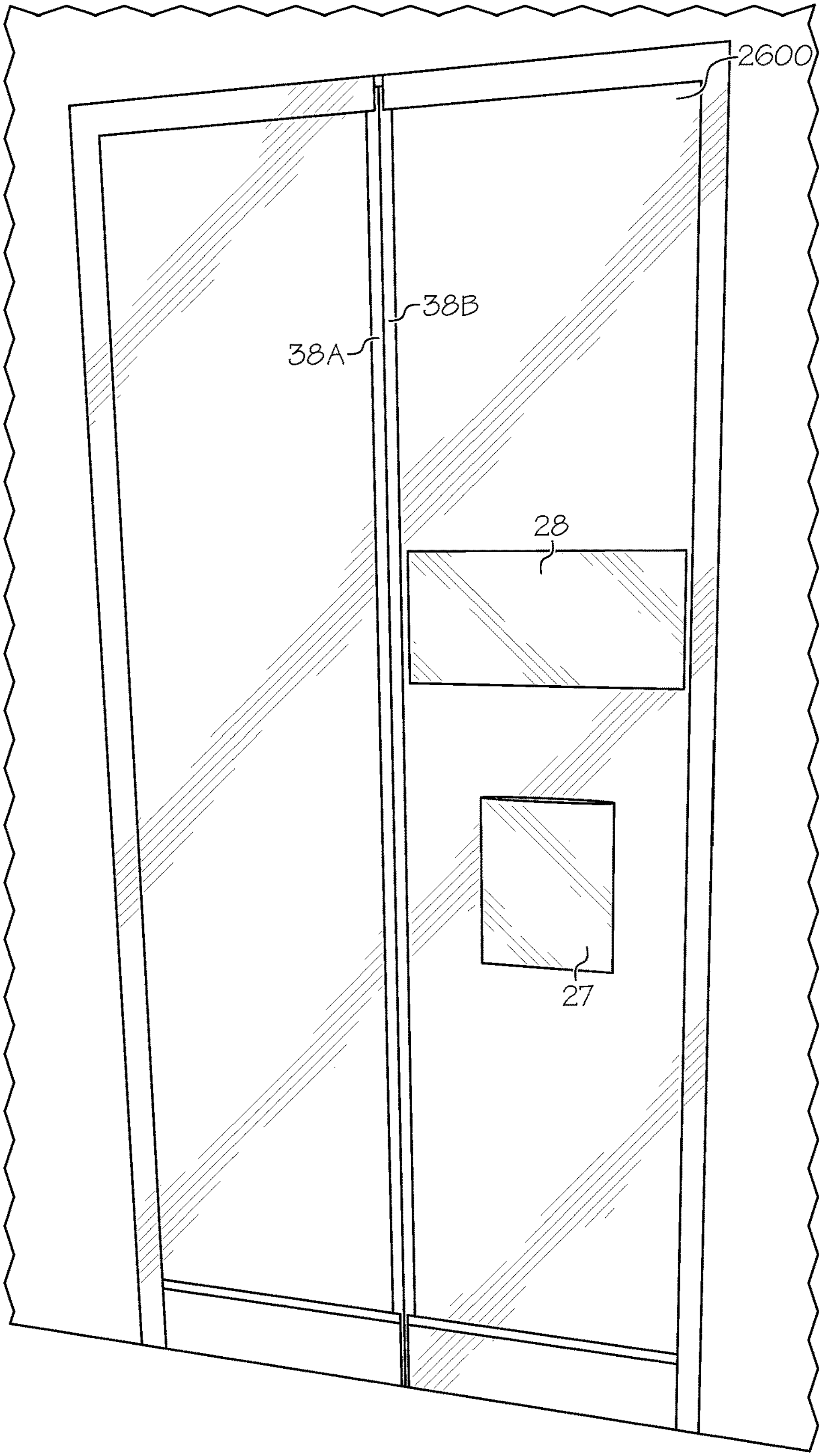
FIG. 31A is a front view of an embodiment of an entryway apparatus installed at a door frame, in accordance with aspects of the present inventive concepts.

FIG. 31A is a perspective view of an embodiment of an entryway apparatus 3000 installed at a door frame 2200, in accordance with aspects of the present inventive concepts. In this embodiment, the entryway apparatus comprises a window 28 and a pocket 27.

Figure 31B:
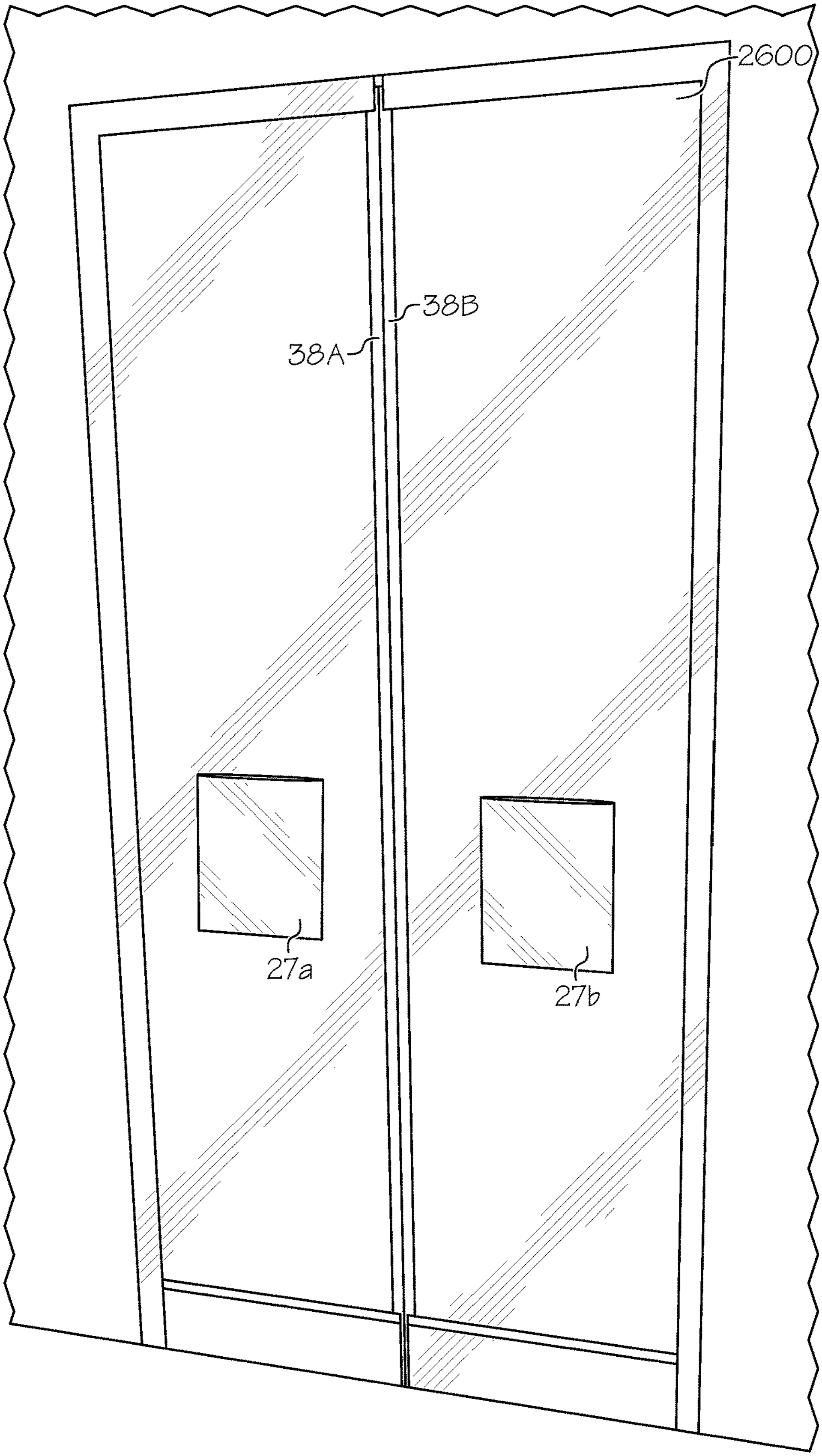
FIG. 31B is a perspective view of an embodiment of an entryway apparatus comprising two pockets, in accordance with aspects of the present inventive concepts.

FIG. 31B is a perspective view of an embodiment of an entryway apparatus 300 comprising two pockets 27*a-b*, in accordance with aspects of the present inventive concepts.

Figure 31C:
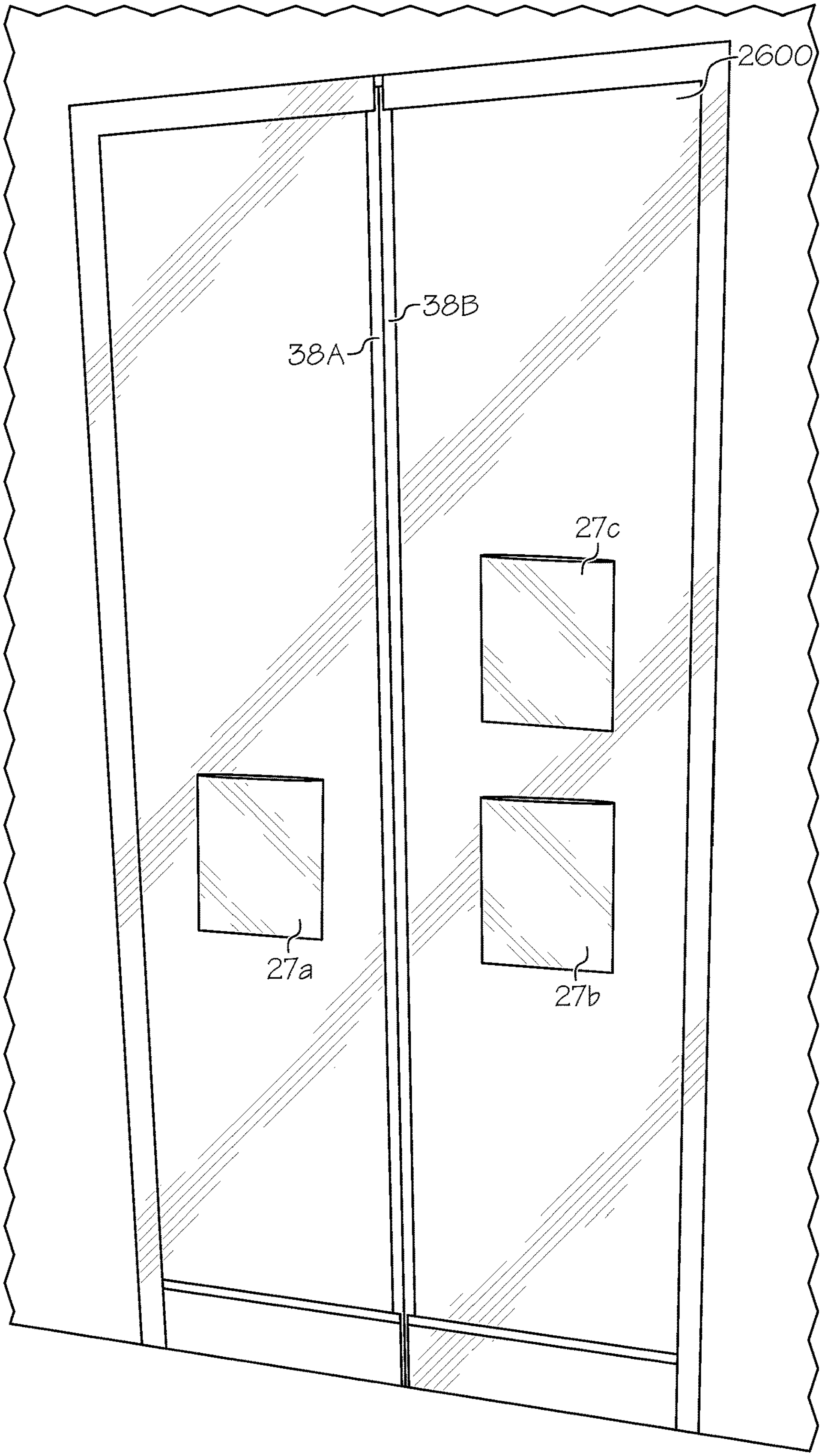
FIG. 31C is a perspective view of an embodiment of an entryway apparatus comprising three pockets in accordance with aspects of the present inventive concepts.

FIG. 31C is a perspective view of an embodiment of an entryway apparatus 3000 comprising three pockets 27 *a-c*, in accordance with aspects of the present inventive concepts.

Figure 31D:
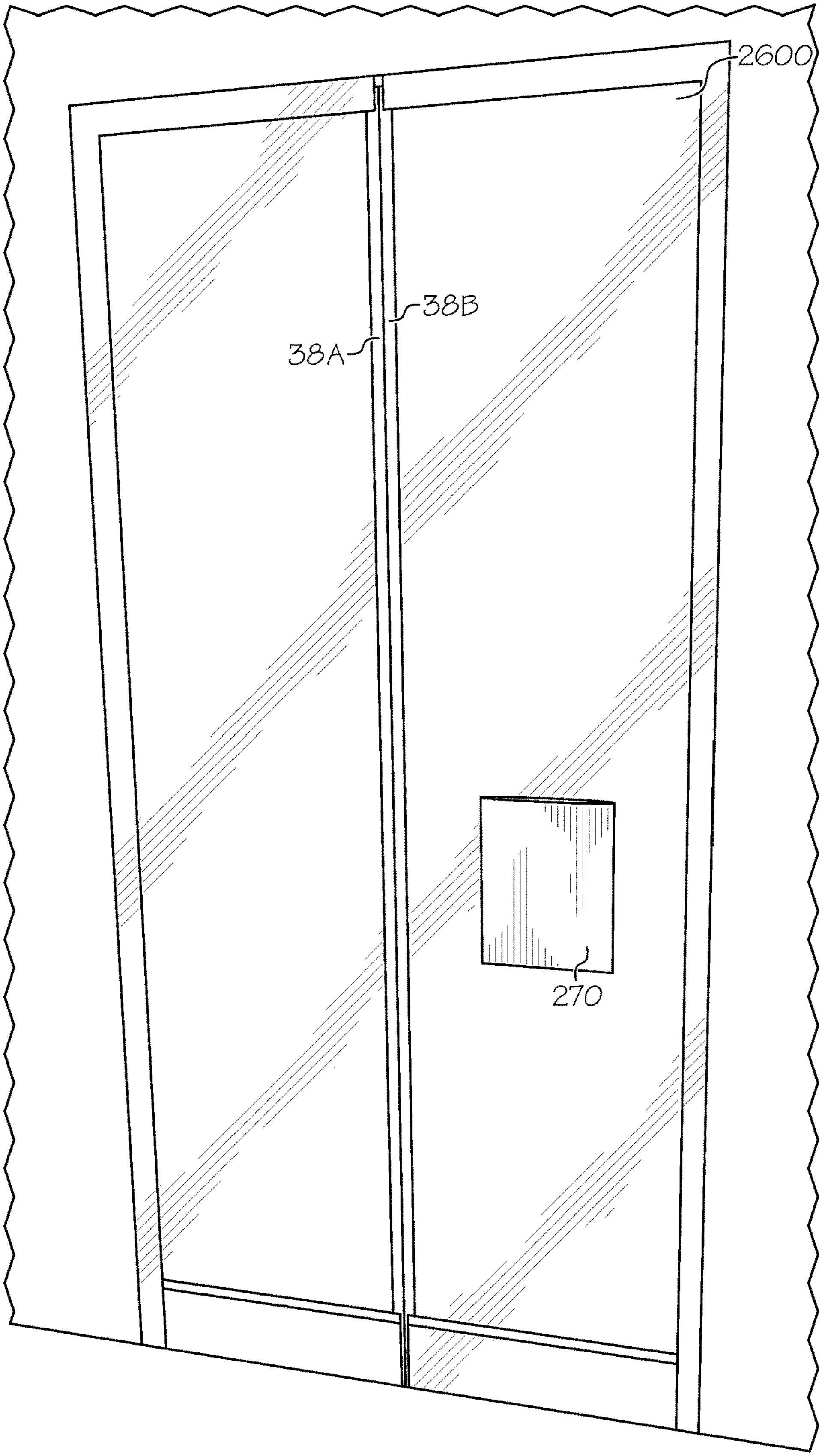
FIG. 31D is a perspective view of an embodiment of an entryway apparatus comprising a non-transparent pocket, in accordance with aspects of the present inventive concepts.

FIG. 31D is a perspective view of an embodiment of an entryway apparatus 3000 comprising a non-transparent pocket 270, in accordance with aspects of the present inventive concepts.

Figure 32:
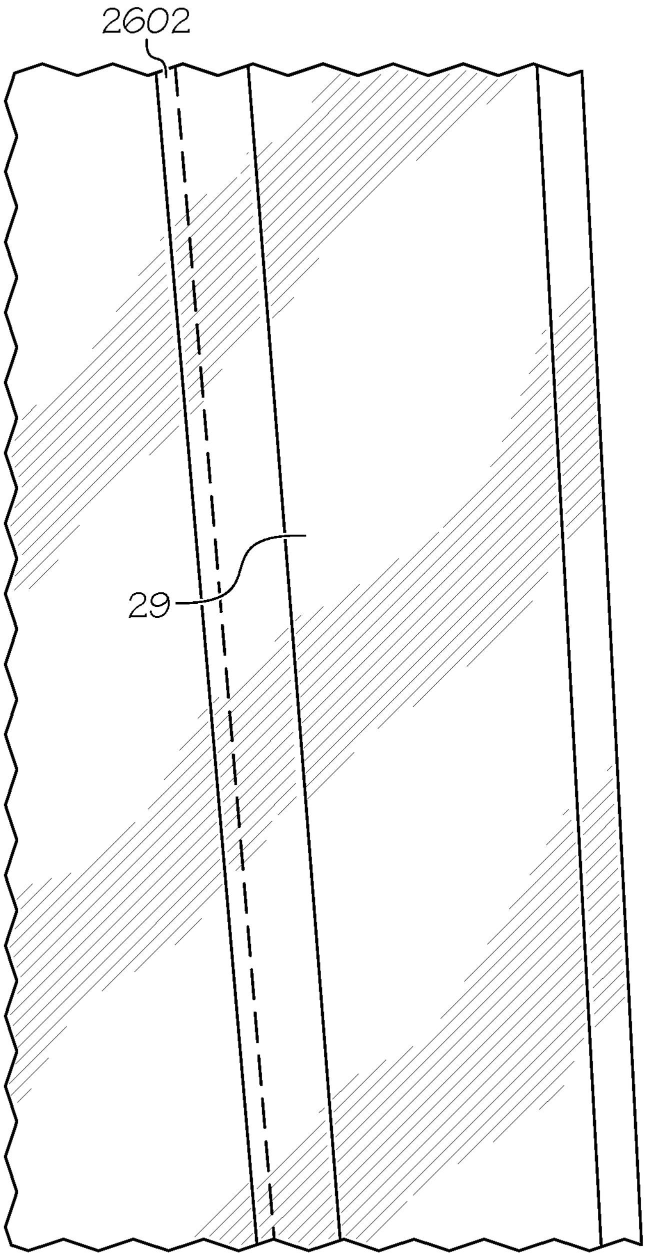
FIG. 32 is a view of an embodiment of a first strap sleeve, in accordance with aspects of the present inventive concepts.

FIG. 32 is a view of an embodiment of a first strap sleeve 29, comprising a stitched region 2602, in accordance with aspects of the present inventive concepts.

Figure 33A:
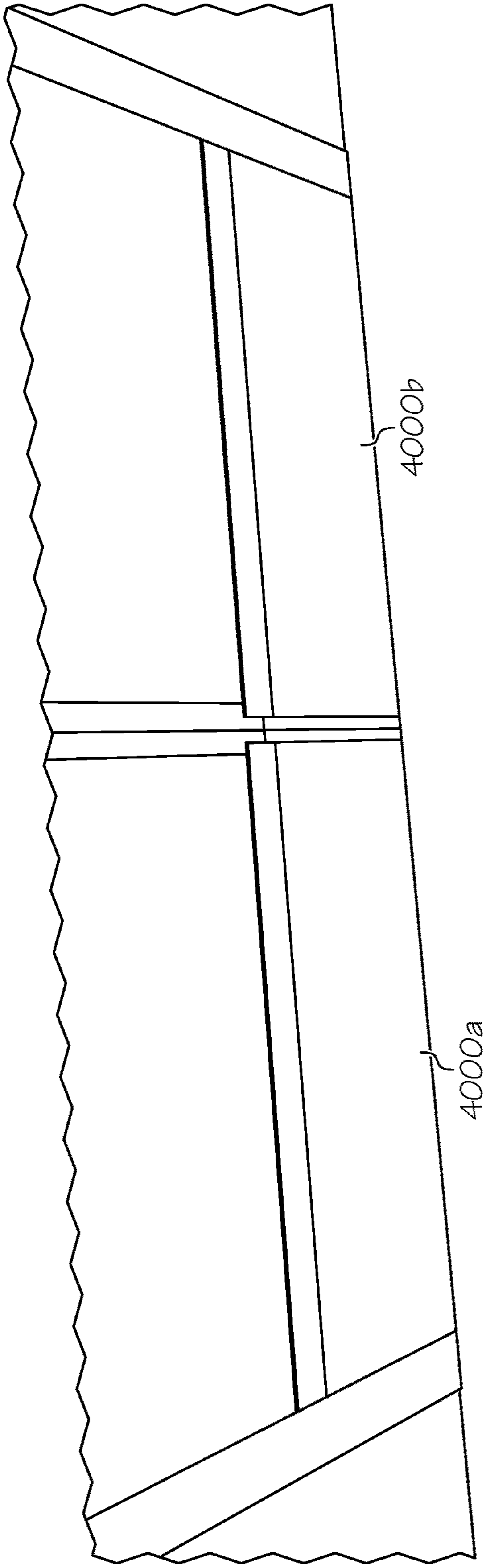
FIG. 33A is a perspective view of an embodiment of an entryway apparatus comprising a curtain extender 4000*a-b*, in accordance with aspects of the present inventive concepts.

FIG. 33A is a perspective view of an embodiment of an entryway apparatus 3000 comprising a bottom extender 4000*a-b*, in accordance with aspects of the present inventive concepts. In this embodiment, the bottom extender 4000 *a-b* is constructed and arranged to adjust the length of the sheet of material 2600 such that it makes contact with the floor. The entryway apparatus 3000 may be used with door frames that have different heights. In such cases, the bottom extender 4000*a-b* may be inserted and the position of the bottom extender 4000*a-b* may be adjusted to remove gaps between the entryway apparatus 3000 and the floor. The bottom extender 4000*a-b* may be coupled to the sheet of material 2600 using different attachment mechanisms, including, but not limited to, a hook and loop, buttons, magnets, etc.

Figure 33B:
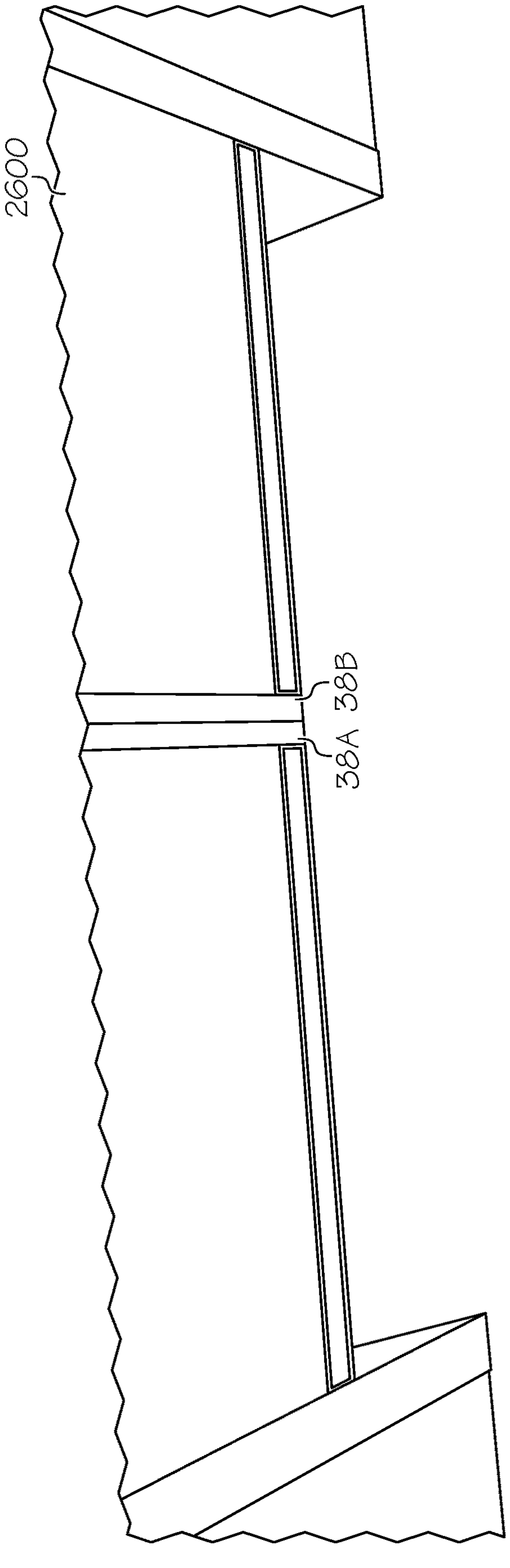
FIG. 33B is a perspective view of an embodiment of an entryway apparatus without a curtain extender, in accordance with aspects of the present inventive concepts.

FIG. 33B is perspective view of an embodiment of an entryway apparatus 3000 without a bottom extender 4000, in accordance with aspects of the present inventive concepts.

Figure 34A:
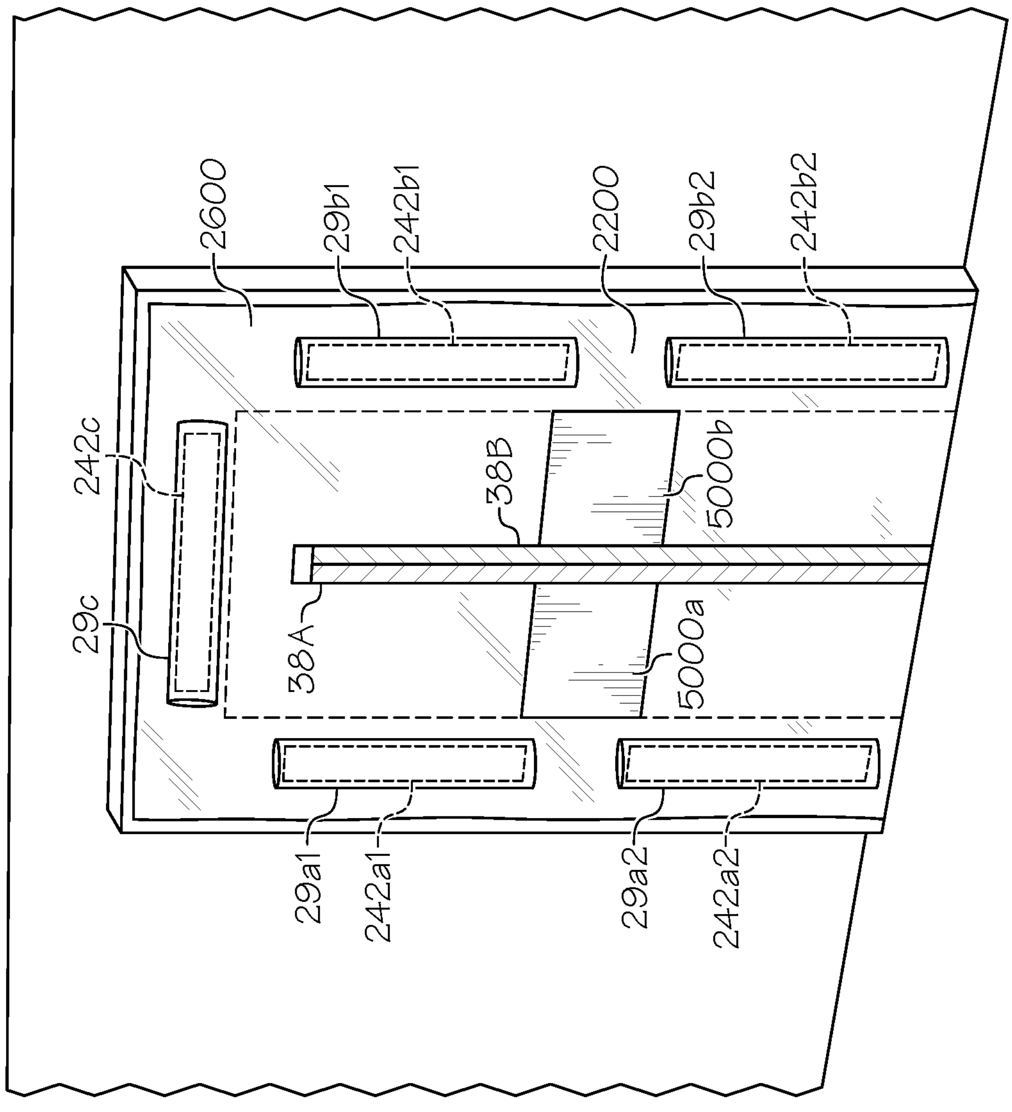
FIG. 34A is a perspective view of an embodiment of an entryway apparatus comprising two stiff regions, in accordance with aspects of the present inventive concepts.

FIG. 34A is a perspective view of an embodiment of an entryway apparatus 3000 comprising two stiff regions 5000*a-b*, in accordance with aspects of the present inventive concepts. In some embodiments, such as the one shown in FIG. 34A, the entryway apparatus 3000 comprises one or more stiff regions 5000 that are stiffer than surrounding regions. These stiffer regions reduce folding in the sheet of material 2600. Such folding may prevent the entryway apparatus 3000 from closing properly.

Figure 34B:
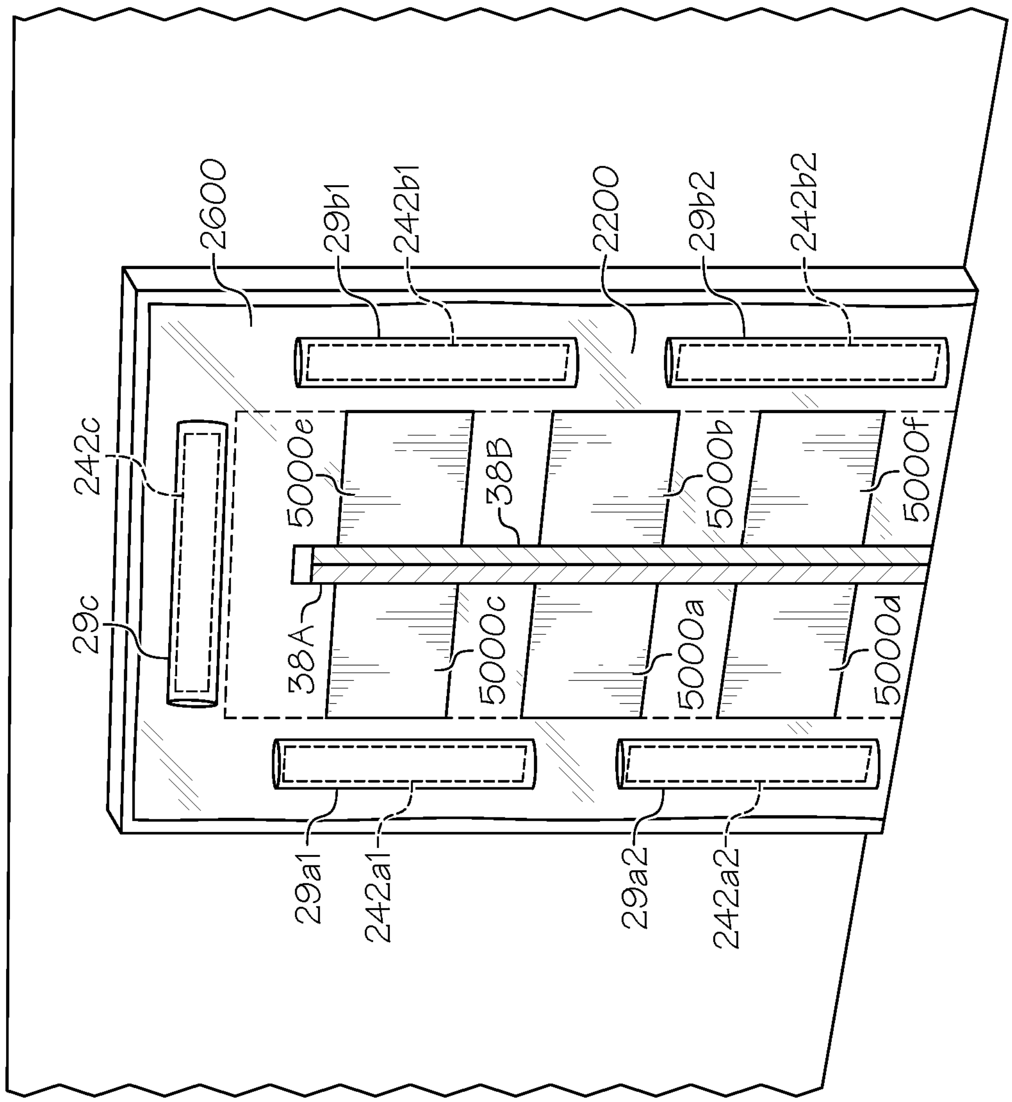
FIG. 34B is a perspective view of an embodiment of an entryway apparatus comprising six stiff regions, in accordance with aspects of the present inventive concepts.

FIG. 34B is a perspective view of an embodiment of an entryway apparatus 3000 comprising six stiff regions 5000*a-f*, in accordance with aspects of the present inventive concepts. Alternative embodiments comprise a different number of stiff regions 5000.

Figure 35B:
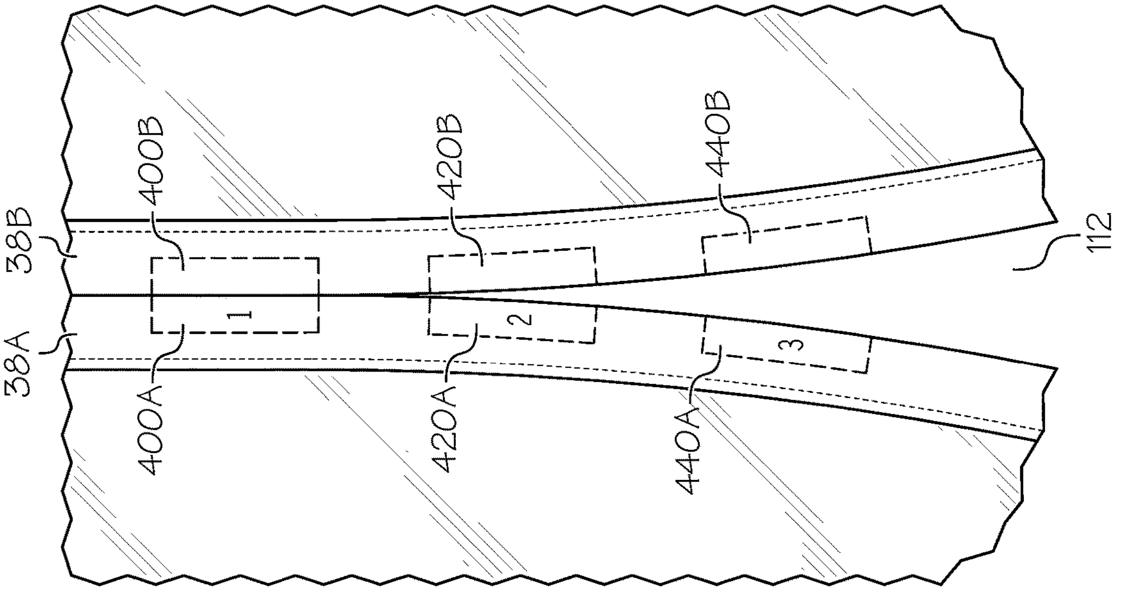
FIG. 35B is a front view of an alternative embodiment of an arrangement of magnets that may be employed in the entryway apparatus, in accordance with aspects of the present inventive concepts.
Figure 35A:
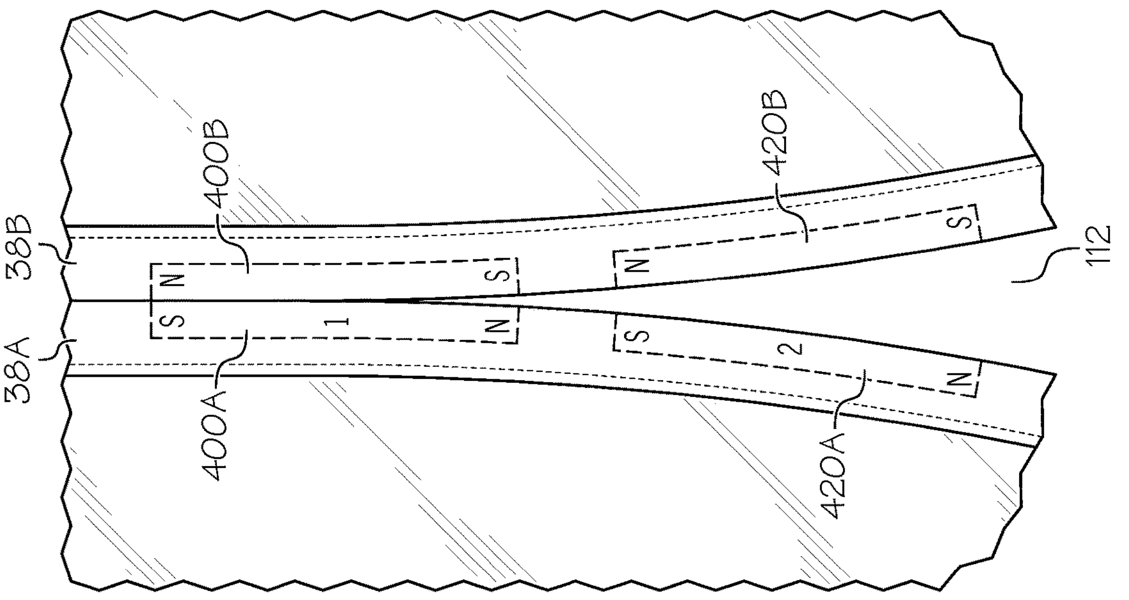
FIG. 35A is a front view of an alternative embodiment of an arrangement of magnets that may be employed at the entryway apparatus seams, in accordance with aspects of the present inventive concepts.

FIG. 35A is a front view of an alternative embodiment of an arrangement of magnets 400, 420 that may be employed at the entryway apparatus 3000 seams, in accordance with aspects of the present inventive concepts. In this embodiment, two different types of magnets 400, 420 are used, with the magnitude of the force between the first set of magnets 400A-B being greater than the magnitude of the force between the second set of magnets 420A-B. In some embodiments, the magnitude of the force between the second set of magnets 420A-B is greater than the magnitude of the force between the first set of magnets 400A-B. The magnets with the weaker force between them will be easier to separate, facilitating easier seam separation. The magnets with the stronger force between them may recouple more easily, facilitating easier seam recoupling. In some embodiments, any of the patterns of magnet pairs 400, 420 repeats along the length of the opening 112.

FIG. 35B is a front view of an alternative embodiment of an arrangement of magnets 400, 420, 440 that may be employed in the entryway apparatus 3000, in accordance with aspects of the present inventive concepts. In this embodiment, three different types of magnets 400, 420, 440 are used, with the magnitude of the force between the first set of magnets 400A-B being greater than the magnitude of the force between the second set of magnets 420A-B and the magnitude of the force between the third set of magnets 440A-B. The magnitude of the force between the second set of magnets 420A-B is greater than and the magnitude of the force between the third set of magnets 440A-B. In alternative embodiments, the arrangement of the magnet pairs differs. In some cases, the magnets with the greatest force between then are below those with a weaker force between them. In some embodiments, any of the patterns of magnet pairs 400, 420 repeats along the length of the opening 112.

FIG. 35C1 is a perspective view of an embodiment of a support 3200 comprising a hook that comprises a first leg L1 and a second leg L2, in accordance with aspects of the present inventive concepts. In this embodiment, the first leg L1 and the second leg L2 extend in directions that are transverse to each other. In this embodiment, a lower surface of the second leg L2 comprises a contact portion 3220 constructed and arranged to make contact with an upper edge of a door frame 2200. In this embodiment, the first leg L1 comprises a base 3240 constructed and arranged to couple to the sheet of material. In this embodiment, the base 3240 and the contact portion 3220 are rigidly coupled to each other.

FIG. 35C2 is a perspective view of an embodiment of a support 3200 comprising a hook that is arcuate, in accordance with aspects of the present inventive concepts.

FIG. 35C3 is a perspective view of an embodiment of a support 3200 comprising a hook that comprises a first leg L1, a second leg L2, and a third leg L3, in accordance with aspects of the present inventive concepts. In this embodiment, each leg extends in a direction that is transverse relative to its neighboring leg. In this embodiment, the third leg L3 comprises a contact portion 3220 constructed and arranged to make contact with an upper edge of a door frame 2200. In this embodiment, the first leg L1 comprises a base 3240 constructed and arranged to couple to the sheet of material. In this embodiment, the base 3240 and the contact portion 3220 are rigidly coupled to each other.

FIG. 35C4 is a perspective view of an embodiment of a support 3200 comprising a hook that comprises a first leg L1, a second leg L2, a third leg L3, and a hinge H1 between the first leg L1 and the second leg L2, in accordance with aspects of the present inventive concepts. In this embodiment, each leg extends in a direction that is transverse relative to its neighboring leg. In this embodiment, the third leg L3 comprises a contact portion 3220 constructed and arranged to make contact with an upper edge of a door frame 2200. In this embodiment, the first leg L1 comprises a base 3240 constructed and arranged to couple to the sheet of material. In this embodiment, the base 3240 and the contact portion 3220 are hinged relative to each other.

Figure 36A:
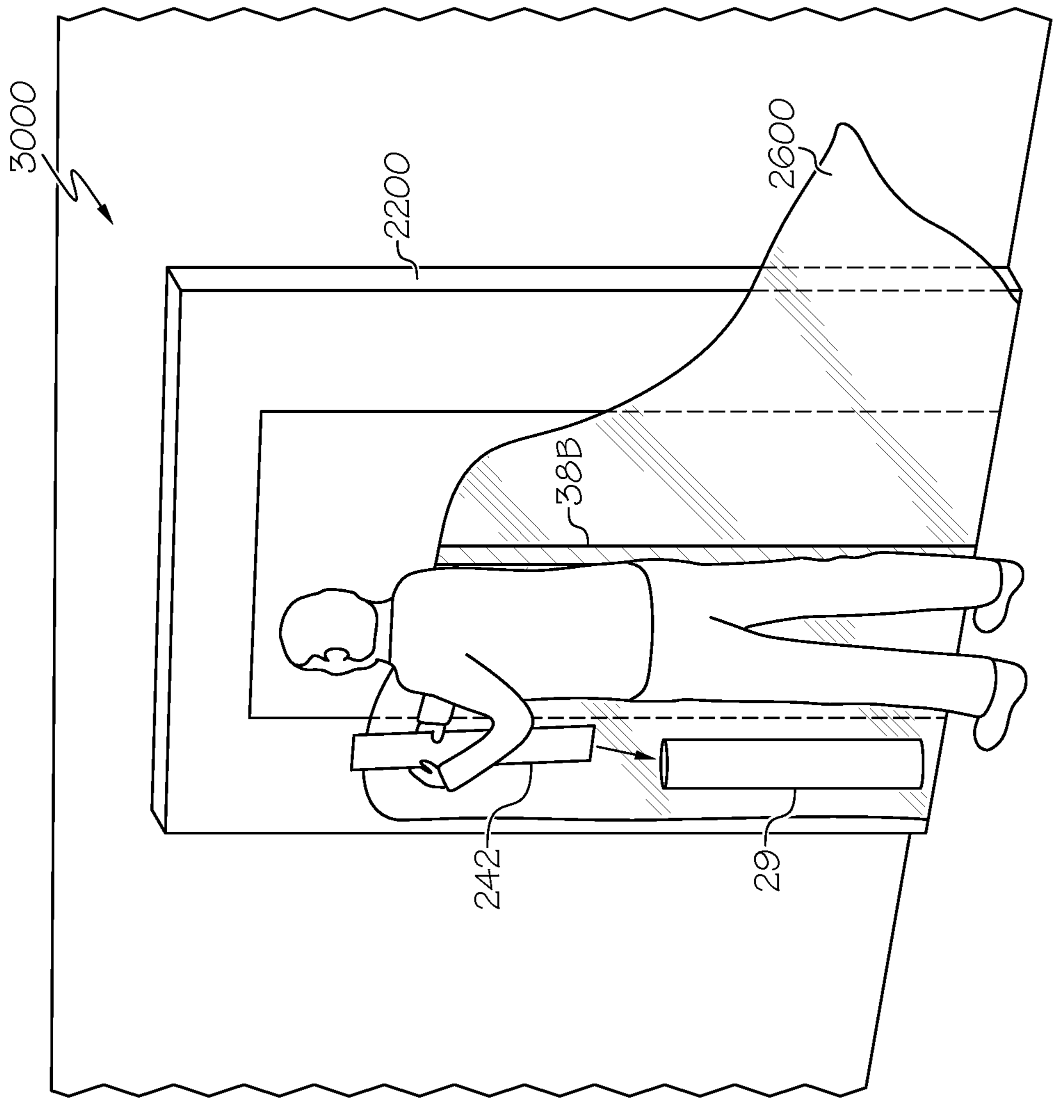
FIG. 36A is a perspective view of a portion of a method of assembling an embodiment of an entryway apparatus, in accordance with aspects of the present inventive concepts.
Figure 36B:
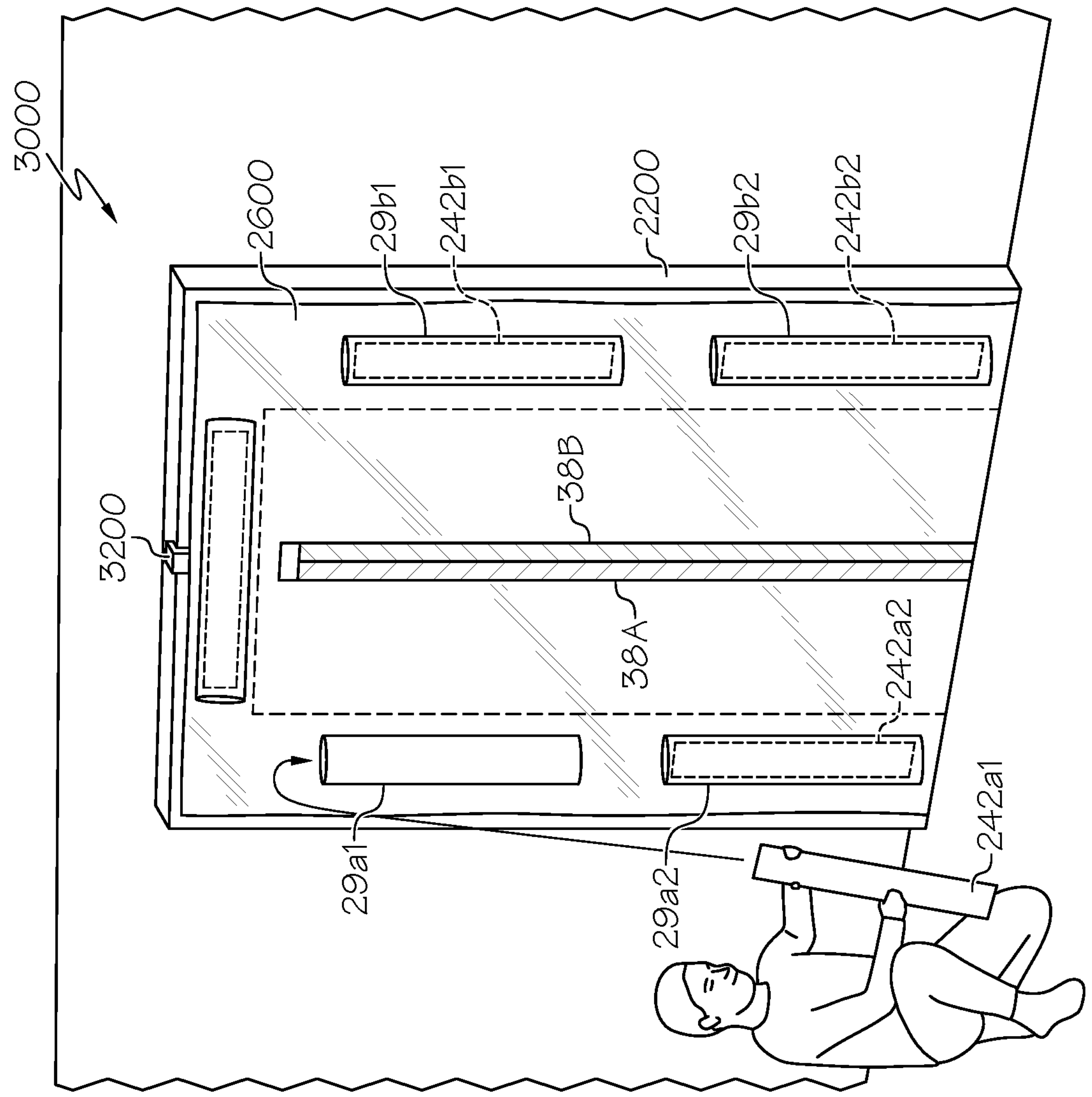
FIG. 36B is a perspective view of a portion of a method of assembling an embodiment of an entryway apparatus, in accordance with aspects of the present inventive concepts.
Figure 36C:
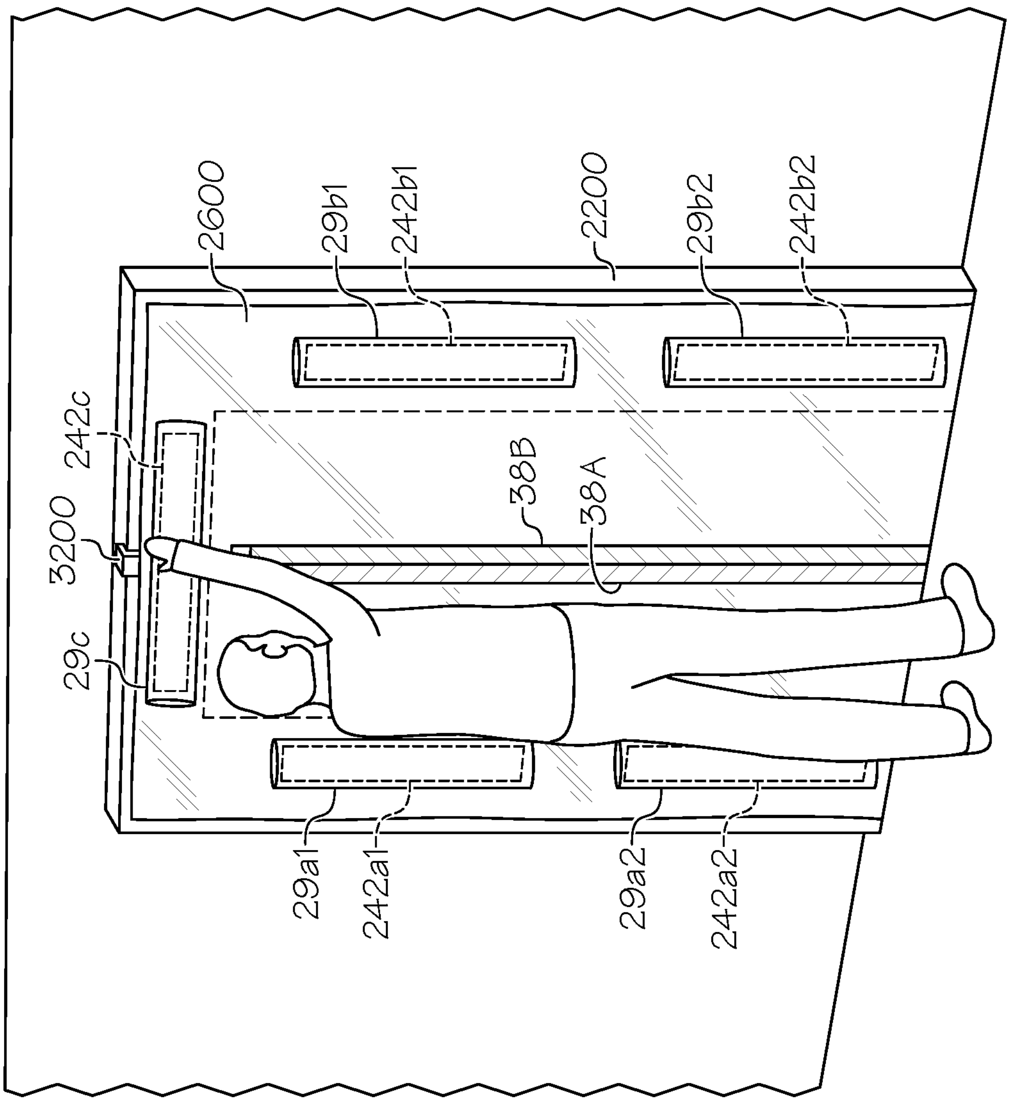
FIG. 36C is a perspective view of a portion of a method of assembling an embodiment of an entryway apparatus, in accordance with aspects of the present inventive concepts.

FIG. 36A-C are perspective views of an embodiment of a method of assembling an entryway apparatus 3000, in accordance with aspects of the present inventive concepts. In this embodiment, the entryway apparatus 3000 comprises a sheet of material 2600, the sheet of material 2600 comprising a top edge 2610; a bottom edge 2630, a left edge 2640; and a right edge 2620, the top edge 2610, bottom edge 2630, left edge 2640, and right edge 2620 defining a plane. The apparatus 3000 also comprises an opening extending from a position below the top edge 2610 to the bottom edge 2630, the opening comprising a left seam 38A and a right seam 38B, a first magnet positioned at the left seam 38A of the opening, and a second magnet positioned at the right seam 38B of the opening, wherein the first and second magnets are magnetically coupled. The apparatus comprises a first strap sleeve 29 positioned at a first side of the opening. The apparatus comprises a support 3200 above the opening, the support 3200 including a contact portion 3220, the contact portion 3220 extending in a direction transverse to the plane of the sheet of material 2600. The apparatus comprises at least one strap 242 constructed and arranged to fit in the first strap sleeve 29.

In this embodiment, the user inserts the strap portion 242 into the first strap sleeve 29. In this embodiment, the user mounts the first strap sleeve 29 to at least a portion of a door frame 2200. In this embodiment the user mounts the support 3200 to the door frame 2200.

FIG. 36A is a perspective view of a portion of a method of assembling an embodiment of an entryway apparatus 3000, in accordance with aspects of the present inventive concepts. In FIG. 36A, a user is inserting a strap portion 242 into a strap sleeve 29.

FIG. 36B is a perspective view of a portion of a method of assembling an embodiment of an entryway apparatus 3000, in accordance with aspects of the present inventive concepts. In FIG. 36B, a user is preparing to insert a strap portion 242 into a strap sleeve 29*a*1.

FIG. 36C is a perspective view of a portion of a method of assembling an embodiment of an entryway apparatus 3000, in accordance with aspects of the present inventive concepts. In FIG. 36C a user mounting a support 3200 to a door frame 2200.

Figure 36D:
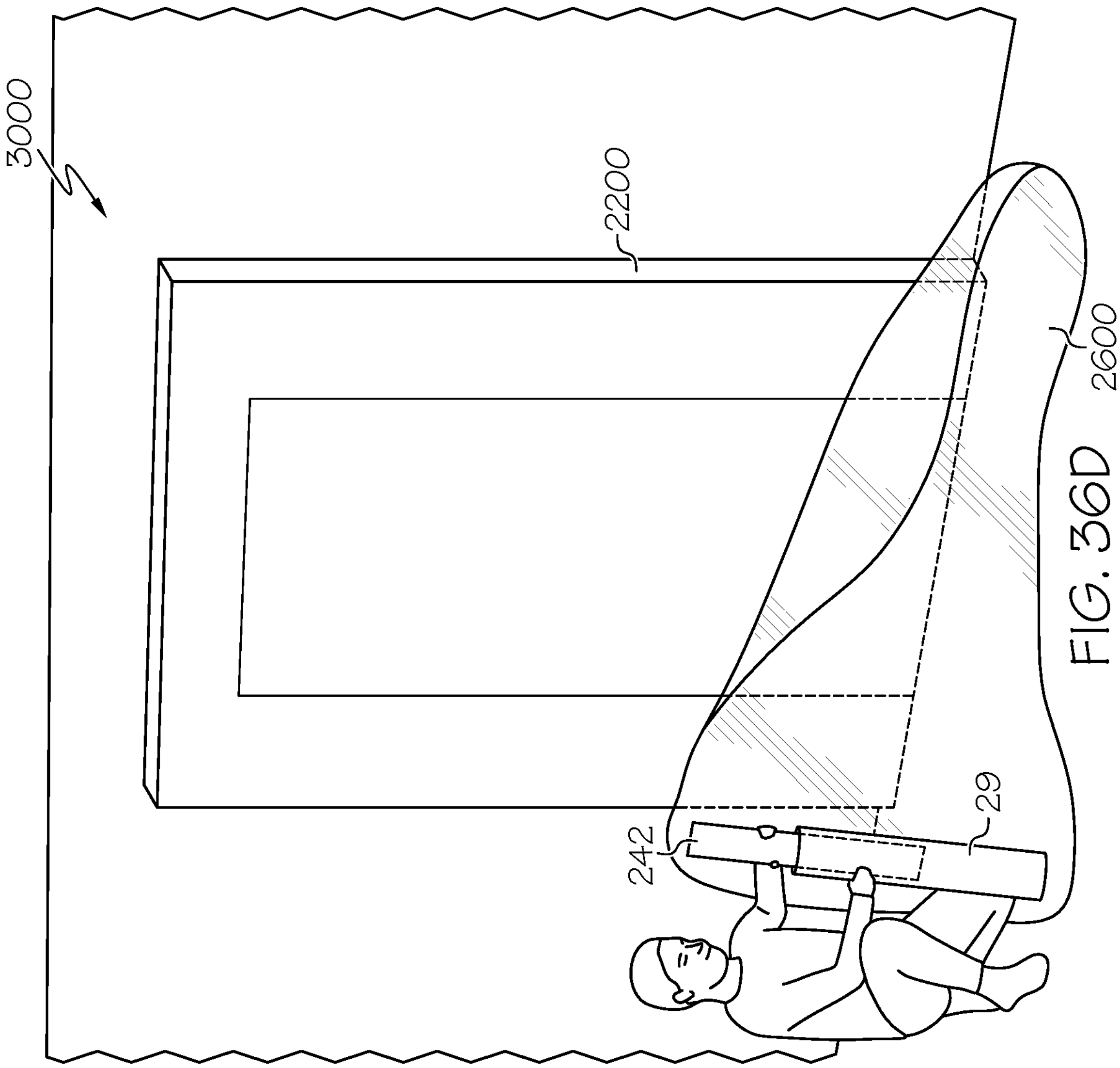
FIG. 36D is a perspective view of a portion of a method of assembling an embodiment of an entryway apparatus, in accordance with aspects of the present inventive concepts.

FIG. 36D is a perspective view of a portion of a method of assembling an embodiment of an entryway apparatus 3000, in accordance with aspects of the present inventive concepts. In FIG. 36D a user is inserting a strap portion 242 into a strap sleeve 29.

Figure 36E:
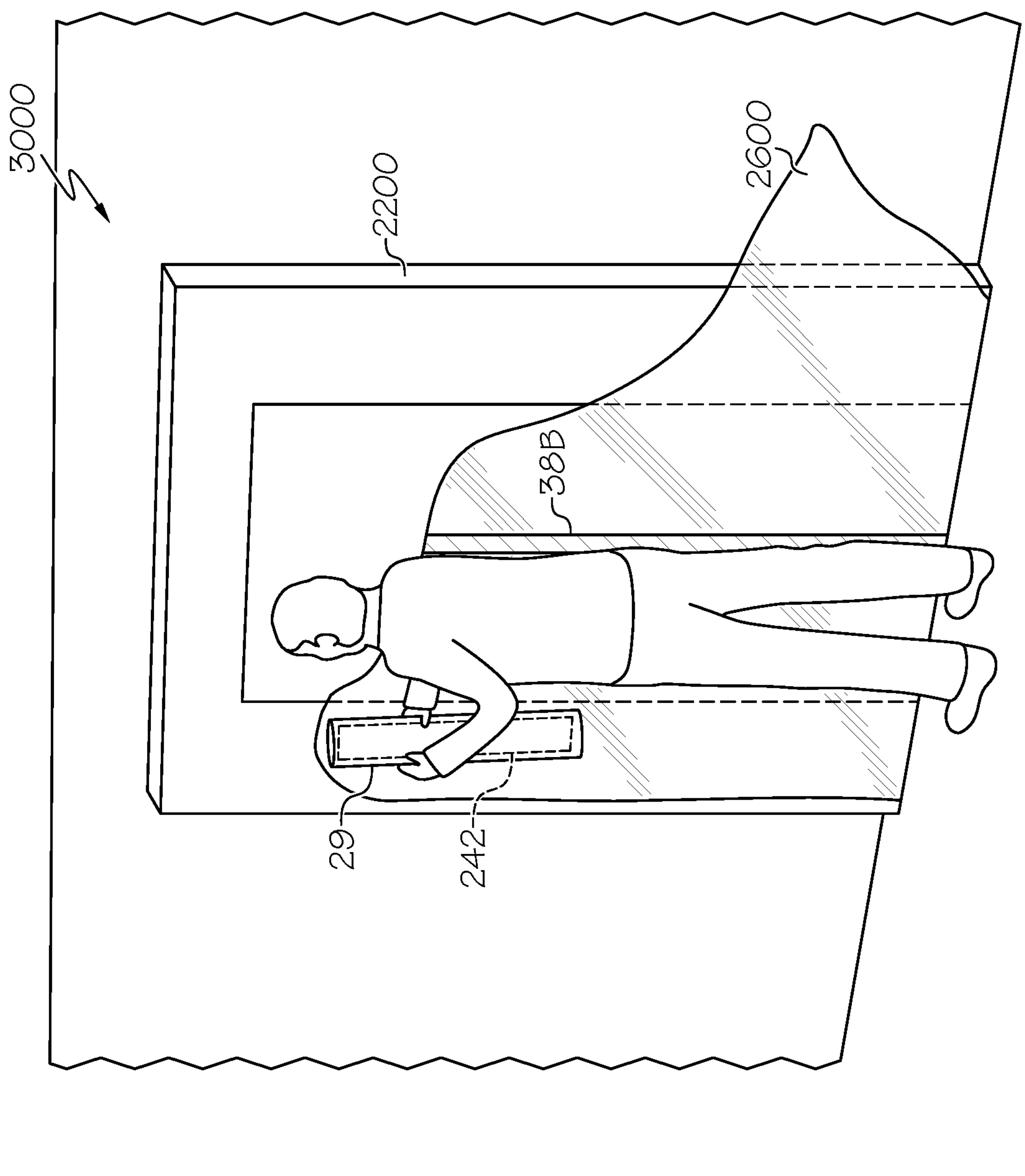
FIG. 36E is a perspective view of a portion of a method of assembling an embodiment of an entryway apparatus, in accordance with aspects of the present inventive concepts.

FIG. 36E is a perspective view of a portion of a method of assembling an embodiment of an entryway apparatus 3000, in accordance with aspects of the present inventive concepts. In FIG. 36E a user is mounting a strap sleeve to a portion of a door frame 2200.

While the present inventive concepts have been particularly shown and described above with reference to example embodiments thereof, it will be understood by those of ordinary skill in the art, that various changes in form and detail can be made without departing from the spirit and scope of the present inventive concepts described and defined by the following claims.

What is claimed is:

1. An entryway apparatus, comprising:

a sheet of material, comprising a top edge, a bottom edge, a left edge and a right edge, wherein the top edge, the bottom edge, the left edge, and the right edge define a plane;

an opening extending from a position that is below the top edge and above the bottom edge and extending to the bottom edge, the opening comprising a left seam at a first side of the opening and a right seam at a second side of the opening opposite the first side, a first magnet positioned at the left seam, and a second magnet positioned at the right seam, wherein the first and second magnets are magnetically coupled to each other; and a support above the opening, the support including a contact portion, the contact portion extending in a direction transverse to the plane of the sheet of material, wherein the support is constructed and arranged to be supported by an upper edge of a door frame in contact with the contact portion, and wherein the support comprises a base coupled to the sheet of material directly above the opening.

2. The apparatus of claim 1 wherein the support is coupled to the sheet of material at the top edge.

3. The apparatus of claim 1, wherein the base and the contact portion are rigidly coupled to each other.

4. The apparatus of claim 1, wherein the base and the contact portion are hinged relative to each other.

5. The apparatus of claim 1 wherein the contact portion comprises a magnet.

6. The apparatus of claim 1 wherein the support is coupled to an elongated support member positioned above the opening.

7. The apparatus of claim 1, further comprising a bottom left extender and a bottom right extender, each constructed and arranged to couple to the sheet of material and extend dimensions of the sheet of material in a region proximal the bottom edge of the sheet of material.

8. The apparatus of claim 1 wherein the support is coupled to the sheet of material in a region of the sheet of material spaced apart from the top edge.

9. The apparatus of claim 1, wherein the support comprises a hook.

10. The apparatus of claim 9 wherein the hook is arcuate.

11. The apparatus of claim 9 wherein the hook includes first and second legs that are transverse each other.

12. The apparatus of claim 11 wherein the hook further includes a third leg that is transverse the second leg.

13. The apparatus of claim 1 further comprising a first strap sleeve positioned at a first side of the opening; and a second strap sleeve positioned at a second side of the opening opposite the first side of the opening, the second strap sleeve spaced apart from and parallel to the first strap sleeve, wherein the first and second strap sleeves are each constructed and arranged to receive an elongated magnetic strap.

14. The apparatus of claim 13, further comprising at least one strap portion, wherein each of the at least one strap portion is constructed and arranged to fit in a corresponding one of the first or second strap sleeves.

15. The apparatus of claim 14, wherein at least one of the at least one strap portion comprises a magnet.

16. The apparatus of claim 13, wherein the first strap sleeve extends in a first axis of extension and the second strap sleeve extends in a second axis of extension; and the apparatus further comprising a third strap sleeve positioned above the opening, the third strap sleeve extending in a third axis of extension, the third axis of extension orthogonal to the first axis of extension and the third axis of extension orthogonal to the second axis of extension.

17. The apparatus of claim 16, further comprising at least one strap portion, wherein the at least one strap portion is constructed and arranged to fit in the third strap sleeve.

18. The apparatus of claim 17, wherein at least one of the at least one strap portion comprises a magnet.

* * * * *